(12) United States Patent
Dakin et al.

(10) Patent No.: US 9,830,048 B2
(45) Date of Patent: Nov. 28, 2017

(54) DEVICES AND METHODS FOR PROCESSING TOUCH INPUTS WITH INSTRUCTIONS IN A WEB PAGE

(71) Applicant: Apple Inc., Cupertino, CA (US)

(72) Inventors: Beth M. Dakin, San Jose, CA (US); Dean R. Jackson, Holt (AU); Samuel M. Weinig, San Francisco, CA (US); Jonathan J. Lee, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/866,489

(22) Filed: Sep. 25, 2015

(65) Prior Publication Data

US 2016/0357389 A1    Dec. 8, 2016

Related U.S. Application Data

(60) Provisional application No. 62/184,816, filed on Jun. 25, 2015, provisional application No. 62/172,187, filed on Jun. 7, 2015.

(51) Int. Cl.
*G06F 3/0488* (2013.01)
*G06F 3/0482* (2013.01)
(Continued)

(52) U.S. Cl.
CPC .......... *G06F 3/0482* (2013.01); *G06F 3/0483* (2013.01); *G06F 3/0484* (2013.01); *G06F 3/04883* (2013.01)

(58) Field of Classification Search
CPC ........................... G06F 3/0488; G06F 3/04812
See application file for complete search history.

(56) References Cited

U.S. PATENT DOCUMENTS 5,374,787 A    12/1994 Miller et al.
5,463,722 A    10/1995 Venolia
(Continued)

FOREIGN PATENT DOCUMENTS

CN          1808362 A    7/2006
CN        101222704 A    7/2008
(Continued)

OTHER PUBLICATIONS

Agarwal, "How to Copy and Paste Text on Window Phone 8," Guiding Tech, http://web.archive.org/web20130709204246/http://www.guidingtech.com/20280/copy-paste-text-windows-phone-8/, Jul. 9, 2013, 10 pages.
(Continued)

*Primary Examiner* — Jung-Mu Chuang
(74) *Attorney, Agent, or Firm* — Morgan, Lewis & Bockius LLP

(57) ABSTRACT

An electronic device, while displaying a user interface that corresponds to at least a portion of a web page on a display, detects a touch input on a touch-sensitive surface at a first location that corresponds to the displayed portion of the web page on the display. While detecting the touch input on the touch-sensitive surface, the electronic device detects an intensity of the touch input on the touch-sensitive surface, determines whether the intensity of the touch input on the touch-sensitive surface has changed from below a first intensity threshold to above the first intensity threshold, and in response to determining that the intensity of the touch input on the touch-sensitive surface has changed from below the first intensity threshold to above the first intensity threshold, generates a force down event that is distinct from a mouse down event.

45 Claims, 49 Drawing Sheets

(51) Int. Cl.
*G06F 3/0483* (2013.01)
*G06F 3/0484* (2013.01)

(56) References Cited

U.S. PATENT DOCUMENTS

| | | | |
|---|---|---|---|
| 5,510,813 A * | 4/1996 | Makinwa | G06F 3/041 341/33 |
| 5,555,354 A | 9/1996 | Strasnick et al. | |
| 5,559,301 A | 9/1996 | Bryan, Jr. et al. | |
| 5,710,896 A | 1/1998 | Seidl | |
| 5,793,360 A * | 8/1998 | Fleck | G06F 3/023 178/19.01 |
| 5,793,377 A | 8/1998 | Moore | |
| 5,801,692 A | 9/1998 | Muzio et al. | |
| 5,805,144 A | 9/1998 | Scholder et al. | |
| 5,809,267 A | 9/1998 | Moran et al. | |
| 5,825,352 A | 10/1998 | Bisset et al. | |
| 5,844,560 A | 12/1998 | Crutcher et al. | |
| 5,872,922 A | 2/1999 | Hogan et al. | |
| 5,946,647 A | 8/1999 | Miller et al. | |
| 6,002,397 A | 12/1999 | Jaaskelainen, Jr. | |
| 6,031,989 A | 2/2000 | Cordell | |
| 6,088,019 A | 7/2000 | Rosenberg | |
| 6,088,027 A | 7/2000 | Konar et al. | |
| 6,111,575 A | 8/2000 | Martinez et al. | |
| 6,208,329 B1 | 3/2001 | Ballare | |
| 6,208,340 B1 | 3/2001 | Amin et al. | |
| 6,219,034 B1 | 4/2001 | Elbing et al. | |
| 6,243,080 B1 | 6/2001 | Molne | |
| 6,252,594 B1 | 6/2001 | Xia et al. | |
| 6,396,523 B1 | 5/2002 | Segal et al. | |
| 6,429,846 B2 | 8/2002 | Rosenberg et al. | |
| 6,448,977 B1 | 9/2002 | Braun et al. | |
| 6,459,442 B1 | 10/2002 | Edwards et al. | |
| 6,563,487 B2 | 5/2003 | Martin et al. | |
| 6,567,102 B2 | 5/2003 | Kung | |
| 6,583,798 B1 | 6/2003 | Hoek et al. | |
| 6,590,568 B1 | 7/2003 | Astala et al. | |
| 6,661,438 B1 | 12/2003 | Shiraishi et al. | |
| 6,735,307 B1 | 5/2004 | Volckers | |
| 6,750,890 B1 | 6/2004 | Sugimoto | |
| 6,822,635 B2 | 11/2004 | Shahoian et al. | |
| 6,919,927 B1 | 7/2005 | Hyodo | |
| 7,138,983 B2 | 11/2006 | Wakai et al. | |
| 7,312,791 B2 | 12/2007 | Hoshino et al. | |
| 7,411,575 B2 | 8/2008 | Hill et al. | |
| 7,479,949 B2 | 1/2009 | Jobs et al. | |
| 7,533,352 B2 | 5/2009 | Chew et al. | |
| 7,577,530 B2 | 8/2009 | Vignalou-Marche | |
| 7,614,008 B2 | 11/2009 | Ording | |
| 7,619,616 B2 | 11/2009 | Rimas Ribikauskas et al. | |
| 7,656,413 B2 | 2/2010 | Khan et al. | |
| 7,683,889 B2 | 3/2010 | Ribikauskas et al. | |
| 7,743,348 B2 | 6/2010 | Robbins et al. | |
| 7,760,187 B2 | 7/2010 | Kennedy | |
| 7,787,026 B1 | 8/2010 | Flory et al. | |
| 7,797,642 B1 | 9/2010 | Karam et al. | |
| 7,801,950 B2 | 9/2010 | Eisenstadt et al. | |
| 7,812,826 B2 | 10/2010 | Ording et al. | |
| 7,890,862 B2 | 2/2011 | Kompe et al. | |
| 7,903,090 B2 | 3/2011 | Soss et al. | |
| 7,952,566 B2 | 5/2011 | Poupyrev et al. | |
| 7,956,847 B2 | 6/2011 | Christie | |
| 7,973,778 B2 | 7/2011 | Chen | |
| 8,040,142 B1 * | 10/2011 | Bokma | H03K 17/955 324/658 |
| 8,106,856 B2 | 1/2012 | Matas et al. | |
| 8,125,440 B2 * | 2/2012 | Guyot-Sionnest | G06F 3/014 345/156 |
| RE43,448 E | 6/2012 | Kimoto et al. | |
| 8,209,628 B1 | 6/2012 | Davidson | |
| 8,363,020 B2 | 1/2013 | Li et al. | |
| 8,390,583 B2 | 3/2013 | Forutanpour et al. | |
| 8,423,089 B2 | 4/2013 | Song et al. | |
| 8,446,376 B2 | 5/2013 | Levy et al. | |
| 8,456,431 B2 | 6/2013 | Victor | |
| 8,466,889 B2 | 6/2013 | Tong et al. | |
| 8,508,494 B2 | 8/2013 | Moore | |
| 8,542,205 B1 | 9/2013 | Keller | |
| 8,581,870 B2 | 11/2013 | Bokma et al. | |
| 8,587,542 B2 | 11/2013 | Moore | |
| 8,593,415 B2 | 11/2013 | Han et al. | |
| 8,625,882 B2 | 1/2014 | Backlund et al. | |
| 8,638,311 B2 * | 1/2014 | Kang | G06F 3/041 345/173 |
| 8,665,227 B2 | 3/2014 | Gunawan | |
| 8,669,945 B2 | 3/2014 | Coddington | |
| 8,698,765 B1 | 4/2014 | Keller | |
| 8,717,305 B2 * | 5/2014 | Williamson | G06F 3/04883 345/156 |
| 8,743,069 B2 | 6/2014 | Morton et al. | |
| 8,773,389 B1 | 7/2014 | Freed | |
| 8,793,577 B2 | 7/2014 | Schellingerhout et al. | |
| 8,799,816 B2 | 8/2014 | Wells et al. | |
| 8,854,316 B2 | 10/2014 | Shenfield | |
| 8,872,729 B2 * | 10/2014 | Lyons | G04G 17/083 345/1.1 |
| 8,872,773 B2 * | 10/2014 | Mak | G06F 3/0488 345/157 |
| 8,875,044 B2 | 10/2014 | Ozawa et al. | |
| 8,914,732 B2 | 12/2014 | Jun et al. | |
| 8,952,987 B2 | 2/2015 | Momeyer et al. | |
| 8,959,430 B1 | 2/2015 | Spivak et al. | |
| 8,976,128 B2 | 3/2015 | Moore | |
| 9,026,932 B1 | 5/2015 | Dixon | |
| 9,030,419 B1 | 5/2015 | Freed | |
| 9,030,436 B2 | 5/2015 | Ikeda | |
| 9,069,460 B2 | 6/2015 | Moore | |
| 9,086,755 B2 | 7/2015 | Cho et al. | |
| 9,092,058 B2 * | 7/2015 | Kasahara | G06F 3/016 |
| 9,098,188 B2 | 8/2015 | Kim | |
| 9,116,571 B2 * | 8/2015 | Zeliff | G06F 3/044 |
| 9,122,364 B2 | 9/2015 | Kuwabara et al. | |
| 9,148,618 B2 | 9/2015 | Matas et al. | |
| 9,164,779 B2 * | 10/2015 | Brakensiek | G06F 9/4445 |
| 9,170,607 B2 * | 10/2015 | Bose | G01S 5/0072 |
| 9,218,105 B2 * | 12/2015 | Masson | G06F 3/0482 |
| 9,244,562 B1 | 1/2016 | Rosenberg et al. | |
| 9,244,576 B1 | 1/2016 | Vadagave et al. | |
| 9,244,601 B2 | 1/2016 | Kim et al. | |
| 9,246,487 B2 | 1/2016 | Casparian et al. | |
| 9,262,002 B2 | 2/2016 | Momeyer et al. | |
| 9,304,668 B2 | 4/2016 | Rezende et al. | |
| 9,307,112 B2 | 4/2016 | Molgaard et al. | |
| 9,349,552 B2 | 5/2016 | Huska et al. | |
| 9,361,018 B2 | 6/2016 | Defazio et al. | |
| 9,389,718 B1 | 7/2016 | Letourneur | |
| 9,389,722 B2 | 7/2016 | Matsuki et al. | |
| 9,400,581 B2 | 7/2016 | Bokma et al. | |
| 9,405,367 B2 | 8/2016 | Jung et al. | |
| 9,417,754 B2 | 8/2016 | Smith | |
| 9,436,344 B2 | 9/2016 | Kuwabara et al. | |
| 9,471,145 B2 | 10/2016 | Langlois et al. | |
| 9,477,393 B2 | 10/2016 | Zambetti et al. | |
| 9,542,013 B2 * | 1/2017 | Dearman | G06F 3/017 |
| 9,600,114 B2 | 3/2017 | Milam et al. | |
| 9,600,116 B2 | 3/2017 | Tao et al. | |
| 2001/0024195 A1 | 9/2001 | Hayakawa et al. | |
| 2001/0045965 A1 | 11/2001 | Orbanes et al. | |
| 2002/0008691 A1 | 1/2002 | Hanajima et al. | |
| 2002/0015064 A1 * | 2/2002 | Robotham | G06F 3/0481 715/863 |
| 2002/0109678 A1 | 8/2002 | Marmolin et al. | |
| 2002/0140680 A1 | 10/2002 | Lu | |
| 2002/0180763 A1 | 12/2002 | Kung | |
| 2003/0001869 A1 | 1/2003 | Nissen | |
| 2003/0086496 A1 | 5/2003 | Zhang et al. | |
| 2003/0151589 A1 | 8/2003 | Bensen et al. | |
| 2003/0184574 A1 | 10/2003 | Phillips et al. | |
| 2003/0189647 A1 | 10/2003 | Kang | |
| 2003/0206169 A1 | 11/2003 | Springer et al. | |
| 2003/0222915 A1 | 12/2003 | Marion et al. | |
| 2004/0021643 A1 | 2/2004 | Hoshino et al. | |
| 2004/0056849 A1 | 3/2004 | Lohbihler et al. | |

(56) References Cited

U.S. PATENT DOCUMENTS

| | | |
|---|---|---|
| 2004/0108995 A1 | 6/2004 | Hoshino et al. |
| 2004/0138849 A1* | 7/2004 | Schmidt .............. G06F 3/0414 702/127 |
| 2004/0150631 A1* | 8/2004 | Fleck .................. G06F 3/038 345/179 |
| 2004/0150644 A1 | 8/2004 | Kincaid et al. |
| 2004/0174399 A1 | 9/2004 | Wu et al. |
| 2004/0219969 A1 | 11/2004 | Casey et al. |
| 2005/0012723 A1 | 1/2005 | Pallakoff |
| 2005/0110769 A1 | 5/2005 | DaCosta et al. |
| 2005/0125742 A1 | 6/2005 | Grotjohn et al. |
| 2005/0132297 A1 | 6/2005 | Milic-Frayling et al. |
| 2005/0134578 A1 | 6/2005 | Chambers et al. |
| 2005/0183017 A1 | 8/2005 | Cain |
| 2005/0190280 A1 | 9/2005 | Haas et al. |
| 2005/0204295 A1 | 9/2005 | Voorhees et al. |
| 2005/0223338 A1 | 10/2005 | Partanen |
| 2005/0229112 A1 | 10/2005 | Clay et al. |
| 2005/0289476 A1 | 12/2005 | Tokkonen |
| 2006/0022955 A1 | 2/2006 | Kennedy |
| 2006/0022956 A1 | 2/2006 | Lengeling et al. |
| 2006/0026536 A1 | 2/2006 | Hotelling et al. |
| 2006/0036971 A1* | 2/2006 | Mendel ................ G06F 9/4443 715/856 |
| 2006/0059436 A1 | 3/2006 | Nurmi |
| 2006/0067677 A1 | 3/2006 | Tokiwa et al. |
| 2006/0101347 A1 | 5/2006 | Runov et al. |
| 2006/0109252 A1 | 5/2006 | Kolmykov-Zotov et al. |
| 2006/0109256 A1 | 5/2006 | Grant et al. |
| 2006/0119586 A1 | 6/2006 | Grant et al. |
| 2006/0132455 A1 | 6/2006 | Rimas-Ribikauskas et al. |
| 2006/0132456 A1 | 6/2006 | Anson |
| 2006/0132457 A1 | 6/2006 | Rimas-Ribikauskas et al. |
| 2006/0136834 A1 | 6/2006 | Cao et al. |
| 2006/0136845 A1 | 6/2006 | Rimas-Ribikauskas et al. |
| 2006/0197753 A1 | 9/2006 | Hotelling |
| 2006/0212812 A1 | 9/2006 | Simmons et al. |
| 2006/0213754 A1 | 9/2006 | Jarrett et al. |
| 2006/0233248 A1 | 10/2006 | Rynderman et al. |
| 2006/0274042 A1* | 12/2006 | Krah .................. G06F 3/03543 345/163 |
| 2006/0277469 A1 | 12/2006 | Chaudhri et al. |
| 2006/0282778 A1 | 12/2006 | Barsness et al. |
| 2006/0284858 A1 | 12/2006 | Rekimoto |
| 2006/0290681 A1 | 12/2006 | Ho et al. |
| 2007/0024595 A1 | 2/2007 | Baker et al. |
| 2007/0024646 A1 | 2/2007 | Saarinen et al. |
| 2007/0080953 A1 | 4/2007 | Lii |
| 2007/0113681 A1 | 5/2007 | Nishimura et al. |
| 2007/0120835 A1 | 5/2007 | Sato |
| 2007/0124699 A1 | 5/2007 | Michaels |
| 2007/0168369 A1 | 7/2007 | Bruns |
| 2007/0168890 A1 | 7/2007 | Zhao et al. |
| 2007/0176904 A1 | 8/2007 | Russo |
| 2007/0186178 A1 | 8/2007 | Schiller |
| 2007/0222768 A1 | 9/2007 | Geurts et al. |
| 2007/0229455 A1 | 10/2007 | Martin et al. |
| 2007/0229464 A1 | 10/2007 | Hotelling et al. |
| 2007/0236450 A1 | 10/2007 | Colgate et al. |
| 2007/0236477 A1 | 10/2007 | Ryu et al. |
| 2007/0245241 A1 | 10/2007 | Bertram et al. |
| 2007/0257821 A1* | 11/2007 | Son .................... G06F 3/016 341/22 |
| 2007/0270182 A1 | 11/2007 | Gulliksson et al. |
| 2007/0294295 A1 | 12/2007 | Finkelstein et al. |
| 2008/0001924 A1 | 1/2008 | dos los Reyes et al. |
| 2008/0024459 A1* | 1/2008 | Poupyrev ............ G06F 3/016 345/173 |
| 2008/0034306 A1 | 2/2008 | Ording |
| 2008/0036743 A1 | 2/2008 | Westerman et al. |
| 2008/0051989 A1 | 2/2008 | Welsh |
| 2008/0052945 A1 | 3/2008 | Matas et al. |
| 2008/0066010 A1 | 3/2008 | Brodersen et al. |
| 2008/0094367 A1 | 4/2008 | Van De Ven et al. |
| 2008/0106523 A1 | 5/2008 | Conrad |
| 2008/0136790 A1 | 6/2008 | Hio |
| 2008/0155415 A1 | 6/2008 | Yoon et al. |
| 2008/0168395 A1 | 7/2008 | Ording et al. |
| 2008/0168403 A1 | 7/2008 | Westerman et al. |
| 2008/0202824 A1 | 8/2008 | Philipp et al. |
| 2008/0204427 A1 | 8/2008 | Heesemans et al. |
| 2008/0219493 A1 | 9/2008 | Tadmor |
| 2008/0222569 A1 | 9/2008 | Champion et al. |
| 2008/0259046 A1 | 10/2008 | Carsanaro |
| 2008/0263452 A1 | 10/2008 | Tomkins |
| 2008/0284866 A1 | 11/2008 | Mizutani |
| 2008/0294984 A1 | 11/2008 | Ramsay et al. |
| 2008/0297475 A1 | 12/2008 | Woolf et al. |
| 2008/0303799 A1 | 12/2008 | Schwesig et al. |
| 2008/0307359 A1 | 12/2008 | Louch et al. |
| 2008/0317378 A1 | 12/2008 | Steinberg et al. |
| 2008/0320419 A1 | 12/2008 | Matas et al. |
| 2009/0007017 A1 | 1/2009 | Anzures et al. |
| 2009/0046110 A1* | 2/2009 | Sadler ................ G06F 3/0488 345/660 |
| 2009/0058828 A1 | 3/2009 | Jiang et al. |
| 2009/0066668 A1 | 3/2009 | Kim et al. |
| 2009/0073118 A1 | 3/2009 | Yamaji et al. |
| 2009/0083665 A1 | 3/2009 | Anttila et al. |
| 2009/0085878 A1 | 4/2009 | Heubel et al. |
| 2009/0085881 A1 | 4/2009 | Keam |
| 2009/0085886 A1 | 4/2009 | Huang et al. |
| 2009/0100343 A1 | 4/2009 | Lee et al. |
| 2009/0102804 A1 | 4/2009 | Wong et al. |
| 2009/0102805 A1 | 4/2009 | Meijer et al. |
| 2009/0140985 A1 | 6/2009 | Liu |
| 2009/0158198 A1 | 6/2009 | Hayter et al. |
| 2009/0160793 A1 | 6/2009 | Rekimoto |
| 2009/0160814 A1 | 6/2009 | Li et al. |
| 2009/0167507 A1 | 7/2009 | Maenpaa |
| 2009/0167508 A1 | 7/2009 | Fadell et al. |
| 2009/0167704 A1 | 7/2009 | Terlizzi et al. |
| 2009/0169061 A1 | 7/2009 | Anderson et al. |
| 2009/0225037 A1* | 9/2009 | Williamson ........ G06F 3/04883 345/173 |
| 2009/0237374 A1 | 9/2009 | Li et al. |
| 2009/0247112 A1 | 10/2009 | Lundy et al. |
| 2009/0256947 A1 | 10/2009 | Ciurea et al. |
| 2009/0267906 A1 | 10/2009 | Schroderus |
| 2009/0282360 A1 | 11/2009 | Park et al. |
| 2009/0293009 A1 | 11/2009 | Meserth et al. |
| 2009/0303187 A1* | 12/2009 | Pallakoff ............. G06F 3/04886 345/169 |
| 2009/0307633 A1 | 12/2009 | Haughay, Jr. et al. |
| 2009/0322893 A1 | 12/2009 | Stallings et al. |
| 2010/0007926 A1 | 1/2010 | Imaizumi et al. |
| 2010/0011304 A1 | 1/2010 | Van Os |
| 2010/0013777 A1 | 1/2010 | Baudisch et al. |
| 2010/0017710 A1 | 1/2010 | Kim et al. |
| 2010/0026640 A1 | 2/2010 | Kim et al. |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0057235 A1 | 3/2010 | Wang et al. |
| 2010/0058231 A1 | 3/2010 | Duarte et al. |
| 2010/0070908 A1 | 3/2010 | Mori et al. |
| 2010/0073329 A1 | 3/2010 | Raman et al. |
| 2010/0083116 A1 | 4/2010 | Akifusa et al. |
| 2010/0085302 A1* | 4/2010 | Fairweather ........ G06F 3/03548 345/157 |
| 2010/0085314 A1 | 4/2010 | Kwok |
| 2010/0085317 A1 | 4/2010 | Park et al. |
| 2010/0088596 A1 | 4/2010 | Griffin et al. |
| 2010/0127983 A1 | 5/2010 | Irani et al. |
| 2010/0128002 A1 | 5/2010 | Stacy et al. |
| 2010/0138776 A1 | 6/2010 | Korhonen |
| 2010/0148999 A1 | 6/2010 | Casparian et al. |
| 2010/0149096 A1 | 6/2010 | Migos et al. |
| 2010/0156813 A1 | 6/2010 | Duarte et al. |
| 2010/0156818 A1 | 6/2010 | Burrough et al. |
| 2010/0156823 A1 | 6/2010 | Paleczny et al. |
| 2010/0156825 A1 | 6/2010 | Sohn et al. |
| 2010/0171713 A1 | 7/2010 | Kwok et al. |

(56) References Cited

U.S. PATENT DOCUMENTS

| | | |
|---|---|---|
| 2010/0175023 A1 | 7/2010 | Gatlin et al. |
| 2010/0180225 A1 | 7/2010 | Chiba et al. |
| 2010/0199227 A1 | 8/2010 | Xiao et al. |
| 2010/0211872 A1 | 8/2010 | Rolston et al. |
| 2010/0225604 A1 | 9/2010 | Homma et al. |
| 2010/0231534 A1 | 9/2010 | Chaudhri et al. |
| 2010/0235726 A1 | 9/2010 | Ording et al. |
| 2010/0235746 A1 | 9/2010 | Anzures |
| 2010/0271312 A1 | 10/2010 | Alameh et al. |
| 2010/0271500 A1 | 10/2010 | Park et al. |
| 2010/0289807 A1 | 11/2010 | Yu et al. |
| 2010/0302177 A1 | 12/2010 | Kim et al. |
| 2010/0302179 A1 | 12/2010 | Ahn et al. |
| 2010/0306702 A1 | 12/2010 | Warner |
| 2010/0308983 A1 | 12/2010 | Conte et al. |
| 2010/0309147 A1 | 12/2010 | Fleizach et al. |
| 2010/0313124 A1 | 12/2010 | Privault et al. |
| 2010/0313156 A1 | 12/2010 | Louch et al. |
| 2010/0313158 A1 | 12/2010 | Lee et al. |
| 2010/0313166 A1 | 12/2010 | Nakayama et al. |
| 2010/0315417 A1 | 12/2010 | Cho et al. |
| 2010/0315438 A1 | 12/2010 | Horodezky et al. |
| 2010/0321301 A1 | 12/2010 | Casparian et al. |
| 2010/0325578 A1 | 12/2010 | Mital et al. |
| 2011/0018695 A1* | 1/2011 | Bells ............... G06F 3/016 340/407.2 |
| 2011/0050588 A1 | 3/2011 | Li et al. |
| 2011/0050591 A1 | 3/2011 | Kim et al. |
| 2011/0050594 A1 | 3/2011 | Kim et al. |
| 2011/0050629 A1 | 3/2011 | Homma et al. |
| 2011/0050630 A1 | 3/2011 | Ikeda |
| 2011/0050653 A1 | 3/2011 | Miyazawa et al. |
| 2011/0054837 A1 | 3/2011 | Ikeda |
| 2011/0055135 A1 | 3/2011 | Dawson et al. |
| 2011/0057886 A1 | 3/2011 | Ng et al. |
| 2011/0057903 A1 | 3/2011 | Yamano et al. |
| 2011/0061029 A1 | 3/2011 | Yeh et al. |
| 2011/0063248 A1 | 3/2011 | Yoon |
| 2011/0069012 A1 | 3/2011 | Martensson |
| 2011/0069016 A1 | 3/2011 | Victor |
| 2011/0074697 A1 | 3/2011 | Rapp et al. |
| 2011/0080350 A1* | 4/2011 | Almalki ............ G06F 3/0414 345/173 |
| 2011/0084910 A1* | 4/2011 | Almalki ............ G06F 3/016 345/173 |
| 2011/0087983 A1 | 4/2011 | Shim |
| 2011/0093815 A1 | 4/2011 | Gobeil |
| 2011/0093817 A1 | 4/2011 | Song et al. |
| 2011/0107272 A1 | 5/2011 | Aguilar |
| 2011/0116716 A1 | 5/2011 | Kwon et al. |
| 2011/0141031 A1 | 6/2011 | McCullough et al. |
| 2011/0141052 A1 | 6/2011 | Bernstein et al. |
| 2011/0144777 A1 | 6/2011 | Firkins et al. |
| 2011/0145752 A1 | 6/2011 | Fagans |
| 2011/0145753 A1 | 6/2011 | Prakash |
| 2011/0145764 A1 | 6/2011 | Higuchi et al. |
| 2011/0149138 A1 | 6/2011 | Watkins |
| 2011/0163971 A1 | 7/2011 | Wagner et al. |
| 2011/0164042 A1 | 7/2011 | Chaudhri |
| 2011/0169765 A1 | 7/2011 | Aono |
| 2011/0175830 A1 | 7/2011 | Miyazawa et al. |
| 2011/0179368 A1 | 7/2011 | King et al. |
| 2011/0179381 A1 | 7/2011 | King |
| 2011/0181538 A1 | 7/2011 | Aono |
| 2011/0185299 A1 | 7/2011 | Hinckley et al. |
| 2011/0185300 A1 | 7/2011 | Hinckley et al. |
| 2011/0185316 A1 | 7/2011 | Reid et al. |
| 2011/0193809 A1 | 8/2011 | Walley et al. |
| 2011/0193881 A1 | 8/2011 | Rydenhag |
| 2011/0201387 A1 | 8/2011 | Paek et al. |
| 2011/0202834 A1 | 8/2011 | Mandryk et al. |
| 2011/0202853 A1 | 8/2011 | Mujkic |
| 2011/0205163 A1 | 8/2011 | Hinckley et al. |
| 2011/0209088 A1 | 8/2011 | Hinckley et al. |
| 2011/0209093 A1 | 8/2011 | Hinckley et al. |
| 2011/0209099 A1 | 8/2011 | Hinckley et al. |
| 2011/0210931 A1 | 9/2011 | Shai |
| 2011/0215914 A1 | 9/2011 | Edwards |
| 2011/0221684 A1 | 9/2011 | Rydenhag |
| 2011/0221776 A1 | 9/2011 | Shimotani et al. |
| 2011/0231789 A1 | 9/2011 | Bukurak et al. |
| 2011/0238690 A1 | 9/2011 | Arrasvuori et al. |
| 2011/0239110 A1 | 9/2011 | Garrett et al. |
| 2011/0242029 A1 | 10/2011 | Kasahara et al. |
| 2011/0246877 A1 | 10/2011 | Kwak et al. |
| 2011/0248948 A1 | 10/2011 | Griffin et al. |
| 2011/0252357 A1 | 10/2011 | Chaudhri |
| 2011/0252362 A1 | 10/2011 | Cho et al. |
| 2011/0258537 A1 | 10/2011 | Rives et al. |
| 2011/0263298 A1 | 10/2011 | Park |
| 2011/0267530 A1 | 11/2011 | Chun |
| 2011/0279381 A1 | 11/2011 | Tong et al. |
| 2011/0279395 A1 | 11/2011 | Kuwabara et al. |
| 2011/0279852 A1 | 11/2011 | Oda et al. |
| 2011/0285656 A1 | 11/2011 | Yaksick et al. |
| 2011/0285659 A1 | 11/2011 | Kuwabara et al. |
| 2011/0291951 A1 | 12/2011 | Tong |
| 2011/0296351 A1 | 12/2011 | Ewing, Jr. et al. |
| 2011/0304559 A1 | 12/2011 | Pasquero |
| 2011/0304577 A1 | 12/2011 | Brown et al. |
| 2011/0310049 A1 | 12/2011 | Homma et al. |
| 2012/0011437 A1 | 1/2012 | James et al. |
| 2012/0013541 A1 | 1/2012 | Boka et al. |
| 2012/0013542 A1 | 1/2012 | Shenfield |
| 2012/0019448 A1 | 1/2012 | Pitkanen et al. |
| 2012/0026110 A1 | 2/2012 | Yamano |
| 2012/0036556 A1 | 2/2012 | LeBeau et al. |
| 2012/0038580 A1 | 2/2012 | Sasaki |
| 2012/0044153 A1 | 2/2012 | Arrasvuori et al. |
| 2012/0056837 A1 | 3/2012 | Park et al. |
| 2012/0056848 A1 | 3/2012 | Yamano et al. |
| 2012/0062564 A1 | 3/2012 | Miyashita et al. |
| 2012/0062604 A1 | 3/2012 | Lobo |
| 2012/0066630 A1 | 3/2012 | Kim et al. |
| 2012/0066648 A1 | 3/2012 | Rolleston et al. |
| 2012/0081375 A1 | 4/2012 | Robert et al. |
| 2012/0084689 A1 | 4/2012 | Ledet et al. |
| 2012/0089932 A1 | 4/2012 | Kano et al. |
| 2012/0089951 A1 | 4/2012 | Cassidy |
| 2012/0096393 A1 | 4/2012 | Shim et al. |
| 2012/0098780 A1 | 4/2012 | Fujisawa et al. |
| 2012/0102437 A1 | 4/2012 | Worley et al. |
| 2012/0105358 A1 | 5/2012 | Momeyer et al. |
| 2012/0105367 A1* | 5/2012 | Son ................... G06F 3/0414 345/174 |
| 2012/0106852 A1 | 5/2012 | Khawand et al. |
| 2012/0113023 A1 | 5/2012 | Koch et al. |
| 2012/0126962 A1 | 5/2012 | Ujii et al. |
| 2012/0131495 A1 | 5/2012 | Goossens et al. |
| 2012/0139864 A1 | 6/2012 | Sleeman et al. |
| 2012/0146945 A1 | 6/2012 | Miyazawa et al. |
| 2012/0147052 A1 | 6/2012 | Homma et al. |
| 2012/0154328 A1 | 6/2012 | Kono |
| 2012/0159380 A1 | 6/2012 | Kocienda et al. |
| 2012/0169646 A1 | 7/2012 | Berkes et al. |
| 2012/0176403 A1 | 7/2012 | Cha et al. |
| 2012/0179967 A1 | 7/2012 | Hayes |
| 2012/0182226 A1 | 7/2012 | Tuli |
| 2012/0183271 A1 | 7/2012 | Forutanpour et al. |
| 2012/0206393 A1 | 8/2012 | Hillis et al. |
| 2012/0216114 A1 | 8/2012 | Privault et al. |
| 2012/0218203 A1 | 8/2012 | Kanki |
| 2012/0235912 A1* | 9/2012 | Laubach ............ G06F 3/04895 345/163 |
| 2012/0240044 A1 | 9/2012 | Johnson et al. |
| 2012/0249575 A1 | 10/2012 | Krolczyk et al. |
| 2012/0249853 A1 | 10/2012 | Krolczyk et al. |
| 2012/0256846 A1* | 10/2012 | Mak ................... G06F 3/0488 345/173 |
| 2012/0256847 A1* | 10/2012 | Mak ................... G06F 3/0488 345/173 |
| 2012/0256857 A1* | 10/2012 | Mak ................... G06F 3/0488 345/173 |
| 2012/0257071 A1 | 10/2012 | Prentice |

(56) References Cited

U.S. PATENT DOCUMENTS

| | | |
|---|---|---|
| 2012/0260220 A1* | 10/2012 | Griffin .................. G06F 3/033 715/863 |
| 2012/0274591 A1 | 11/2012 | Rimas-Ribikauskas et al. |
| 2012/0274662 A1 | 11/2012 | Kim et al. |
| 2012/0284673 A1 | 11/2012 | Lamb et al. |
| 2012/0293449 A1 | 11/2012 | Dietz |
| 2012/0293551 A1 | 11/2012 | Momeyer et al. |
| 2012/0304132 A1 | 11/2012 | Sareen et al. |
| 2012/0304133 A1 | 11/2012 | Nan et al. |
| 2012/0306748 A1 | 12/2012 | Fleizach et al. |
| 2012/0306764 A1 | 12/2012 | Kamibeppu |
| 2012/0306765 A1 | 12/2012 | Moore |
| 2012/0306766 A1 | 12/2012 | Moore |
| 2012/0306772 A1 | 12/2012 | Tan et al. |
| 2012/0306778 A1 | 12/2012 | Wheeldreyer et al. |
| 2012/0311429 A1 | 12/2012 | Decker et al. |
| 2012/0311437 A1 | 12/2012 | Weeldreyer et al. |
| 2012/0311498 A1 | 12/2012 | Kluttz et al. |
| 2013/0002561 A1 | 1/2013 | Wakasa |
| 2013/0016042 A1 | 1/2013 | Makinen et al. |
| 2013/0019158 A1 | 1/2013 | Watanabe |
| 2013/0019174 A1 | 1/2013 | Gil et al. |
| 2013/0044062 A1 | 2/2013 | Bose et al. |
| 2013/0047100 A1 | 2/2013 | Kroeger et al. |
| 2013/0050131 A1 | 2/2013 | Lee et al. |
| 2013/0061172 A1 | 3/2013 | Huang et al. |
| 2013/0063389 A1 | 3/2013 | Moore |
| 2013/0067383 A1 | 3/2013 | Kataoka et al. |
| 2013/0067513 A1 | 3/2013 | Takami |
| 2013/0077804 A1 | 3/2013 | Glebe et al. |
| 2013/0082824 A1 | 4/2013 | Colley |
| 2013/0093691 A1 | 4/2013 | Moosavi |
| 2013/0097520 A1* | 4/2013 | Lewin .................. G06F 9/4443 715/744 |
| 2013/0097521 A1* | 4/2013 | Lewin .................. G06F 9/4443 715/744 |
| 2013/0097534 A1* | 4/2013 | Lewin .................. G06F 8/38 715/762 |
| 2013/0097539 A1* | 4/2013 | M nsson .............. G06F 3/0482 715/765 |
| 2013/0097562 A1 | 4/2013 | Kermoian et al. |
| 2013/0113720 A1 | 5/2013 | Van Eerd et al. |
| 2013/0120295 A1 | 5/2013 | Kim et al. |
| 2013/0135243 A1 | 5/2013 | Hirsch et al. |
| 2013/0135499 A1 | 5/2013 | Song |
| 2013/0141364 A1 | 6/2013 | Lynn et al. |
| 2013/0141396 A1 | 6/2013 | Lynn et al. |
| 2013/0145313 A1 | 6/2013 | Roh et al. |
| 2013/0154948 A1 | 6/2013 | Schediwy et al. |
| 2013/0154959 A1 | 6/2013 | Lindsay et al. |
| 2013/0155018 A1 | 6/2013 | Dagdeviren |
| 2013/0159893 A1* | 6/2013 | Lewin .................. G06F 9/4443 715/762 |
| 2013/0162667 A1 | 6/2013 | Eskolin et al. |
| 2013/0169549 A1 | 7/2013 | Seymour et al. |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0191791 A1 | 7/2013 | Rydenhag et al. |
| 2013/0198690 A1 | 8/2013 | Barsoum et al. |
| 2013/0212541 A1 | 8/2013 | Dolenc et al. |
| 2013/0222274 A1 | 8/2013 | Mori et al. |
| 2013/0222671 A1 | 8/2013 | Tseng et al. |
| 2013/0227450 A1 | 8/2013 | Na et al. |
| 2013/0232402 A1* | 9/2013 | Lu .................. G06F 17/30861 715/234 |
| 2013/0234929 A1 | 9/2013 | Libin |
| 2013/0249814 A1 | 9/2013 | Zeng |
| 2013/0257793 A1* | 10/2013 | Zeliff .................. G06F 3/044 345/174 |
| 2013/0257817 A1 | 10/2013 | Yliaho |
| 2013/0265246 A1 | 10/2013 | Tae |
| 2013/0268875 A1 | 10/2013 | Han et al. |
| 2013/0278520 A1 | 10/2013 | Weng et al. |
| 2013/0325342 A1 | 12/2013 | Pylappan et al. |
| 2013/0326420 A1 | 12/2013 | Liu et al. |
| 2013/0326421 A1 | 12/2013 | Jo |
| 2013/0328770 A1 | 12/2013 | Parham |
| 2013/0332892 A1* | 12/2013 | Matsuki .............. G06F 3/0488 715/863 |
| 2013/0339909 A1 | 12/2013 | Ha |
| 2014/0002355 A1 | 1/2014 | Lee et al. |
| 2014/0002374 A1 | 1/2014 | Hunt et al. |
| 2014/0002386 A1 | 1/2014 | Rosenberg et al. |
| 2014/0026098 A1 | 1/2014 | Gilman |
| 2014/0028571 A1 | 1/2014 | St. Clair |
| 2014/0028601 A1 | 1/2014 | Moore |
| 2014/0049491 A1 | 2/2014 | Nagar et al. |
| 2014/0055367 A1* | 2/2014 | Dearman .............. G06F 3/0488 345/173 |
| 2014/0055377 A1 | 2/2014 | Kim |
| 2014/0059485 A1 | 2/2014 | Lehrian et al. |
| 2014/0063316 A1 | 3/2014 | Lee et al. |
| 2014/0078343 A1 | 3/2014 | Dai et al. |
| 2014/0082536 A1 | 3/2014 | Costa et al. |
| 2014/0092025 A1 | 4/2014 | Pala et al. |
| 2014/0109016 A1 | 4/2014 | Ouyang et al. |
| 2014/0111456 A1 | 4/2014 | Kashiwa et al. |
| 2014/0111670 A1 | 4/2014 | Lord et al. |
| 2014/0139471 A1 | 5/2014 | Matsuki |
| 2014/0152581 A1* | 6/2014 | Case .................. G06F 3/041 345/173 |
| 2014/0157203 A1 | 6/2014 | Jeon et al. |
| 2014/0160063 A1 | 6/2014 | Yairi et al. |
| 2014/0160073 A1 | 6/2014 | Matsuki |
| 2014/0165006 A1 | 6/2014 | Chaudhri et al. |
| 2014/0168093 A1 | 6/2014 | Lawrence |
| 2014/0168153 A1 | 6/2014 | Deichmann et al. |
| 2014/0173517 A1 | 6/2014 | Chaudhri |
| 2014/0184526 A1 | 7/2014 | Cho |
| 2014/0210758 A1 | 7/2014 | Park et al. |
| 2014/0210798 A1* | 7/2014 | Wilson .................. G06F 3/0414 345/179 |
| 2014/0245202 A1 | 8/2014 | Yoon et al. |
| 2014/0267114 A1 | 9/2014 | Lisseman et al. |
| 2014/0267135 A1 | 9/2014 | Chhabra |
| 2014/0282084 A1 | 9/2014 | Murarka et al. |
| 2014/0282214 A1 | 9/2014 | Shirzadi et al. |
| 2014/0300569 A1 | 10/2014 | Matsuki et al. |
| 2014/0304651 A1 | 10/2014 | Johansson et al. |
| 2014/0306897 A1 | 10/2014 | Cueto |
| 2014/0306899 A1 | 10/2014 | Hicks |
| 2014/0310638 A1 | 10/2014 | Lee et al. |
| 2014/0313130 A1* | 10/2014 | Yamano .............. G06F 3/0488 345/157 |
| 2014/0333561 A1 | 11/2014 | Bull et al. |
| 2014/0344765 A1 | 11/2014 | Hicks et al. |
| 2014/0354845 A1 | 12/2014 | Molgaard et al. |
| 2014/0354850 A1 | 12/2014 | Kosaka et al. |
| 2014/0359528 A1 | 12/2014 | Murata |
| 2014/0380247 A1 | 12/2014 | Tecarro et al. |
| 2015/0015763 A1 | 1/2015 | Lee et al. |
| 2015/0020036 A1 | 1/2015 | Kim et al. |
| 2015/0026584 A1 | 1/2015 | Kobayakov et al. |
| 2015/0026592 A1 | 1/2015 | Mohammed et al. |
| 2015/0029149 A1 | 1/2015 | Andersson et al. |
| 2015/0033184 A1 | 1/2015 | Kim et al. |
| 2015/0046876 A1 | 2/2015 | Goldenberg |
| 2015/0058723 A1 | 2/2015 | Cieplinski et al. |
| 2015/0062052 A1 | 3/2015 | Bernstein et al. |
| 2015/0062068 A1 | 3/2015 | Shih et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067559 A1 | 3/2015 | Missig et al. |
| 2015/0067560 A1 | 3/2015 | Cieplinski et al. |
| 2015/0067563 A1 | 3/2015 | Bernstein et al. |
| 2015/0067596 A1 | 3/2015 | Brown et al. |
| 2015/0067601 A1 | 3/2015 | Bernstein et al. |
| 2015/0067602 A1 | 3/2015 | Bernstein et al. |
| 2015/0067605 A1 | 3/2015 | Zambetti et al. |

(56) References Cited

U.S. PATENT DOCUMENTS

| | | |
|---|---|---|
| 2015/0071547 A1 | 3/2015 | Keating et al. |
| 2015/0116205 A1 | 4/2015 | Westerman et al. |
| 2015/0121225 A1 | 4/2015 | Somasundaram et al. |
| 2015/0128092 A1 | 5/2015 | Lee et al. |
| 2015/0135109 A1 | 5/2015 | Zambetti et al. |
| 2015/0138126 A1 | 5/2015 | Westerman |
| 2015/0138155 A1 | 5/2015 | Bernstein et al. |
| 2015/0139605 A1 | 5/2015 | Wiklof |
| 2015/0143273 A1 | 5/2015 | Bernstein et al. |
| 2015/0149899 A1 | 5/2015 | Bernstein et al. |
| 2015/0149964 A1 | 5/2015 | Bernstein et al. |
| 2015/0149967 A1 | 5/2015 | Bernstein et al. |
| 2015/0153929 A1 | 6/2015 | Bernstein et al. |
| 2015/0160729 A1 | 6/2015 | Nakagawa |
| 2015/0205495 A1* | 7/2015 | Koide .................. G06F 3/0488 715/760 |
| 2015/0234446 A1 | 8/2015 | Nathan et al. |
| 2015/0253866 A1* | 9/2015 | Amm ...................... G06F 3/017 345/156 |
| 2015/0268813 A1 | 9/2015 | Bos |
| 2015/0321607 A1 | 11/2015 | Cho et al. |
| 2015/0332107 A1 | 11/2015 | Paniaras |
| 2015/0378519 A1 | 12/2015 | Brown et al. |
| 2015/0378982 A1 | 12/2015 | McKenzie et al. |
| 2015/0381931 A1 | 12/2015 | Uhma et al. |
| 2016/0004427 A1 | 1/2016 | Zambetti et al. |
| 2016/0004428 A1 | 1/2016 | Bernstein et al. |
| 2016/0004429 A1 | 1/2016 | Bernstein et al. |
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011771 A1 | 1/2016 | Cieplinski |
| 2016/0019718 A1 | 1/2016 | Mukkamala et al. |
| 2016/0041750 A1 | 2/2016 | Cieplinski et al. |
| 2016/0048326 A1 | 2/2016 | Kim et al. |
| 2016/0062466 A1 | 3/2016 | Moussette et al. |
| 2016/0062619 A1 | 3/2016 | Reeve et al. |
| 2016/0070401 A1 | 3/2016 | Kim et al. |
| 2016/0132139 A1* | 5/2016 | Du ........................ G06F 3/0488 345/173 |
| 2016/0188181 A1 | 6/2016 | Smith |
| 2016/0210025 A1 | 7/2016 | Bernstein et al. |
| 2016/0259412 A1 | 9/2016 | Flint et al. |
| 2016/0259413 A1 | 9/2016 | Anzures et al. |
| 2016/0259495 A1* | 9/2016 | Butcher ................ G06F 3/0482 |
| 2016/0259496 A1* | 9/2016 | Butcher ................ G06F 3/0482 |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259516 A1 | 9/2016 | Kudurshian et al. |
| 2016/0259517 A1* | 9/2016 | Butcher ................ G06F 3/0488 |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0274686 A1 | 9/2016 | Ruiz et al. |
| 2016/0274728 A1 | 9/2016 | Luo et al. |
| 2016/0274761 A1 | 9/2016 | Ruiz et al. |
| 2016/0320906 A1 | 11/2016 | Bokma et al. |
| 2016/0357305 A1 | 12/2016 | Wells et al. |
| 2016/0357368 A1 | 12/2016 | Federighi et al. |
| 2016/0357390 A1 | 12/2016 | Federighi et al. |
| 2016/0357404 A1 | 12/2016 | Ruiz et al. |
| 2016/0360116 A1 | 12/2016 | Penha et al. |
| 2017/0075520 A1 | 3/2017 | Bauer et al. |
| 2017/0075562 A1 | 3/2017 | Bauer et al. |
| 2017/0075563 A1 | 3/2017 | Bauer et al. |

FOREIGN PATENT DOCUMENTS

| | | |
|---|---|---|
| CN | 101320303 A | 12/2008 |
| CN | 101593077 A | 12/2009 |
| CN | 101809526 A | 8/2010 |
| CN | 102004593 A | 4/2011 |
| CN | 102112946 A | 6/2011 |
| CN | 102160021 A | 8/2011 |
| CN | 102385478 A | 3/2012 |
| CN | 102438092 A | 5/2012 |
| CN | 102662573 A | 9/2012 |
| CN | 102841677 A | 12/2012 |
| CN | 103097992 A | 5/2013 |
| DE | 100 59 906 A1 | 6/2002 |
| EP | 0 859 307 A1 | 3/1998 |
| EP | 0 880 090 A2 | 11/1998 |
| EP | 1 028 583 A1 | 8/2000 |
| EP | 1 406 150 A1 | 4/2004 |
| EP | 1 674 977 A2 | 6/2006 |
| EP | 1 882 902 A1 | 1/2008 |
| EP | 2 000 896 A2 | 12/2008 |
| EP | 2 017 701 A1 | 1/2009 |
| EP | 2 028 583 A2 | 2/2009 |
| EP | 2 141 574 A2 | 1/2010 |
| EP | 2 175 357 A1 | 4/2010 |
| EP | 2 196 893 A2 | 6/2010 |
| EP | 2 214 087 A1 | 8/2010 |
| EP | 2 226 715 A2 | 9/2010 |
| EP | 2 299 351 A2 | 9/2010 |
| EP | 2 302 496 A1 | 3/2011 |
| EP | 2 375 309 A1 | 10/2011 |
| EP | 2 375 314 A1 | 10/2011 |
| EP | 2 386 935 A1 | 11/2011 |
| EP | 2 407 868 A1 | 1/2012 |
| EP | 2 426 580 A2 | 3/2012 |
| EP | 2 447 818 A1 | 5/2012 |
| EP | 2 527 966 A2 | 11/2012 |
| EP | 2 530 677 A2 | 12/2012 |
| EP | 2 541 376 A1 | 1/2013 |
| EP | 2 555 500 A1 | 2/2013 |
| EP | 2 615 535 A1 | 7/2013 |
| EP | 2 631 737 A1 | 8/2013 |
| EP | 2 674 846 A2 | 12/2013 |
| EP | 2 733 578 A2 | 5/2014 |
| EP | 2 808 764 A1 | 12/2014 |
| EP | 2 809 058 A1 | 12/2014 |
| EP | 2 813 938 A1 | 12/2014 |
| GB | 2 402 105 A | 12/2004 |
| JP | H07-151512 A | 6/1995 |
| JP | H08-227341 A | 9/1996 |
| JP | H09-330175 A | 12/1997 |
| JP | H11-203044 A | 7/1999 |
| JP | 2001-202192 A | 7/2001 |
| JP | 2002-149312 A | 5/2002 |
| JP | 2003-157131 A | 5/2003 |
| JP | 2003-186597 A | 7/2003 |
| JP | 2004-054861 A | 2/2004 |
| JP | 2004-062648 A | 2/2004 |
| JP | 2004-070492 A | 3/2004 |
| JP | 2004-086733 A | 3/2004 |
| JP | 2005-031786 A | 2/2005 |
| JP | 2005-092386 A | 4/2005 |
| JP | 2005-135106 A | 5/2005 |
| JP | 2005-157842 A | 6/2005 |
| JP | 2006-185443 A | 7/2006 |
| JP | 2007-116384 A | 5/2007 |
| JP | 2007-264808 A | 10/2007 |
| JP | 2008-009759 A | 1/2008 |
| JP | 2008-015890 A | 1/2008 |
| JP | 2008-033739 A | 2/2008 |
| JP | 2008-146453 A | 6/2008 |
| JP | 2008-537615 | 9/2008 |
| JP | 2008 305174 A | 12/2008 |
| JP | 2009-500761 | 1/2009 |
| JP | 2009-211704 A | 9/2009 |
| JP | 2009-217543 A | 9/2009 |
| JP | 2010-009321 A | 1/2010 |
| JP | 2010-503130 A | 1/2010 |
| JP | 2010-055274 A | 3/2010 |
| JP | 2010-146507 A | 7/2010 |
| JP | 2010-152716 A | 7/2010 |
| JP | 2010-176174 A | 8/2010 |
| JP | 2010-176337 A | 8/2010 |
| JP | 2010-181934 A | 8/2010 |

(56) References Cited

FOREIGN PATENT DOCUMENTS

| | | |
|---|---|---|
| JP | 2010-541071 A | 12/2010 |
| JP | 2011-501307 A | 1/2011 |
| JP | 2011-048666 A | 3/2011 |
| JP | 2011-048686 A | 3/2011 |
| JP | 2011-048762 A | 3/2011 |
| JP | 2011-048832 A | 3/2011 |
| JP | 2011-053831 A | 3/2011 |
| JP | 2011-053973 A | 3/2011 |
| JP | 2011-059821 A | 3/2011 |
| JP | 2011-070342 A | 4/2011 |
| JP | 2011-100290 A | 5/2011 |
| JP | 2011-107823 A | 6/2011 |
| JP | 2011-123773 A | 6/2011 |
| JP | 2011-141868 A | 7/2011 |
| JP | 2011-192179 A | 9/2011 |
| JP | 2011-192215 A | 9/2011 |
| JP | 2011-242386 A | 12/2011 |
| JP | 2011-253556 A | 12/2011 |
| JP | 2011-257941 A | 12/2011 |
| JP | 2011-530101 A | 12/2011 |
| JP | 2012-043266 A | 12/2011 |
| JP | 2012-027940 A | 2/2012 |
| JP | 2012-043267 A | 3/2012 |
| JP | 2012-053754 | 3/2012 |
| JP | 2012-053926 A | 3/2012 |
| JP | 2012-073873 A | 4/2012 |
| JP | 2012-509605 A | 4/2012 |
| JP | 2012-093820 A | 5/2012 |
| JP | 2012-123564 A | 6/2012 |
| JP | 2012-128825 A | 7/2012 |
| JP | 2013-030050 A | 2/2013 |
| JP | 2013-058149 A | 3/2013 |
| JP | 2013-080521 A | 5/2013 |
| JP | 2013-542488 A | 11/2013 |
| JP | 2014-130567 A | 7/2014 |
| JP | 2014-519109 A | 8/2014 |
| JP | 2015-153420 A | 8/2015 |
| KR | 2006-0071353 A | 6/2006 |
| KR | 2008-0045143 A | 4/2008 |
| KR | 2008-0054346 A | 6/2008 |
| KR | 2010 0133246 A | 12/2010 |
| KR | 2011 0086501 A | 7/2011 |
| KR | 2013 0099647 A | 9/2013 |
| KR | 2014 0079110 A | 6/2014 |
| KR | 20150021977 A | 3/2015 |
| WO | WO 2005/106637 A2 | 11/2005 |
| WO | WO 2006/013485 A2 | 2/2006 |
| WO | WO 2006/042309 A1 | 4/2006 |
| WO | WO 2007/121557 A1 | 11/2007 |
| WO | WO 2008/030976 A2 | 3/2008 |
| WO | WO 2008/064142 A2 | 5/2008 |
| WO | WO 2009/155981 A1 | 12/2009 |
| WO | WO 2009/158549 A2 | 12/2009 |
| WO | WO 2010/013876 A1 | 2/2010 |
| WO | WO 2010/090010 A1 | 8/2010 |
| WO | WO 2011/024389 A1 | 3/2011 |
| WO | WO 2011/024465 A1 | 3/2011 |
| WO | WO 2011/093045 A1 | 8/2011 |
| WO | WO 2011/105009 A1 | 9/2011 |
| WO | WO 2011/115187 A1 | 9/2011 |
| WO | WO 2011/121375 A1 | 10/2011 |
| WO | WO 2012/037664 | 3/2012 |
| WO | WO 2012/096804 A2 | 7/2012 |
| WO | WO 2012/114760 A1 | 8/2012 |
| WO | WO 2012/150540 A2 | 11/2012 |
| WO | WO 2013/169299 A1 | 11/2013 |
| WO | WO 2013/169849 A2 | 11/2013 |
| WO | WO 2013/169851 A2 | 11/2013 |
| WO | WO 2013/169853 A1 | 11/2013 |
| WO | WO 2013/169854 A2 | 11/2013 |
| WO | WO 2013/169870 A1 | 11/2013 |
| WO | WO 2013/169875 A2 | 11/2013 |
| WO | WO 2013/169877 A2 | 11/2013 |
| WO | WO 2013/169882 A2 | 11/2013 |
| WO | WO 2014/105275 A1 | 7/2014 |
| WO | WO 2014/105276 A1 | 7/2014 |
| WO | WO 2014/105277 A1 | 7/2014 |
| WO | WO 2014/105278 A1 | 7/2014 |
| WO | WO 2014/105279 A1 | 7/2014 |
| WO | WO 2014/129655 A1 | 8/2014 |
| WO | WO 2014/149473 A1 | 9/2014 |
| WO | WO 2014/200733 A1 | 12/2014 |
| WO | WO 2016/200584 A2 | 12/2016 |

OTHER PUBLICATIONS

Azundris, "A Fire in the Sky," http://web.archive.org/web/20140722062639/http://blog.azundrix.com/archives/168-A-fire-in-the-sky.html, Jul. 22, 2014, 8 pages.

b-log—betriebsraum weblog, "Extremely Efficient Menu Selection: Marking Menus for the Flash Platform," http://www.betriebsraum.de/blog/2009/12/11/extremely-efficient-menu-selection-marking-for-the-flash-platform, Dec. 11, 2009, 9 pages.

Clark, "Global Moxie, Touch Means a Renaissance for Radial Menus," http://globalmoxie.com/blog/radial-menus-for-touch-ui~print.shtml, Jul. 17, 2012, 7 pages.

Cohen, Cinemagraphs are Animated Gifs for Adults, http://www.tubefilter.com/2011/07/10/cinemagraph, Jul. 10, 2011, 3 pages.

CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.

Crook, "Microsoft Patenting Multi-Screen, Milti-Touch Gesures," http://techcrunch.com/2011/08/25/microsoft-awarded-patents-for-multi-screen-multi-touch-gestures/, Aug. 25, 2011, 8 pages.

cvil.ly—a design bog, Interesting Touch Interactions on Windows 8, http://cvil.ly/2011/06/04/interesting-touch-interactions-on-windows-8/, Jun. 4, 2011, 3 pages.

Davidson, et al., "Extending 2D Object Arrangement with Pressure-Sensitive Layering Cues", Proceedings of the 21st Annual ACM Symposium on User Interface Software and Technology, Oct. 19, 2008, 4 pages.

Dinwiddle, et al., "Combined-User Interface for Computers, Television, Video Recorders, and Telephone, Etc", ip.com Journal, Aug. 1, 1990. 3 Pages.

Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.

Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.

Flixel, "Cinemagraph Pro for Mac", https://flixel.com/products/mac/cinemagraph-pro, 2014, 7 pages.

Flock, "Cinemagraphics: What It Looks Like When a Photo Moves," http://www.washingtonpost.com/blogs/blowpost/post/cinemagraphs-what-it-looks-like-when-a-photo-moves/2011/07-08/gl@AONez3H.blog.html, Jul. 12, 2011, 3 pages.

Flowplayer, "Slowmotion: Flowplayer," https://web.archive.org/web/20150226191526/http://flash.flowplayer.org/plugins/streaming/slowmotion.html, Feb. 26, 2015, 4 pages.

Forlines, et al., "Glimpse: a Novel Input Model for Multi-level Devices", Chi '05 Extended Abstracts on Human Factors in Computing Systems, Apr. 2, 2005, 4 pages.

IBM et al., "Pressure-Sensitive Icons", IBM Technical Disclosure Bulletin, vol. 33, No. 1B, Jun. 1, 1990, 3 pages.

iCIMS Recruiting Software, "Blackberry Playbook Review," http://www.tested.com/tech.tablets/5749-blackberry-playbook-review/, 2015, 11 pages.

Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.

Kronfli, "HTC Zoe Comes to Goole Play, Here's Everthing You Need to Know," http://www.knowyourmobile.com/htc/htc-one/19550/what-htc-zoe, Aug. 14, 2014, 5 pages.

Laurie, "The Power of the Right Click," http://vlaurie.com/right-click/customize-context-menu.html, 2002-2016, 3 pages.

McRitchie, "Internet Explorer Right-Click Menus," http://web.archive.org/web-201405020/http:/dmcritchie.mvps.org/ie/rightie6.htm, May 2, 2014, 10 pages.

(56) References Cited

OTHER PUBLICATIONS

Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.

Minsky, "Computational Haptics the *Sandpaper* System for Synthesizing Texture for a Force-Feedback Display," Massachusetts Institute of Technology, Jun. 1978, 217 pages.

Nikon, "Scene Recognition System and Advanced SRS," http://www.nikonusa.com/en.Learn-And-Explore/Article/ftlzi4rr/Scene-Recognition-System.html, Jul. 22, 2015, 2 pages.

O'Hara, et al., "Pressure-Sensitive Icons", ip.com Journal, ip.com Inc., West Henrietta, NY, US, Jun. 1, 1990, 2 Pages.

Pallenberg, "Wow, the new iPad had gestures." https://plus.google.com/+SaschaPallenberg/posts/aaJtJogu8ac, Mar. 7, 2012, 2 pages.

PoliceOne.com, "COBAN Technoligies Pre-Event Buffer & Fail Safe Feature," http://www.policeone.com/police-products/police-technology/mobile-computures/videos/5955587-COBAN-Technologies-Pre-Event, Nov. 11, 2010, 2 pages.

Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.

"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.

Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.

Rekimoto, et al., "PreSense: Interaction Techniques for Finger Sensing Input Devices", Proceedings of the 16th Annual ACM Symposium on User Interface Software and Technology, Nov. 30, 2003, 10 pages.

Rekimoto, et al., "PreSensell: Bi-directional Touch and Pressure Sensing Interactions with Tactile Feedback", Conference on Human Factors in Computing Systems Archive, ACM, Apr. 22, 2006, 6 pages.

Sony, "Intelligent Scene Recognition," https://www.sony-asia.com/article/252999/section/product/product/dsc-t77, downloaded on May 20, 2016, 5 pages.

Stross, "Wearing a Badge, and a Video Camera," The New York Times, http://www.nytimes.com/2013/04/07/business/wearable-video-cameras-for-police-offers.html? R=0, Apr. 6, 2013, 4 pages.

Taser, "Taser Axon Body Camera User Manual," https://www.taser.com/images/support/downloads/product-resourses/axon_body_product_manual.pdf, Oct. 1, 2013, 24 pages.

Tidwell, "Designing Interfaces," O'Reilly Media, Inc., USA, Nov. 2005, 348 pages.

Wikipedia, "AirDrop,", Wikipedia, the free encyclopedia, http://en.wikipedia.org/wiki/AirDrop, May 17, 2016, 5 pages.

Wikipedia, "Cinemagraph," Wikipedia, the free encyclopedia, http://en.wikipedia.org/wiki/Cinemagraph, Last Modified Mar. 16, 2016, 2 pages.

Wikipedia, "Context Menu," Wikipedia, the free encyclopedia https://en.wikipedia.org/wiki/Context menu, Last Modified May 15, 2016, 4 pages.

Wikipedia, "HTC One (M7)," Wikipedia, the free encyclopedia, https://en.wikipedia.org/wiki/HTC_One_(M7), Mar. 2013, 20 pages.

Wikipedia, "Mobile Ad Hoc Network," Wikipedia, the free encyclopedia, http://en.wikipedia.org/wiki/Mobile_ad_hoc_network, May 20, 2016, 4 pages.

Wikipedia, "Pie Menu," Wikipedia, the free encyclopedia, http://en.wikipedia.org/wiki/Pie_menu, Last Modified Jun. 4, 2016, 3 pages.

Wikipedia, "Quick Look," from Wikipedia, the free encyclopedia, https://en.wikipedia.org/wiki/Quick_Look, Last Modified Jan. 15, 2016, 3 pages.

Wikipedia, "Sony Xperia Z1", Wikipedia, the free encyclopedia, https://enwikipedia.org/wiki/Sony_Experia_Z1, Sep. 2013, 10 pages.

YouTube, "Blackberry Playbook bezel interaction," https://www.youtube.com/watch?v=YGkzFqnOwXI, Jan. 10, 2011, 2 pages.

Office Action, dated Dec. 18, 2015, received in Australian Patent Application No. 2013368440, which corresponds with U.S. Appl. No. 14/536,426, 3 pages.

Office Action, dated Apr. 5, 2016, received in Korean Patent Application No. 10-2015-7018851, which corresponds with U.S. Appl. No. 14/536,426, 7 pages.

Office Action, dated Jul. 21, 2016, received in European Patent Application No. 13795391.5, which corresponds with U.S. Appl. No. 14/536,426, 9 pages.

Office Action, dated Dec. 17, 2015, received in U.S. Appl. No. 14/536,426, 28 pages.

Final Office Action, dated May 6, 2016, received in U.S. Appl. No. 14/536,426, 23 pages.

Office Action, dated Jul. 15, 2015, received in Australian Patent Application No. 2013259606, which corresponds with U.S. Appl. No. 14/536,426, 3 pages.

Notice of Allowance, dated May 23, 2016, received in Australian Patent Application No. 2013259606, which corresponds with U.S. Appl. No. 14/536,426, 3 pages.

Office Action, dated Nov. 18, 2016, received in Australian Patent Application No. 2015101231, which corresponds with U.S. Appl. No. 14/536,426, 3 pages.

Decision to Grant, dated Jul. 14, 2016, received in European Patent Application No. 13724100.6, which corresponds with U.S. Appl. No. 14/536,426, 1 page.

Office Action, dated Mar. 4, 2016, received in Japanese Patent Application No. 2015-511644, which corresponds with U.S. Appl. No. 14/536,426, 3 pages.

Office Action, dated Feb. 1, 2016, received in Australian Patent Application No. 2013368441, which corresponds with U.S. Appl. No. 14/608,926, 3 pages.

Notice of Allowance, dated Mar. 30, 2016, received in Australian Patent Application No. 2013368441, which corresponds with U.S. Appl. No. 14/608,926, 1 page.

Office Action, dated Apr. 21, 2016, received in European Patent Application No. 13795392.3, which corresponds with U.S. Appl. No. 14/608,926, 6 pages.

Office Action, dated May 6, 2016, received in European Patent Application No. 13795392.3, which corresponds with U.S. Appl. No. 14/608,926, 6 pages.

Office Action, dated Mar. 14, 2016, received in Japanese Patent Application No. 2015-549392, which corresponds with U.S. Appl. No. 14/608,926, 4 pages.

Office Action, dated May 12, 2016, received in Korean Patent Application No. 10-2015-7018853, which corresponds with U.S. Appl. No. 14/608,926, 4 pages.

Office Action, dated Jul. 17, 2015, received in Australian Patent Application No. 2013259613, which corresponds with U.S. Appl. No. 14/536,646, 5 pages.

Office Action, dated May 31, 2016, received in Australian Patent Application No. 2013259613, which corresponds with U.S. Appl. No. 14/536,646, 4 pages.

Notice of Allowance, dated Jul. 5, 2016, received in Australian Patent Application No. 2013259613, which corresponds with U.S. Appl. No. 14/536,646, 3 pages.

Office Action, dated Nov. 12, 2015, received in European Patent Application No. 13724102.2, which corresponds with U.S. Appl. No. 14/536,646, 6 pages.

Office Action, dated May 31, 2016, received in European Patent Application No. 13724102.2, which corresponds with U.S. Appl. No. 14/536,646, 5 pages.

Office Action, dated Feb. 29, 2016, received in Japanese Patent Application No. 2015-511645, which corresponds with U.S. Appl. No. 14/536,646, 5 pages.

(56) References Cited

OTHER PUBLICATIONS

Office Action, dated Aug. 27, 2015, received in Australian Patent Application No. 2013259614, which corresponds with U.S. Appl. No. 14/536,141, 4 pages.
Office Action, dated Jan. 7, 2016, received in European Patent Application No. 13726053.5, which corresponds with U.S. Appl. No. 14/536,141, 10 pages.
Office Action, dated Feb. 29, 2015, received in Japanese Patent Application No. 2015-511646, which corresponds with U.S. Appl. No. 14/536,141, 3 pages.
Office Action, dated Jan. 29, 2016, received in Australian Patent Application No. 2013368443, which corresponds with U.S. Appl. No. 14/536,141, 3 pages.
Notice of Allowance, dated Mar. 11, 2016, received in Australian Patent Application No. 2013368443, which corresponds with U.S. Appl. No. 14/536,141, 2 pages.
Certificate of Grant, dated Jul. 7, 2016, received in Australian Patent Application No. 2013368443, which corresponds with U.S. Appl. No. 14/536,141, 3 pages.
Office Action, dated Jul. 4, 2016, received in Japanese Patent Application No. 2015-549393, which corresponds with U.S. Appl. No. 14/536,141, 4 pages.
Office Action, dated Apr. 5, 2016, received in Korean Patent Application No. 10-2015-7018448, which corresponds with U.S. Appl. No. 14/536,141, 6 pages.
Office Action, dated Aug. 1, 2016, received in U.S. Appl. No. 14/536,203, 14 pages.
Office Action, dated Jul. 9, 2015, received in Australian Patent Application No. 2013259630, which corresponds with U.S. Appl. No. 14/536,203, 3 pages.
Notice of Allowance, dated Jun. 15, 2016, received in Australian Patent Applicatin No. 2013259630, which corresponds with U.S. Appl. No. 14/536,203, 3 pages.
Office Action, dated Nov. 11, 2015, received in European Patent Application No. 13724104.8, which corresponds with U.S. Appl. No. 14/536,203, 5 pages.
Office Action, dated May 31, 2016, received in European Patent Application No. 13724104.8, which corresponds with U.S. Appl. No. 14/536,203, 5 pages.
Office Action, dated Feb. 15, 2016, received in Japanese Patent Application No. 2015-511650, which corresponds with U.S. Appl. No. 14/536,203, 5 pages.
Office Action, dated Dec. 4, 2015, received in Korean Patent Application No. 2014-7034520, which corresponds with U.S. Appl. No. 14/536,203, 4 pages.
Office Action, dated Jul. 22, 2016, received in European Offfice Action No. 13798465.4, which corresponds with U.S. Appl. No. 14/608,965, 8 pages.
Office Action, dated Aug. 10, 2015, received in Australian Patent Application No. 2013259637, which corresponds with U.S. Appl. No. 14/536,267, 3 pages.
Notice of Allowance, dated Jun. 28, 2016, received in Australian Patent Application No. 2013259637, which corresponds with U.S. Appl. No. 14/536,267, 3 pages.
Office Action, dated Jan. 29, 2016, received in Japanese Patent Application No. 2015-511652, which corresponds with U.S. Appl. No. 14/536,267, 3 pages.
Office Action, dated Dec. 4, 2015, received in Korean Patent Application No. 2014-7034530, which corresponds with U.S. Appl. No. 14/536,267, 3 pages.
Office Action, dated Aug. 18, 2015, received in Australian Patent Application No. 2013259642, which corresponds with U.S. Appl. No. 14/536,291, 3 pages.
Office Action, dated Jul. 25, 2016, received in Australian Patent Application No. 2013259642, which corresponds with U.S. Appl. No. 14/536,291, 3 pages.
Office Action, dated Jan. 7, 2016, received in European Patent Application No. 13724107.1, which corresponds with U.S. Appl. No. 14/536,291, 11 pages.
Office Action, dated Mar. 8, 2016, recieved in Japanese Application No. 2015-511655, which corresponds with U.S. Appl. No. 14/536,291, 4 pages.
Office Action, dated Jan. 15, 2016, received in Australian Patent Application No. 2013368445, which corresponds with U.S. Appl. No. 14/608,985, 3 pages.
Office Action, dated Apr. 25, 2016, received in Japanese Patent Application No. 2015-550384, which corresponds with U.S. Appl. No. 14/608,985, 4 pages
Office Action, dated Mar. 31, 2016, recieved in U.S. Appl. No. 14/864,737 , 17 pages.
Notice of Allowance, dated Jul. 1, 2016, received in Chinese Patent Application No. 201620214376.7, which correresponds with U.S. Appl. No. 14/864,737, 3 pages.
Certificate of Registration, dated Jun. 20, 2016, received in German Patent Application No. 202016001845.1, which correresponds with U.S. Appl. No. 14/864,737, 3 pages.
Office Action, dated Apr. 5, 2016, received in Danish Patent Application No. 201500577, which corresponds with U.S. Appl. No. 14/864,737, 7 pages.
Office Action, dated Jun. 27, 2016, received in U.S. Appl. No. 14/866,981, 22 pages.
Office Action, dated May 10, 2016, received in Australian Patent Application No. 2016100254, which corresponds with U.S. Appl. No. 14/866,981, 6 pages.
Notice of Allowance, dated Jul. 27, 2016, received in Chinese Patent Application No. 201620176169.7, which corresponds with U.S. Appl. No. 14/866,981, 3 pages.
Certificate of Registration, dated Jun. 20, 2016, received in German Patent Application No. 202016001514.2, which corresponds with U.S. Appl. No. 14/864,737, 3 pages.
Office Action, dated Mar. 18, 2016, received in Danish Patent Application No. 2016100254, which corresponds with U.S. Appl. No. 14/866,981, 9 pages.
Office Action, dated May 19, 2016, received in Australian Patent Application No. 2016100251, which corresponds with U.S. Appl. No. 14/866,159, 5 pages.
Office Action, dated Mar. 9, 2016, received in Danish Patent Application No. 201500574, which corresponds with U.S. Appl. No. 14/866,159, 11 pages.
Certificate of Registration, dated Jun. 30, 2016, received in German Patent Application No. 20201600156.9, which corresponds with U.S. Appl. No. 14/868,078, 3 pages.
Office Action, dated Mar. 30, 2016, received in Australian Patent Application No. 201500588, which corresponds with U.S. Appl. No. 14/868,078, 9 pages.
Office Action, dated May 9, 2016, received in U.S. Appl. No. 14/863,432, 26 pages.
Office Action, dated Apr. 4, 2016, received in Danish Patent Application No. 201500582, which corresponds with U.S. Appl. No. 14/863,432, 10 pages.
Office Action, dated Mar. 22, 2016, received in Danish Patent Application No. 201500576, which corresponds with U.S. Appl. No. 14/866,511, 10 pages.
Notice of Allowance, dated Jun. 8, 2016, received in Danish Patent Application No. 201500576, which corresponds with U.S. Appl. No. 14/866,511, 2 pages.
Office Action, dated Mar. 28, 2016, received in U.S. Appl. No. 14/869,899, 17 pages.
Office Action, dated Jun. 28, 2016, received in U.S. Appl. No. 14/869,899, 5 pages.
Office Action, dated Feb. 3, 2016, received in Danish Patent Application No. 201500592, which corresponds with U.S. Appl. No. 14/869,899, 9 pages.
Office Action, dated Mar. 4, 2016, received in U.S. Appl. No. 14/866,992, 30 pages.
Final Office Action, dated Jul. 29, 2016, received in U.S. Appl. No. 14/866,992, 35 pages.
Office Action, dated Mar. 18, 2016, received in Danish Patent Application No. 201500593, which corresponds with U.S. Appl. No. 14/866,992, 10 pages.

(56) References Cited

OTHER PUBLICATIONS

Office Action, dated Jun. 27, 2016, recieved in Danish Patent Application No. 201500593, which corresponds with U.S. Appl. No. 14/866,992, 7 pages.
Office Action, dated Nov. 30, 2015, received in U.S. Appl. No. 14/845,217, 24 pages.
Final Office Action, dated Apr. 22, 2016, recieved in U.S. Appl. No. 14/845,217, 36 pages.
Office Action, dated Feb. 3, 2016, received in U.S. Appl. No. 14/856,517, 36 pages.
Final Office Action, dated Jul. 13, 2016, received in U.S. Appl. No. 14/856,517, 30 pages.
Office Action, dated Feb. 11, 2016, received in U.S. Appl. No. 14/856,519, 34 pages.
Final Office Action, dated Jul. 15, 2016, received in U.S. Appl. No. 14/856,519, 31 pages.
Office Action, dated Feb. 1, 2016, received in U.S. Appl. No. 14/857,645, 15 pages.
Final Office Action, dated Jun. 16, 2016, received in U.S. Appl. No. 14/857,645, 12 pages.
Office Action, dated Jan. 25, 2016, received in U.S. Appl. No. 14/864,580, 29 pages.
Notice of Allowance, dated May 23, 2016, received in U.S. Appl. No. 14/864,580, 9 pages.
Corrected Notice of Allowability, dated Jun. 16, 2016, received in U.S. Appl. No. 14/864,580, 2 pages.
Notice of Allowance, dated Aug. 4, 2016, received in U.S. Appl. No. 14/864,580, 9 pages.
Office Action, dated Apr. 8, 2016, received in Danish Patent Application No. 201500584, which corresponds with U.S. Appl. No. 14/864,580, 9 pages.
Office Action, dated Apr. 19, 2016, received in U.S. Appl. No. 14/864,627, 9 pages.
Office Action, dated Apr. 8, 2016, received in Danish Patent Application No. 201500585, which corresponds with U.S. Appl. No. 14/864,627, 9 pages.
Office Action, dated Mar. 29, 2016, received in U.S. Appl. No. 14/866,361, 22 pages.
Notice of Allowance, dated Jul. 19, 2016, received in U.S. Appl. No. 14/866,361, 8 pages.
Office Action, dated Jun. 10, 2016, received in Australian Patent Application No. 2016100292, which corresponds with U.S. Appl. No. 14/866,361, 4 pages.
Notice of Allowance/Grant, dated Jul. 1, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Office Action, dated Apr. 7, 2016, received in Danish Patent Application No. 201500579, which corresponds with U.S. Appl. No. 14/866,361, 10 pages.
Office Action, dated Mar. 22, 2016, received in Danish Patent Application No. 201500587, which corresponds with U.S. Appl. No. 14/866,987, 8 pages.
Notice of Allowance, dated Jun. 10, 2016, received in Danish Patent Application No. 201500587, which corresponds with U.S. Appl. No. 14/866,987, 2 pages.
Certificate of Exam, dated Jul. 21, 2016, received in Australian Patent Application No. 2016100652, which corresponds with U.S. Appl. No. 14/866,989, 1 page.
Office Action, dated Apr. 1, 2016, received in Danish Patent Application No. 201500589, which corresponds with U.S. Appl. No. 14/866,989, 8 pages.
Notice of Allowance, dated Jun. 10, 2016, received in Danish Patent Application No. 201500589, which corresponds with U.S. Appl. No. 14/866,989, 2 pages.
Office Action, dated Apr. 11, 2016, received in U.S. Appl. No. 14/871,236, 23 pages.
Office Action, dated Jun. 28, 2016, received in U.S. Appl. No. 14/871,236, 21 pages.
Office Action, dated Apr. 8, 2016, received in Danish Patent Application No. 201500595, which corresponds with U.S. Appl. No. 14/871,236, 12 pages.
Office Action, dated May 26, 2016, received in Danish Patent Application No. 201500595, which corresponds with U.S. Appl. No. 14/871,236, 14 pages.
Office Action, dated Apr. 6, 2016, received in Danish Patent Application No. 201500596, which corresponds with U.S. Appl. No. 14/870,882, 7 pages.
Office Action, dated Jun. 9, 2016, received in Danish Patent Application No. 201500596, which corresponds with U.S. Appl. No. 14/870,882, 9 pages.
Office Action, dated Apr. 7, 2016, received in Danish Patent Application No. 201500597, which corresponds with U.S. Appl. No. 14/871,227, 7 pages.
Notice of Allowance, dated Jun. 21, 2016, received in Danish Patent Application No. 201500597, which corresponds with U.S. Appl. No. 14/871,227, 2 pages.
Office Action, dated Apr. 18, 2016, received in Danish Patent Application No. 201500601, which corresponds with U.S. Appl. No. 14/871,336, 8 pages.
Notice of Allowance, dated Apr. 18, 2016, received in Danish Patent Application No. 201500600, which corresponds with U.S. Appl. No. 14/871,462, 7 pages.
Office Action, dated Apr. 29, 2016, received in U.S. Appl. No. 14/867,823, 28 pages.
Office Action, dated Mar. 18, 2016, received in Danish Patent Application No. 201500594, which corresponds with U.S. Appl. No. 14/867,823, 10 pages.
Office Action, dated May 10, 2016, received in U.S. Appl. No. 14/867,892, 28 pages.
Office Action, dated Mar. 21, 2016, received in Danish Patent Application No. 201500598, which corresponds with U.S. Appl. No. 14/867,892, 9 pages.
Office Action, dated May 23, 2016, received in Australian Patent Application No. 2016100253, which corresponds with U.S. Appl. No. 14/867,990, 5 pages.
Certificate of Registration, dated Jun. 16, 2016, received in German Patent No. 202016001489.8, which corresponds with U.S. Appl. No. 14/867,990, 3 pages.
Office Action, dated Mar. 18, 2016, received in Danish Patent Application No. 201500581, which corresponds with U.S. Appl. No. 14/867,990, 9 pages.
International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.
International Search Report and Written Opinion dated Apr. 7, 2014, received in International Application No. PCT/US2013/069472, which corresponds to U.S. Appl. No. 14/608,895, 24 pages.
International Preliminary Report on Patentability, dated Jun. 30, 2015, received in International Patent Application No. PCT/US2013/069472, which corresponds with U.S. Appl. No. 14/608,895, 18 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages.
International Preliminary Report on Patentability dated Nov. 20, 2014, received in International Application No. PCT/US2013/040056, which corresponds to U.S. Appl. No. 14/536,367, 11 pages.
Extended European Search Report, dated Nov. 6, 2015, received in European Patent Application No. 15183980.0, which corresponds with U.S. Appl. No. 14/536,426, 7 pages.

(56) References Cited

OTHER PUBLICATIONS

International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.
International Search Report and Written Opinion dated May 8, 2014, received in International Application No. PCT/US2013/040067, which corresponds to U.S. Appl. No. 14/536,644, 45 pages.
International Preliminary Report dated Nov. 20, 2014, received in International Application No. PCT/US2013/040067, which corresponds to U.S. Appl. No. 14/536,644, 36 pages.
International Search Report and Written Opinion dated Mar. 12, 2014, received in International Application No. PCT/US2013/069479, which corresponds to U.S. Appl. No. 14/608,926, 14 pages.
International Preliminary Report on Patentability, dated Jun. 30, 2015, received in International Patent Application No. PCT/US2013/069479, which corresponds with U.S. Appl. No. 14/608,926, 11 pages.
International Search Report and Written Opinion dated Aug. 7, 2013, received in International Application No. PCT/US2013/040070, which corresponds to U.S. Appl. No. 14/535,646, 12 pages.
International Preliminary Report on Patentability dated Nov. 20, 2014, received in International Application No. PCT/US2013/040070, which corresponds to U.S. Appl. No. 14/536,646, 10 pages.
International Search Report and Written Opinion dated Apr. 7, 2014, received in International Application No. PCT/US2013/040072, which corresponds to U.S. Appl. No. 14/536,141, 38 pages.
International Preliminary Report on Patentability dated Nov. 20, 2014, received in International Application No. PCT/US2013/040072, which corresponds to U.S. Appl. No. 14/536,141, 32 pages.
International Search Report and Written Opinion dated Apr. 7, 2014, received in International Application No. PCT/US2013/069483, which corresponds to U.S. Appl. No. 14/608,942, 18 pages.
International Preliminary Report on Patentability, dated Jun. 30, 2015, received in International Application No. PCT/US2013/069483, which corresponds to U.S. Appl. No. 14/608,942, 13 pages.
International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/2013/040087, which corresponds to U.S. Appl. No. 14/536,166, 29 pages.
International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Appl. No. 14/536,203, 9 pages.
International Search Report and Written Opinion dated Jul. 9, 2014, received in International Application No. PCT/US2013/069484, which corresponds to U.S. Appl. No. 14/608,965, 17 pages.
International Preliminary Report on Patentability, dated Jun. 30, 2015, received in International Application No. PCT/US2013/069484, which corresponds with U.S. Appl. No. 14/608,965, 12 pages.
International Search Report and Written Opinion dated Feb. 5, 2014, received in International Application No. PCT/US2013/040098, which corresponds to U.S. Appl. No. 14/536,247, 35 pages.
International Preliminary Report on Patentability dated Nov. 20, 2014, received in International Application No. PCT/2013/040098, which corresponds to U.S. Appl. No. 14/536,247, 27 pages.
International Search Report and Written Opinion dated Jan. 27, 2014, received in International Application No. PCT/US2013/040101, which corresponds to U.S. Appl. No. 14/536,267, 30 pages.
International Preliminary Report on Patentability dated Nov. 20, 2014, received in International Application No. PCT/2013/040101, which corresponds to U.S. Appl. No. 14/536,267, 24 pages.
International Search Report and Written Opinion dated Jan. 8, 2014, received in International Application No. PCT/US2013/040108, which corresponds to U.S. Appl. No. 14/536,291, 30 pages.
International Preliminary Report on Patentability dated Nov. 20, 2014, received in International Application No. PCT/2013/040108, which corresponds to U.S. Appl. No. 14/536,291, 25 pages.
International Search Report and Written Opinion dated Jun. 2, 2014, received in International Application No. PCT/US2013/069486, which corresponds to U.S. Appl. No. 14/608,985, 7 pages.
International Preliminary Report on Patentability, dated Jun. 30, 2015, received in International Application No. PCT/US2013/069486, which corresponds with U.S. Appl. No. 14/608,985, 19 pages.
International Search Report and Written Opinion dated Mar. 6, 2014, received in International Application No. PCT/US2013/069489, which corresponds with U.S. Appl. No. 14/609,006, 12 pages.
International Preliminary Report on Patentability, dated Jun. 30, 2015, received in International Patent Application No. PCT/US2013/069489, which corresponds with U.S. Appl. No. 14/609,006, 10 pages.
International Search Report and Written Opinion, dated Apr. 25, 2016, received in International Patent Application No. PCT/US2016/018758, which corresponds with U.S. Appl. No. 14/866,159, 15 pages.
International Search Report and Written Opinion, dated Jul. 21, 2016, received in International Patent Application No. PCT/US2016/019913, which corresponds with U.S. Appl. No. 14/868,078, 16 pages.
Angelov, "Sponsor Flip Wall With Jquery & CSS", Tutorialzine. N.p., Mar. 24, 2010. Web. http://tutorialzine.com/2010/03/sponsor-wall-slip-jquery-css/, Mar. 24, 2010, 8 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.
Anonymous, "Notifications, Android 4.4 and Lower", Android Developers, https://developer.android.com/design/patterns/notifications_k.html, May 24, 2015, 9 pages.
Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Dzyre, "10 Android Notification Features You Can Fiddle With", http://www.hongkiat.com/blog/android-notification-features, Mar. 10, 2014, 10 pages.
Elliot, "Mac System 7", YouTube. Web. Mar. 8, 2017, http://www.youtube.com/watch?v=XLv22hfuuik, Aug. 3, 2011, 1 page.
Farshad, "SageThumbs-Preview and Convert Pictures From Windows Context Menu", https://web.addictivetips.com/windows-tips/sagethumbs-preview-and-convert-photos-from-windows-context-menu, Aug. 8, 2011, 5 pages.
Flaherty, "Is Apple Watch's Pressure-Sensitive Screen a Bigger Deal Than the Gadget Itself?", http://www.wired.com/2014/09/apple-watchs-pressure-sensitive-screen-bigger-deal-gadget, Sep. 15, 2014, 3 pages.
Gardner, "Recenz—Recent Apps in One Tap", You Tube, https://www.youtube.com/watch?v=qailSHRgsTo, May 15, 2015, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Grant, "Android's Notification Center", https://www.objc.io/issues/11-android/android-notifications, Apr. 30, 2014, 26 pages.

(56) References Cited

OTHER PUBLICATIONS iPhoneOperator, "Wasser Liveeffekt fur Homescreen & Lockscreen—Aquaboard (Cydia)", http://www.youtube.com/watch?v=fG9YMF-mBOQ, Sep. 22, 2012, 3 pages.
iPodHacks 142: "Water Ripple Effects on the Home and Lock Screen: AquaBoard Cydia Tweak Review", YouTube, https://www.youtube.com.watch?v-Auu_uRaYHJs, Sep. 24, 2012, 3 pages.
Kiener, "Force Touch on iPhone", https://www.youtube.com/watch?v=CEMmnsU5fC8, Aug. 4, 2015, 4 pages.
Kost, "LR3-Deselect All Images But One", Julieanne Kost's Blog, blogs.adobe.com/jkost/2011/12/lr3-deselect-all-images-but-one.html, Dec. 22, 2011, 1 page.
Kumar, "How to Enable Ripple Effect on Lock Screen of Galaxy S2", YouTube, http, http://www.youtube.com/watch?v+B9-4M5abLXA, Feb. 12, 2013, 3 pages.
Matthew, "How to Preview Photos and Images From Right-Click Context Menue in Windows [Tip]", https://dottech.org/159009/add-image-preview-in-windows-context-menu-tip, Jul. 4, 2014, 5 pages.
Microsoft, "Lumia—How to Personalize Your Start Screen", https://www.youtube.com/watch?v=6GI5Z3TrSEs, Nov. 11, 2014, 3 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Nacca, "NiLS Lock Screen Notifications / Floating Panel—Review", https://www.youtube.com/watch?v=McT4QnS9TDY, Feb. 3, 2014, 4 pages.
Phonebuff, "How to Pair Bluetooth on the iPhone", https://www.youtube.com/watch?v=LudNwEar9A8, Feb. 8, 2012, 3 pages.
VGJFeliz, "How to Master Android Lollipop Notifications in Four Minutes!", https://www.youtube.com/watch?v=S-zBRG7GJgs, Feb. 8, 2015, 5 pages.
Office Action, dated Mar. 15, 2017, received in U.S. Appl. No. 14/535,671, 13 pages.
Office Action, dated Oct. 18, 2016, received in Australian Patent Application No. 2013368440, which corresponds with U.S. Appl. No. 14/536,426, 3 pages.
Notice of Allowance, dated Dec. 20, 2016, received in Australian Patent Application No. 2013368440, which corresponds with U.S. Appl. No. 14/536,426, 3 pages.
Office Action, dated Sep. 13, 2016, received in Japanese Patent Application No. 2015-547948, which corresponds with U.S. Appl. No. 14/536,426, 5 pages.
Patent, dated May 12, 2017, received in Japanese Patent Application No. 2015547948, which corresponds with U.S. Appl. No. 14/536,426, 3 pages.
Office Action, dated Feb. 24, 2017, received in Korean Patent Application No. 10-2015-7018851, which corresponds with U.S. Appl. No. 14/536,426, 3 pages.
Office Action, dated Apr. 5, 2017, received in U.S. Appl. No. 14/536,367, 16 pages.
Certificate of Grant, dated Sep. 15, 2016, received in Australian Patent Australian Patent Application No. 2013259606, which corresponds with U.S. Appl. No. 14/536,426, 1 page.
Office Action, dated May 15, 2017, received in Australian Patent Application No. 2016216580, which corresponds with U.S. Appl. No. 14/536,426, 3 pages.
Letters Patent, dated Aug. 10, 2016, received in European Patent Application No. 13724100.6, which corresponds with U.S. Appl. No. 14/536,426, 1 page.
Office Action, dated Jan. 20, 2017, received in European Patent Application No. 15183980.0, which corresponds with U.S. Appl. No. 14/536,426, 5 pages.
Office Action, dated Feb. 6, 2017, received in Japanese Patent Application No. 2015-511644, which corresponds with U.S. Appl. No. 14/536,426, 6 pages.
Office Action, dated Mar. 9, 2017, received in U.S. Appl. No. 14/536,464, 21 pages.
Office Action, dated Jan. 3, 2017, received in Australian Patent Application No. 2016201451, which corresponds with U.S. Appl. No. 14/608,926, 3 pages.
Office Action, dated May 4, 2017, received in Chinese Patent Application No. 201380068414.1, which corresponds with U.S. Appl. No. 14/608,926, 5 pages.
Office Action, dated Nov. 11, 2016, received in European Patent Application No. 13795392.3, which corresponds with U.S. Appl. No. 14/608,926, 6 pages.
Notice of Allowance, dated Jan. 17, 2017, received in Japanese Patent Application No. 2015-549392, which corresponds with U.S. Appl. No. 14/608,926, 2 pages.
Patent, dated Feb. 17, 2017, received in Japanese Patent Application No. 2015-549392, which corresponds with U.S. Appl. No. 14/608,926, 3 pages.
Notice of Allowance, dated Mar. 31, 2017, received in Korean Patent Application No. 2015-7018853, which corresponds with U.S. Appl. No. 14/608,926, 4 pages.
Office Action, dated Dec. 1, 2016, received in Chinese Patent Application No. 2013800362059, which corresponds with U.S. Appl. No. 14/536,646, 3 pages.
Notice of Allowance, dated Jan. 4, 2017, received in European Patent Application No. 13724102.2, which corresponds with U.S. Appl. No. 14/536,646, 5 pages.
Patent, dated May 26, 2017, received in European Patent Application No. 13724102.2, which corresponds with U.S. Appl. No. 14/536,646, 1 page.
Notice of Allowance, dated Dec. 22, 2016, received in Japanese Patent Application No. 2015-511645, which corresponds with U.S. Appl. No. 14/536,646, 2 pages.
Office Action, dated Apr. 3, 2017, received in U.S. Appl. No. 14/536,141, 11 pages.
Office Action, dated Mar. 3, 2017, received in Chinese Patent Application No. 201380035893.7, which corresponds with U.S. Appl. No. 14/536,646, 8 pages.
Notice of Allowance, dated Aug. 15, 2016, received in Australian Patent Application No. 2013259614, which corresponds with U.S. Appl. No. 14/536,141, 1 page.
Office Action, dated Aug. 31, 2016, received in European Patent Application No. 13726053.5, which corresponds with U.S. Appl. No. 14/536,141, 10 pages.
Office Action, dated Oct. 25, 2016, received in Japanese Patent Application No. 2015-511646, which corresponds with U.S. Appl. No. 14/536,141, 6 pages.
Office Action, dated Dec. 8, 2016, received in U.S. Appl. No. 14/608,942, 9 pages.
Notice of Allowance, dated May 12, 2017, received in U.S. Appl. No. 14/608,942, 10 pages.
Office Action, dated Mar. 29, 2017, received in Australian patent Application No. 2016201303, which corresponds with U.S. Appl. No. 14/608,942, 3 pages.
Office Action, dated Oct. 7, 2016, received in European Patent Application No. 13798464.7, which corresponds with U.S. Appl. No. 14/608,942, 7 pages.
Notice of Allowance, dated May 12, 2017, received in Japanese Patent Application No. 2015-549393, which corresponds with U.S. Appl. No. 14/608,942, 5 pages.
Office Action, dated Feb. 24, 2017, received in Korean Patent Application No. 2015-7018448, which corresponds with U.S. Appl. No. 14/608,942, 4 pages.
Notice of Allowance, dated Feb. 1, 2017, received in U.S. Appl. No. 14/536,203, 9 pages.
Certificate of Grant, dated Oct. 21, 2016, received in Australian Patent Application No. 2013259630, which corresponds with U.S. Appl. No. 14/536,203, 3 pages.
Certificate of Patent, dated Sep. 9, 2016, received in Japanese Patent Application No. 2015-511650, which corresponds with U.S. Appl. No. 14/536,203, 3 pages.
Notice of Allowance, dated Sep. 1, 2016, received in Korean Patent Application No. 2014-7034520, which corresponds with U.S. Appl. No. 14/536,203, 5 pages.

(56) References Cited

OTHER PUBLICATIONS

Office Action, dated Feb. 6, 2017, received in Korean Patent Application No. 2016-7033834, which corresponds with U.S. Appl. No. 14/536,203, 4 pages.
Office Action, dated Oct. 20, 2016, received in U.S. Appl. No. 14/536,247, 10 pages.
Final Office Action, dated Mar. 24, 2017, received in U.S. Appl. No. 14/536,247, 14 pages.
Office Action, dated Mar. 24, 2017, received in U.S. Appl. No. 14/536,267, 12 pages.
Certificate of Grant, dated Oct. 21, 2016, received in Australian Patent Application No. 2013259637, which corresponds with U.S. Appl. No. 14/536,267, 3 pages.
Office Action, dated Mar. 24, 2017, received in Australian Patent Application No. 2016204411, which corresponds with U.S. Appl. No. 14/536,267, 3 pages.
Office Action, dated Dec. 9, 2016, received in Chinese Patent Application No. 2016120601564130, which corresponds with U.S. Appl. No. 14/536,267, 4 pages.
Notice of Allowance, dated Sep. 26, 2016, received in Japanese Patent Application No. 2015-511652, which corresponds with U.S. Appl. No. 14/536,267, 5 pages.
Office Action, dated Mar. 3, 2017, received in Japanese Patent Application No. 2016-125839, which corresponds with U.S. Appl. No. 14/536,267, 6 pages.
Notice of Allowance, dated Sep. 1, 2016, received in Korean Patent Application No. 2014-7034530, which corresponds with U.S. Appl. No. 14/536,267, 3 pages.
Office Action, dated Jan. 5, 2017, received in Korean Patent Application No. 2016-7029533, which corresponds with U.S. Appl. No. 14/536,267, 2 pages.
Office Action, dated Apr. 7, 2017, received in U.S. Appl. No. 14/536,291, 11 pages.
Office Action, dated Aug. 10, 2016, received in Australian Patent Application No. 2013259642, which corresponds with U.S. Appl. No. 14/536,291, 4 pages.
Innovation Patent, dated Sep. 1, 2016, received in Australian Patent Application No. 2016101481, which corresponds with U.S. Appl. No. 14/536,291, 1 page.
Office Action, dated Sep. 29, 2016, received in Australian Patent Application No. 2016101481, which corresponds with U.S. Appl. No. 14/536,291, 3 pages.
Office Action, dated Aug. 22, 2016, received in European Patent Application No. 13724107.1, which corresponds with U.S. Appl. No. 14/536,291, 7 pages.
Office Action, dated Mar. 23, 2017, received in European Patent Application No. 13724107.1, which corresponds with U.S. Appl. No. 14/536,291, 8 pages.
Final Office Action, dated Dec. 22, 2016, received in Japanese Patent Application No. 2015-511655, which corresponds with U.S. Appl. No. 14/536,291, 3 pages.
Notice of Allowance, dated Jan. 18, 2017, received in Australian Patent Application No. 2013368445, which corresponds with U.S. Appl. No. 14/608,985, 3 pages.
Office Action, dated Jul. 25, 2016, received in European Patent Application No. 13811032.5, which corresponds with U.S. Appl. No. 14/608,985, 8 pages.
Office Action, dated Feb. 27, 2017, received in European Patent Application No. 13811032.5, which corresponds with U.S. Appl. No. 14/608,985, 6 pages.
Notice of Allowance, dated Jan. 24, 2017, received in Japanese Patent Application No. 2015-550384, which corresponds with U.S. Appl. No. 14/608,985, 5 pages.
Patent, dated Feb. 24, 2017, received in Japanese Patent Application No. 2015550384, which corresponds with U.S. Appl. No. 14/608,985, 2 pages.
Office Action, dated Nov. 4, 2016, received in Korean Patent Application No. 10-2015-7019984, which corresponds with U.S. Appl. No. 14/608,985, 8 pages.

Office Action, dated Mar. 24, 2017, received in U.S. Appl. No. 14/609,006, 13 pages.
Office Action, dated Apr. 19, 2017, received in U.S. Appl. No. 14/536,296, 12 pages.
Office Action, dated Jan. 19, 2017, received in U.S. Appl. No. 14/609,042, 12 pages.
Notice of Allowance, dated Feb. 27, 2017, received in U.S. Appl. No. 14/864,737, 9 pages.
Patent, dated Aug. 3, 2016, received in Chinese Patent Application No. 201620214376.7, which corresponds with U.S. Appl. No. 14/864,737, 5 pages.
Intention to Grant, dated Aug. 2, 2016, received in Danish Patent Application No. 201500577, which corresponds with U.S. Appl. No. 14/864,737, 2 pages.
Office Action, dated May 15, 2017, received in Japanese Patent Application No. 2016-558331, which corresponds with U.S. Appl. No. 14/864,737, 5 pages.
Office Action, dated May 18, 2017, received in Dutch Patent Application No. 2016452, which corresponds with U.S. Appl. No. 14/864,737, 22 pages.
Notice of Allowance, dated Oct. 24, 2016, received in U.S. Appl. No. 14/866,981, 7 pages.
Notice of Allowance, dated Feb. 10, 2017, received in U.S. Appl. No. 14/866,981, 5 pages.
Patent, dated Nov. 2, 2016, received in Australian Patent Application No. 2016100254, which corresponds with U.S. Appl. No. 14/866,981, 1 page.
Patent, dated Sep. 28, 2016, received in Chinese Patent Application No. 201620176169.7, which corresponds with U.S. Appl. No. 14/866,981, 4 pages.
Office Action, dated Dec. 5, 2016, received in Danish Patent Application No. 201500575, which corresponds with U.S. Appl. No. 14/866,981, 3 pages.
Office Action, dated Jul. 5, 2016, received in Chinese Patent Application No. 201620186008.6, which corresponds with U.S. Appl. No. 14/866,159, 3 pages.
Certificate of Registration, dated Jun. 16, 2016, received in German Patent No. 202016001483.9, which corresponds with U.S. Appl. No. 14,866,159, 3 pages.
Office Action, dated Sep. 27, 2016, received in Danish Patent Application No. 201500574, which corresponds with U.S. Appl. No. 14/866,159, 4 pages.
Office Action, dated Mar. 14, 2017, received in Danish Patent Application No. 201500574, which corresponds with U.S. Appl. No. 14/866,159, 5 pages.
Innovation (Unexamined) Patent, dated Aug. 4, 2016, received in Australian Patent Application No. 2016101201, which corresponds with U.S. Appl. No. 14/686,078, 1 page.
Office Action, dated Oct. 12, 2016, received in Australian Patent Application No. 2016101201, which corresponds with U.S. Appl. No. 14/686,078, 3 pages.
Notice of Allowance, dated Oct. 1, 2016, received in Chinese Patent Application No. 201620175847.8, which corresponds with U.S. Appl. No. 14/686,078, 1 page.
Office Action, dated Sep. 2, 2016, received in Danish Patent Application No. 201500588, which corresponds with U.S. Appl. No. 14/868,078, 4 pages.
Notice of Allowance, dated Jan. 30, 2017, received in received in Danish Patent Application No. 201500588, which corresponds with U.S. Appl. No. 14/868,078, 2 pages.
Notice of Allowance, dated May 2, 2017, received in received in Danish Patent Application No. 201500588, which corresponds with U.S. Appl. No. 14/868,078, 2 pages.
Office Action, dated May 18, 2017, received in Dutch Patent Application No. 2016376, which corresponds with U.S. Appl. No. 14/868,078, 15 pages.
Notice of Allowance, dated Nov. 14, 2016, received in U.S. Appl. No. 14/863,432, 7 pages.
Notice of Allowance, dated Apr. 27, 2017, received in U.S. Appl. No. 14/863,432, 7 pages.
Office Action, dated Aug. 19, 2016, received in Australian Patent Application No. 2016100647, which corresponds with U.S. Appl. No. 14/863,432, 5 pages.

(56) References Cited

OTHER PUBLICATIONS

Notice of Allowance, dated Jan. 12, 2017, received in Chinese Patent Application No. 201620470063.8, which corresponds with U.S. Appl. No. 14/863,432, 1 page.
Office Action and Additional Search Report, dated Oct. 7, 2016, received in Danish Patent Application No. 201500582, which corresponds with U.S. Appl. No. 14/863,432, 6 pages.
Office Action, dated May 18, 2017, received in Dutch Patent Application No. 2016801, which corresponds with U.S. Appl. No. 14/863,432, 34 pages.
Office Action, dated Oct. 13, 2016, received in U.S. Appl. No. 14/866,511, 27 pages.
Final Office Action, dated Jan. 27, 2017, received in U.S. Appl. No. 14/866,511, 26 pages.
Patent, dated Aug. 8, 2016, received in Australian Patent Application 2016100653, corresponds with U.S. Appl. No. 14/866,511, 1 page.
Notice of Allowance, dated Jan. 12, 2017, received in Chinese Patent Application No. 201620470281.1, which corresponds with U.S. Appl. No. 14/866,511, 1 page.
Patent, dated Jan. 23, 2017, received in Danish Patent Application No. 201500576, which corresponds with U.S. Appl. No. 14/866,511, 3 pages.
Office Action, dated Jun. 9, 2017, received in Japanese Patent Application No. 2016558214, which corresponds with U.S. Appl. No. 14/866,511, 6 pages.
Final Office Action, dated Sep. 2, 2016, received in U.S. Appl. No. 14/869,899, 22 pages.
Notice of Allowance, dated Feb. 28, 2017, received in U.S. Appl. No. 14/869,899, 9 pages.
Innovation (Unexamined) Patent, dated Aug. 25, 2016, received in Australian Patent Application No. 2016101438, which corresponds with U.S. Appl. No. 14/869,899, 1 page.
Certificate of Examination, dated Oct. 11, 2016, received in Australian Patent Application No. 2016101438, which corresponds with U.S. Appl. No. 14/869,899, 1 page.
Office Action, dated Oct. 7, 2016, received in Danish Patent Application No. 201500592, which corresponds with U.S. Appl. No. 14/869,899, 6 pages.
Office Action, dated Nov. 22, 2016, received in Danish Patent Application No. 201670594, which corresponds with U.S. Appl. No. 14/869,899, 9 pages.
Office Action, dated Apr. 13, 2017, received in U.S. Appl. No. 14/866,992, 34 pages.
Innovation Patent, dated Sep. 22, 2016, received in Australian Patent Application No. 2016101418, which corresponds with U.S. Appl. No. 14/866,992, 1 page.
Office Action, dated Nov. 22, 2016, received in Australian Patent Application No. 2016101418, which corresponds with U.S. Appl. No. 14/866,992, 7 pages.
Office Action, dated Feb. 7, 2017, received in Australian Patent Application No. 2016101418, which corresponds with U.S. Appl. No. 14/866,992, 5 pages.
Office Action, dated Feb. 6, 2017, received in Danish Patent Application No. 201500593, which corresponds with U.S. Appl. No. 14/866,992, 4 pages.
Notice of Allowance, dated Aug. 26, 2016, received in U.S. Appl. No. 14/845,217, 5 pages.
Notice of Allowance, dated Jan. 4, 2017, received in U.S. Appl. No. 14/845,217, 5 pages.
Office Action, dated May 2, 2017, received in U.S. Appl. No. 14/856,517, 34 pages.
Office Action, dated May 18, 2017, received in U.S. Appl. No. 14/856,519, 35 pages.
Office Action, dated Jun. 9, 2017, received in U.S. Appl. No. 14/856,520, 36 pages.
Notice of Allowance, dated Oct. 24, 2016, received in U.S. Appl. No. 14/857,645, 6 pages.
Office Action, dated Mar. 31, 2017, received in U.S. Appl. No. 14/857,700, 14 pages.
Notice of Allowance, dated Dec. 28, 2016, received in U.S. Appl. No. 14/864,580, 8 pages.
Office Action, dated Aug. 19, 2016, received in Australian Patent Application No. 2016100648, which corresponds with U.S. Appl. No. 14/864,580, 6 pages.
Notice of Allowance, dated Nov. 8, 2016, received in Chinese Patent Application No. 201620470247.4, which corresponds with U.S. Appl. No. 14/864,580, 3 pages.
Certificate of Registration, dated Oct. 14, 2016, received in German Patent Application No. 20201600003234.9, which corresponds with U.S. Appl. No. 14/864,580, 3 pages.
Office Action, dated Oct. 7, 2016, received in Danish Patent Application No. 201500584, which corresponds with U.S. Appl. No. 14/864,580, 3 pages.
Office Action, dated May 5, 2017, received in Danish Patent Application No. 201500584, which corresponds with U.S. Appl. No. 14/864,580, 3 pages.
Notice of Allowance, dated Nov. 23, 2016, received in U.S. Appl. No. 14/864,601, 12 pages.
Notice of Allowance, dated Apr. 20, 2017, received in U.S. Appl. No. 14/864,601, 13 pages.
Notice of Allowance, dated Jan. 31, 2017, received in U.S. Appl. No. 14/864,627, 7 pages.
Office Action, dated Oct. 7, 2016, received in Danish Patent Application No. 201500585, which corresponds with U.S. Appl. No. 14/864,627, 3 pages.
Office Action, dated May 4, 2017, received in Danish Patent Application No. 201500585, which corresponds with U.S. Appl. No. 14/864,627, 4 pages.
Certificate of Examination, dated Dec. 8, 2016, received in Australian Patent Application No. 2016100292, which corresponds with U.S. Appl. No. 14/866,361, 1 page.
Letters Patent, dated Aug. 3, 2016, received in Chinese Patent Application No. 201620251706.X, which corresponds with U.S. Appl. No. 14/866,361, 3 pages.
Office Action, dated Oct. 28, 2016, received in Danish Patent Application No. 201500579, which corresponds with U.S. Appl. No. 14/866,361, 3 pages.
Patent, dated Aug. 8, 2016, received in Australian Patent Application No. 2016100649, which corresponds with U.S. Appl. No. 14/866,987, 1 page.
Office Action, dated Oct. 19, 2016, received in Chinese Patent Application No. 2016201470246.X, which corresponds with U.S. Appl. No. 14/866,987, 4 pages.
Patent, dated May 3, 2017, received in Chinese Patent Application No. 2016201470246.X, which corresponds with U.S. Appl. No. 14/866,987, 2 pages.
Patent, dated Sep. 19, 2016, received in German Patent Application No. 202016002908.9, which corresponds with U.S. Appl. No. 14/866,987, 3 pages.
Notice of Allowance, dated Nov. 1, 2016, received in Danish Patent Application No. 201500587, which corresponds with U.S. Appl. No. 14/866,987, 2 pages.
Office Action and Search Report, dated Sep. 9, 2016, received in Danish Patent Application No. 201670463, which corresponds with U.S. Appl. No. 14/866,987, 7 pages.
Office Action, dated Jan. 31, 2017, received in Danish Patent Application No. 201670463, which corresponds with U.S. Appl. No. 14/866,987, 3 pages.
Office Action, dated Apr. 19, 2017, received in Danish Patent Application No. 201670463, which corresponds with U.S. Appl. No. 14/866,987, 3 pages.
Notice of Allowance, dated Nov. 1, 2016, received in Danish Patent Application No. 201500589, which corresponds with U.S. Appl. No. 14/866,989, 2 pages.
Final Office Action, dated Nov. 4, 2016, received in U.S. Appl. No. 14/871,236, 24 pages.
Notice of Allowance, dated Feb. 28, 2017, received in U.S. Appl. No. 14/871,236, 9 pages.
Innovation (Unexamined) Patent, dated Aug. 25, 2016, received in Australian Patent Application No. 2016101433, which corresponds with U.S. Appl. No. 14/871,236, 1 page.

(56) References Cited

OTHER PUBLICATIONS

Office Action, dated Oct. 14, 2016, received in Australian Patent Application No. 2016101433, which corresponds with U.S. Appl. No. 14/871,236, 3 pages.
Office Action and Additional Search Report, dated Sep. 30, 2016, received in Danish Patent Application No. 201500595, which corresponds with U.S. Appl. No. 14/871,236, 10 pages.
Innovation (Unexamined) Patent, dated Aug. 25, 2016, received in Australian Patent Application No. 2016101436, which corresponds with U.S. Appl. No. 14/871,236, 1 pages.
Office Action, dated Oct. 31, 2016, received in Australian Patent Application No. 2016101438, which corresponds with U.S. Appl. No. 14/871,236, 6 pages.
Office Action, dated Oct. 17, 2016, received in Australian Patent Application No. 2016203040, which corresponds with U.S. Appl. No. 14/871,227, 7 pages.
Office Action, dated Oct. 18, 2016, received in Australian Patent Application No. 2016101431, which corresponds with U.S. Appl. No. 14/871,227, 3 pages.
Office Action, dated Apr. 13, 2017, received in Australian Patent Application No. 2016101431, which corresponds with U.S. Appl. No. 14/871,227, 4 pages.
Patent, dated Sep. 26, 2016, received in Danish Patent Application No. 201500597, which corresponds with U.S. Appl. No. 14/871,227, 7 pages.
Office Action, dated Mar. 24, 2017, received in Japanese Patent Application No. 2016-533201, which corresponds with U.S. Appl. No. 14/871,227, 6 pages.
Office Action, dated Oct. 14, 2016, received in Australian Patent Application No. 2016101437, which corresponds with U.S. Appl. No. 14/871,336, 2 pages.
Office Action, dated Apr. 11, 2017, received in Australian Patent Application No. 2016101437, which corresponds with U.S. Appl. No. 14/871,336, 4 pages.
Office Action, dated Oct. 18, 2016, received in Danish Patent Application No. 201500601, which corresponds with U.S. Appl. No. 14/871,336, 3 pages.
Notice of Allowance, dated Mar. 23, 2017, received in Danish Patent Application No. 201500601, which corresponds with U.S. Appl. No. 14/871,336, 2 pages.
Innovation Patent, dated Aug. 25, 2016, received in Australian Patent Application No. 2016101435, which corresponds with U.S. Appl. No. 14/871,462, 1 page.
Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Office Action, dated Apr. 20, 2017, received in Chinese Patent Application No. 201621044346.2, which corresponds with U.S. Appl. No. 14/871,462, 3 pages.
Grant, dated Aug. 30, 2016, received in Danish Patent Application No. 201500600, which corresponds with U.S. Appl. No. 14/871,462, 2 pages.
Office Action, dated Mar. 13, 2017, received in Japanese Patent Application No. 2016-183289, which corresponds with U.S. Appl. No. 14/871,462, 5 pages.
Final Office Action, dated Sep. 28, 2016, received in U.S. Appl. No. 14/867,823, 31 pages.
Office Action, dated May 11, 2017, received in U.S. Appl. No. 14/867,823, 42 pages.
Office Action, dated Sep. 7, 2016, received in Danish Patent Application No. 201500594, which corresponds with U.S. Appl. No. 14/867,823, 4 pages.
Office Action, dated May 15, 2017, received in Danish Patent Application No. 201500594, which corresponds with U.S. Appl. No. 14/867,823, 4 pages.
Final Office Action, dated Nov. 2, 2016, received in U.S. Appl. No. 14/867,892, 48 pages.
Office Action, dated Sep. 14, 2016, received in Danish Patent Application No. 201500598, which corresponds with U.S. Appl. No. 14/867,892, 4 pages.
Office Action, dated May 4, 2017, received in Danish Patent Application No. 201500598, which corresponds with U.S. Appl. No. 14/867,892, 4 pages.
Office Action, dated Mar. 1, 2017, received in U.S. Appl. No. 14/869,855, 14 pages.
Office Action, dated Feb. 9, 2017, received in U.S. Appl. No. 14/869,873, 17 pages.
Office Action, dated Jul. 5, 2016, received in Chinese Patent Application No. 201620176221.9, which corresponds with U.S. Appl. No. 14/867,990, 4 pages.
Office Action, dated Oct. 25, 2016, received in Chinese Patent Application No. 201620176221.9, which corresponds with U.S. Appl. No. 14/867,990, 7 pages.
Office Action, dated Sep. 26, 2016, received in Danish Patent Application No. 201500581, which corresponds with U.S. Appl. No. 14/867,990, 5 pages.
Office Action, dated May 3, 2017, received in Danish Patent Application No. 201500581, which corresponds with U.S. Appl. No. 14/867,990, 5 pages.
Office Action, dated Nov. 25, 2016, received in U.S. Appl. No. 15/081,771, 17 pages.
Final Office Action, dated Jun. 2, 2017, received in U.S. Appl. No. 15/081,771, 17 pages.
Final Office Action, dated May 1, 2017, received in U.S. Appl. No. 15/136,782, 18 pages.
Office Action, dated May 23, 2017, received in Danish Patent Application No. 201770190, which corresponds with U.S. Appl. No. 15/136,782, 7 pages.
Office Action, dated Jan. 20, 2017, received in U.S. Appl. No. 15/231,745, 21 pages.
Office Action and Search Report, dated Oct. 17, 2016, received in Danish Patent Application No. 201670587, which corresponds with U.S. Appl. No. 15/231,745, 9 pages.
Office Action (Search Report), dated Dec. 14, 2016, received in Danish Patent Application No. 201670590, which corresponds with U.S. Appl. No. 15/231,745, 9 pages.
Office Action (Search Report), dated Nov. 10, 2016, received in Danish Patent Application No. 201670591, which corresponds with U.S. Appl. No. 15/231,745, 12 pages.
Office Action and Search Report, dated Oct. 26, 2016, received in Danish Patent Application No. 201670592, which corresponds with U.S. Appl. No. 15/231,745, 8 pages.
Office Action, dated Jan. 5, 2017, received in Danish Patent Application No. 201670592, which corresponds with U.S. Appl. No. 15/231,745, 3 pages.
Office Action and Search Report, dated Oct. 12, 2016, received in Danish Patent Application No. 201670593, which corresponds with U.S. Appl. No. 15/231,745, 7 pages.
Extended European Search Report, dated Oct. 7, 2016, received in European Patent Application No. 16177863.4, which corresponds with U.S. Appl. No. 14/536,267, 12 pages.
Extended European Search Report, dated Mar. 15, 2017, received in European Patent Application No. 17153418.3, which corresponds with U.S. Appl. No. 14/536,648, 7 pages.
International Search Report and Written Opinion, dated Oct. 14, 2016, received in International Patent Application No. PCT/US2016/020697, which corresponds with U.S. Appl. No. 14/866,981, 21 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Aug. 29, 2016, received in International Patent Application No. PCT/US2016/021400, which corresponds with U.S. Appl. No. 14/869,899, 48 pages.

(56) References Cited

OTHER PUBLICATIONS

International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.
International Search Report and Written Opinion, dated Feb. 27, 2017, received in International Patent Application No. PCT/US2016/046407, which corresponds with U.S. Appl. No. 15/009,688, 30 pages.
Extended European Search Report, dated Jun. 8, 2017, received in European Patent Application No. 16189425.8, which corresponds with U.S. Appl. No. 14/866,989, 8 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
Office Action, dated Jun. 29, 2017, received in U.S. Appl. No. 14/608,895, 30 pages.
Office Action, dated Jul. 26, 2017, received in U.S. Appl. No. 14/536,235, 14 pages.
Office action, dated Aug. 3, 2017, received in U.S. Appl. No. 14/536,426, 10 pages.
Office Action, dated Jul. 17, 2017, received in U.S. Appl. No. 14/536,166, 19 pages.
Notice of Allowance, dated Jul. 10, 2017, received in U.S. Appl. No. 14/609,042, 8 pages.
Notice of Allowance, dated Jun. 19, 2017, received in U.S. Appl. No. 14/864,737, 8 pages.
Office Action, dated Jun. 30, 2017, received in U.S. Appl. No. 14/856,522, 22 pages.
Notice of Allowance, dated Jun. 16, 2017, received in in U.S. Appl. No. 14/857,645, 5 pages.
Office Action, dated Jul. 6, 2017, received in U.S. Appl. No. 14/867,892, 55 pages.
Brownlee, "Android 5.0 Lollipop Feature Review!", https//www.youtube.com/watch?v=pEDQ1z1-PvU, Oct. 27, 2014, 5 pages. Jun. 16 Foreign.
Google-Chrome, "Android 5.0 Lollipop", http://androidlovernet/android-os/android-5-0-lollipop/android-5-0-lollipop-recent-apps-card-google-search.html, Oct. 19, 2014, 10 pages. Jun. 16 Foreign.
YouTube, "How to Master Android Lollipop Notifications in Four Minutes!", Video Gadgets Journal (VGJFelix), https://www.youtube.com/watch?v=S-zBRG7GGJgs, Feb. 8, 2015, 4 pages. Jun. 29 Foreign.
Patent, dated May 26, 2017, received in Korean Patent Application No. 20157018851, which corresponds with U.S. Appl. No. 14/536,426, 3 pages.
Office Action, dated Jul. 4, 2017, received in European Patent Application No. 13795392.3, which corresponds with U.S. Appl. No. 14/608,926, 4 pages.
Patent, dated Jun. 30, 2017, received in Korean Patent Application No. 2015-7018853, which corresponds with U.S. Appl. No. 14/608,926, 3 pages.
Office Action, dated Jul. 21, 2017, received in Australian Patent Application No. 2016262773, which corresponds with U.S. Appl. No. 14/536,141, 3 pages.
Notice of Allowance, dated Jun. 30, 2017, received in Japanese Patent Application No. 2015-511646, which corresponds with U.S. Appl. No. 14/536,141, 5 pages.
Office Action, dated Jun. 16, 2017, received in Chinese Patent Application No. 201380068295.X, which corresponds with U.S. Appl. No. 14/608,942, 6 pages.
Patent, dated Jun. 16, 2017, received in Japanese Patent Application No. 2015549393, which corresponds with U.S. Appl. No. 14/608,942, 3 pages.
Office Action, dated Jul. 4, 2017, received in Australian Patent Application No. 2016238917, which corresponds with U.S. Appl. No. 14/536,203, 5 pages.
Office Action, dated Jun. 23, 2017, received in Japanese Patent Application No. 2016173113, which corresponds with U.S. Appl. No. 14/536,203, 5 pages.
Office Action, dated Jul. 21, 2017, received in Australian Patent Application No. 2016216658, which corresponds with U.S. Appl. No. 14/536,291, 3 pages.
Patent, dated May 18, 2017, received in Australian Patent Application No. 2013368445, which corresponds with U.S. Appl. No. 14/608,985, 1 page.
Office Action, dated May 19, 2017, received in Chinese Patent Application No. 201380068399.0, which corresponds with U.S. Appl. No. 14/608,985, 5 pages.
Office Action, dated Jul. 21, 2017, received in Australian Patent Application No. 2016247194, which corresponds with U.S. Appl. No. 14/536,648, 3 pages.
Notice of Allowance, dated Jun. 23, 2017, received in Japanese Patent Application No. 2016-558331, which corresponds with U.S. Appl. No. 14/864,737, 5 pages.
Office Action, dated Jul. 7, 2017, received in Danish Patent Application No. 201500575, 4 pages.
Office Action, dated Jul. 6, 2017, received in Danish Patent Application No. 201500574, which corresponds with U.S. Appl. No. 14/866,159, 3 pages.
Office Action, dated Jun. 12, 2017, received in Danish Patent Application No. 201500582, which corresponds with U.S. Appl. No. 14/863,432, 5 pages.
Notice of Allowance, dated Jul. 14, 2017, received in Japanese Patent Application No. 2016558214, which corresponds with U.S. Appl. No. 14/866,511, 5 pages.
Office Action, dated Jul. 3, 2017, received in Danish Patent Application No. 201500592, which corresponds with U.S. Appl. No. 14/869,899, 5 pages.
Office Action, dated Jun. 15, 2017, received in Danish Patent Application No. 201500579, which corresponds with U.S. Appl. No. 14/866,361, 2 pages.
Office Action, dated Jul. 31, 2017, received in Japanese Patent Application No. 2017126445, which corresponds with U.S. Appl. No. 14/866,987, 4 pages.
Office Action, dated Jun. 16, 2017, received in Japanese Patent Application No. 2016-233450, which corresponds with U.S. Appl. No. 14/866,989, 6 pages.
Office Action, dated Jun. 15, 2017, received in Danish Patent Application No. 201500595, which corresponds with U.S. Appl. No. 14/871,236, 4 pages.
Office Action, dated Jun. 29, 2017, received in Danish Patent Application No. 201670587, which corresponds with U.S. Appl. No. 15/231,745, 4 pages.
Office Action, dated Jul. 6, 2017, received in Danish Patent Application No. 201670590, which corresponds with U.S. Appl. No. 15/231,745, 3 pages.
Office Action, dated Jul. 27, 2017, received in Australian Patent Application No. 2017100535, which corresponds with U.S. Appl. No. 15/272,341, 4 pages.
Search Report, dated Jun. 22, 2017, received in Dutch Patent Application No. 2016375, which corresponds with U.S. Appl. No. 14/866,981, 17 pages.
Search Report, dated Jun. 19, 2017, received in Dutch Patent Application No. 2016377, which corresponds with U.S. Appl. No. 14/866,159, 13 pages.
Extended European Search Report, dated Jun. 22, 2017, received in European Patent Application No. 16189421.7, which corresponds with U.S. Appl. No. 14/866,987, 7 pages.
Extended European Search Report, dated Jul. 25, 2017, received in European Patent Application No. 17171972.7, which corresponds with U.S. Appl. No. 14/870,882, 12 pages.

(56) References Cited

OTHER PUBLICATIONS

Extended European Search Report, dated Jul. 25, 2017, received in European Patent Application No. 1717226.3, which corresponds with U.S. Appl. No. 14/871,336, 9 pages.

* cited by examiner

While detecting the touch input on the touch-sensitive surface:

(A)

814 In response to determining that the intensity of the touch input on the touch-sensitive surface has changed from below the first intensity threshold to above the first intensity threshold, process instructions in the web page that correspond to the force down event 816 Subsequent to determining that the intensity of the touch input on the touch-sensitive surface has changed from below the first intensity threshold to above the first intensity threshold, determine whether the intensity of the touch input on the touch-sensitive surface has changed from above a third intensity threshold to below the third intensity threshold, and
in response to determining that the intensity of the touch input on the touch-sensitive surface has changed from above the third intensity threshold to below the third intensity threshold, generate a force up event that is distinct from the force down event.

818 Determine whether the intensity of the touch input on the touch-sensitive surface has changed, and in response to determining that the intensity of the touch input on the touch-sensitive surface has changed, generate a force changed event 820 In response to determining that the intensity of the touch input on the touch-sensitive surface has changed and determining that the touch input has not moved across the touch-sensitive surface, generate the force changed event without generating a mouse moved event 822 In response to detecting an input that includes movement of the touch input and a change in intensity of the touch input on the touch-sensitive surface, generate one or more mouse moved events that correspond to the touch input and generate one or more force changed events that correspond to the touch input. The one or more force changed events are separate from the one or more mouse moved events.

Figure 8B

While detecting the touch input on the touch-sensitive surface:

(A)

---

824 In response to determining that force event will begin criteria are satisfied, generate a will begin event that is distinct from the mouse down event 826 In response to determining that force event preview criteria are satisfied:
in accordance with a determination that the webpage does not include instructions that correspond to the will begin event, process the touch input in accordance with instructions in the first application that correspond to the will begin event, and
in accordance with a determination that the webpage includes instructions that correspond to the will begin event, forgo processing the touch input in accordance with instructions in the first application that correspond to the will begin event

---

828 The instructions in the webpage that correspond to the force down event are processed using a first application. Generate a tactile output that corresponds to the force down event using a tactile output module that is distinct and separate from the first application. The tactile output that corresponds to the force down event is generated concurrently with processing the instructions in the webpage that correspond to the force down event.

---

830 The first location on the touch-sensitive surface corresponds to a first user interface object.
The instructions in the webpage that correspond to the mouse down event correspond to the first user interface object.
The instructions in the webpage that correspond to the force down event correspond to the first user interface object.

Figure 8C

DEVICES AND METHODS FOR PROCESSING TOUCH INPUTS WITH INSTRUCTIONS IN A WEB PAGE

RELATED APPLICATIONS

This application claims priority to U.S. Provisional Application Ser. No. 62/184,816, filed Jun. 25, 2015, entitled "Devices and Methods for Processing Touch Inputs with Instructions in a Web Page," and U.S. Provisional Application Ser. No. 62/172,187, filed Jun. 7, 2015, entitled "Devices and Methods for Processing Touch Inputs with Instructions in a Web Page" both of which are incorporated by reference herein in their entireties.

This application relates to U.S. Provisional Application Ser. No. 62/129,954, filed Mar. 8, 2015, and U.S. Provisional Application Ser. No. 62/183,139, filed Jun. 22, 2015, both of which are incorporated by reference herein in their entireties.

TECHNICAL FIELD

This relates generally to electronic devices with touch-sensitive surfaces, including but not limited to electronic devices with touch-sensitive surfaces that display web pages.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But operations for performing these manipulations are predefined in software applications, and it is difficult to customize (e.g., change) performance of these manipulations, without revising the software applications. For example, a revised software application (e.g., an updated software application) needs to be downloaded and installed to customize (e.g., modify) performance of these manipulations. Thus, providing customized operations for modifying performance of such manipulations is time-consuming and inefficient, thereby wasting energy. This latter consideration is particularly important in battery-operated devices.

SUMMARY

Accordingly, the present disclosure provides electronic devices with faster, more efficient methods for providing customized processing of touch inputs. Such methods and interfaces optionally complement or replace conventional methods for providing customized processing of touch inputs. Such methods and interfaces provide a more efficient human-machine interface by allowing customized processing of touch inputs. Further, such methods reduce the processing power consumed to process touch inputs, conserve power, reduce unnecessary/extraneous/repetitive inputs, and potentially reduce memory usage. For battery-operated devices, such methods and interfaces conserve battery power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors. Alternatively, or in addition, executable instructions for performing these functions are, optionally, included in a transitory computer-readable storage medium or other computer program product configured for execution by one or more processors.

In accordance with some embodiments, a method is performed at an electronic device with a display, a touch-sensitive surface, and one or more sensors to detect intensity of contacts with the touch-sensitive surface. The method includes: detecting a touch input on the touch-sensitive surface at a first location that corresponds to the displayed portion of a web page on the display, while displaying a user interface that corresponds to at least a portion of the web page on the display, and while detecting the touch input on the touch-sensitive surface, detecting an intensity of the touch input on the touch-sensitive surface, determining whether the intensity of the touch input on the touch-sensitive surface has changed from below a first intensity threshold to above the first intensity threshold, and in response to determining that the intensity of the touch input on the touch-sensitive surface has changed from below the first intensity threshold to above the first intensity threshold, generating a force down event that is distinct from a mouse down event.

In accordance with some embodiments, a method is performed at an electronic device with a display, a touch sensitive surface and one or more sensors that are configured to detect the intensity of inputs on the touch-sensitive surface. The method includes displaying, on the display, a content region including first content that contains an image; and, while displaying the first content in the content region on the display, detecting an input at a location that corresponds to the location of the image on the display. The method also includes, in response to detecting the input: in accordance with a determination that the input includes an intensity above a respective threshold and that the image is associated with a link to second content that is different from the first content, displaying a preview of the second content while maintaining display of at least a portion of the first content in the content region; and, in accordance with a determination that the input includes an intensity above a respective threshold and that the image is not associated with a link to additional content, displaying an enlarged version of the image while maintaining display of at least a portion of the first content in the content region.

In accordance with some embodiments, an electronic device includes a display, a touch-sensitive surface, one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In some embodiments, the electronic device includes one or more sensors to detect signals from a stylus associated with the electronic device. In accordance with some embodiments, a computer readable storage medium (e.g., a non-transitory computer readable storage medium, or alternatively, a transitory computer readable storage medium) has stored therein instructions which when executed by an electronic device with a display, a touch-sensitive surface, and one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, one or more sensors to detect intensity of contacts with the touch-sensitive surface, a memory, and one or more processors to execute one or more programs stored in the memory includes one or more of the elements displayed in any of the methods described above, which are updated in response to inputs, as described in any of the methods described herein. In accordance with some embodiments, an electronic device includes: a display, a touch-sensitive surface, and one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and one or more sensors to detect intensity of contacts with the touch-sensitive surface, includes means for performing or causing performance of the operations of any of the methods described herein.

Thus, electronic devices with displays, touch-sensitive surfaces and one or more sensors to detect intensity of contacts with the touch-sensitive surface are provided with faster, more efficient methods and interfaces for customized processing of touch inputs, thereby increasing the effectiveness and efficiency of such devices, and user satisfaction with such devices. Furthermore, such methods and interfaces reduce processing power, reduce memory usage, reduce battery usage, and/or reduce unnecessary or extraneous or repetitive inputs. Furthermore, such methods and interfaces may complement or replace conventional methods for customized processing of touch inputs.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8C are flow diagrams illustrating a method of processing touch inputs with instructions in a web page in accordance with some embodiments.

DESCRIPTION OF EMBODIMENTS

Many electronic devices store applications to allow certain manipulations of displayed user interface objects in response to touch inputs. Such applications are hardcoded for predefined operations that define how touch inputs are to be processed. However, instructions included in a document (e.g., JavaScript instructions in a web page) can be used to provide customized operations. For example, instructions in the document can be tailored based on the content of the document (e.g., user interface objects defined in the document) to improve user experience. Because such documents (e.g., web pages) can be readily modified and used without installing them on the electronic devices, instructions included (e.g., embedded) in such documents offer flexibility as to how the content of the documents is delivered to users. However, conventional methods and user interfaces (e.g., those offered by conventional web pages with JavaScript instructions) are inefficient and/or incompatible in allowing operations based on an intensity of a touch input on a touch-sensitive surface. For example, generating a mouse moved event due to a change to the intensity of a touch input on the touch-sensitive surface without the touch input moving across the touch-sensitive surface can generate an error. By providing force events separate from mouse events, the describe methods streamline handling of changes to the intensity of a touch input on the touch-sensitive surface. In addition, because the force events are generated using a separate software module (e.g., a Webkit), instructions included in web pages do not need to define operations performed by the separate software module, thereby simplifying the instructions in the web pages. This also reduces the burden on web developers and facilitates development of web pages that can more efficiently handle changes to the intensity of a touch input on a touch-sensitive surface.

Figure 2:
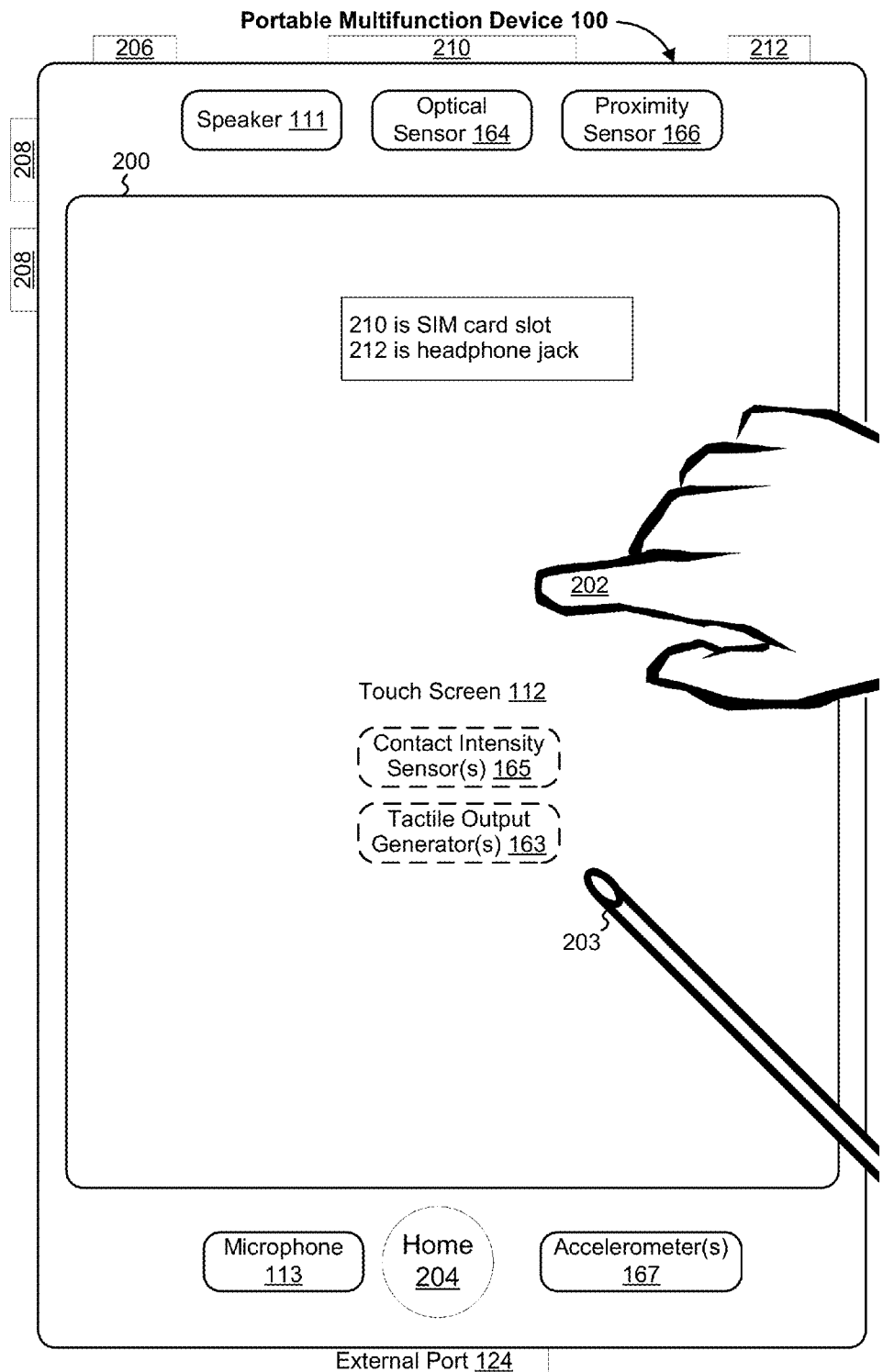
FIG. 2 illustrates a portable multifunction device having a touch screen in accordance with some embodiments.
Figure 3:
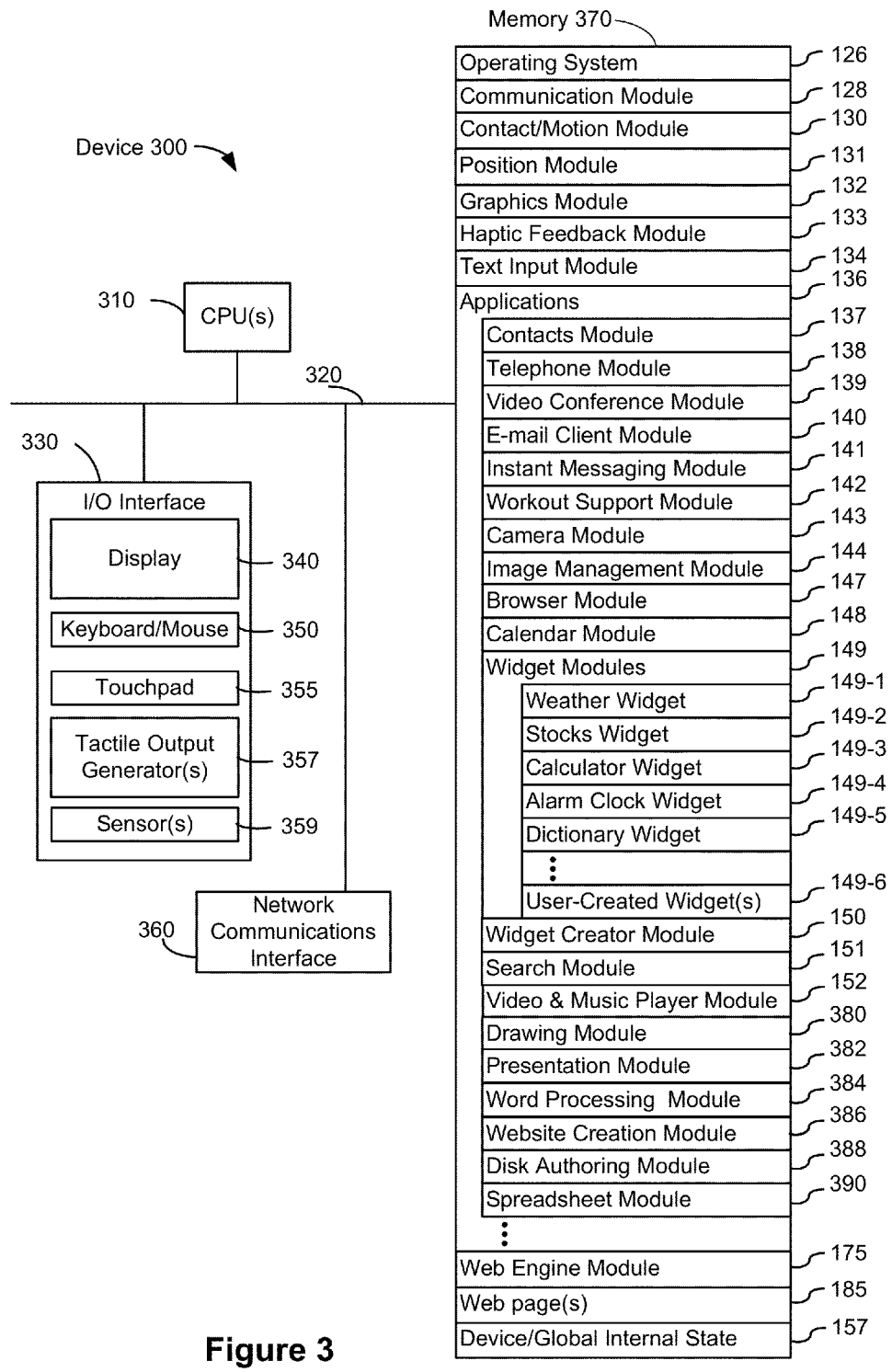
FIG. 3 is a block diagram of an exemplary multifunction device with a display and a touch-sensitive surface in accordance with some embodiments.
Figure 4:
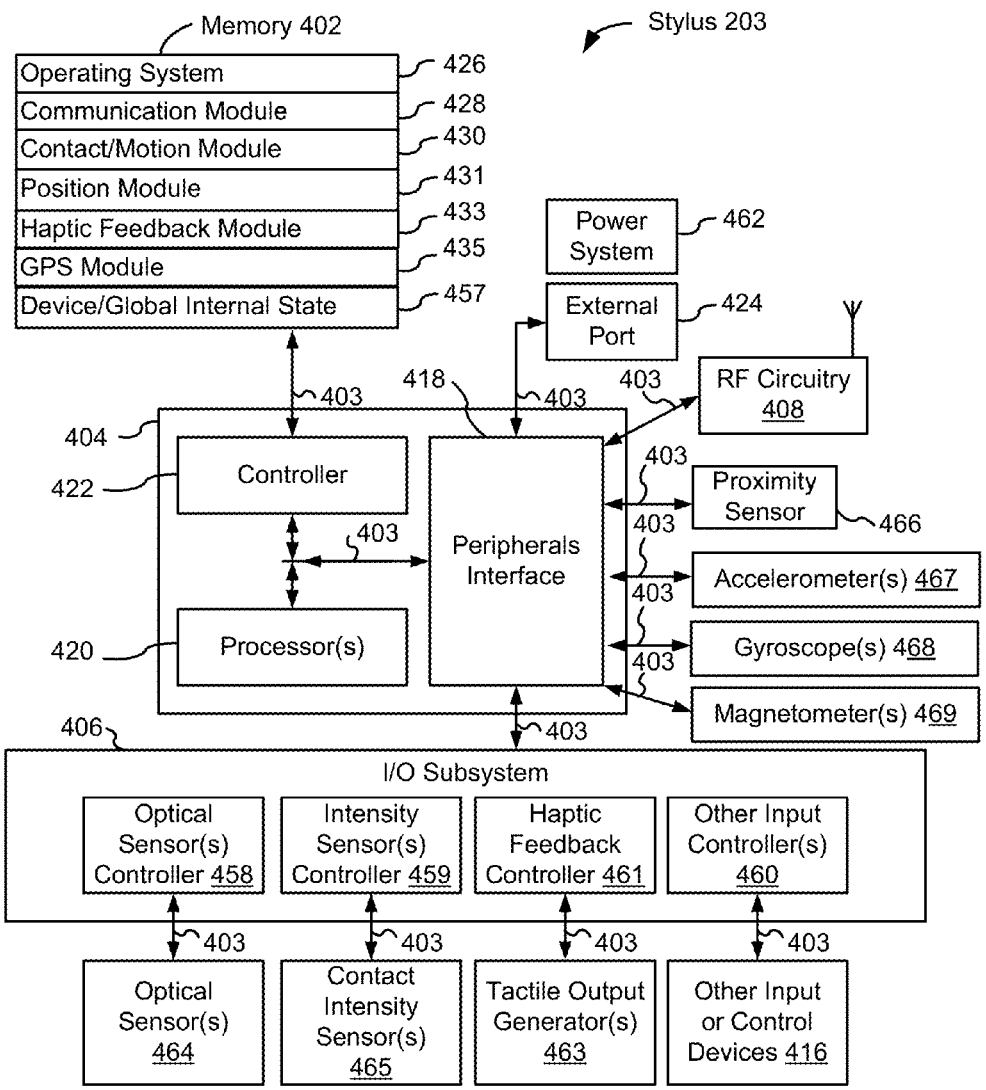
FIG. 4 is a block diagram of an exemplary electronic stylus in accordance with some embodiments.
Figure 5A:
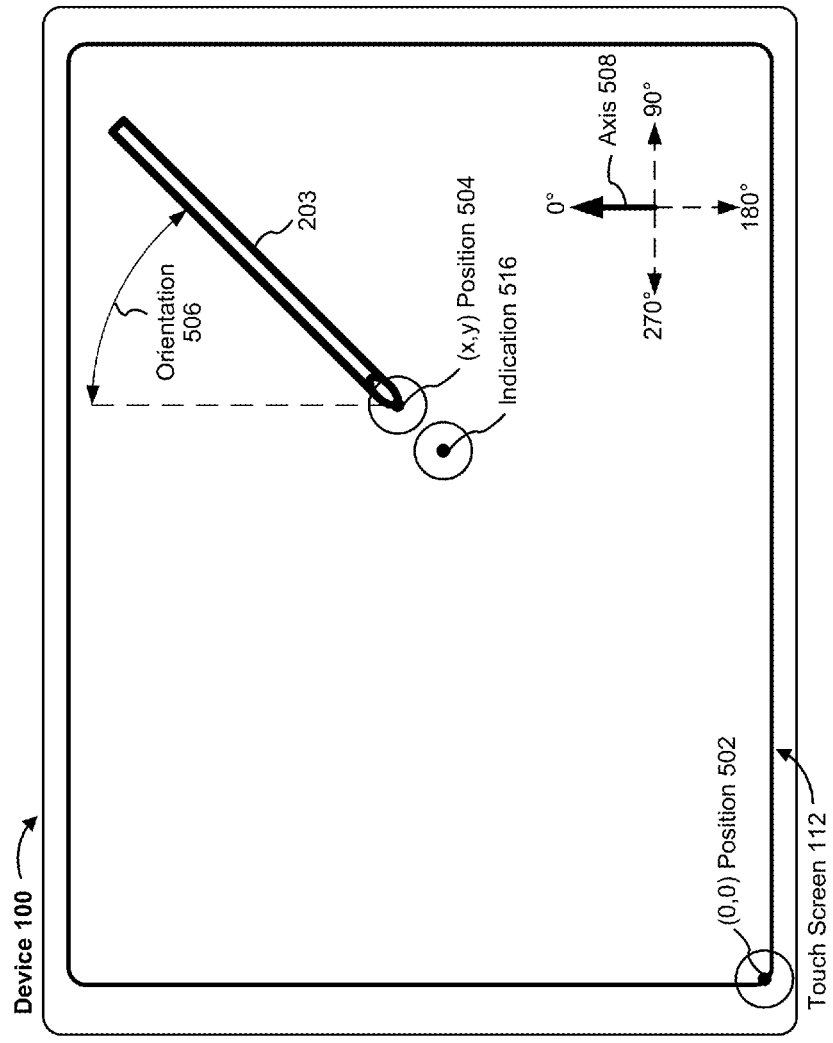
FIGS. 5A-5B illustrate a positional state of a stylus relative to a touch-sensitive surface in accordance with some embodiments.
Figure 5A:
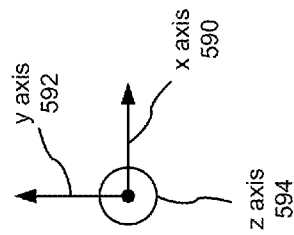
Figure 5B:
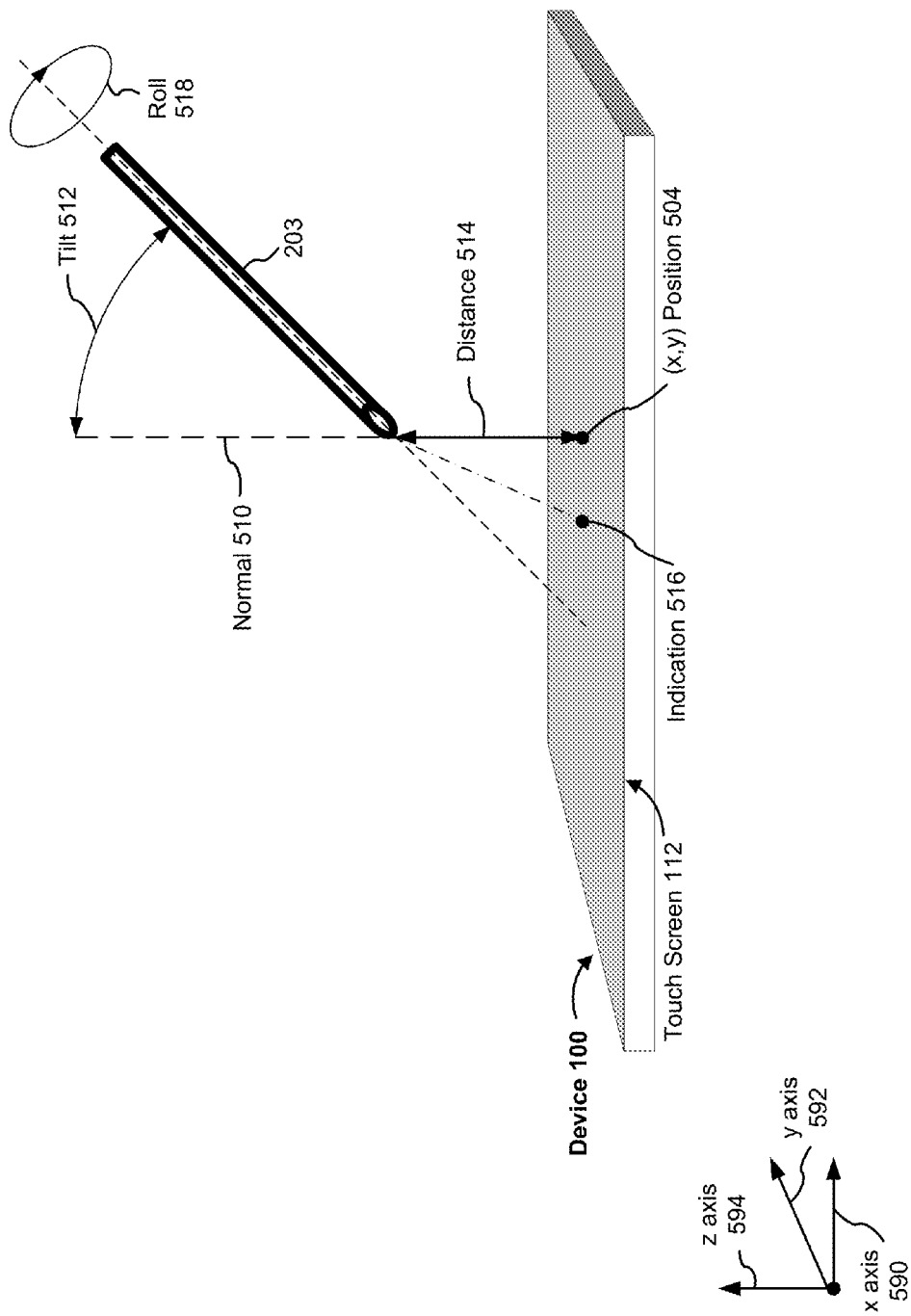
Figure 8A:
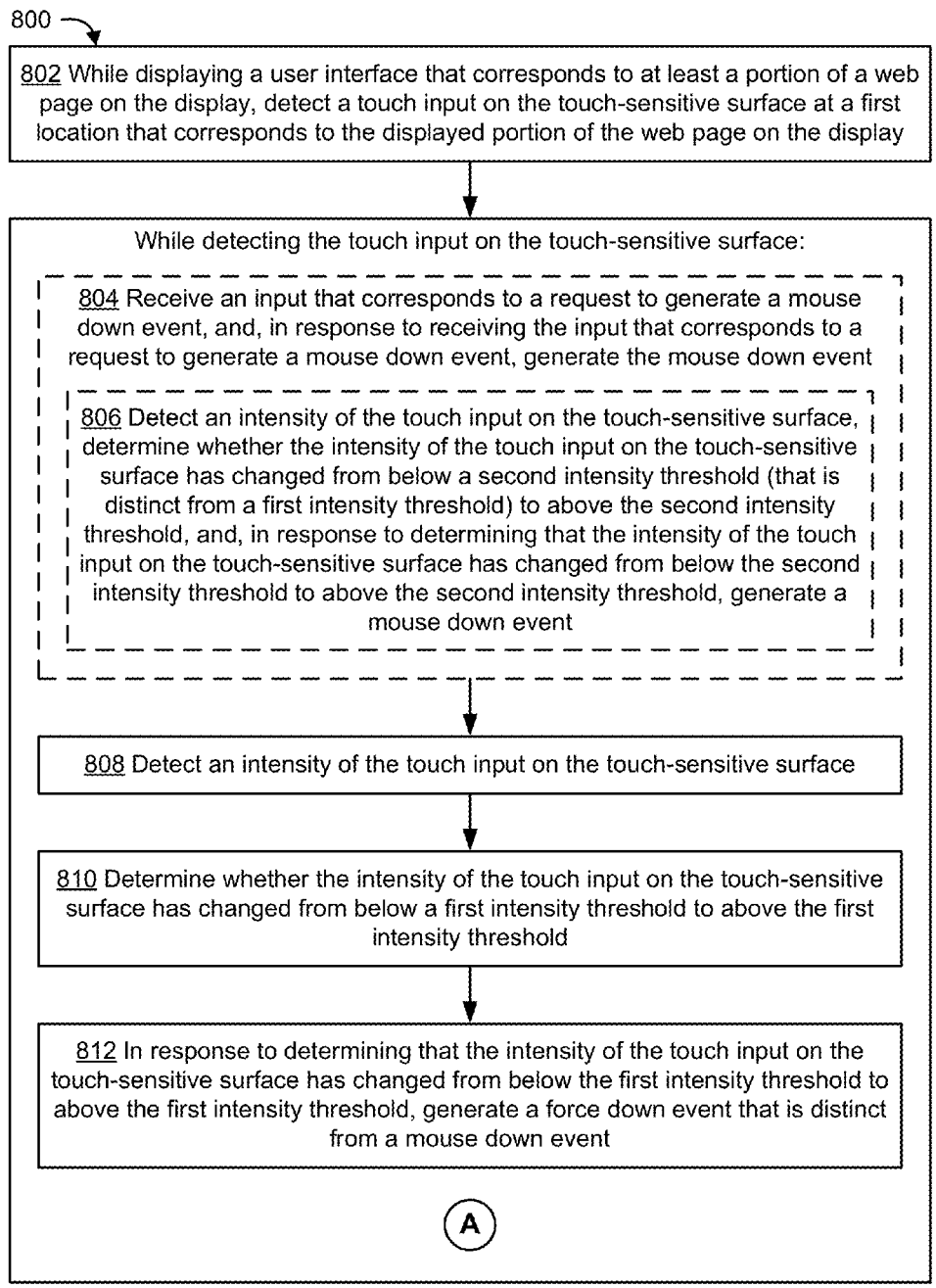
Figure 9:
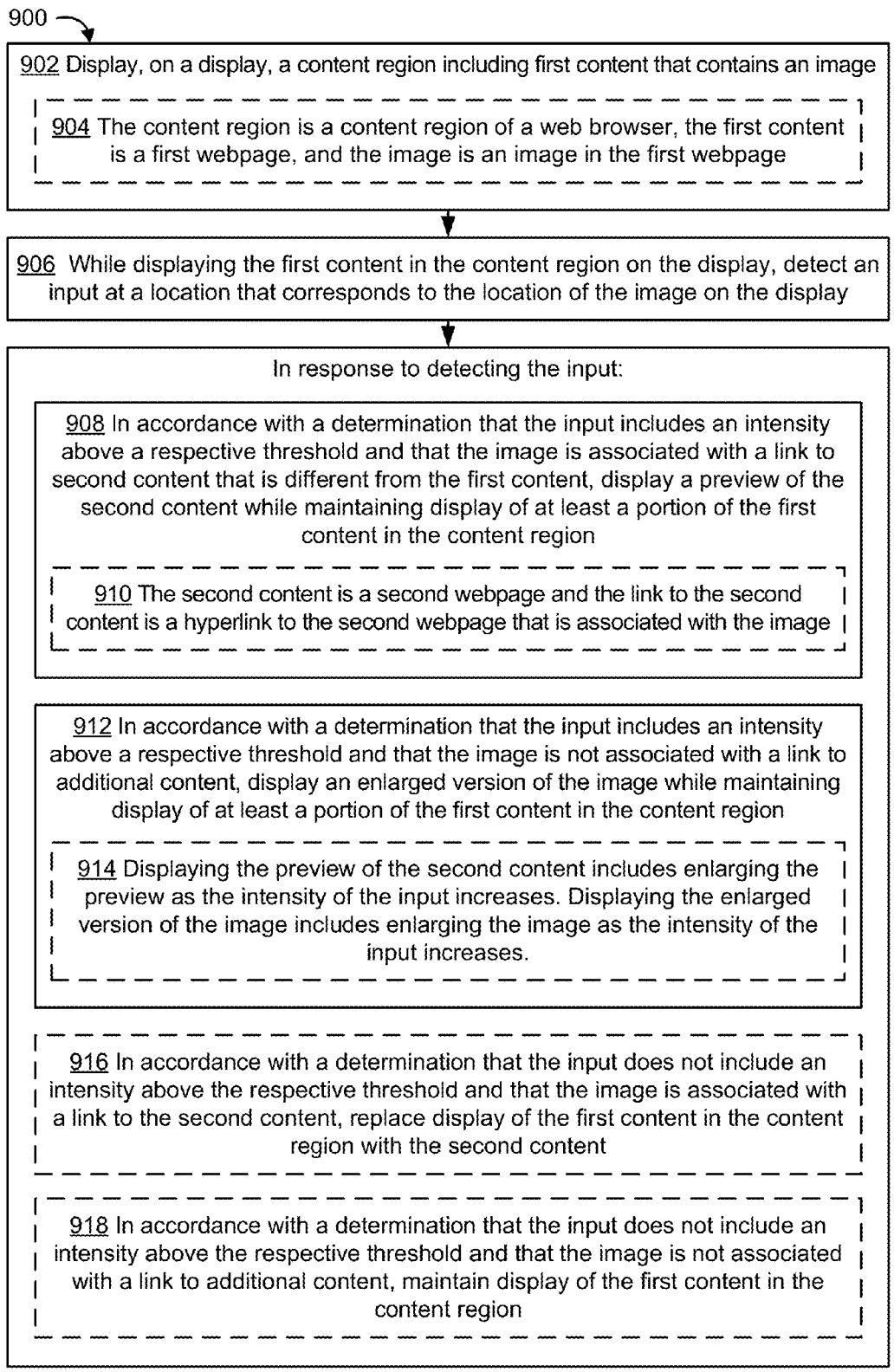
FIG. 9 is a flow diagram illustrating a method of processing touch inputs based on displayed content in accordance with some embodiments.

Below, FIGS. 1A-1B, 2, and 3 provide a description of exemplary devices. FIG. 4 provides a description of an exemplary electronic stylus. FIGS. 5A-5B illustrate a positional state of a stylus relative to a touch-sensitive surface. FIGS. 6A-6B and 7A-7FF illustrate exemplary user interfaces for processing touch inputs with instructions in a web page. FIGS. 8A-8C illustrate a flow diagram of a method of processing touch inputs with instructions in a web page. FIG. 9 illustrates a flow diagram of a method of processing touch inputs based on displayed content. The user interfaces in FIGS. 7A-7FF are used to illustrate the processes in FIGS. 8A-8C and FIG. 9.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
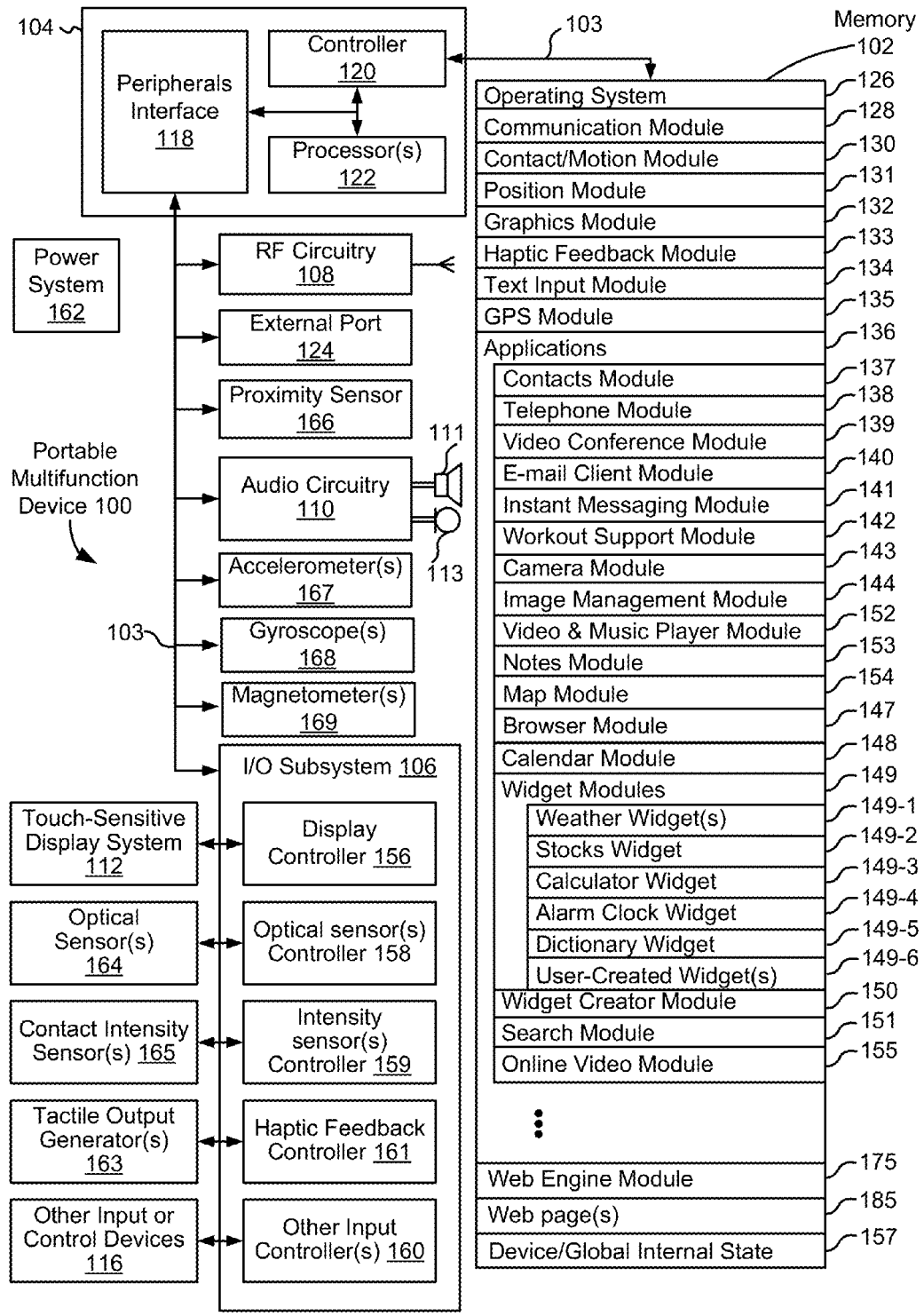
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more non-transitory computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). In some embodiments, tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

In some embodiments, the software components stored in memory 102 include operating system 126, communication module (or set of instructions) 128, contact/motion module (or set of instructions) 130, position module (or set of instructions) 131, graphics module (or set of instructions) 132, haptic feedback module (or set of instructions) 133, text input module (or set of instructions) 134, Global Positioning System (GPS) module (or set of instructions) 135, applications (or sets of instructions) 136, web engine module 175, and one or more web pages 185. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Similarly, tap, swipe, drag, and other gestures are optionally detected for a stylus by detecting a particular contact pattern for the stylus.

Position module 131, in conjunction with accelerometers 167, gyroscopes 168, and/or magnetometers 169, optionally detects positional information concerning the device, such as the device's attitude (roll, pitch, and/or yaw) in a particular frame of reference. Position module 130 includes software components for performing various operations related to detecting the position of the device and detecting changes to the position of the device. In some embodiments, position module 131 uses information received from a stylus being used with the device to detect positional information concerning the stylus, such as detecting the positional state of the stylus relative to the device and detecting changes to the positional state of the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 163 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

Web Engine Module 175 (also called a web browser engine, layout engine, rendering engine, or Webkit) processes marked up content (e.g., HyperText Markup Language (HTML) documents, Extensible Markup Language (XML) documents, etc.). For example, web engine module 175 prepares a layout of the marked up content for display. In some embodiments, web engine module 175 processes instructions included in the marked up content (e.g., JavaScript instructions in web pages 185, etc.). In some embodiments, web engine module 175 is included in operating system 126. In some embodiments, web engine module 175 is integrated with browser module 147.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
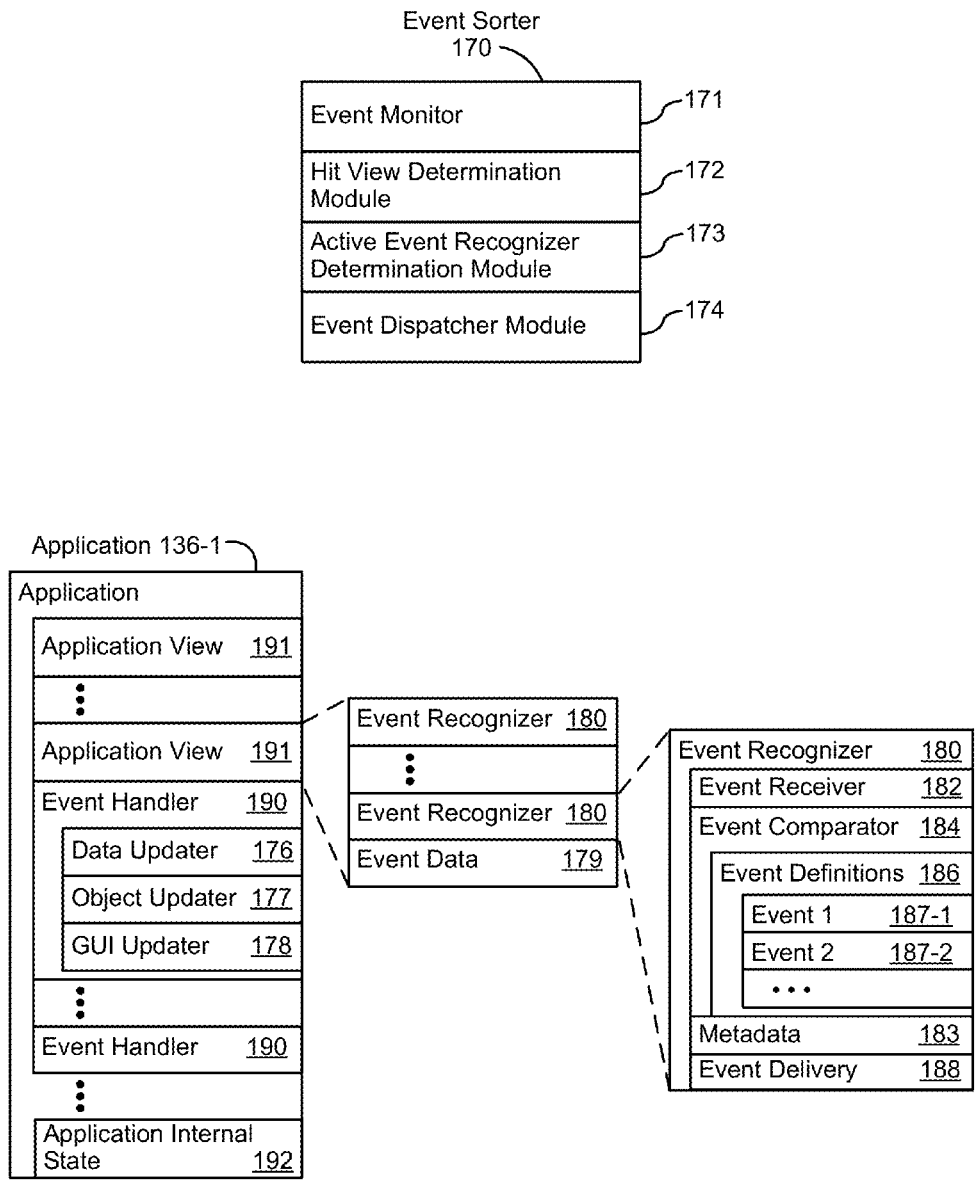
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

As used herein, a force event refers to a device-generated signal or device-generated data (e.g., a signal or a data object generated or updated by device 100) to indicate status or a change in status of a touch input, such as beginning (e.g., satisfying a minimum force intensity threshold), changing intensity (e.g., increasing or decreasing intensity of the touch input), or changing intensity status (e.g., hard press to exceed a high intensity threshold or release the touch input so that the intensity falls below the high intensity threshold) of the touch input. Although force events are associated with physical touches (e.g., touches with a finger and/or a stylus) on the touch-sensitive surface, the force events, as described herein, are distinct from the physical touches.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
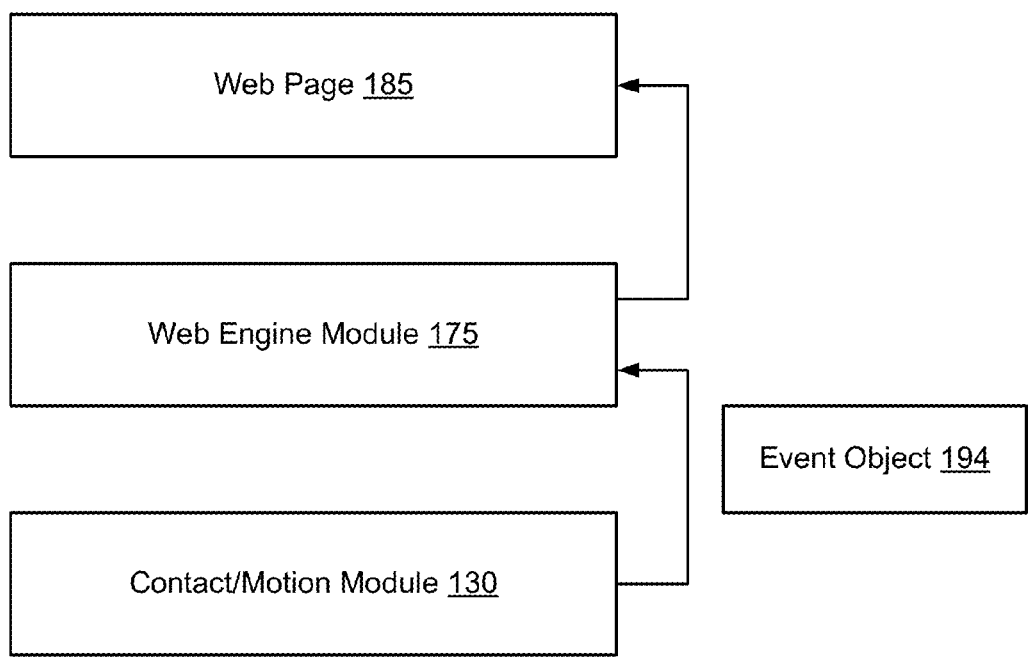
FIG. 1C is a block diagram illustrating transfer of an event object in accordance with some embodiments.

FIG. 1C is a block diagram illustrating transfer of event object 194 in accordance with some embodiments.

As described above with respect to FIG. 1A, contact/motion module 130 determines status and/or a change in the status of a touch input. In some embodiments, the device generates signal or data (e.g., in the form of a data object) to transfer the determined status and/or the determined change in the status of a touch input to one or more software components. In some embodiments, the data object is called an event object (e.g., event object 194). An event object includes data that represents the status of a corresponding touch input. In some embodiments, event object 194 is a mouse event object (because the touch input is equivalent to an input by a mouse). For example, in such embodiments, a touch input moving across a touch-sensitive surface corresponds to a mouse movement (e.g., a mouse moved event). In some other embodiments, event object 194 is a touch event object that is distinct from a mouse event object. In some embodiments, the touch event object includes data that represents touch-specific properties of a corresponding touch input (e.g., a number of concurrent touches, an orientation of a finger contact or a stylus, etc.). In some embodiments, event object 194 is a force event object that is distinct from a mouse event object (or a touch event object). In some embodiments, the force event object includes data that represents force event specific properties of a corresponding touch input (e.g., an intensity applied by the touch input, a stage/phase of the touch input, etc.). In some embodiments, the event object includes any combination of such properties (e.g., mouse event specific properties, touch event specific properties, and force event specific properties).

In some embodiments, contact/motion module 130 sends event object 194 to one or more applications (e.g., applications 136 in FIG. 1A). In some embodiments, contact/motion module 130 sends event object 194 to web engine module 175. In some embodiments, event object 194 is sent directly to the destination (e.g., a software component, such as applications 136 and/or web engine module 175). In some embodiments, event object 194 is sent by posting event object 194 for retrieval by application 136 and/or web engine module 175.

In some embodiments, the device uses web engine module 175 to process instructions in web page 185 based on information in event object 194. For example, in accordance with a determination that force (or intensity) of a touch input indicated in event object 194 meets predefined criteria, the device uses web engine module 175 to process instructions in web page 185 that corresponds to the force of the touch input indicated in event object 194.

In some embodiments, event object 194 includes force information. In some embodiments, a mouse event object includes force information (e.g., raw or normalized force applied by the touch input). In some embodiments, a touch event object includes force information. In some embodiments, a force event object includes force information.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 is, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

FIG. 4 is a block diagram of an exemplary electronic stylus 203 in accordance with some embodiments. Electronic stylus 203 is sometimes simply called a stylus. Stylus 203 includes memory 402 (which optionally includes one or more computer readable storage mediums), memory controller 422, one or more processing units (CPUs) 420, peripherals interface 418, RF circuitry 408, input/output (I/O) subsystem 406, and other input or control devices 416. Stylus 203 optionally includes external port 424 and one or more optical sensors 464. Stylus 203 optionally includes one or more intensity sensors 465 for detecting intensity of contacts of stylus 203 on device 100 (e.g., when stylus 203 is used with a touch-sensitive surface such as touch-sensitive display system 112 of device 100) or on other surfaces (e.g., a desk surface). Stylus 203 optionally includes one or more tactile output generators 463 for generating tactile outputs on stylus 203. These components optionally communicate over one or more communication buses or signal lines 403.

In some embodiments, the term "tactile output," discussed above, refers to physical displacement of an accessory (e.g., stylus 203) of a device (e.g., device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of stylus 203) is, optionally, interpreted by the user as a "click" of a physical actuator button. In some cases, a user will feel a tactile sensation such as a "click" even when there is no movement of a physical actuator button associated with the stylus that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the device or a component thereof that will generate the described sensory perception for a typical (or average) user.

It should be appreciated that stylus 203 is only one example of an electronic stylus, and that stylus 203 optionally has more or fewer components than shown, optionally combines two or more components, or optionally has a different configuration or arrangement of the components.

The various components shown in FIG. 4 are implemented in hardware, software, firmware, or a combination thereof, including one or more signal processing and/or application specific integrated circuits.

Memory 402 optionally includes high-speed random access memory and optionally also includes non-volatile memory, such as one or more flash memory devices, or other non-volatile solid-state memory devices. Access to memory 402 by other components of stylus 203, such as CPU(s) 420 and the peripherals interface 418, is, optionally, controlled by memory controller 422.

Peripherals interface 418 can be used to couple input and output peripherals of the stylus to CPU(s) 420 and memory 402. The one or more processors 420 run or execute various software programs and/or sets of instructions stored in memory 402 to perform various functions for stylus 203 and to process data.

In some embodiments, peripherals interface 418, CPU(s) 420, and memory controller 422 are, optionally, implemented on a single chip, such as chip 404. In some other embodiments, they are, optionally, implemented on separate chips.

RF (radio frequency) circuitry 408 receives and sends RF signals, also called electromagnetic signals. RF circuitry 408 converts electrical signals to/from electromagnetic signals and communicates with device 100 or 300, communications networks, and/or other communications devices via the electromagnetic signals. RF circuitry 408 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 408 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

I/O subsystem 406 couples input/output peripherals on stylus 203, such as other input or control devices 416, with peripherals interface 418. I/O subsystem 406 optionally includes optical sensor controller 458, intensity sensor controller 459, haptic feedback controller 461, and one or more input controllers 460 for other input or control devices. The one or more input controllers 460 receive/send electrical signals from/to other input or control devices 416. The other input or control devices 416 optionally include physical buttons (e.g., push buttons, rocker buttons, etc.), dials, slider switches, click wheels, and so forth. In some alternate embodiments, input controller(s) 460 are, optionally, coupled with any (or none) of the following: an infrared port and/or a USB port.

Stylus 203 also includes power system 462 for powering the various components. Power system 462 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

Stylus 203 optionally also includes one or more optical sensors 464. FIG. 4 shows an optical sensor coupled with optical sensor controller 458 in I/O subsystem 406. Optical sensor(s) 464 optionally include charge-coupled device (CCD) or complementary metal-oxide semiconductor (CMOS) phototransistors. Optical sensor(s) 464 receive light from the environment, projected through one or more lens, and converts the light to data representing an image.

Stylus 203 optionally also includes one or more contact intensity sensors 465. FIG. 4 shows a contact intensity sensor coupled with intensity sensor controller 459 in I/O subsystem 406. Contact intensity sensor(s) 465 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a surface). Contact intensity sensor(s) 465 receive contact intensity information (e.g., pressure information or a proxy for pressure information) from the environment. In some embodiments, at least one contact intensity sensor is collocated with, or proximate to, a tip of stylus 203.

Stylus 203 optionally also includes one or more proximity sensors 466. FIG. 4 shows proximity sensor 466 coupled with peripherals interface 418. Alternately, proximity sensor 466 is coupled with input controller 460 in I/O subsystem 406. In some embodiments, the proximity sensor determines proximity of stylus 203 to an electronic device (e.g., device 100).

Stylus 203 optionally also includes one or more tactile output generators 463. FIG. 4 shows a tactile output generator coupled with haptic feedback controller 461 in I/O subsystem 406. Tactile output generator(s) 463 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 463 receive tactile feedback generation instructions from haptic feedback module 433 and generates tactile outputs on stylus 203 that are capable of being sensed by a user of stylus 203. In some embodiments, at least one tactile output generator is collocated with, or proximate to, a length (e.g., a body or a housing) of stylus 203 and, optionally, generates a tactile output by moving stylus 203 vertically (e.g., in a direction parallel to the length of stylus 203) or laterally (e.g., in a direction normal to the length of stylus 203).

Stylus 203 optionally also includes one or more accelerometers 467, gyroscopes 468, and/or magnetometers 470 (e.g., as part of an inertial measurement unit (IMU)) for obtaining information concerning the location and positional state of stylus 203. FIG. 4 shows sensors 467, 469, and 470 coupled with peripherals interface 418. Alternately, sensors 467, 469, and 470 are, optionally, coupled with an input controller 460 in I/O subsystem 406. Stylus 203 optionally includes a GPS (or GLONASS or other global navigation system) receiver (not shown) for obtaining information concerning the location of stylus 203.

In some embodiments, the software components stored in memory 402 include operating system 426, communication module (or set of instructions) 428, contact/motion module (or set of instructions) 430, position module (or set of instructions) 431, and Global Positioning System (GPS) module (or set of instructions) 435. Furthermore, in some embodiments, memory 402 stores device/global internal state 457, as shown in FIG. 4. Device/global internal state 457 includes one or more of: sensor state, including information obtained from the stylus's various sensors and other input or control devices 416; positional state, including information regarding the stylus's position (e.g., position, orientation, tilt, roll and/or distance, as shown in FIGS. 5A and 5B) relative to a device (e.g., device 100); and location information concerning the stylus's location (e.g., determined by GPS module 435).

Operating system 426 (e.g., iOS, Darwin, RTXC, LINUX, UNIX, OS X, WINDOWS, or an embedded operating system such as VxWorks) includes various software components and/or drivers for controlling and managing general system tasks (e.g., memory management, power management, etc.) and facilitates communication between various hardware and software components.

Communication module 428 optionally facilitates communication with other devices over one or more external ports 424 and also includes various software components for handling data received by RF circuitry 408 and/or external port 424. External port 424 (e.g., Universal Serial Bus (USB), FIREWIRE, etc.) is adapted for coupling directly to other devices or indirectly over a network (e.g., the Internet, wireless LAN, etc.). In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 430 optionally detects contact with stylus 203 and other touch-sensitive devices of stylus 203 (e.g., buttons or other touch-sensitive components of stylus 203). Contact/motion module 430 includes software components for performing various operations related to detection of contact (e.g., detection of a tip of the stylus with a touch-sensitive display, such as touch screen 112 of device 100, or with another surface, such as a desk surface), such as determining if contact has occurred (e.g., detecting a touch-down event), determining an intensity of the contact (e.g., the force or pressure of the contact or a substitute for the force or pressure of the contact), determining if there is movement of the contact and tracking the movement (e.g., across touch screen 112 of device 100), and determining if the contact has ceased (e.g., detecting a lift-off event or a break in contact). In some embodiments, contact/motion module 430 receives contact data from I/O subsystem 406. Determining movement of the point of contact, which is represented by a series of contact data, optionally includes determining speed (magnitude), velocity (magnitude and direction), and/or an acceleration (a change in magnitude and/or direction) of the point of contact. As noted above, in some embodiments, one or more of these operations related to detection of contact are performed by the device using contact/motion module 130 (in addition to or in place of the stylus using contact/motion module 430).

Contact/motion module 430 optionally detects a gesture input by stylus 203. Different gestures with stylus 203 have different contact patterns (e.g., different motions, timings, and/or intensities of detected contacts). Thus, a gesture is, optionally, detected by detecting a particular contact pattern. For example, detecting a single tap gesture includes detecting a touch-down event followed by detecting a lift-off event at the same position (or substantially the same position) as the touch-down event (e.g., at the position of an icon). As another example, detecting a swipe gesture includes detecting a touch-down event followed by detecting one or more stylus-dragging events, and subsequently followed by detecting a lift-off event. As noted above, in some embodiments, gesture detection is performed by the device using contact/motion module 130 (in addition to or in place of the stylus using contact/motion module 430).

Position module 431, in conjunction with accelerometers 467, gyroscopes 468, and/or magnetometers 469, optionally detects positional information concerning the stylus, such as the stylus's attitude (roll, pitch, and/or yaw) in a particular frame of reference. Position module 431, in conjunction with accelerometers 467, gyroscopes 468, and/or magnetometers 469, optionally detects stylus movement gestures, such as flicks, taps, and rolls of the stylus. Position module 431 includes software components for performing various operations related to detecting the position of the stylus and detecting changes to the position of the stylus in a particular frame of reference. In some embodiments, position module 431 detects the positional state of the stylus relative to the device and detects changes to the positional state of the stylus relative to the device. As noted above, in some embodiments, device 100 or 300 determines the positional state of the stylus relative to the device and changes to the positional state of the stylus using position module 131 (in addition to or in place of the stylus using position module 431).

Haptic feedback module 433 includes various software components for generating instructions used by tactile output generator(s) 463 to produce tactile outputs at one or more locations on stylus 203 in response to user interactions with stylus 203.

GPS module 435 determines the location of the stylus and provides this information for use in various applications (e.g., to applications that provide location-based services such as an application to find missing devices and/or accessories).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 402 optionally stores a subset of the modules and data structures identified above. Furthermore, memory 402 optionally stores additional modules and data structures not described above.

FIGS. 5A-5B illustrate a positional state of stylus 203 relative to a touch-sensitive surface (e.g., touch screen 112 of device 100) in accordance with some embodiments. In some embodiments, the positional state of stylus 203 corresponds to (or indicates): a position of a projection of a tip (or other representative portion) of the stylus on the touch-sensitive surface (e.g., (x,y) position 504, FIG. 5A), an orientation of the stylus relative to the touch-sensitive surface (e.g., orientation 506, FIG. 5A), a tilt of the stylus relative to the touch-sensitive surface (e.g., tilt 512, FIG. 5B), and/or a distance of the stylus relative to the touch-sensitive surface (e.g., distance 514, FIG. 5B). In some embodiments, the positional state of stylus 203 corresponds to (or indicates) a pitch, yaw, and/or roll of the stylus (e.g., an attitude of the stylus relative to a particular frame of reference, such as a touch-sensitive surface (e.g., touch screen 112) or the ground). In some embodiments, the positional state includes a set of positional parameters (e.g., one or more positional parameters). In some embodiments, the positional state is detected in accordance with one or more measurements from stylus 203 that are sent to an electronic device (e.g., device 100). For example, the stylus measures the tilt (e.g., tilt 512, FIG. 5B) and/or the orientation (e.g., orientation 506, FIG. 5A) of the stylus and sends the measurement to device 100. In some embodiments, the positional state is detected in accordance with raw output, from one or more electrodes in the stylus, that is sensed by a touch-sensitive surface (e.g., touch screen 112 of device 100) instead of, or in combination with positional state detected in accordance with one or more measurements from stylus 203. For example, the touch-sensitive surface receives raw output from one or more electrodes in the stylus and calculates the tilt and/or the orientation of the stylus based on the raw output (optionally, in conjunction with positional state information provided by the stylus based on sensor measurements generated by the stylus).

FIG. 5A illustrates stylus 203 relative to a touch-sensitive surface (e.g., touch screen 112 of device 100) from a viewpoint directly above the touch-sensitive surface, in accordance with some embodiments. In FIG. 5A, z axis 594 points out of the page (i.e., in a direction normal to a plane of touch screen 112), x axis 590 is parallel to a first edge (e.g., a length) of touch screen 112, y axis 592 is parallel to a second edge (e.g., a width) of touch screen 112, and y axis 592 is perpendicular to x axis 590.

FIG. 5A illustrates the tip of stylus 203 at (x,y) position 504. In some embodiments, the tip of stylus 203 is a terminus of the stylus configured for determining proximity of the stylus to a touch-sensitive surface (e.g., touch screen 112). In some embodiments, the projection of the tip of the stylus on the touch-sensitive surface is an orthogonal projection. In other words, the projection of the tip of the stylus on the touch-sensitive surface is a point at the end of a line from the stylus tip to the touch-sensitive surface that is normal to a surface of the touch-sensitive surface (e.g., (x,y) position 504 at which the tip of the stylus would touch the touch-sensitive surface if the stylus were moved directly along a path normal to the touch-sensitive surface). In some embodiments, the (x,y) position at the lower left corner of touch screen 112 is position (0,0) (e.g., (0,0) position 502) and other (x,y) positions on touch screen 112 are relative to the lower left corner of touch screen 112. Alternatively, in some embodiments, the (0,0) position is located at another position of touch screen 112 (e.g., in the center of touch screen 112) and other (x,y) positions are relative to the (0,0) position of touch screen 112.

Further, FIG. 5A illustrates stylus 203 with orientation 506. In some embodiments, orientation 506 is an orientation of a projection of stylus 203 onto touch screen 112 (e.g., an orthogonal projection of a length of stylus 203 or a line corresponding to the line between the projection of two different points of stylus 203 onto touch screen 112). In some embodiments, orientation 506 is relative to at least one axis in a plane parallel to touch screen 112. In some embodiments, orientation 506 is relative to a single axis in a plane parallel to touch screen 112 (e.g., axis 508, with a clockwise rotation angle from axis 508 ranging from 0 degrees to 360 degrees, as shown in FIG. 5A). Alternatively, in some embodiments, orientation 506 is relative to a pair of axes in a plane parallel to touch screen 112 (e.g., x axis 590 and y axis 592, as shown in FIG. 5A, or a pair of axes associated with an application displayed on touch screen 112).

In some embodiments, an indication (e.g., indication 516) is displayed on a touch-sensitive display (e.g., touch screen 112 of device 100). In some embodiments, indication 516 shows where the stylus will touch (or mark) the touch-sensitive display before the stylus touches the touch-sensitive display. In some embodiments, indication 516 is a portion of a mark that is being drawn on the touch-sensitive display. In some embodiments, indication 516 is separate from a mark that is being drawn on the touch-sensitive display and corresponds to a virtual "pen tip" or other element that indicates where a mark will be drawn on the touch-sensitive display.

In some embodiments, indication 516 is displayed in accordance with the positional state of stylus 203. For example, in some circumstances, indication 516 is displaced from (x,y) position 504 (as shown in FIGS. 5A and 5B), and in other circumstances, indication 516 is not displaced from (x,y) position 504 (e.g., indication 516 is displayed at or near (x,y) position 504 when tilt 512 is zero degrees). In some embodiments, indication 516 is displayed, in accordance with the positional state of the stylus, with varying color, size (or radius or area), opacity, and/or other characteristics. In some embodiments, the displayed indication accounts for thickness of a glass layer on the touch-sensitive display, so as to carry through the indication "onto the pixels" of the touch-sensitive display, rather than displaying the indication "on the glass" that covers the pixels.

FIG. 5B illustrates stylus 203 relative to a touch-sensitive surface (e.g., touch screen 112 of device 100) from a side viewpoint of the touch-sensitive surface, in accordance with some embodiments. In FIG. 5B, z axis 594 points in a direction normal to the plane of touch screen 112, x axis 590 is parallel to a first edge (e.g., a length) of touch screen 112, y axis 592 is parallel to a second edge (e.g., a width) of touch screen 112, and y axis 592 is perpendicular to x axis 590.

FIG. 5B illustrates stylus 203 with tilt 512. In some embodiments, tilt 512 is an angle relative to a normal (e.g., normal 510) to a surface of the touch-sensitive surface (also called simply the normal to the touch-sensitive surface). As shown in FIG. 5B, tilt 512 is zero when the stylus is perpendicular/normal to the touch-sensitive surface (e.g., when stylus 203 is parallel to normal 510) and the tilt increases as the stylus is tilted closer to being parallel to the touch-sensitive surface.

Further, FIG. 5B illustrates distance 514 of stylus 203 relative to the touch-sensitive surface. In some embodiments, distance 514 is the distance from the tip of stylus 203 to the touch-sensitive surface, in a direction normal to the touch-sensitive surface. For example, in FIG. 5B, distance 514 is the distance from the tip of stylus 203 to (x,y) position 504.

Although the terms, "x axis," "y axis," and "z axis," are used herein to illustrate certain directions in particular figures, it will be understood that these terms do not refer to absolute directions. In other words, an "x axis" could be any respective axis, and a "y axis" could be a particular axis that is distinct from the x axis. Typically, the x axis is perpendicular to the y axis. Similarly, a "z axis" is distinct from the "x axis" and the "y axis," and is typically perpendicular to both the "x axis" and the "y axis."

Further, FIG. 5B illustrates roll 518, a rotation about the length (long axis) of stylus 203.

Attention is now directed towards embodiments of user interfaces ("UI") that are, optionally, implemented on portable multifunction device 100.

Figure 6A:
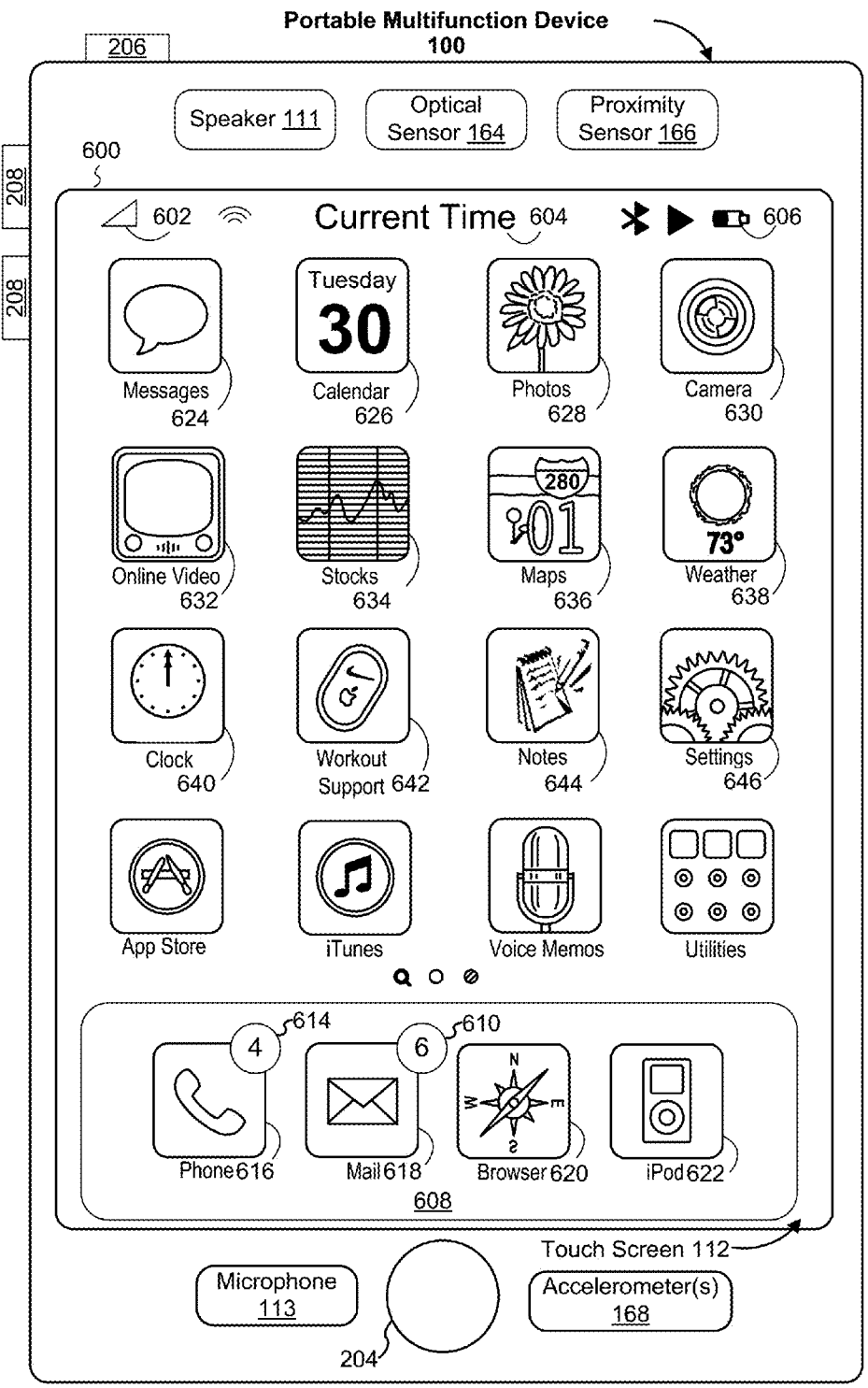
FIG. 6A illustrates an exemplary user interface for a menu of applications on a portable multifunction device in accordance with some embodiments.

FIG. 6A illustrates an exemplary user interface for a menu of applications on portable multifunction device 100 in accordance with some embodiments. Similar user interfaces are, optionally, implemented on device 300. In some embodiments, user interface 600 includes the following elements, or a subset or superset thereof:

Signal strength indicator(s) 602 for wireless communication(s), such as cellular and Wi-Fi signals;
Time 604;
Bluetooth indicator 605;
Battery status indicator 606;
Tray 608 with icons for frequently used applications, such as:
  Icon 616 for telephone module 138, labeled "Phone," which optionally includes an indicator 614 of the number of missed calls or voicemail messages;
  Icon 618 for e-mail client module 140, labeled "Mail," which optionally includes an indicator 610 of the number of unread e-mails;
  Icon 620 for browser module 147, labeled "Browser;" and
  Icon 622 for video and music player module 152, also referred to as iPod (trademark of Apple Inc.) module 152, labeled "iPod;" and
Icons for other applications, such as:
  Icon 624 for IM module 141, labeled "Messages;"
  Icon 626 for calendar module 148, labeled "Calendar;"
  Icon 628 for image management module 144, labeled "Photos;"
  Icon 630 for camera module 143, labeled "Camera;"
  Icon 632 for online video module 155, labeled "Online Video;"
  Icon 634 for stocks widget 149-2, labeled "Stocks;"
  Icon 636 for map module 154, labeled "Maps;"
  Icon 638 for weather widget 149-1, labeled "Weather;"
  Icon 640 for alarm clock widget 169-6, labeled "Clock;"
  Icon 642 for workout support module 142, labeled "Workout Support;"
  Icon 644 for notes module 153, labeled "Notes;" and
  Icon 646 for a settings application or module, which provides access to settings for device 100 and its various applications 136.

It should be noted that the icon labels illustrated in FIG. 6A are merely exemplary. For example, in some embodiments, icon 622 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 6B:
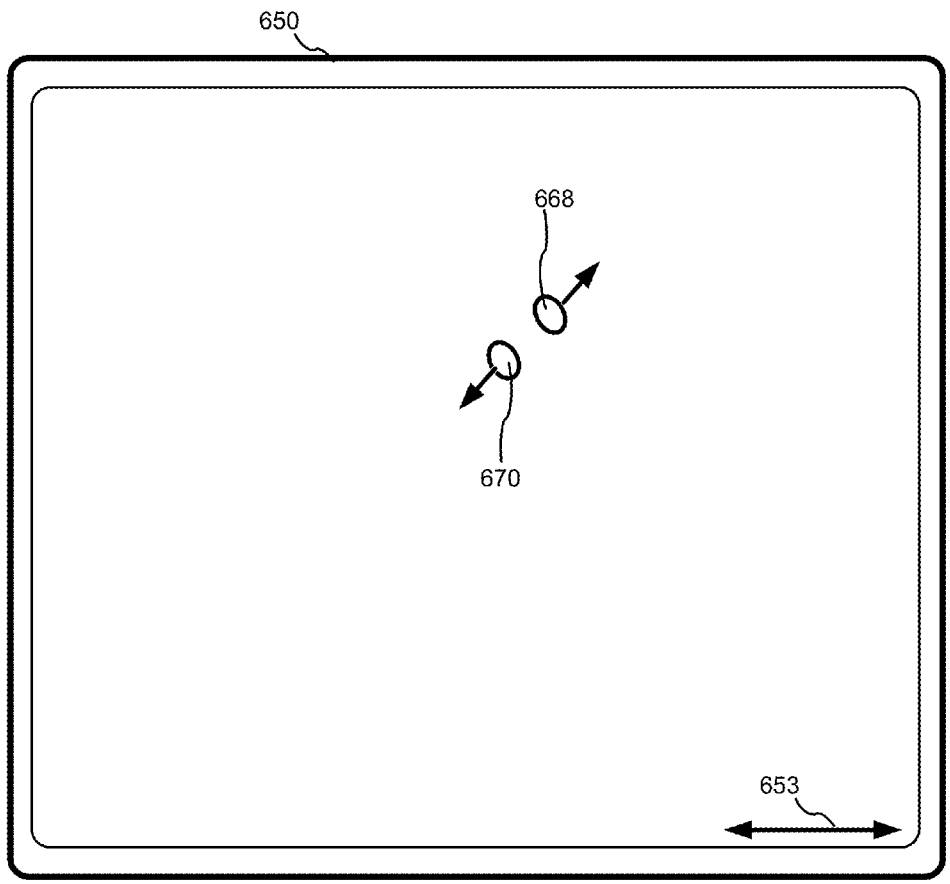
FIG. 6B illustrates an exemplary user interface for a multifunction device with a touch-sensitive surface that is separate from the display in accordance with some embodiments.
Figure 6B:
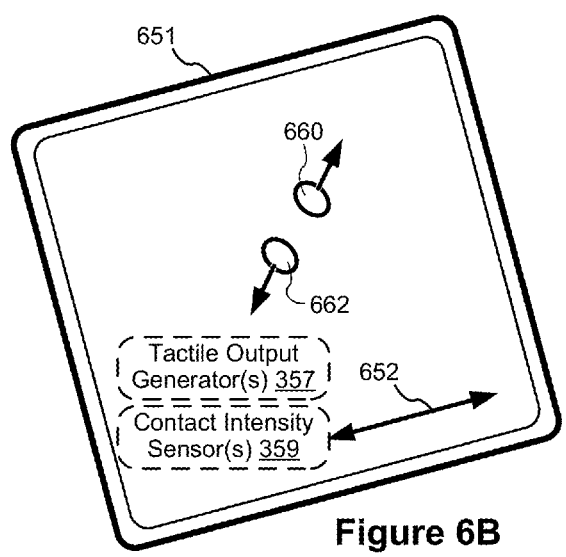

FIG. 6B illustrates an exemplary user interface on a device (e.g., device 300, FIG. 3) with a touch-sensitive surface 651 (e.g., a tablet or touchpad 355, FIG. 3) that is separate from display 650. Device 300 also, optionally, includes one or more contact intensity sensors (e.g., one or more of sensors 359) for detecting intensity of contacts on touch-sensitive surface 651 and/or one or more tactile output generators 359 for generating tactile outputs for a user of device 300.

FIG. 6B illustrates an exemplary user interface on a device (e.g., device 300, FIG. 3) with a touch-sensitive surface 651 (e.g., a tablet or touchpad 355, FIG. 3) that is separate from display 650. Many of the examples that follow will be given with reference to a device that detects inputs on a touch-sensitive surface that is separate from the display, as shown in FIG. 6B. In some embodiments, the touch-sensitive surface (e.g., 651 in FIG. 6B) has a primary axis (e.g., 652 in FIG. 6B) that corresponds to a primary axis (e.g., 653 in FIG. 6B) on the display (e.g., 650). In accordance with these embodiments, the device detects contacts (e.g., 660 and 662 in FIG. 6B) with touch-sensitive surface 651 at locations that correspond to respective locations on the display (e.g., in FIG. 6B, 660 corresponds to 668 and 662 corresponds to 670). In this way, user inputs (e.g., contacts 660 and 662, and movements thereof) detected by the device on the touch-sensitive surface (e.g., 651 in FIG. 6B) are used by the device to manipulate the user interface on the display (e.g., 650 in FIG. 6B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a stylus input).

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 651 in FIG. 6B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 6A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 and/or 430 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a low intensity threshold and a high intensity threshold. In this example, a contact with a characteristic intensity that does not exceed the low intensity threshold results in a first operation, a contact with a characteristic intensity that exceeds the low intensity threshold and does not exceed the high intensity threshold results in a second operation, and a contact with a characteristic intensity that exceeds the high intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures (e.g., FIGS. 7A-7FF) described below optionally include various intensity diagrams that show the current intensity of the contact on the touch-sensitive surface relative to one or more intensity thresholds (e.g., a contact detection intensity threshold $IT_0$, a light press intensity threshold $I_L$, a deep press intensity threshold $I_H$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a low intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a high intensity threshold during the input, greater than the low intensity threshold for a light press, triggers a second response only if a delay time has elapsed between meeting the low intensity threshold and meeting the high intensity threshold. This delay time is typically less than 200 ms in duration (e.g., 40, 100, or 120 ms, depending on the magnitude of the high intensity threshold, with the delay time increasing as the high intensity threshold increases). This delay time helps to avoid accidental deep press inputs. As another example, for some "deep press" inputs, there is a reduced-sensitivity time period that occurs after the time at which the low intensity threshold is met. During the reduced-sensitivity time period, the high intensity threshold is increased. This temporary increase in the high intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

Figure 6C:
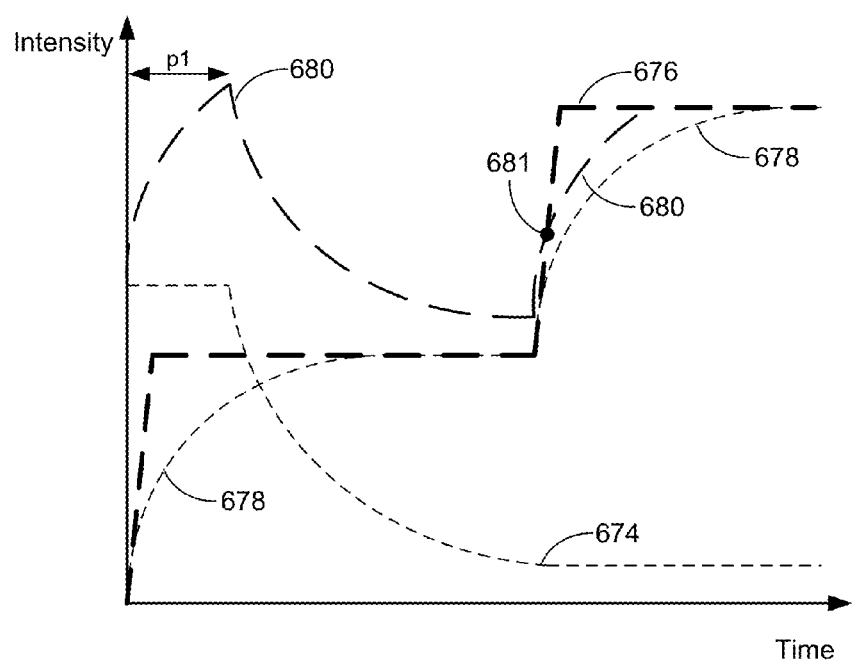
FIGS. 6C-6E illustrate exemplary dynamic intensity thresholds in accordance with some embodiments.

For example, FIG. 6C illustrates a dynamic intensity threshold 680 that changes over time based in part on the intensity of touch input 676 over time. Dynamic intensity threshold 680 is a sum of two components, first component 674 that decays over time after a predefined delay time p1 from when touch input 676 is initially detected, and second component 678 that trails the intensity of touch input 676 over time. The initial high intensity threshold of first component 674 reduces accidental triggering of a "deep press" response, while still allowing an immediate "deep press" response if touch input 676 provides sufficient intensity. Second component 678 reduces unintentional triggering of a "deep press" response by gradual intensity fluctuations of a touch input. In some embodiments, when touch input 676 satisfies dynamic intensity threshold 680 (e.g., at point 681 in FIG. 6C), the "deep press" response is triggered.

Figure 6D:
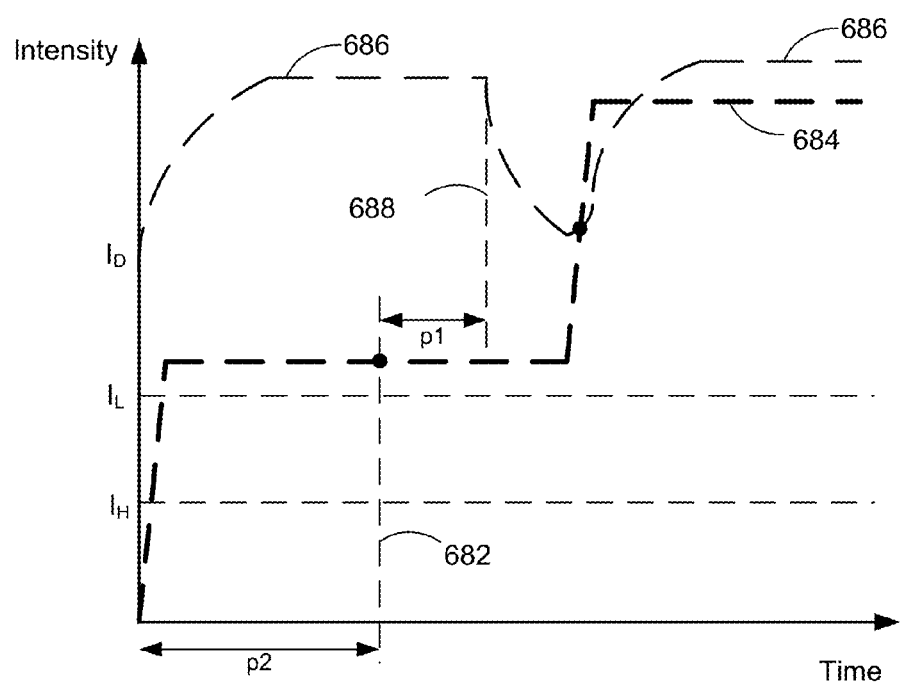

FIG. 6D illustrates another dynamic intensity threshold 686 (e.g., intensity threshold $I_D$). FIG. 6D also illustrates two other intensity thresholds: a first intensity threshold $I_H$ and a second intensity threshold $I_L$. In FIG. 6D, although touch input 684 satisfies the first intensity threshold $I_H$ and the second intensity threshold $I_L$ prior to time p2, no response is provided until delay time p2 has elapsed at time 682. Also in FIG. 6D, dynamic intensity threshold 686 decays over time, with the decay starting at time 688 after a predefined delay time p1 has elapsed from time 682 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 6E:
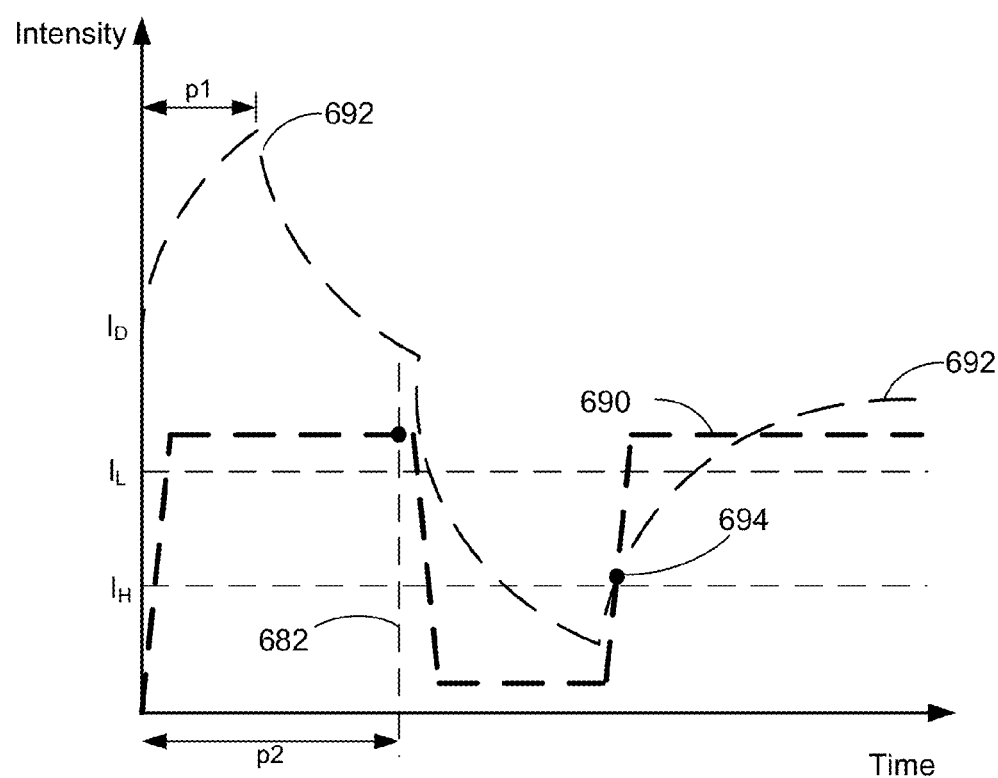

FIG. 6E illustrate yet another dynamic intensity threshold 692 (e.g., intensity threshold $I_D$). In FIG. 6E, a response associated with the intensity threshold $I_L$ is triggered after the delay time p2 has elapsed from when touch input 690 is initially detected. Concurrently, dynamic intensity threshold 692 decays after the predefined delay time p1 has elapsed from when touch input 690 is initially detected. So a decrease in intensity of touch input 690 after triggering the response associated with the intensity threshold $I_L$, followed by an increase in the intensity of touch input 690, without releasing touch input 690, can trigger a response associated with the intensity threshold $I_D$ (e.g., at time 694) even when the intensity of touch input 690 is below another intensity threshold, for example, the intensity threshold $I_L$.

An increase of characteristic intensity of the contact from an intensity below the light press intensity threshold $I_L$ to an intensity between the light press intensity threshold $I_L$ and the deep press intensity threshold $I_H$ is sometimes referred to as a "light press" input. An increase of characteristic intensity of the contact from an intensity below the deep press intensity threshold $I_H$ to an intensity above the deep press intensity threshold $I_H$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $I_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a low intensity threshold being met and a high intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensity of contacts with the touch-sensitive surface.

FIGS. 7A-7FF illustrate exemplary user interfaces for processing touch inputs with instructions in a web page in accordance with some embodiments. The user interfaces in these figures are used to illustrate the processes described below, including the processes in FIGS. 8A-8C and FIG. 9. Although some of the examples which follow will be given with reference to inputs on a touch-sensitive surface 651 that is separate from display 650, in some embodiments, the device detects inputs on a touch-screen display (where the touch-sensitive surface and the display are combined), as shown in FIG. 6A.

Figure 7A:
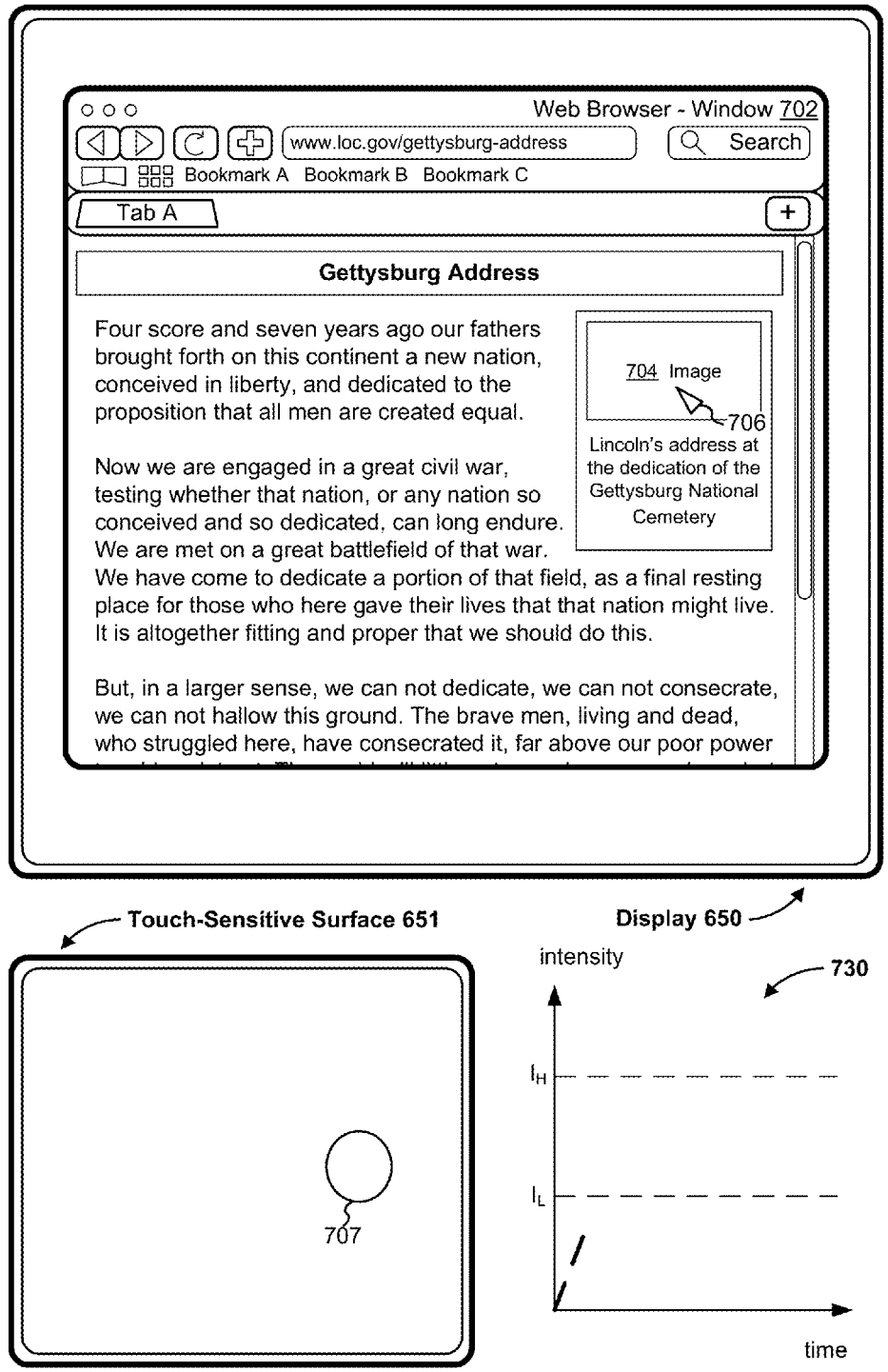
FIGS. 7A-7FF illustrate exemplary user interfaces for processing touch inputs with instructions in a web page in accordance with some embodiments.

FIG. 7A illustrates that a user interface 702 on display 650 includes a user interface of a web browser application (e.g., browser module 147, FIG. 3). The user interface of the web browser application includes display of a portion of a web page (e.g., web page 185, FIG. 3) that includes an image 704. FIG. 7A also illustrates that touch input 707 (e.g., a finger or stylus contact) is detected on touch-sensitive surface 651 at a location that corresponds to the displayed portion of the web page (e.g., focus selector 706, such as a cursor, is on the displayed portion of the web page). In FIG. 7A, intensity diagram 730 indicates that an intensity applied by touch input 707 on touch-sensitive surface 651 is increasing over time.

Figure 7B:
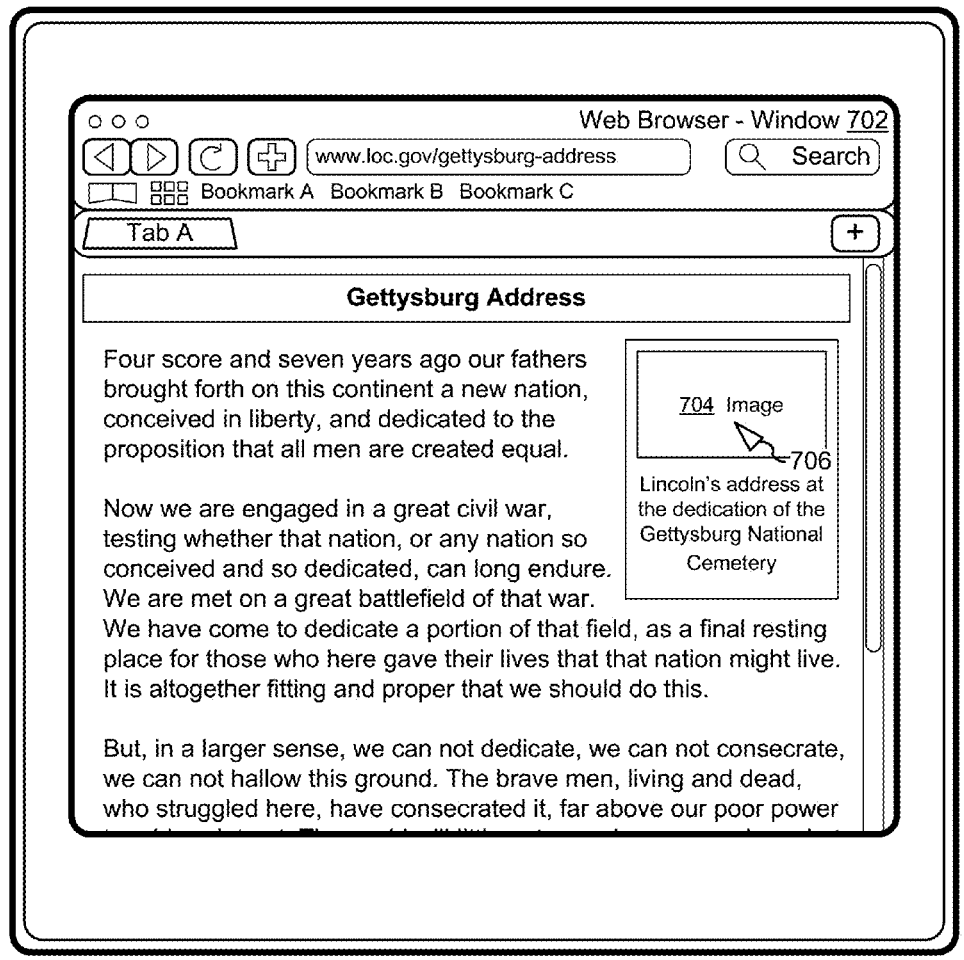
Figure 7B:
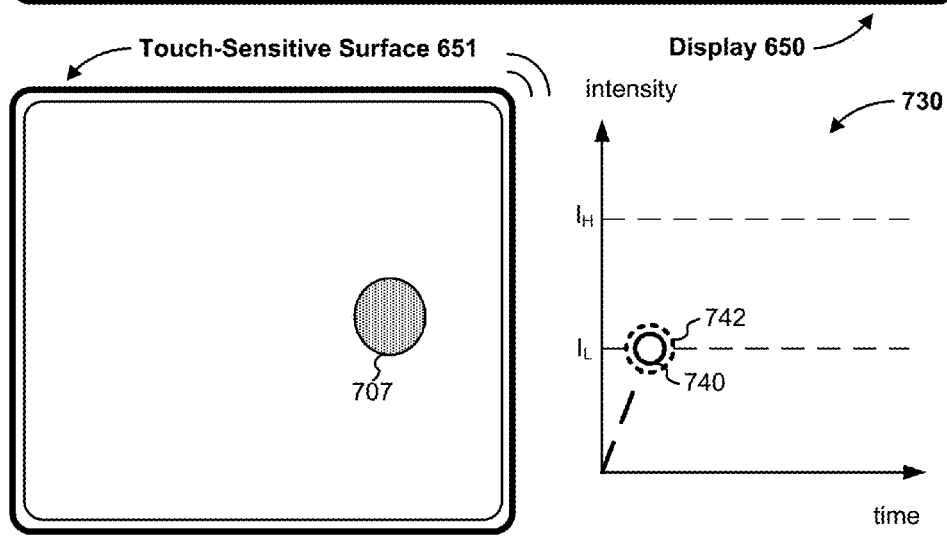

In FIG. 7B, intensity diagram 730 indicates that the intensity applied by touch input 707 on touch-sensitive surface 651 continues to increase over time and reaches a low intensity threshold $I_L$ (or the intensity applied by touch input 707 has changed from below the low intensity threshold $I_L$ to above the low intensity threshold $I_L$).

Intensity diagram 730 in FIG. 7B illustrates that the device generates mouse down event 740 in response to the intensity applied by touch input 707 on touch-sensitive surface 651 reaching the low intensity threshold $I_L$ (or the intensity applied by touch input 707 changing from below the low intensity threshold $I_L$ to above the low intensity threshold $I_L$). In some embodiments, a mouse down event indicates that an input button (e.g., a mouse button or trackpad button) has been pressed or that another input (e.g., a touch input pressing touch-sensitive surface 651 with a sufficient intensity) that meets predefined criteria for generating or triggering a mouse down event has been received. Thus, in some embodiments, the device generates a mouse down event in response to determining that an input button, of a mouse or a similar input device (e.g., a trackpad) in communication with the device, has been pressed, independent of an intensity detected on touch-sensitive surface 651. In some embodiments, when the web browser or the web page includes instructions for handling the mouse down event, the device processes the mouse down event in accordance with the instructions for handling the mouse down event in the web browser or the web page (e.g., pressing a mouse button while focus selector 706 is displayed over a scrollbar initiates scrolling a displayed portion of the web page).

Intensity diagram 730 in FIG. 7B also illustrates that, optionally, "will begin" event 742 (also called herein a "force will begin" event) is generated in response to the intensity applied by touch input 707 on touch-sensitive surface 651 reaching the low intensity threshold $I_L$ (or the intensity applied by touch input 707 has changed from below the low intensity threshold $I_L$ to above the low intensity threshold $I_L$). In some embodiments, a will begin event is used to indicate that one or more force events are expected (e.g., because an intensity threshold for generating a force event has been satisfied or a difference between a current intensity and the intensity threshold for generating a force event is small).

FIG. 7B also illustrates that, in response to the intensity applied by touch input 707 on touch-sensitive surface 651 reaching the low intensity threshold $I_L$ (or the intensity applied by touch input 707 changing from below the low intensity threshold $I_L$ to above the low intensity threshold $I_L$), the device generates a tactile output of a first type (e.g., using tactile output generator(s) 357 in FIG. 3). A tactile output of the first type provides feedback to the user indicating that the intensity of the contact has increased to (or risen above) the low intensity threshold $I_L$. In the example illustrated in FIG. 7B, a mouse down event is generated in temporal proximity to (e.g., immediately before, during, or immediately after) generation of the tactile output of the first type. As such, the tactile output in FIG. 7B provides feedback to the user that a mouse down event associated with the change in intensity of the contact has been (or will be) generated.

Figure 7C:
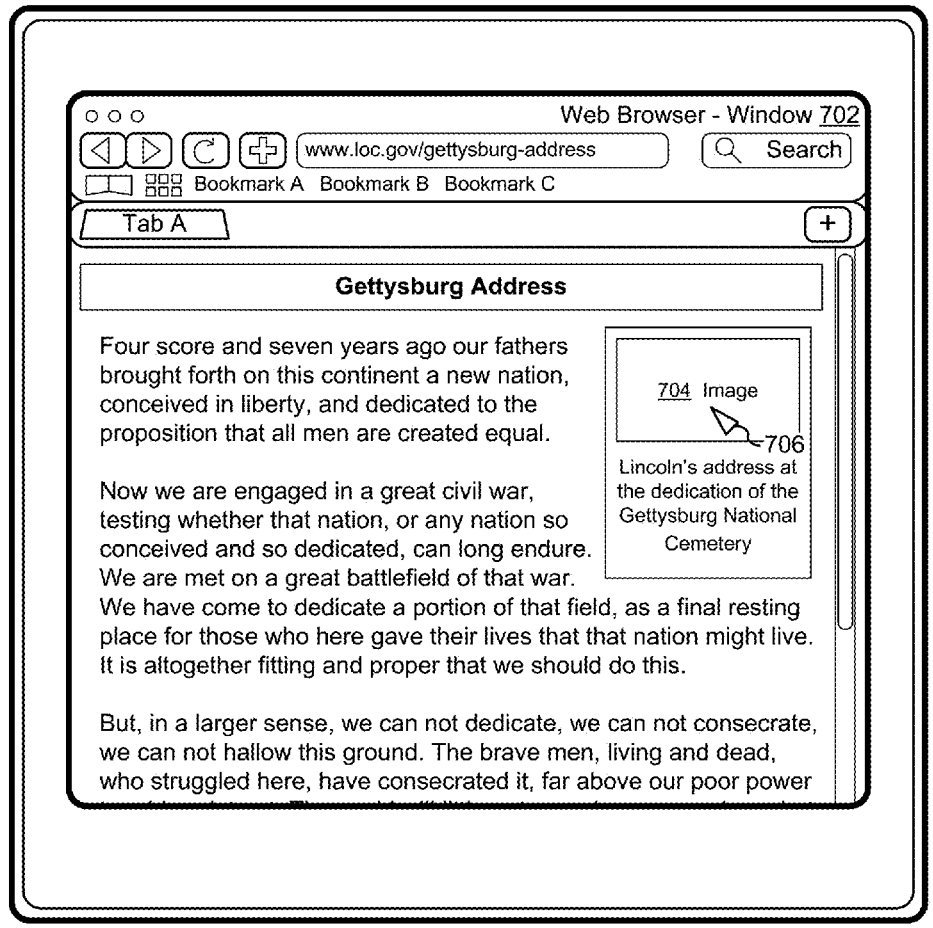
Figure 7C:
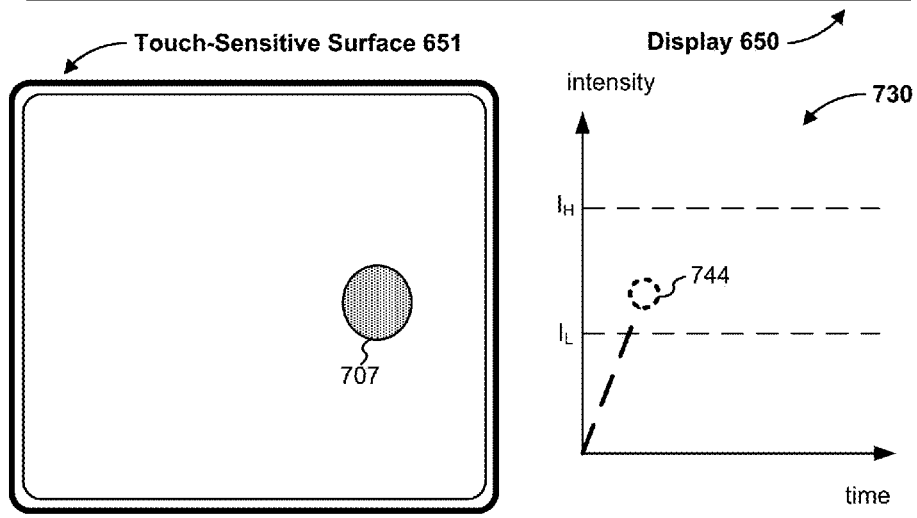

In FIG. 7C, intensity diagram 730 illustrates that the intensity applied by touch input 707 on touch-sensitive surface 651 continues to increase over time, and, in response to a change (e.g., an increase) to the intensity applied by touch input 707 on touch-sensitive surface 651, the device generates force changed event 744.

Figure 7D:
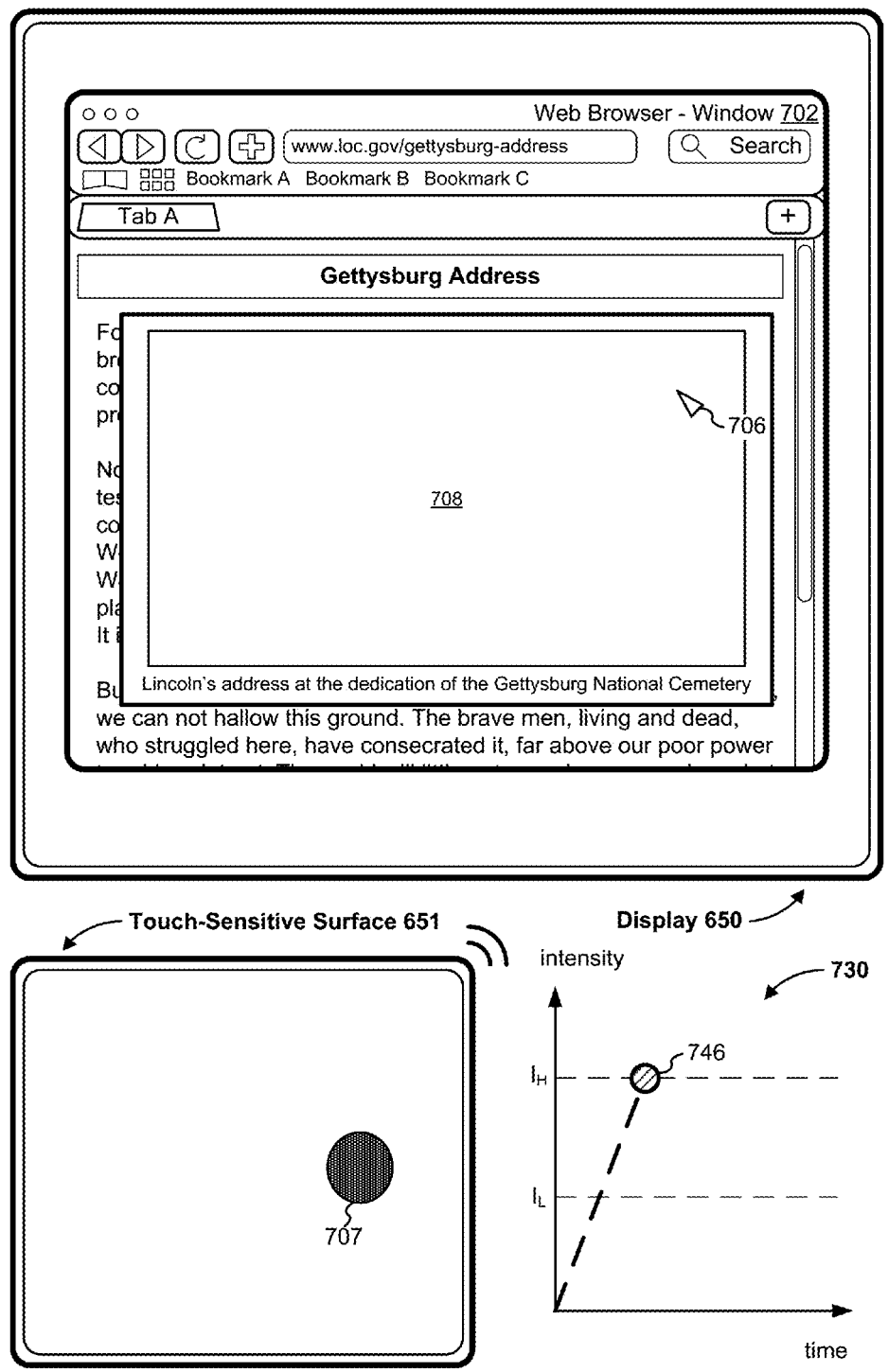

FIG. 7D illustrates, in intensity diagram 730, that the intensity applied by touch input 707 on touch-sensitive surface 651 has increased to reach a high intensity threshold $I_H$ (or the intensity applied by touch input 707 has changed from below the high intensity threshold $I_H$ to above the high intensity threshold $I_H$), and, in response to the intensity applied by touch input 707 on touch-sensitive surface 651 reaching the high intensity threshold $I_H$ (or the intensity applied by touch input 707 changing from below the high intensity threshold $I_H$ to above the high intensity threshold $I_H$), the device generates force down event 746. Force down event 746 indicates that the intensity applied by touch input 707 on touch-sensitive surface 651 has reached the high intensity threshold $I_H$ (or the intensity applied by touch input 707 has changed from below the high intensity threshold $I_H$ to above the high intensity threshold $I_H$).

FIG. 7D also illustrates that, in response to the intensity applied by touch input 707 on touch-sensitive surface 651 reaching the high intensity threshold $I_H$ (or the intensity applied by touch input 707 changing from below the high intensity threshold $I_H$ to above the high intensity threshold $I_H$), user interface 702 is updated to display region 708. In some embodiments, region 708 includes an enlarged image (e.g., an enlargement of image 704). In some embodiments, region 708 includes a video (e.g., a screenshot of the video is shown in region 708, and an activation of the screenshot, such as a click on the screenshot, initiates a playback of the video).

In some embodiments, when the web browser or the web page includes instructions for handling the force down event, the device processes the force down event in accordance with the instructions for handling the force down event in the web browser or the web page (e.g., displaying region 708 in accordance with instructions for handling the force down event in the web page).

FIG. 7D illustrates that, in response to the intensity applied by touch input 707 on touch-sensitive surface 651 reaching the high intensity threshold $I_H$ (or the intensity applied by touch input 707 changing from below the high intensity threshold $I_H$ to above the high intensity threshold $I_H$), the device generates a tactile output of a second type (e.g., using tactile output generator(s) 357 in FIG. 3). A tactile output of the second type provides feedback to the user indicating that the intensity of the contact has increased to (or risen above) the high intensity threshold $I_H$. In the example illustrated in FIG. 7D, a force down event is generated in temporal proximity to (e.g., immediately before, during, or immediately after) generation of the tactile output of the second type. As such, the tactile output in FIG. 7D provides feedback to the user that a force down event associated with the change in intensity of the contact has been (or will be) generated. In some embodiments, a tactile output of a second type is distinct from a tactile output of a first type.

Figure 7E:
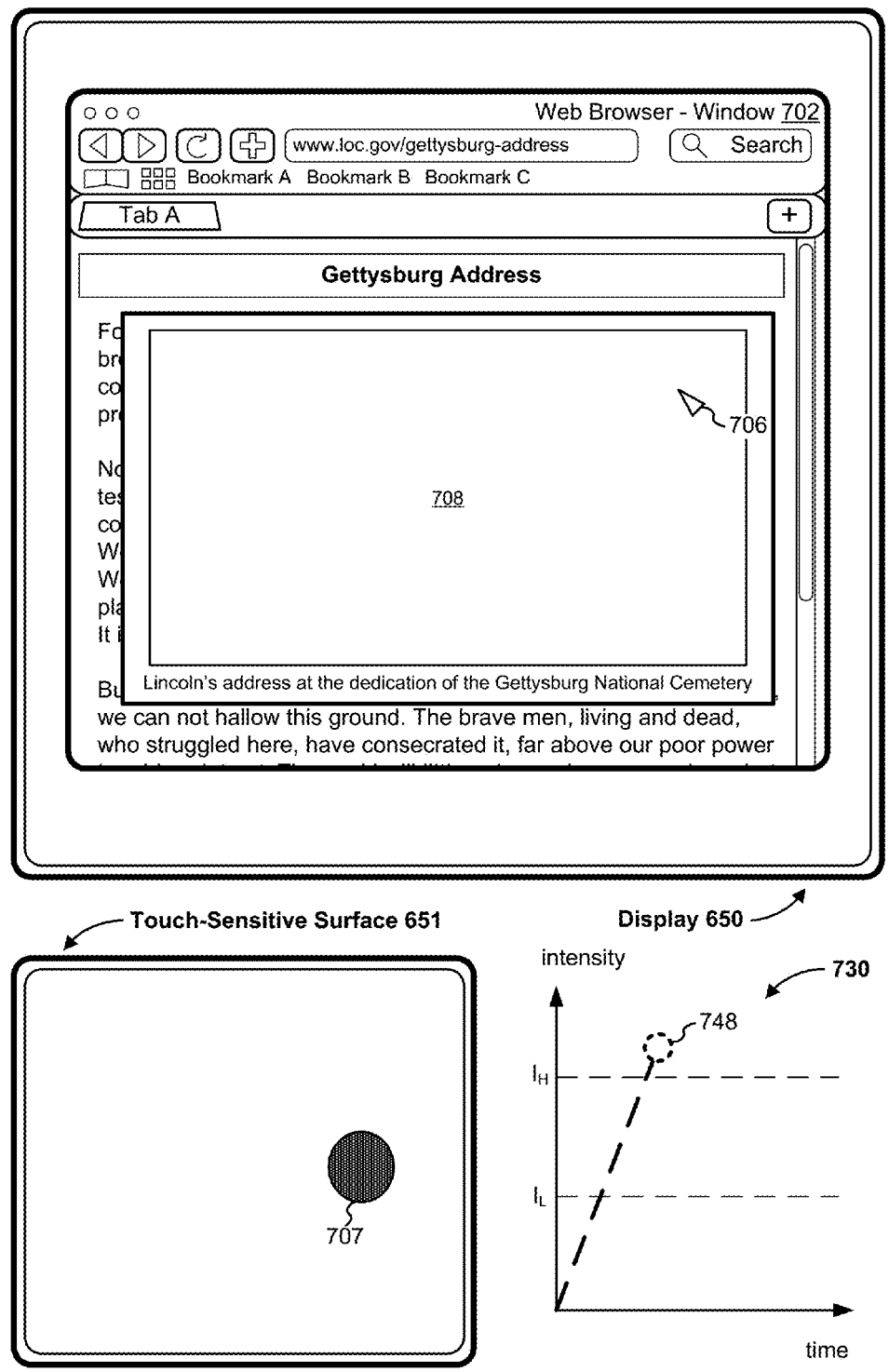

In FIG. 7E, intensity diagram 730 illustrates that the intensity applied by touch input 707 on touch-sensitive surface 651 continues to increase over time, and, in response to a change (e.g., an increase) to the intensity applied by touch input 707 on touch-sensitive surface 651, the device generates force changed event 748.

Figure 7F:
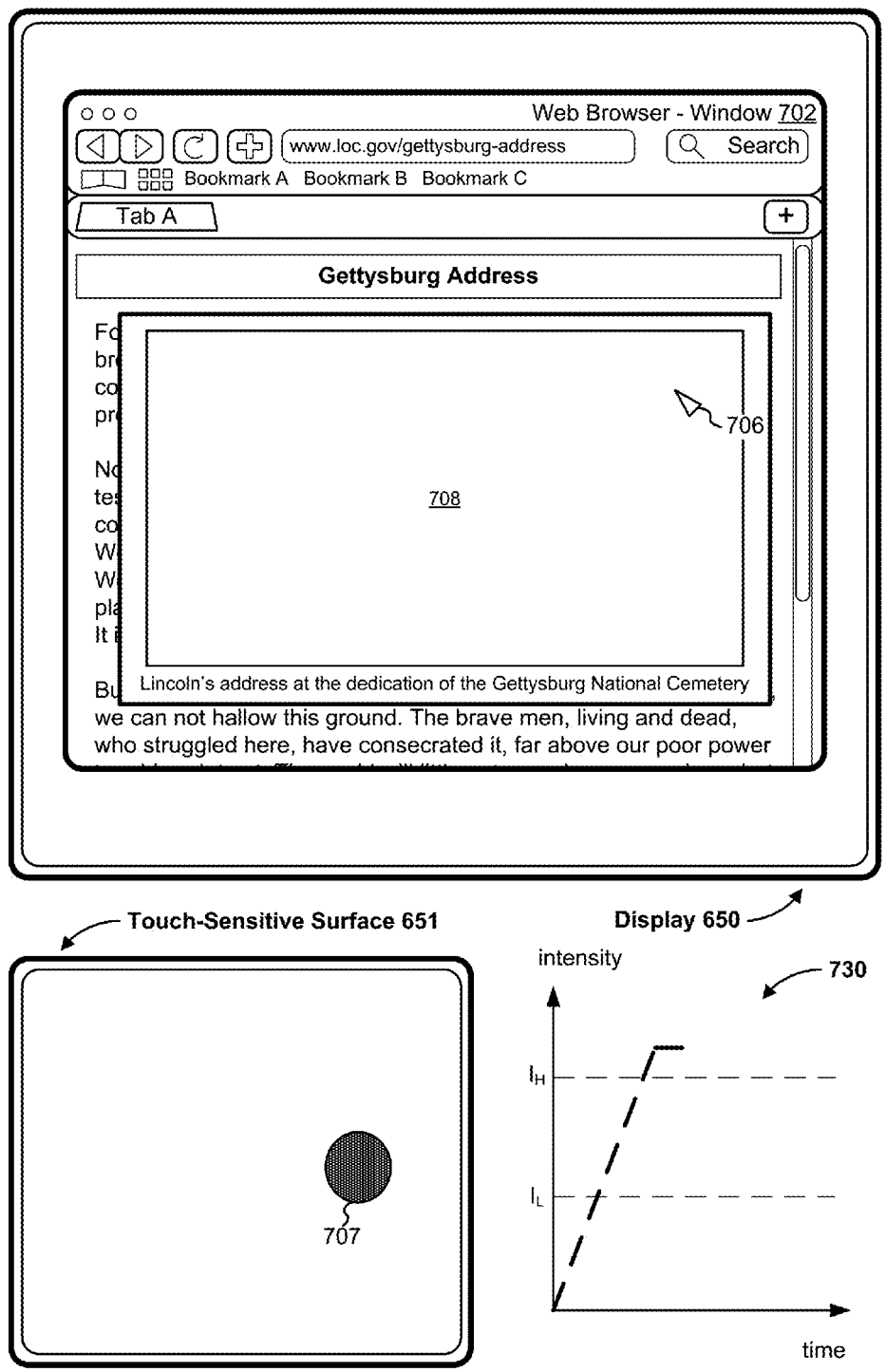

Intensity diagram 730 in FIG. 7F illustrates that the intensity applied by touch input 707 on touch-sensitive surface 651 is maintained (e.g., the intensity has not changed) for a period of time, and the device does not generate a force changed event while the intensity applied by touch input 707 does not change. In addition, touch input 707 on touch-sensitive surface 651 has not moved across touch-sensitive surface 651, and the device does not generate a mouse moved event while touch input 707 does not move across touch-sensitive surface 651.

Figure 7G:
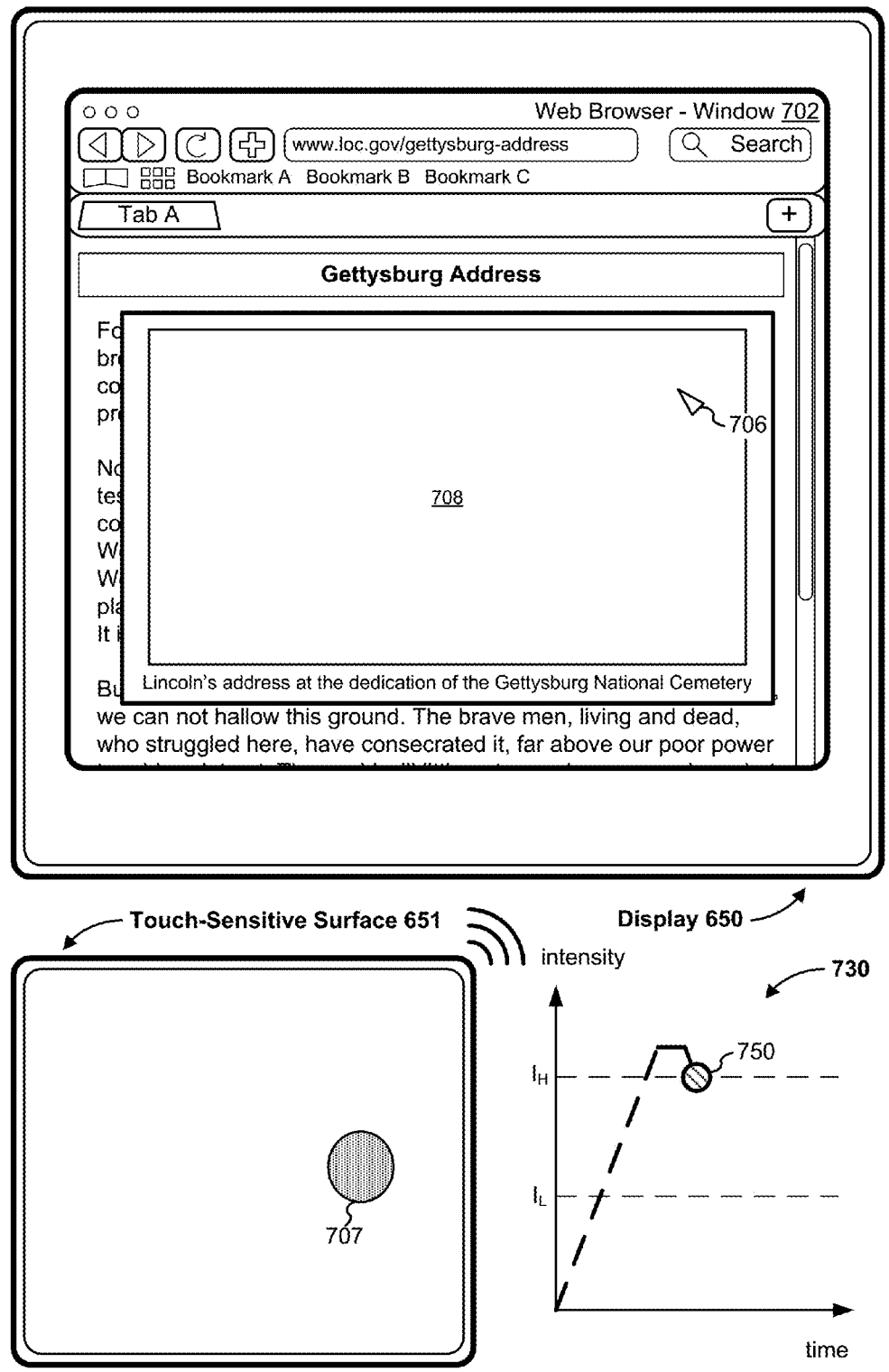

FIG. 7G illustrates, in intensity diagram 730, that the intensity applied by touch input 707 on touch-sensitive surface 651 decreases to the high intensity threshold $I_H$ (or the intensity applied by touch input 707 has changed from above the high intensity threshold $I_H$ to below the high intensity threshold $I_H$), and, in response to the intensity applied by touch input 707 on touch-sensitive surface 651 decreasing to the high intensity threshold $I_H$ (or the intensity applied by touch input 707 changing from above the high intensity threshold $I_H$ to below the high intensity threshold $I_H$), the device generates force up event 750. Force up event 750 indicates that the intensity applied by touch input 707 on touch-sensitive surface 651 has fallen to the high intensity threshold $I_H$ (or the intensity applied by touch input 707 has changed from above the high intensity threshold $I_H$ to below the high intensity threshold $I_H$).

FIG. 7G also illustrates that, in response to the intensity applied by touch input 707 on touch-sensitive surface 651 decreasing to the high intensity threshold $I_H$ (or the intensity applied by touch input 707 changing from above the high intensity threshold $I_H$ to below the high intensity threshold $I_H$), region 708 (e.g., for playing a video or displaying an enlarged image as illustrated in FIG. 7F) is visually distinguished (e.g., color, line width, highlighting, and/or line pattern are changed). For example, a border of region 708 is visually distinguished, such as highlighted, to indicate that region 708 is "locked." When the region 708 is locked, region 708 remains on display 650 subsequent to the intensity applied by touch input 707 on touch-sensitive surface 651 decreasing to the high intensity threshold $I_H$ (or the intensity applied by touch input 707 changing from above the high intensity threshold $I_H$ to below the high intensity threshold $I_H$). Alternatively, in some embodiments, in response to the intensity applied by touch input 707 on touch-sensitive surface 651 decreasing to the high intensity threshold $I_H$ (or the intensity applied by touch input 707 changing from above the high intensity threshold $I_H$ to below the high intensity threshold $I_H$), region 708 (e.g., for playing a video or displaying an enlarged image as illustrated in FIG. 7F) ceases to be displayed in user interface 702.

In some embodiments, when the web browser or the web page includes instructions for handling the force up event, the device processes the force up event in accordance with the instructions for handling the force up event in the web browser or the web page (e.g., visually distinguishing display region 708 in accordance with instructions in the web page for handling the force up event, or alternatively, ceasing to display region 708 in accordance with instructions in the web page for handling the force up event).

FIG. 7G illustrates that, in response to the intensity applied by touch input 707 on touch-sensitive surface 651 decreasing to the high intensity threshold $I_H$ (or the intensity applied by touch input 707 changing from above the high intensity threshold $I_H$ to below the high intensity threshold $I_H$), the device generates a tactile output of a third type (e.g., using tactile output generator(s) 357 in FIG. 3). A tactile output of the third type provides feedback to the user indicating that the intensity of the contact has decreased to (or has fallen below) the high intensity threshold $I_H$. In the example illustrated in FIG. 7G, a force up event is generated in temporal proximity to (e.g., immediately before, during, or immediately after) generation of the tactile output of the third type. As such, the tactile output in FIG. 7G provides feedback to the user that a force up event associated with the change in intensity of the contact has been (or will be) generated. In some embodiments, a tactile output of a third type is distinct from a tactile output of a first type and a tactile output of a second type.

Figure 7H:
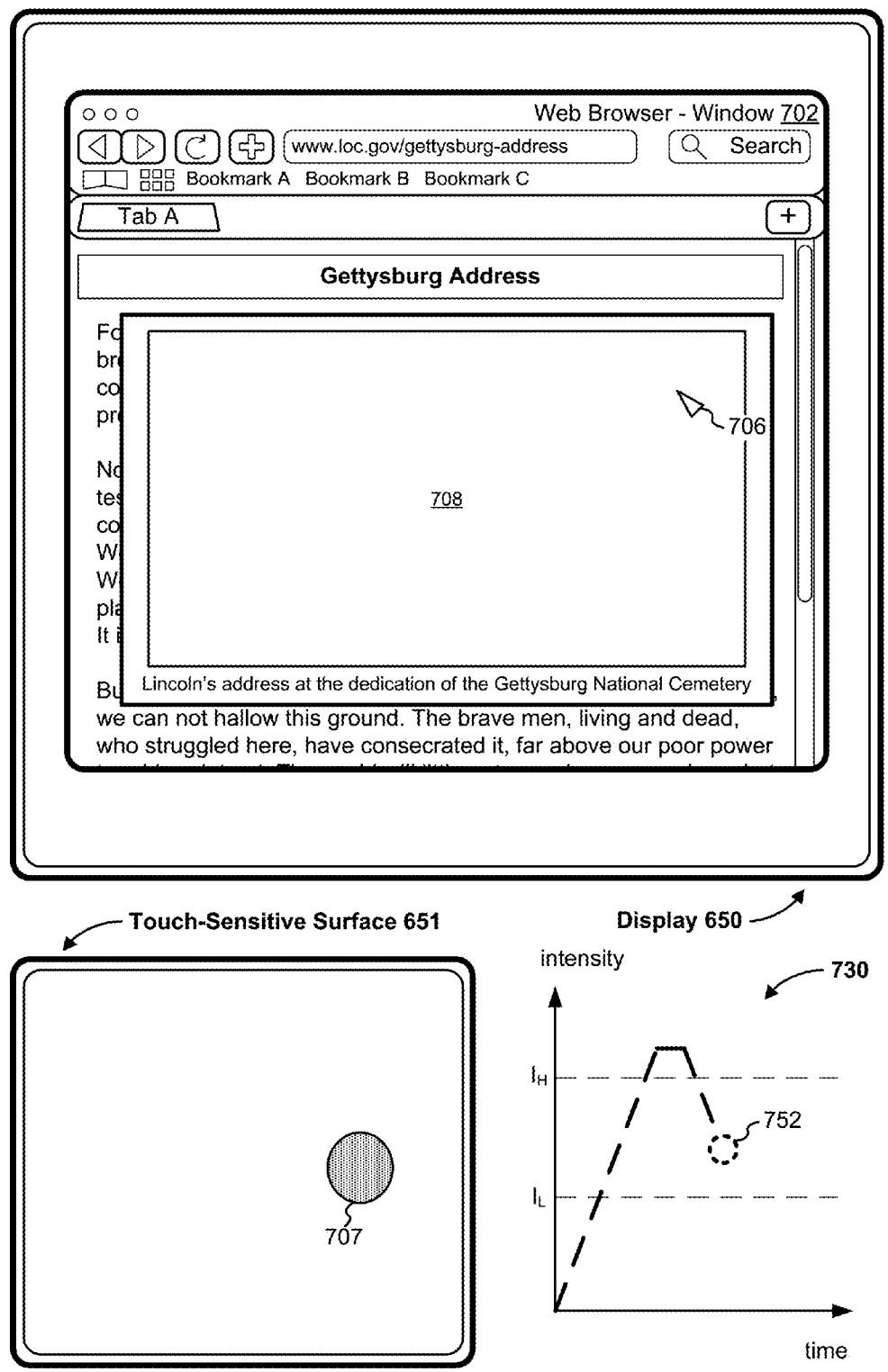

In FIG. 7H, intensity diagram 730 illustrates that the intensity applied by touch input 707 on touch-sensitive surface 651 continues to decrease over time, and, in response to a change (e.g., a decrease) to the intensity applied by touch input 707 on touch-sensitive surface 651, the device generates force changed event 752.

Figure 7I:
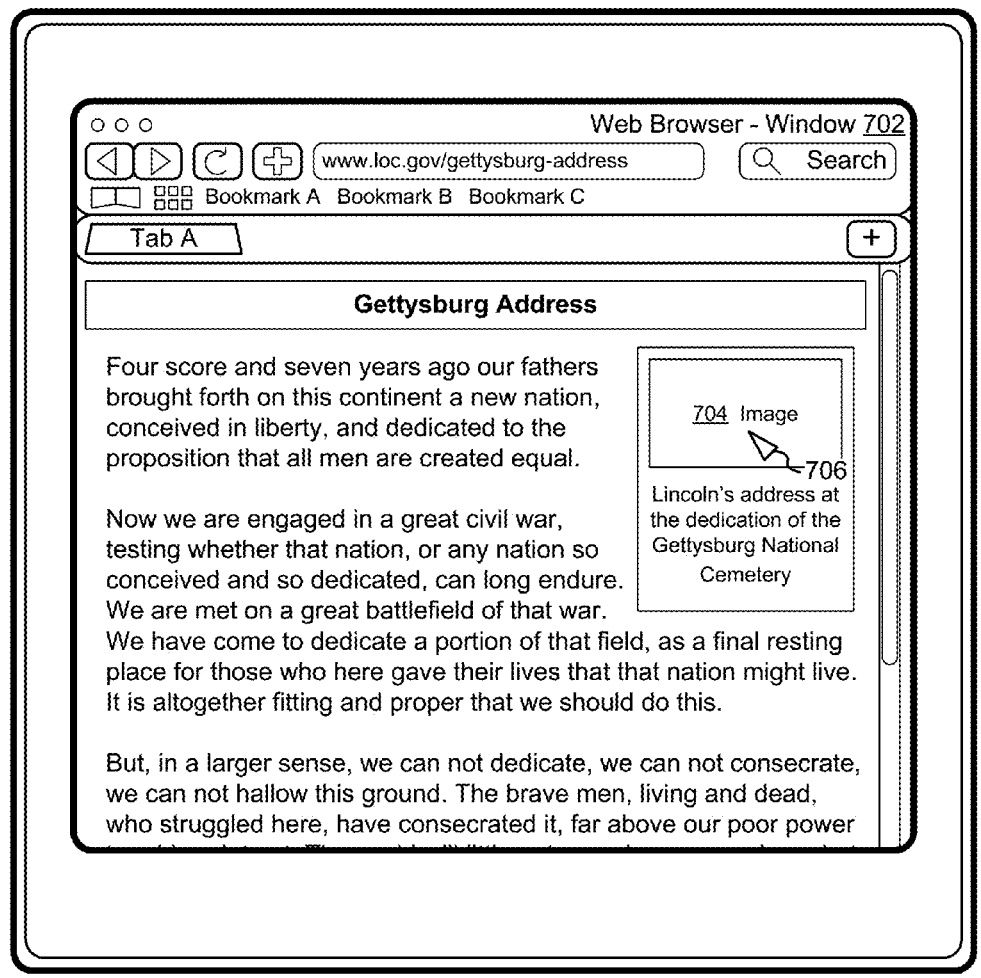
Figure 7I:
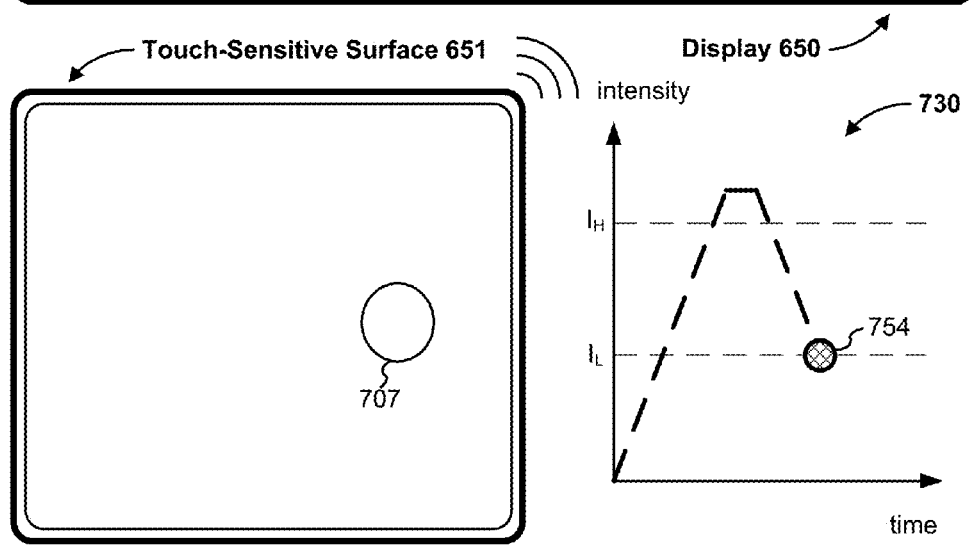

FIG. 7I illustrates, in intensity diagram 730, that the intensity applied by touch input 707 on touch-sensitive surface 651 continues to decrease to the low intensity threshold $I_L$ (or the intensity applied by touch input 707 has changed from above the low intensity threshold $I_L$ to below the low intensity threshold $I_L$), and, in response to the intensity applied by touch input 707 on touch-sensitive surface 651 decreasing to the low intensity threshold $I_L$ (or the intensity applied by touch input 707 changing from above the low intensity threshold $I_L$ to below the low intensity threshold $I_L$), the device generates mouse up event 754. In some embodiments, a mouse up event indicates that an input button (e.g., a mouse button) has been released or that another input (e.g., a touch input) that meets predefined mouse up criteria has been received. Thus, in some embodiments, the device generates a mouse up event in response to determining that an input button, of a mouse or a similar input device (e.g., a trackpad) in communication with the device, has been released, independent of an intensity detected on touch-sensitive surface 651. In some embodiments, when the web browser or the web page includes instructions for handling the mouse up event, the device processes the mouse up event in accordance with the instructions for handling the mouse up event in the web browser or the web page (e.g., releasing a mouse button, after pressing the mouse button, while focus selector 706 is displayed over the displayed representation of a hyperlink, initiates displaying a web page that is indicated by the hyperlink). In FIG. 7I, in response to the intensity applied by touch input 707 on touch-sensitive surface 651 decreasing to the low intensity threshold $I_L$ (or the intensity applied by touch input 707 changing from above the low intensity threshold $I_L$ to below the low intensity threshold $I_L$), region 708 (e.g., as illustrated in FIG. 7F) ceases to be displayed in user interface 702. Alternatively, subsequent to the intensity applied by touch input 707 on touch-sensitive surface 651 reaching the high intensity threshold $I_H$ (or the intensity applied by touch input 707 changing from below the high intensity threshold $I_H$ to above the high intensity threshold $I_H$), region 708 remains on user interface 702 independent of subsequent intensity applied by touch input 707 on touch-sensitive surface 651 (e.g., region 708 remains in user interface 702 even after touch input 707 ceases to be detected on touch-sensitive surface 651).

FIG. 7I also illustrates that, in response to the intensity applied by touch input 707 on touch-sensitive surface 651 decreasing to the low intensity threshold $I_L$ (or the intensity applied by touch input 707 changing from above the low intensity threshold $I_L$ to below the low intensity threshold $I_L$), the device generates a tactile output of a fourth type (e.g., using tactile output generator(s) 357 in FIG. 3). A tactile output of the fourth type provides feedback to the user indicating that the intensity of the contact has decreased to (or fallen below) the low intensity threshold $I_L$. In the example illustrated in FIG. 7I, a mouse up event is generated in temporal proximity to (e.g., immediately before, during, or immediately after) generation of the tactile output of the fourth type. As such, the tactile output in FIG. 7I provides feedback to the user that a mouse up event associated with the change in intensity of the contact has been (or will be) generated. In some embodiments, a tactile output of a fourth type is distinct from a tactile output of a first type, a tactile output of a second type, and a tactile output of a third type.

Figure 7J:
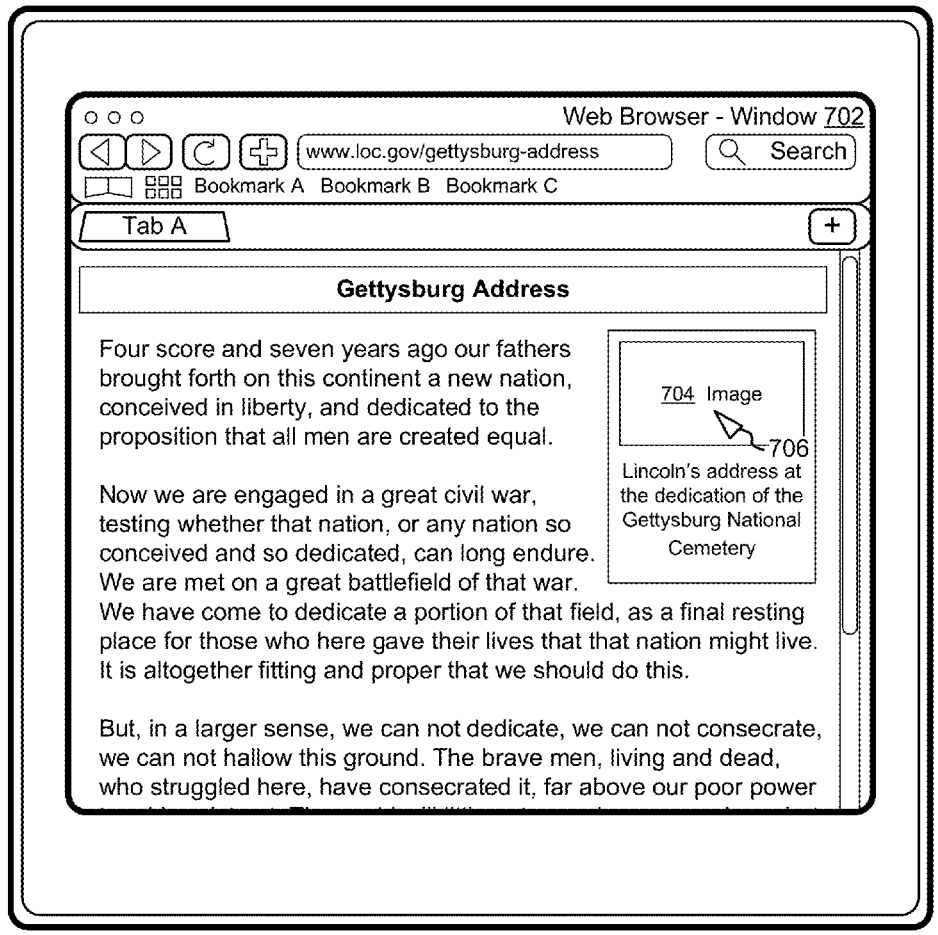
Figure 7J:
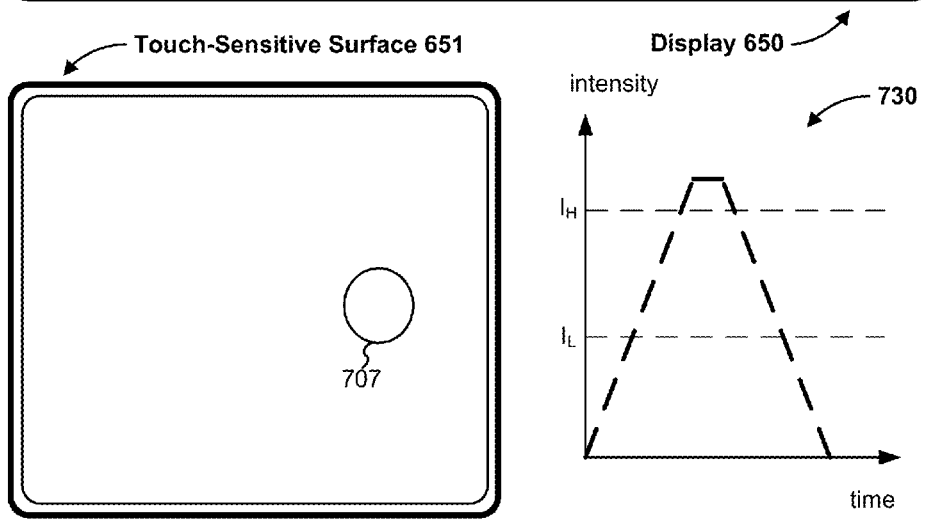

Intensity diagram 730 in FIG. 7J illustrates that the intensity applied by touch input 707 on touch-sensitive surface 651 continues to decrease. In some embodiments, a force changed event is not generated (e.g., generating a force changed event is forgone) in accordance with a determination that the intensity applied by touch input 707 on touch-sensitive surface 651 is below the low intensity threshold $I_L$.

Figure 7K:
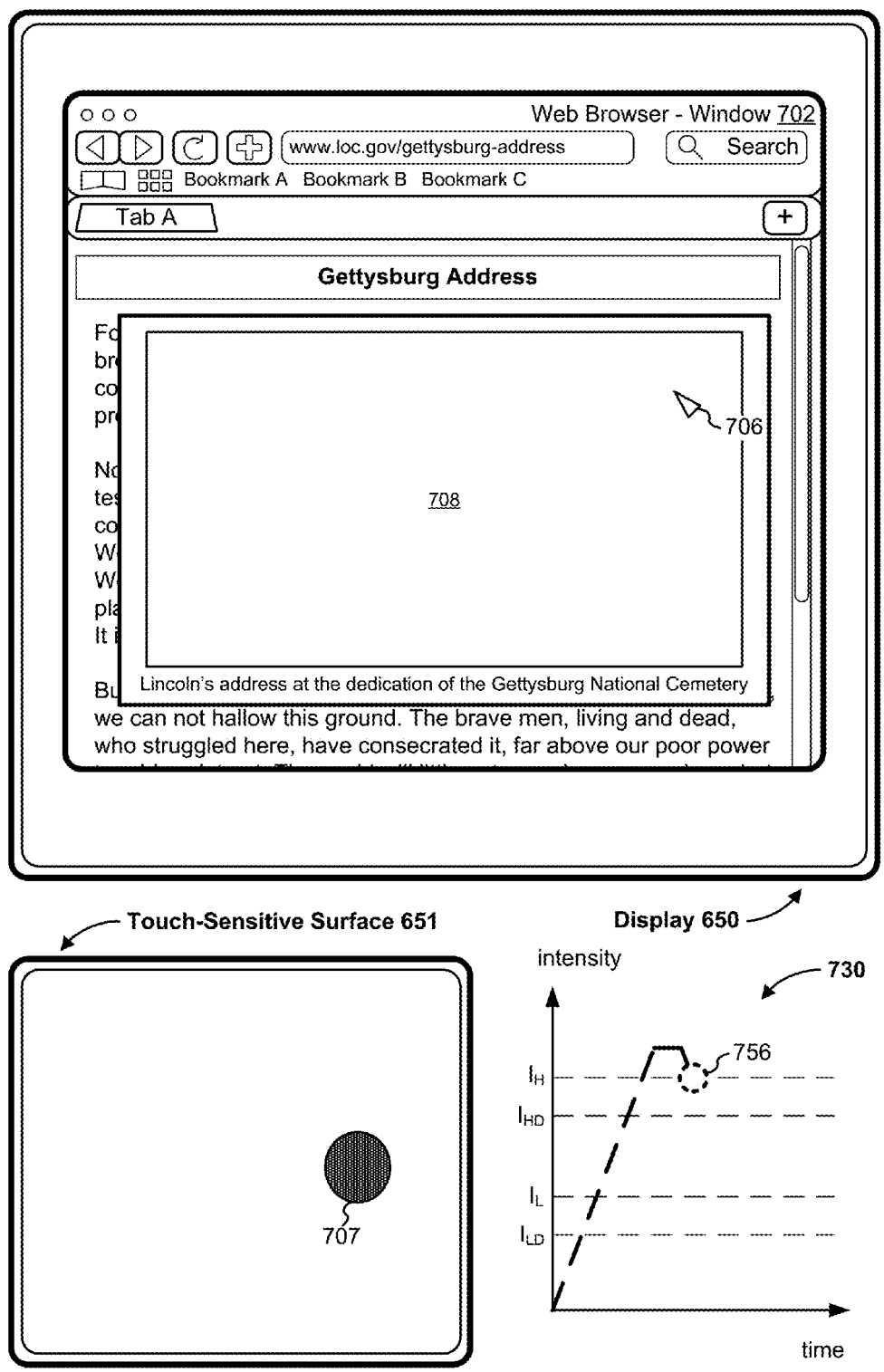
Figure 7L:
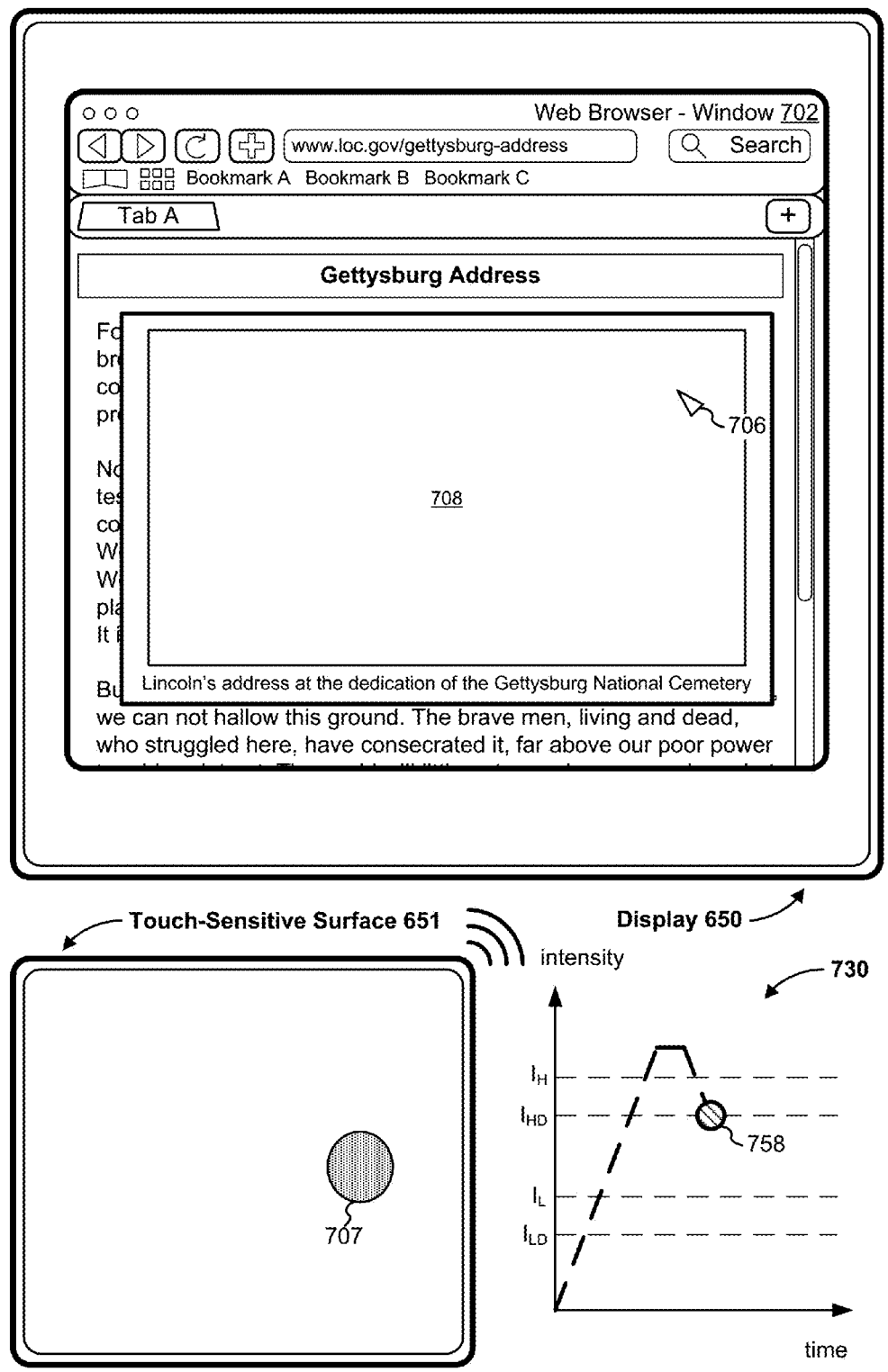

FIGS. 7K-7L illustrates that, in some embodiments, a force up event is generated in response to the intensity applied by touch input 707 on touch-sensitive surface 651 decreasing to a force down intensity threshold $I_{HD}$ that is distinct from the high intensity threshold $I_H$, instead of the intensity applied by touch input 707 on touch-sensitive surface 651 decreasing to the high intensity threshold $I_H$ (or the intensity applied by touch input 707 changing from above the force down intensity threshold $I_{HD}$ to below the force down intensity threshold $I_{HD}$).

Intensity diagram 730 in FIG. 7K illustrates that the intensity applied by touch input 707 on touch-sensitive surface 651 decreases to the high intensity threshold $I_H$ (or the intensity applied by touch input 707 has changed from above the high intensity threshold $I_H$ to below the high intensity threshold $I_H$), and, in response to the intensity applied by touch input 707 on touch-sensitive surface 651 decreasing to the high intensity threshold $I_H$ (or the intensity applied by touch input 707 changing from above the high intensity threshold $I_H$ to below the high intensity threshold $I_H$), the device generates force changed event 756 (e.g., because the intensity has changed) instead of generating a force up event.

FIG. 7L illustrates that that the intensity applied by touch input 707 on touch-sensitive surface 651 decreases to the force up intensity threshold $I_{HD}$ (or the intensity applied by touch input 707 has changed from above the force up intensity threshold $I_{HD}$ to below the force up intensity threshold $I_{HD}$), and, in response to the intensity applied by touch input 707 on touch-sensitive surface 651 decreasing to the force up intensity threshold $I_{HD}$ (or the intensity applied by touch input 707 changing from above the force up intensity threshold $I_{HD}$ to below the force up intensity threshold $I_{HD}$), the device generates force up event 758.

FIG. 7L also illustrates that, in response to the intensity applied by touch input 707 on touch-sensitive surface 651 decreasing to the force up intensity threshold $I_{HD}$ (or the intensity applied by touch input 707 changing from above the force up intensity threshold $I_{HD}$ to below the force up intensity threshold $I_{HD}$), the device generates a tactile output of a third type (e.g., using tactile output generator(s) 357 in FIG. 3). A tactile output of the third type provides feedback to the user indicating that the intensity of the contact has decreased to (or below) the force up intensity threshold $I_{HS}$. In the example illustrated in FIG. 7L, a force up event is generated in temporal proximity to (e.g., immediately before, during, or immediately after) generation of the tactile output of the third type. As such, the tactile output in FIG. 7L provides feedback to the user that a force up event associated with the change in intensity of the contact has been (or will be) generated.

Figure 7M:
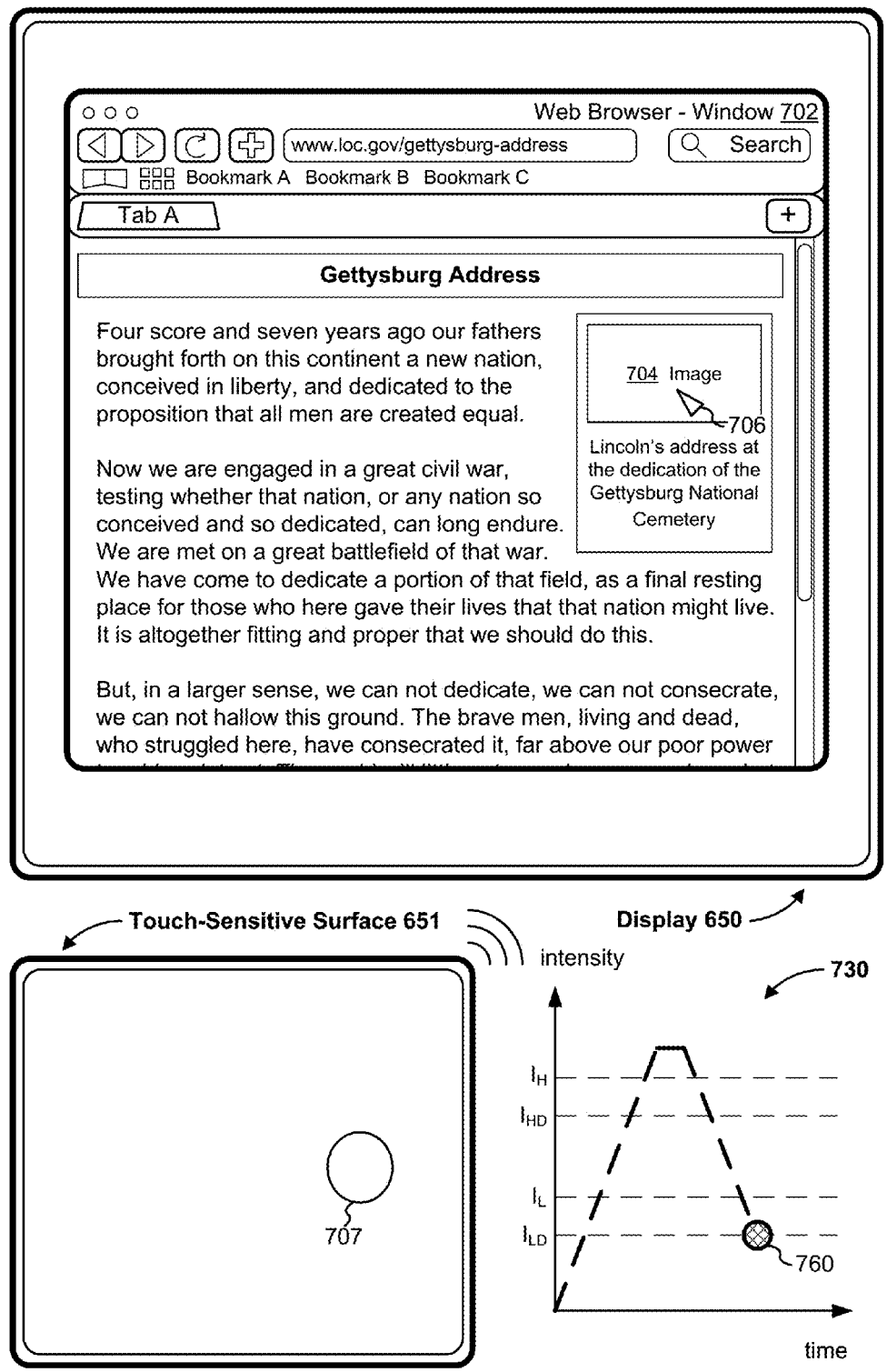

FIG. 7M illustrates that that the intensity applied by touch input 707 on touch-sensitive surface 651 decreases to a mouse up intensity threshold $I_{LD}$ (or the intensity applied by touch input 707 has changed from above the mouse up intensity threshold $I_{LD}$ to below the mouse up intensity threshold $I_{LD}$), and, in response to the intensity applied by touch input 707 on touch-sensitive surface 651 decreasing to the mouse up intensity threshold $I_{LD}$ (or the intensity applied by touch input 707 changing from above the mouse up intensity threshold $I_{LD}$ to below the mouse up intensity threshold $I_{LD}$), the device generates mouse up event 760.

FIG. 7M also illustrates that, in response to the intensity applied by touch input 707 on touch-sensitive surface 651 decreasing to the mouse up intensity threshold $I_{LD}$ (or the intensity applied by touch input 707 changing from above the mouse up intensity threshold $I_{LD}$ to below the mouse up intensity threshold $I_{LD}$), the device generates a tactile output of a fourth type (e.g., using tactile output generator(s) 357 in FIG. 3). A tactile output of the fourth type provides feedback to the user indicating that the intensity of the contact has decreased to (or below) the mouse up intensity threshold $I_{LD}$. In the example illustrated in FIG. 7M, a mouse up event is generated in temporal proximity to (e.g., immediately before, during, or immediately after) generation of the tactile output of the fourth type. As such, the tactile output in FIG. 7M provides feedback to the user that a mouse up event associated with the change in intensity of the contact has been (or will be) generated.

Figure 7N:
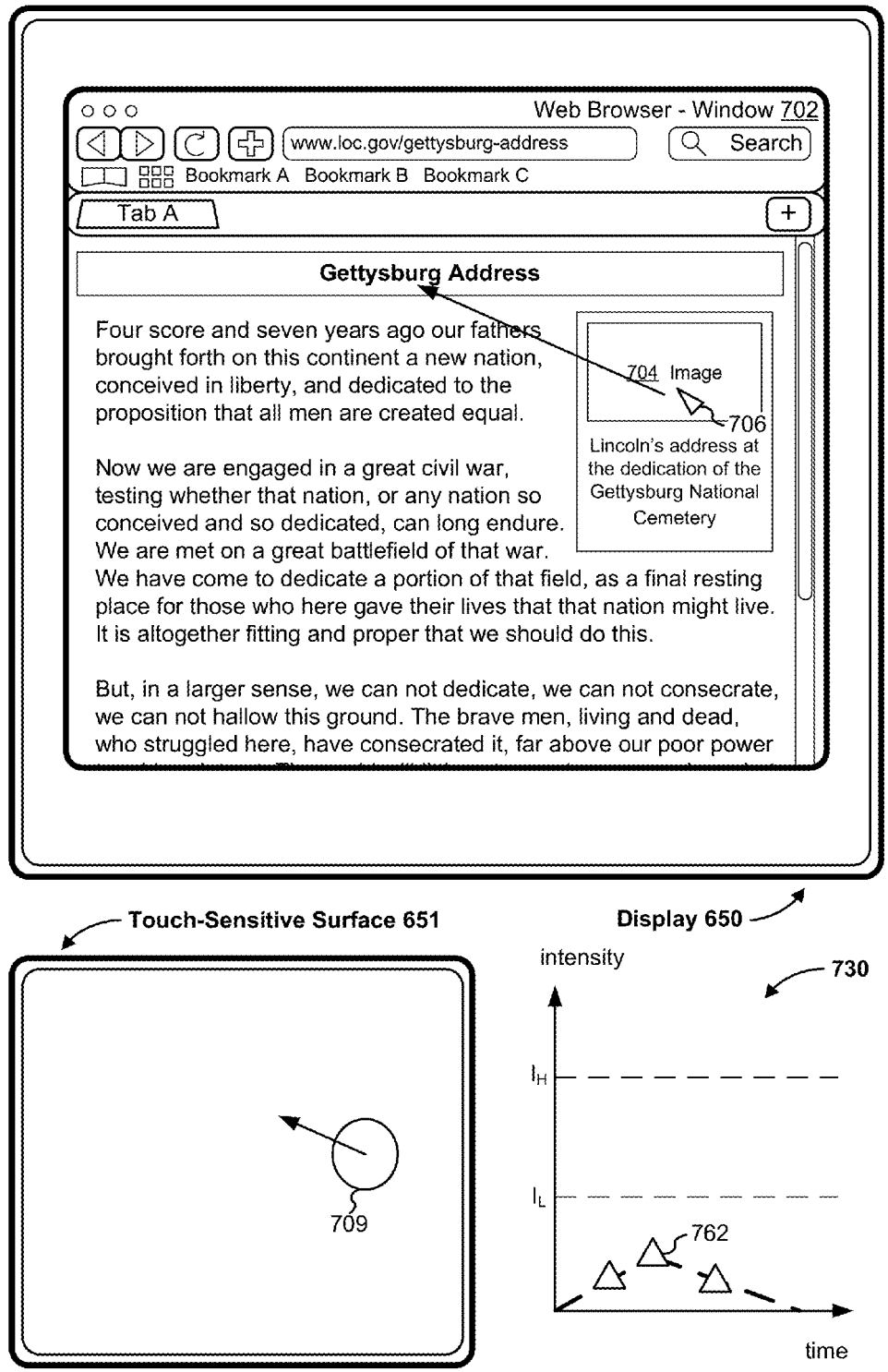

FIG. 7N illustrates that touch input 709 on touch-sensitive surface 651 moves across touch-sensitive surface 651 and focus selector 706 moves across display 650 in accordance with a movement of touch input 709 across touch-sensitive surface 651. Intensity diagram 730 in FIG. 7N illustrates that multiple mouse moved events 762 are generated in response to touch input 709 on touch-sensitive surface 651 moving across touch-sensitive surface 651.

FIGS. 7O-7S illustrate operations associated with touch input 711 in accordance with some embodiments.

Figure 7O:
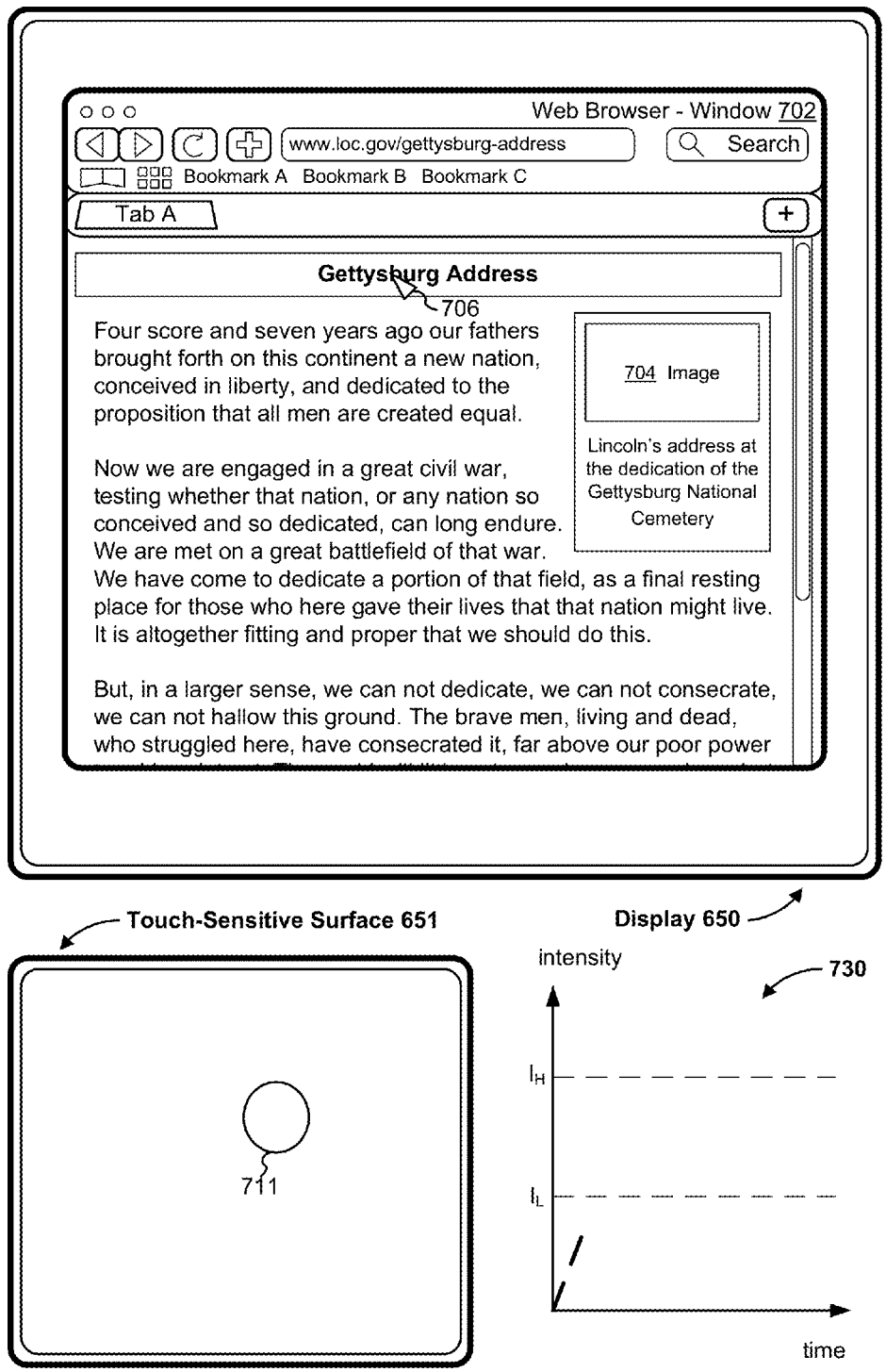

FIG. 7O illustrates that focus selector 706 has moved to a location on display 650 that corresponds to the word "Gettysburg" in the web page. FIG. 7O also illustrates that touch input 711 is detected on touch-sensitive surface 651 and the intensity applied by touch input 711 on touch-sensitive surface 651 increases over time.

Figure 7P:
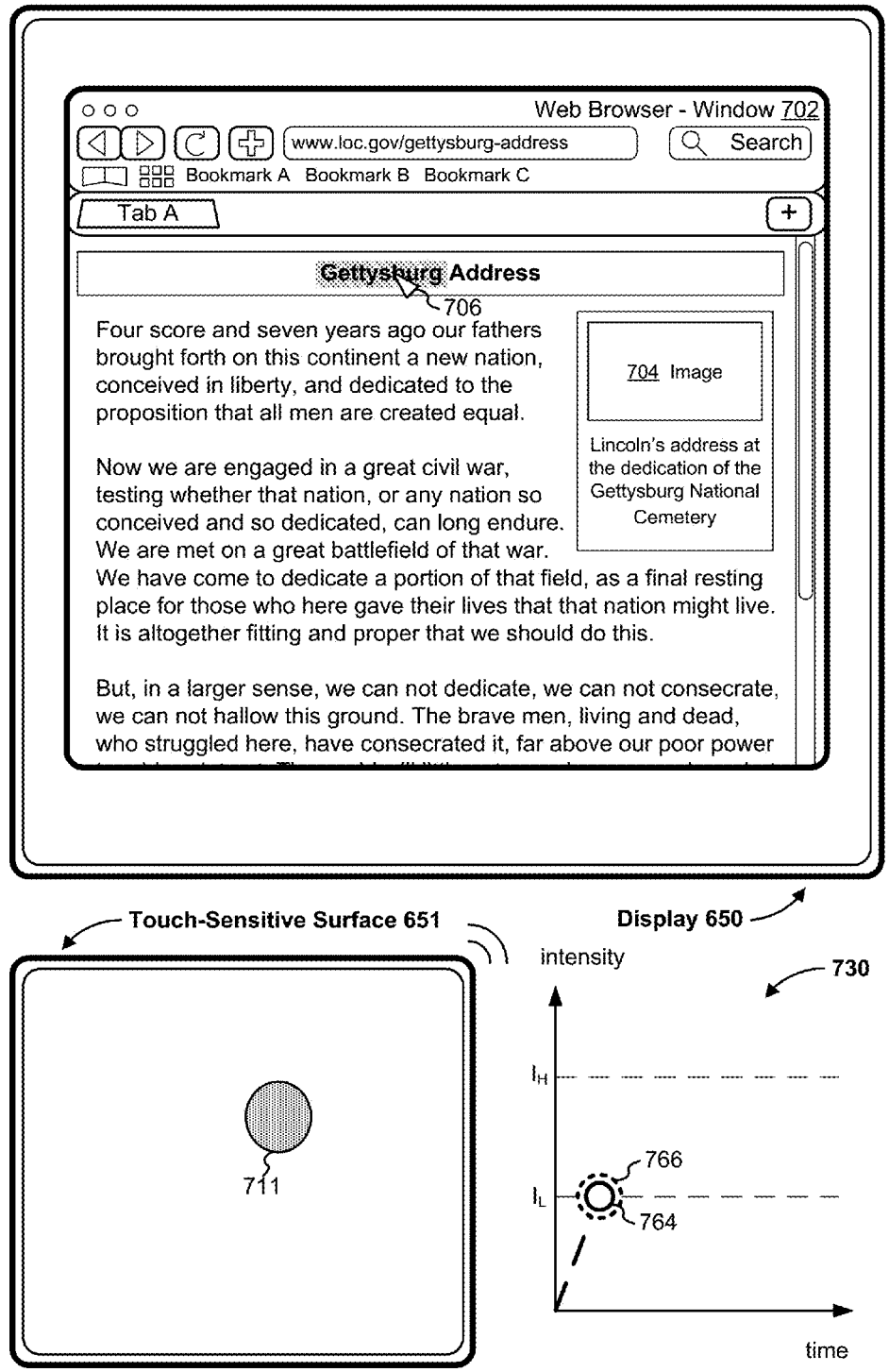

In FIG. 7P, intensity diagram 730 illustrates that the intensity applied by touch input 711 on touch-sensitive surface 651 continues to increase over time and reaches the low intensity threshold $I_L$ (or the intensity applied by touch input 711 has changed from below the low intensity threshold $I_L$ to above the low intensity threshold $I_L$). Intensity diagram 730 in FIG. 7P also illustrates that the device generates mouse down event 764 and optionally, a will begin event 766.

FIG. 7P also illustrates that, in response to the intensity applied by touch input 711 on touch-sensitive surface 651 reaching the low intensity threshold $I_L$ (or the intensity applied by touch input 711 changing from below the low intensity threshold $I_L$ to above the low intensity threshold $I_L$), the device generates a tactile output of the first type (e.g., using tactile output generator(s) 357 in FIG. 3). A tactile output of the first type provides feedback to the user indicating that the intensity of the contact has increased to (or risen above) the low intensity threshold $I_L$. In the example illustrated in FIG. 7P, a mouse down event is generated in temporal proximity to (e.g., immediately before, during, or immediately after) generation of the tactile output of the first type. As such, the tactile output in FIG. 7P provides feedback to the user that a mouse down event associated with the change in intensity of the contact has been (or will be) generated.

Figure 7Q:
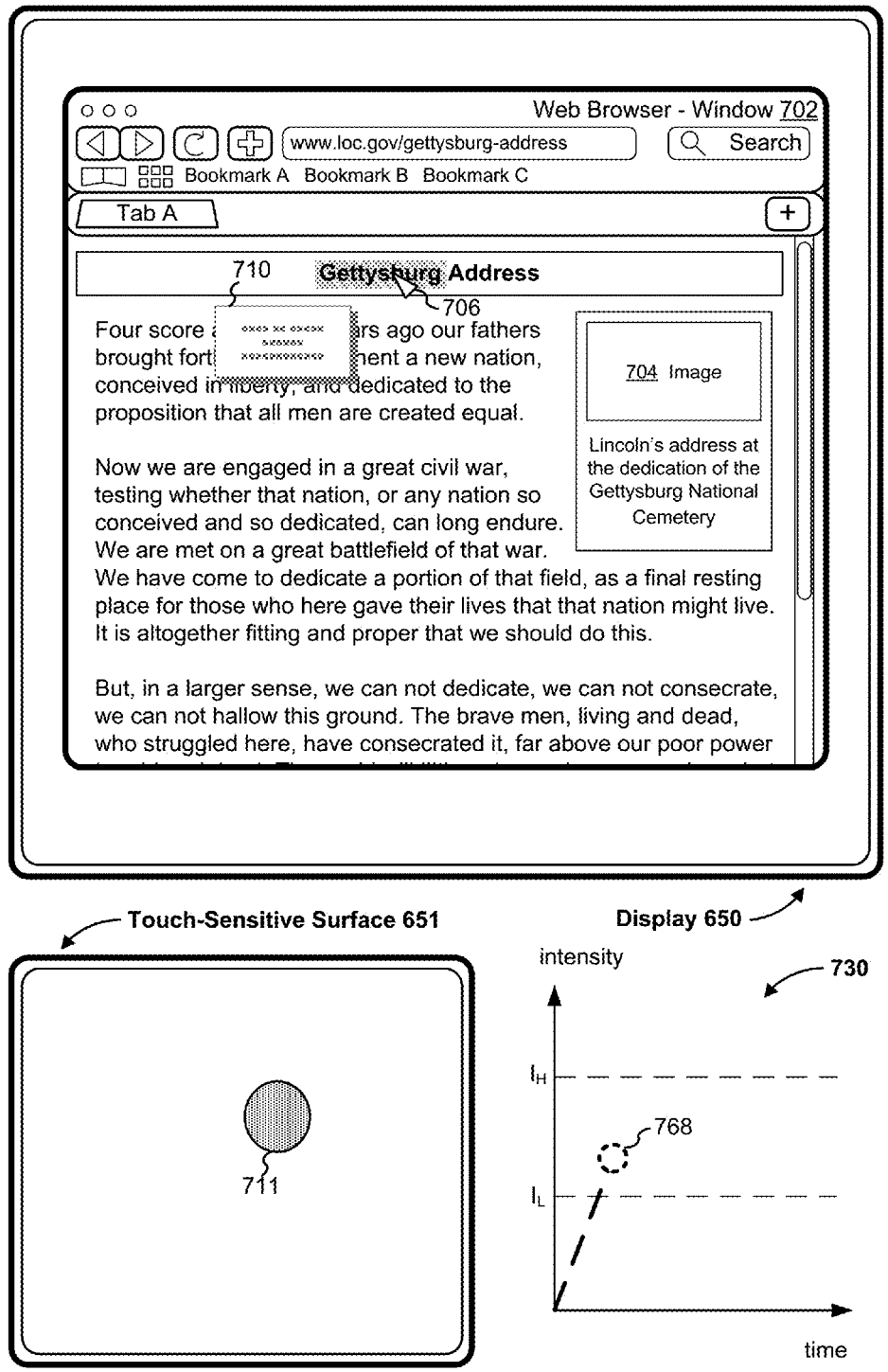

Intensity diagram 730 in FIG. 7Q illustrates that the intensity applied by touch input 711 on touch-sensitive surface 651 continues to increase over time, and, in response to a change (e.g., an increase) to the intensity applied by touch input 711 on touch-sensitive surface 651, the device generates force changed event 768. FIG. 7Q also illustrates that popup view 710 is displayed in response to the intensity applied by touch input 711 on touch-sensitive surface 651 increasing above the low intensity threshold $I_L$.

Figure 7R:
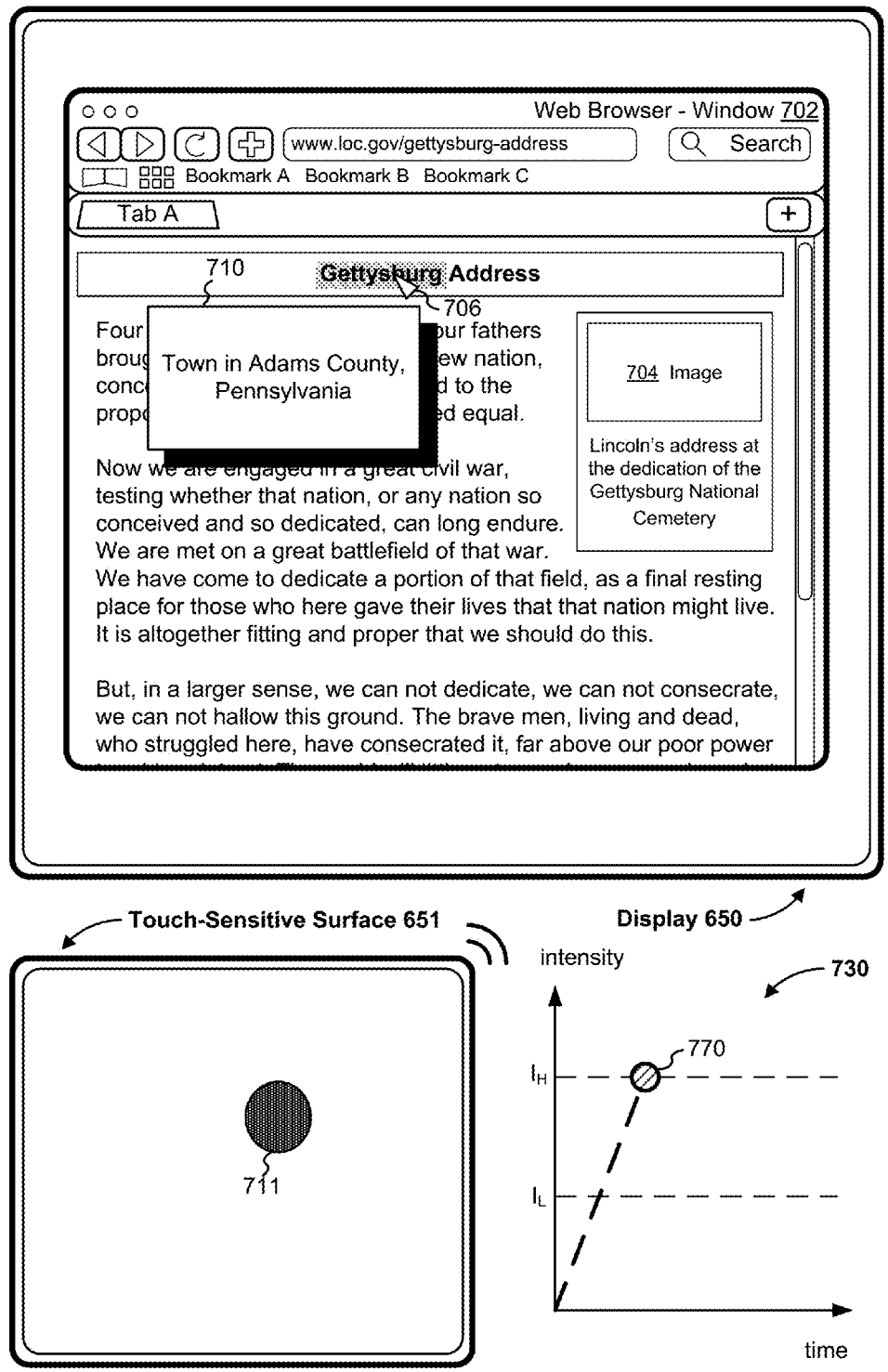

FIG. 7R illustrates, in intensity diagram 730, that the intensity applied by touch input 711 on touch-sensitive surface 651 has increased to reach the high intensity threshold $I_H$ (or the intensity applied by touch input 711 has changed from below the high intensity threshold $I_H$ to above the high intensity threshold $I_H$), and, in response to the intensity applied by touch input 711 on touch-sensitive surface 651 reaching the high intensity threshold $I_H$ (or the intensity applied by touch input 711 changing from below the high intensity threshold $I_H$ to above the high intensity threshold $I_H$), the device generates force down event 770.

FIG. 7R also illustrates that, in response to the intensity applied by touch input 711 on touch-sensitive surface 651 reaching the high intensity threshold $I_H$ (or the intensity applied by touch input 711 changing from below the high intensity threshold $I_H$ to above the high intensity threshold $I_H$), the device generates a tactile output of the second type (e.g., using tactile output generator(s) 357 in FIG. 3). A tactile output of the second type provides feedback to the user indicating that the intensity of the contact has increased to (or risen above) the high intensity threshold $I_H$. In the example illustrated in FIG. 7R, a force down event is generated in temporal proximity to (e.g., immediately before, during, or immediately after) generation of the tactile output of the second type. As such, the tactile output in FIG. 7R provides feedback to the user that a force down event associated with the change in intensity of the contact has been (or will be) generated.

In some embodiments, a size of popup view 710 increases with the intensity applied by touch input 711 on touch-sensitive surface 651 until the intensity reaches the high intensity threshold $I_H$. In some embodiments, in response to the intensity applied by touch input 711 on touch-sensitive surface 651 reaching the high intensity threshold $I_H$ (or the intensity applied by touch input 711 changing from below the high intensity threshold $I_H$ to above the high intensity threshold $I_H$), popup view 710 is "locked" on display 650. For example, after the intensity applied by touch input 711 on touch-sensitive surface 651 reaching the high intensity threshold $I_H$, popup view 710 remains on display 650 at the same size independent of a subsequent decrease of the intensity applied by touch input 711 on touch-sensitive surface 651 below the high intensity threshold $I_H$.

In FIGS. 7Q-7R, popup view 710 includes a dictionary lookup of a corresponding word or phrase (e.g., "Gettysburg"). In some embodiments, popup view 710 is "locked" in accordance with instructions, in the web browser, for handling a force down event.

Figure 7S:
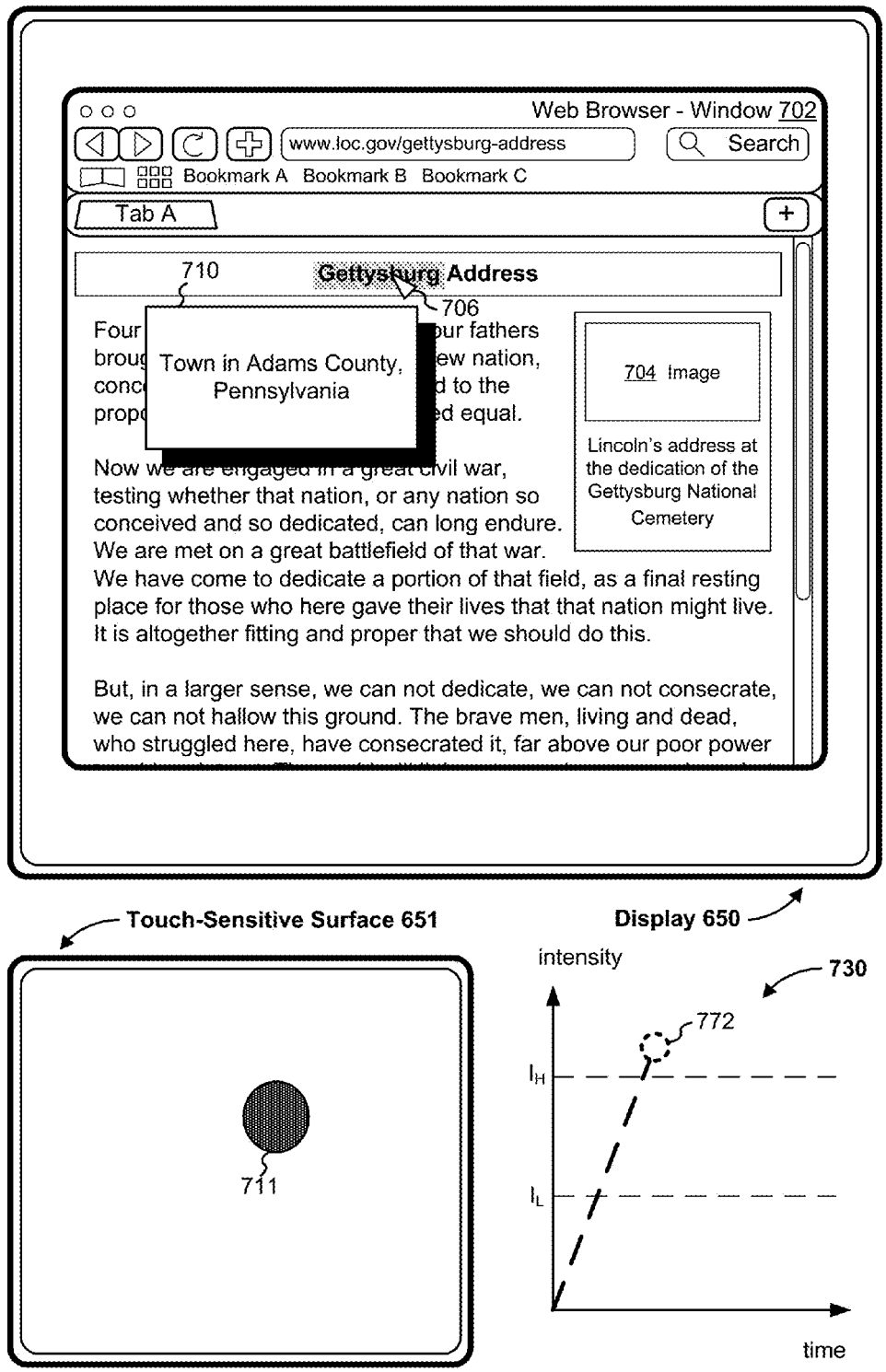

In FIG. 7S, intensity diagram 730 illustrates that the intensity applied by touch input 711 on touch-sensitive surface 651 continues to increase over time, and, in response to a change (e.g., an increase) to the intensity applied by touch input 711 on touch-sensitive surface 651, the device generates force changed event 772. In some embodiments, because popup view 710 is locked when the intensity applied by touch input 711 on touch-sensitive surface 651 reaches the high intensity threshold $I_H$, the size of the popup view 710 does not increase further with the subsequent increase in the intensity applied by touch input 711, as shown in FIG. 7S. This is an example of an application receiving a force changed event, but making no change to the user interface corresponding to the application, or at least not change that correspond to the change in intensity of the touch input. More generally stated, in some circumstances, an application receiving a force changed event makes no corresponding change to the user interface corresponding to that application. On the other hand, optionally, an internal state of the application is updated in response to the force changed event, for example, by updating an internal state value that indicates a last reported intensity of the touch input, as reported by the last received force changed event.

Figure 7T:
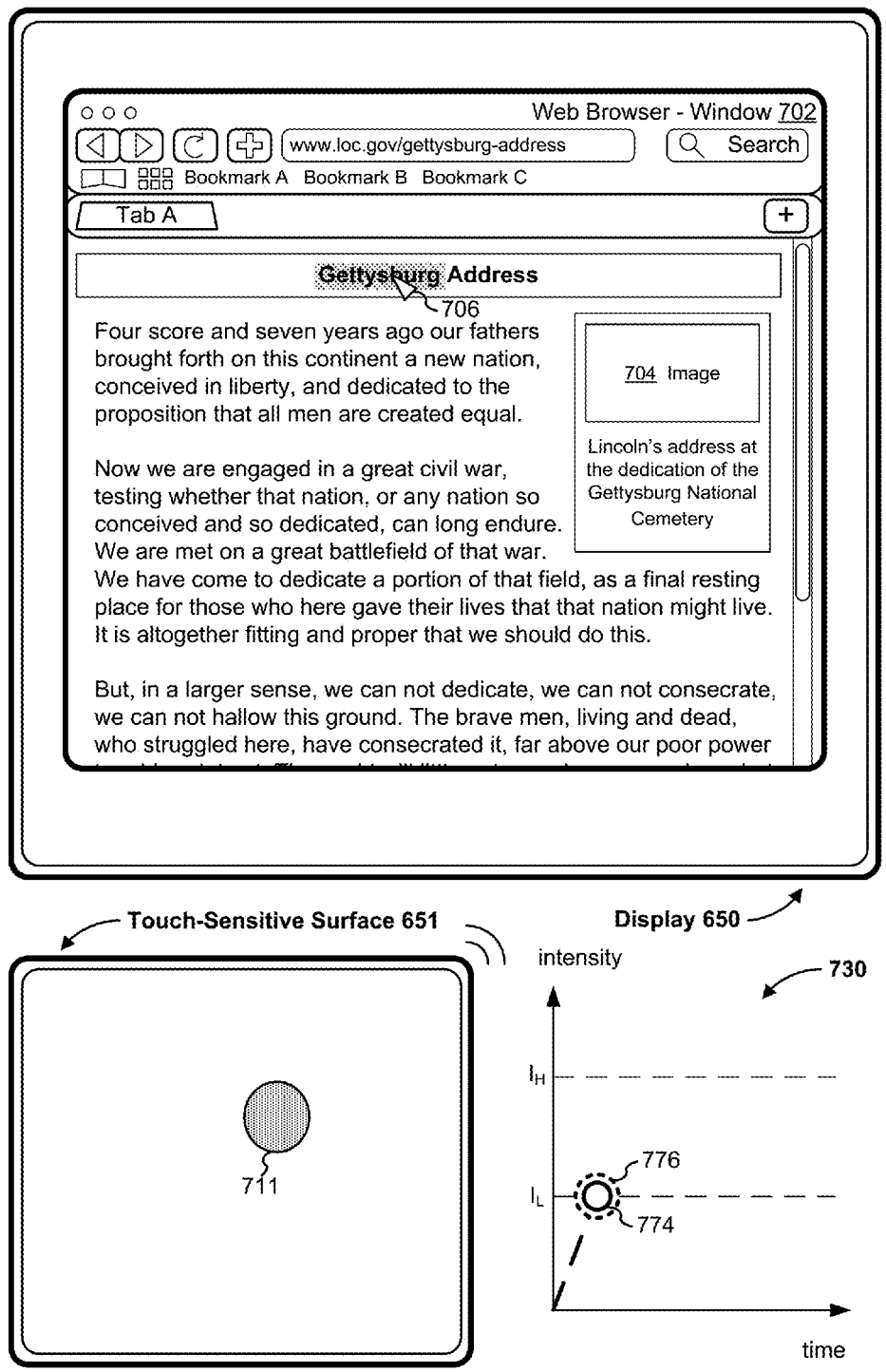
Figure 7U:
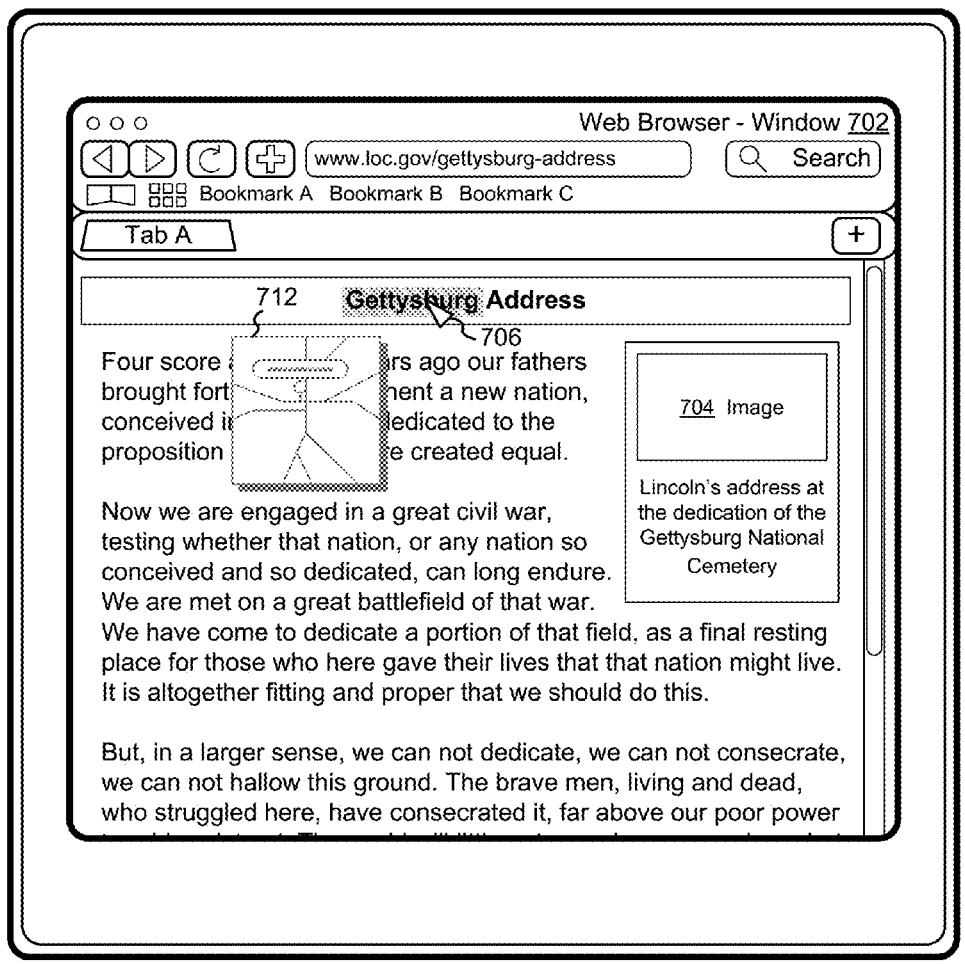
Figure 7U:
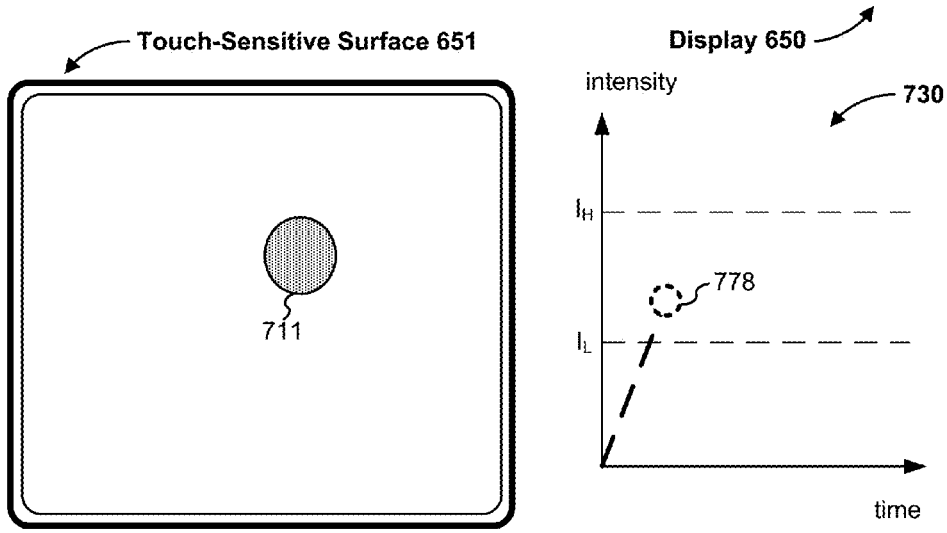
Figure 7V:
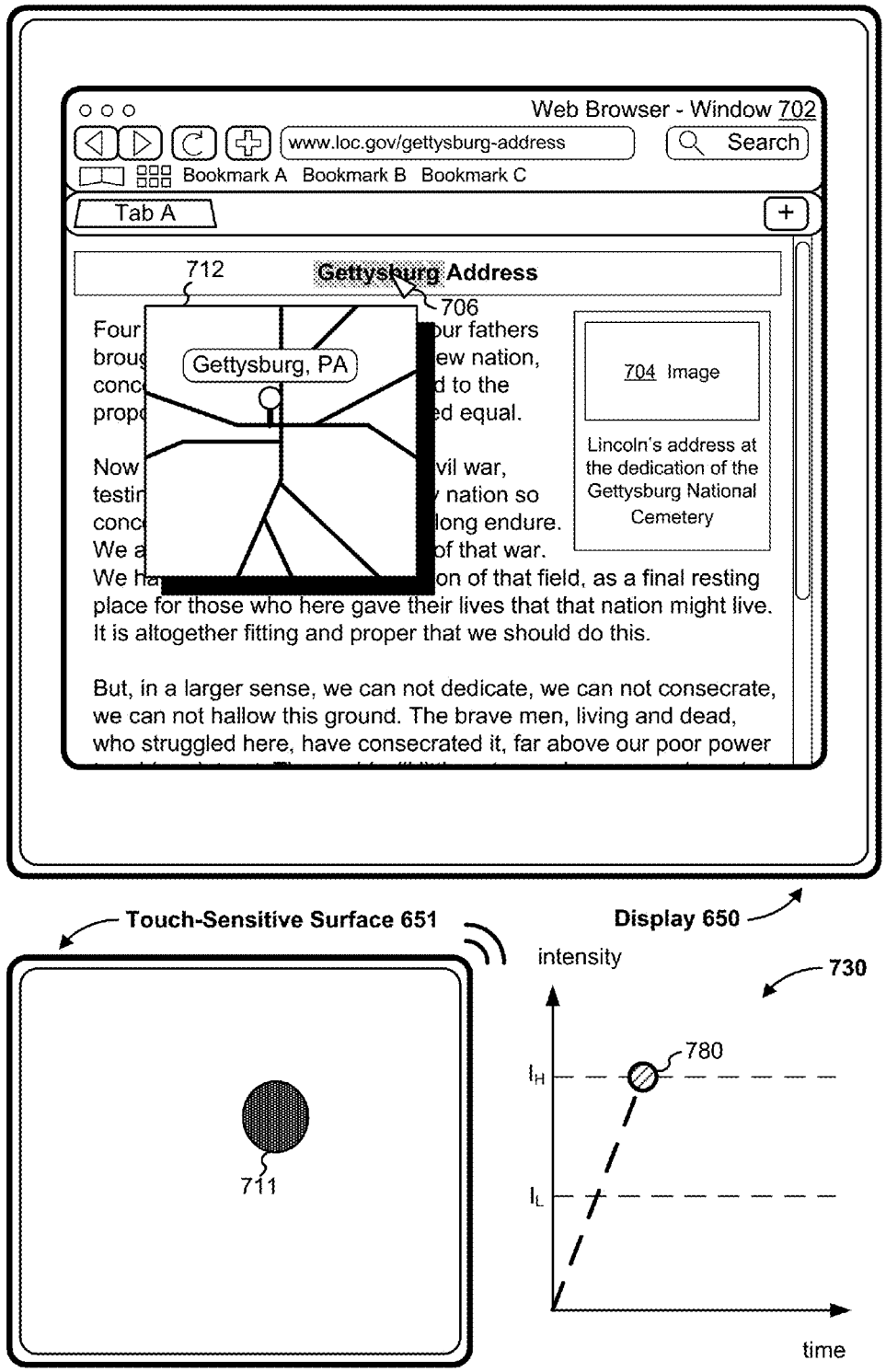

FIGS. 7T-7V illustrate operations associated with touch input 711 in accordance with some other embodiments.

In FIG. 7T, intensity diagram 730 illustrates that the intensity applied by touch input 711 on touch-sensitive surface 651 reaches the low intensity threshold $I_L$ (or the intensity applied by touch input 711 has changed from below the low intensity threshold $I_L$ to above the low intensity threshold $I_L$). Intensity diagram 730 in FIG. 7T also illustrates that the device generates mouse down event 774 and optionally, will begin event 776, in response to the intensity applied by touch input 711 on touch-sensitive surface 651 reaching the low intensity threshold $I_L$ (or the intensity applied by touch input 711 changing from below the low intensity threshold $I_L$ to above the low intensity threshold $I_L$).

FIG. 7T also illustrates that, in response to the intensity applied by touch input 711 on touch-sensitive surface 651 reaching the low intensity threshold $I_L$ (or the intensity applied by touch input 711 changing from below the low intensity threshold $I_L$ to above the low intensity threshold $I_L$), the device generates a tactile output of the first type (e.g., using tactile output generator(s) 357 in FIG. 3). A tactile output of the first type provides feedback to the user indicating that the intensity of the contact has increased to (or risen above) the low intensity threshold $I_L$. In the example illustrated in FIG. 7T, a mouse down event is generated in temporal proximity to (e.g., immediately before, during, or immediately after) generation of the tactile output of the first type. As such, the tactile output in FIG. 7T provides feedback to the user that a mouse down event associated with the change in intensity of the contact has been (or will be) generated.

Intensity diagram 730 in FIG. 7U illustrates that the intensity applied by touch input 711 on touch-sensitive surface 651 continues to increase over time, and, in response to a change (e.g., an increase) to the intensity applied by touch input 711 on touch-sensitive surface 651, the device generates force changed event 778. FIG. 7U also illustrates that popup view 712, instead of popup view 710 (FIG. 7Q) is displayed in response to the intensity applied by touch input 711 on touch-sensitive surface 651 increasing above the low intensity threshold $I_L$.

FIG. 7V illustrates, in intensity diagram 730, that the intensity applied by touch input 711 on touch-sensitive surface 651 has increased to reach the high intensity threshold $I_H$ (or the intensity applied by touch input 711 has changed from below the high intensity threshold $I_H$ to above the high intensity threshold $I_H$), and, in response to the intensity applied by touch input 711 on touch-sensitive surface 651 reaching the high intensity threshold $I_H$ (or the intensity applied by touch input 711 changing from below the high intensity threshold $I_H$ to above the high intensity threshold $I_H$), the device generates force down event 780.

FIG. 7V also illustrates that, in response to the intensity applied by touch input 711 on touch-sensitive surface 651 reaching the high intensity threshold $I_H$ (or the intensity applied by touch input 711 changing from below the high intensity threshold $I_H$ to above the high intensity threshold $I_H$), the device generates a tactile output of the second type (e.g., using tactile output generator(s) 357 in FIG. 3). A tactile output of the second type provides feedback to the user indicating that the intensity of the contact has increased to (or risen above) the high intensity threshold $I_H$. In the example illustrated in FIG. 7V, a force down event is generated in temporal proximity to (e.g., immediately before, during, or immediately after) generation of the tactile output of the second type. As such, the tactile output in FIG. 7V provides feedback to the user that a force down event associated with the change in intensity of the contact has been (or will be) generated.

In FIGS. 7U-7V, popup view 712 includes a map of a location that corresponds to the selected word or phrase (e.g., "Gettysburg"). In some embodiments, popup view 712 is configured in accordance with instructions in the web page (e.g., instructions, in the web page, for processing a force changed event to change a size of popup view 712 and instructions, in the web page, for processing a force down event to lock the size of popup view 712).

In some embodiments, both the web browser and the web page include instructions for processing a force event of a same type (e.g., a force changed event, a force down event, or a force up event). In some embodiments, the device forgoes processing a force event in accordance with instructions in the web browser for processing the force event and processes the force event in accordance with instructions in the web page for processing the force event. More specifically, in some embodiments, the device disables execution of a set of instructions included in the web browser (e.g., the aforementioned instructions for processing one or more particular types of force event) in response to the will begin event. For example, in response to the will begin event, instructions in the web page that disable default processing of the one or more particular types of force events are executed. In some embodiments, disabling the default processing of the one or more particular types of force events is accomplished by executing a predefined method or function call provided by the web browser, which is invoked by instructions in the web page in response to the will begin event.

In some embodiments, instructions in the web page that correspond to certain force events (e.g., a force changed event, a force down event, and/or a force up event) are processed only if default processing of such force events is disabled, because if default processing of such force events is not disabled, such force events can be handled by the default operations (e.g., based on instructions for default operations in the web browser).

Figure 7W:
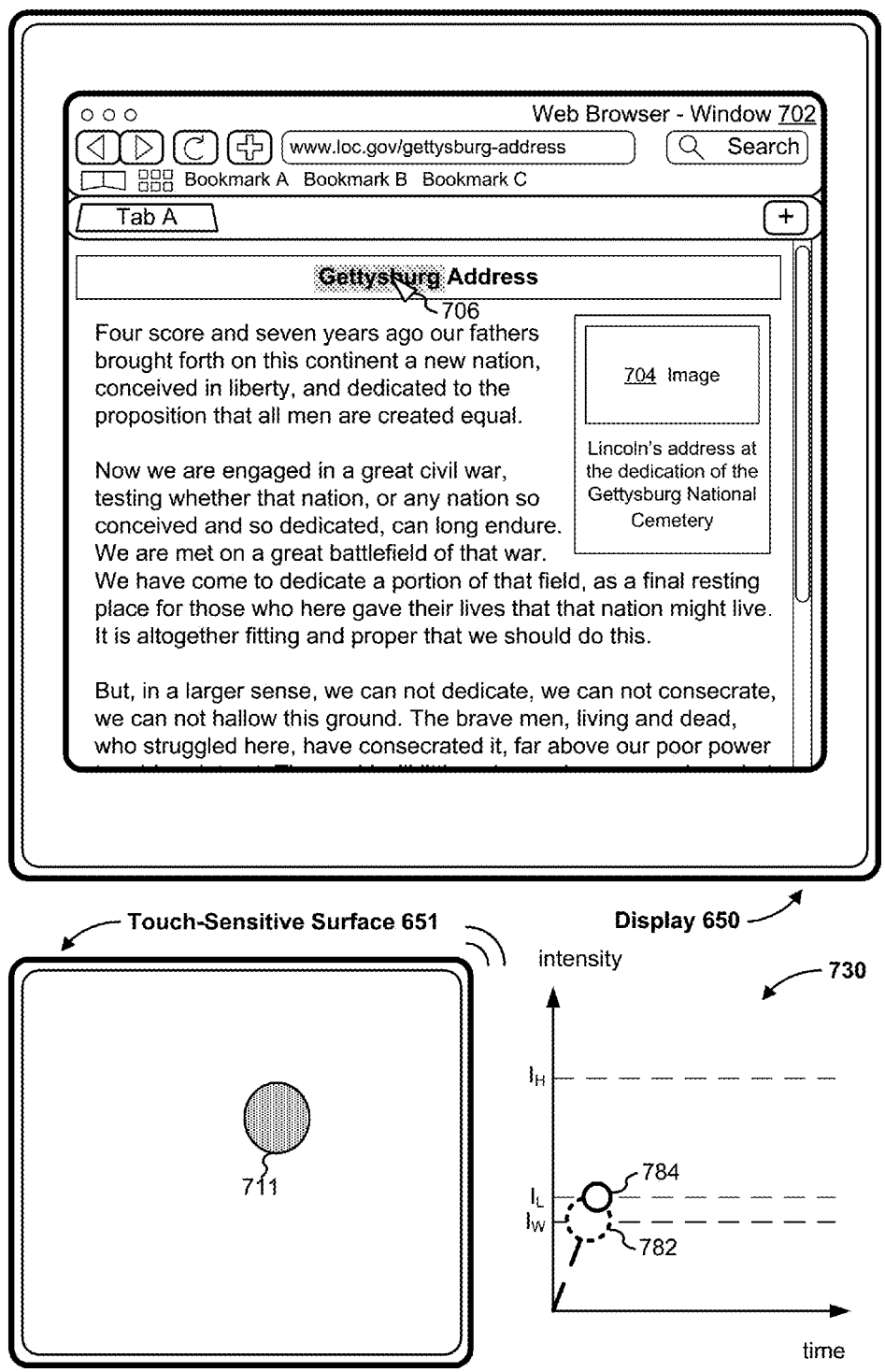

FIG. 7W illustrates that an intensity threshold (e.g., the low intensity threshold $I_L$) for generating a mouse down event 784 is distinct from an intensity threshold (e.g., a will begin intensity threshold $I_W$) for generating a will begin event 782. This allows the device to generate, for a touch input with an increasing intensity, a will begin event 782 before generating a mouse down event 784, thereby providing additional time to disable (default) operations, for processing one or more force events, defined by instructions in the web browser.

FIG. 7W also illustrates that, in response to the intensity applied by touch input 711 on touch-sensitive surface 651 reaching the low intensity threshold $I_L$ (or the intensity applied by touch input 711 changing from below the low intensity threshold $I_L$ to above the low intensity threshold $I_L$), the device generates a tactile output of the first type (e.g., using tactile output generator(s) 357 in FIG. 3). A tactile output of the first type provides feedback to the user indicating that the intensity of the contact has increased to (or risen above) the low intensity threshold $I_L$. In the example illustrated in FIG. 7T, a mouse down event is generated in temporal proximity to (e.g., immediately before, during, or immediately after) generation of the tactile output of the first type. As such, the tactile output in FIG. 7T provides feedback to the user that a mouse down event associated with the change in intensity of the contact has been (or will be) generated.

Figure 7X:
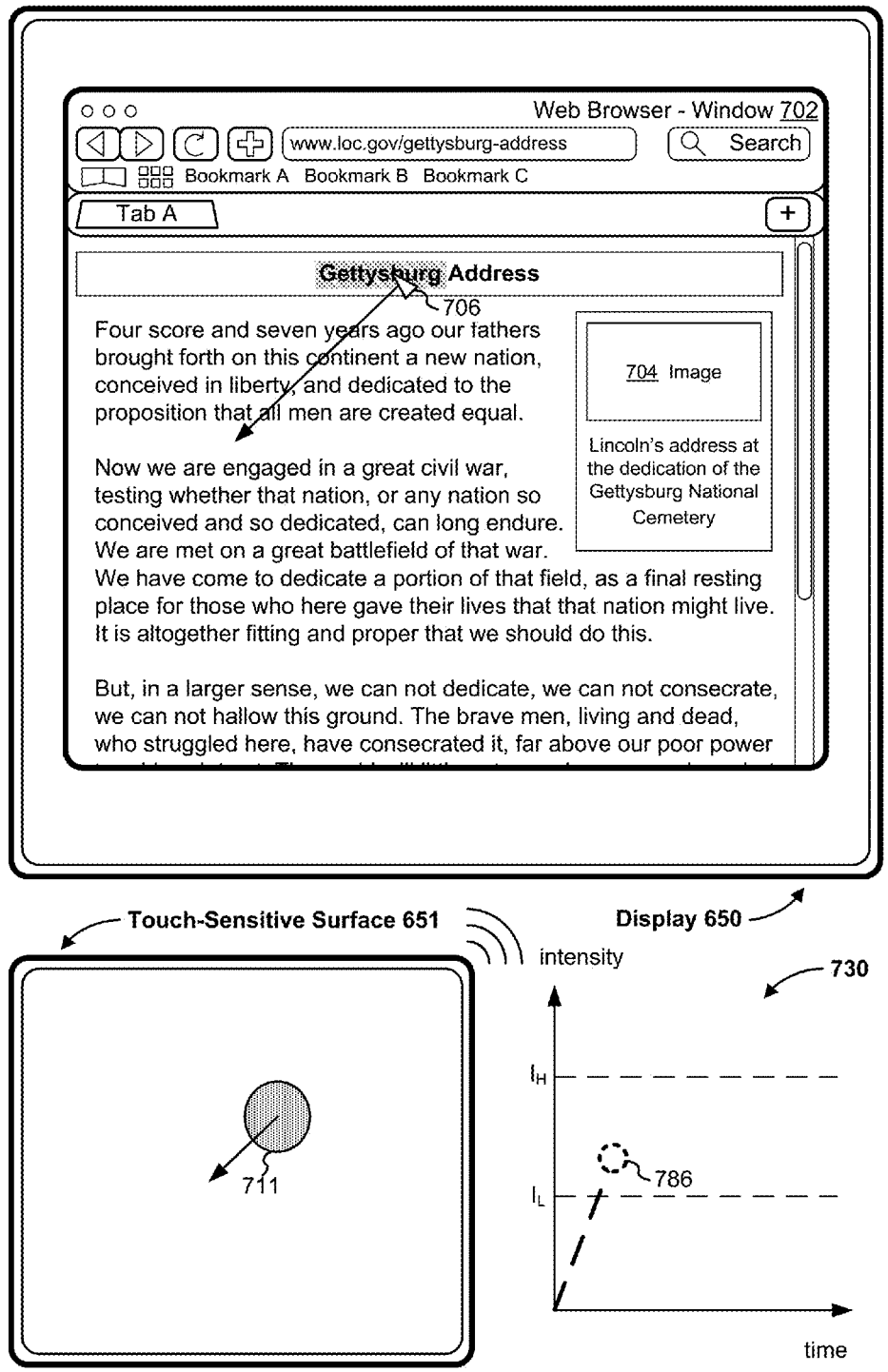
Figure 7Y:
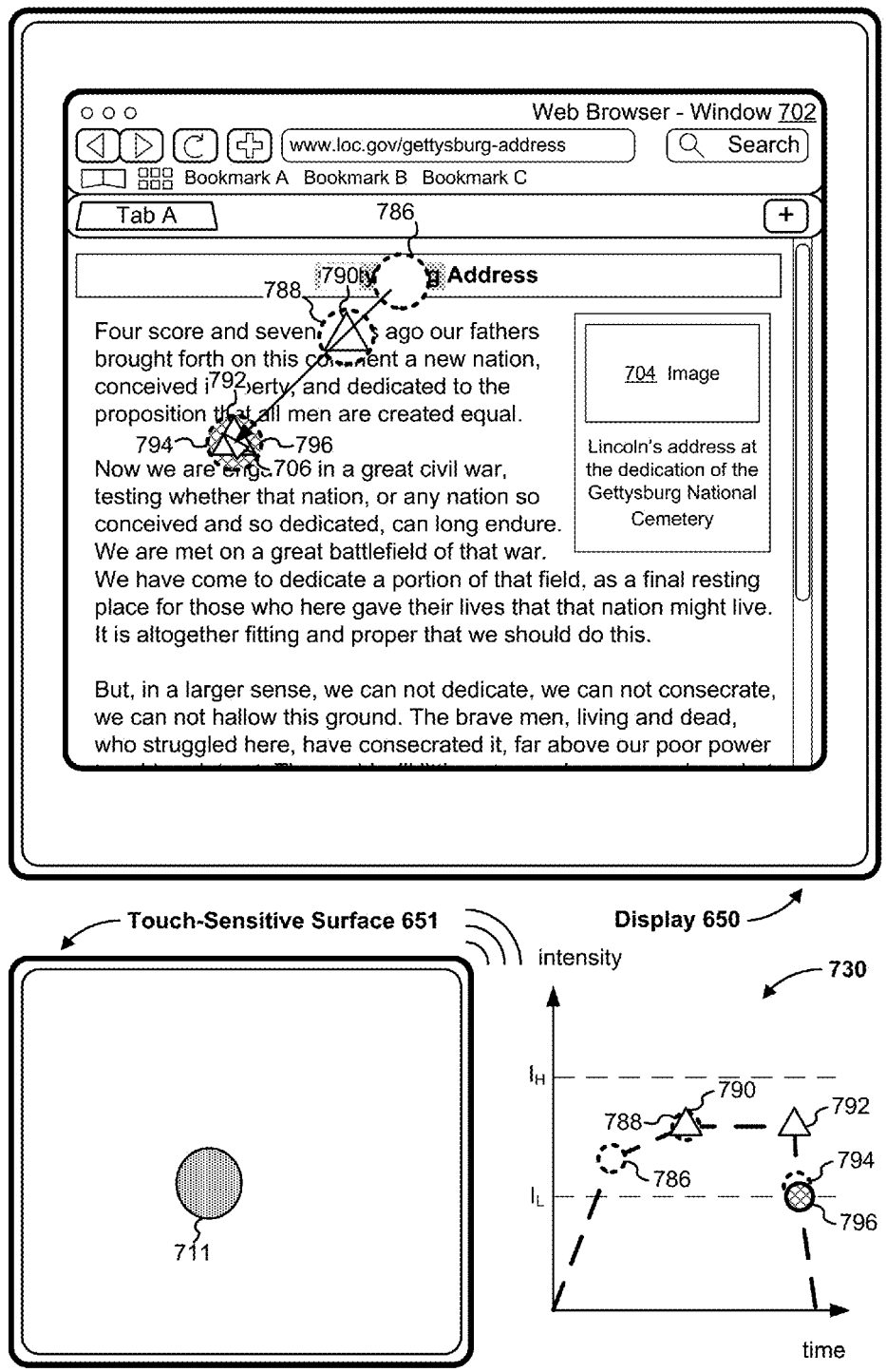

FIGS. 7X-7Y illustrate that touch input 711 on touch-sensitive surface 651 moves across touch-sensitive surface 651 and focus selector 706 moves across display 650 in accordance with a movement of touch input 711 across touch-sensitive surface 651.

FIG. 7X shows user interface 702 before touch input 711 moves across touch-sensitive surface 651. FIG. 7Y shows that touch input 711 has moved across touch-sensitive surface 651 and force events that correspond to respective locations on user interface 702 are generated.

Intensity diagram 730 in FIGS. 7X-7Y illustrate that the intensity applied by touch input 711 on touch-sensitive surface 651 initially increases without moving touch input 711 across touch-sensitive surface 651. In response, the device generates force changed event 786 without generating a mouse moved event.

An overlap of force changed event 788 and mouse moved event 790 indicates movement of touch input 711 across touch-sensitive surface 651 while changing (e.g., increasing) the intensity applied by touch input 711 on touch-sensitive surface 651.

Mouse moved event 792 in FIGS. 7X-7Y (without an associated force changed event) indicates movement of touch input 711 across touch-sensitive surface 651 without changing the intensity applied by touch input 711 on touch-sensitive surface 651.

Force changed event 794 (without an associated mouse moved event) in FIGS. 7X-7Y indicates a change (e.g., decrease) to the intensity applied by touch input 711 on touch-sensitive surface 651 without movement of touch input 711 across touch-sensitive surface 651.

Mouse up event 796 in FIGS. 7X-7Y indicates that the intensity applied by touch input 711 on touch-sensitive surface 651 has reached the low intensity threshold $I_L$ (or the intensity applied by touch input 711 on touch-sensitive surface 651 has changed from above the low intensity threshold $I_L$ to below the low intensity threshold $I_L$).

Thus, by using a mouse event and a separate force event, locations changes of a touch input and intensity changes to the touch input can be tracked independently. This simplifies processing changes to touch inputs, thereby improving the efficiency of the device. In addition, this reduces potential errors in processing instructions in certain web pages (e.g., legacy web pages) that are not configured to handle force events. For example, if the device generates a mouse moved event in response to a change to the intensity applied by a touch input on touch-sensitive surface 651 and if the web page includes instructions to divide a certain number with a travel distance associated with the touch input, a change to the intensity applied by a touch input on touch-sensitive surface 651 without a movement of the touch input across touch-sensitive surface 651 (e.g., zero travel distance) would potentially generate a "division by zero" error. By separating mouse events and force events, a change to the intensity applied by a touch input on touch-sensitive surface 651 without a movement of the touch input across touch-sensitive surface 651 would generate a force event (e.g., a force changed event) without a mouse moved event, and the "division by zero" error can be avoided.

Figure 7Z:
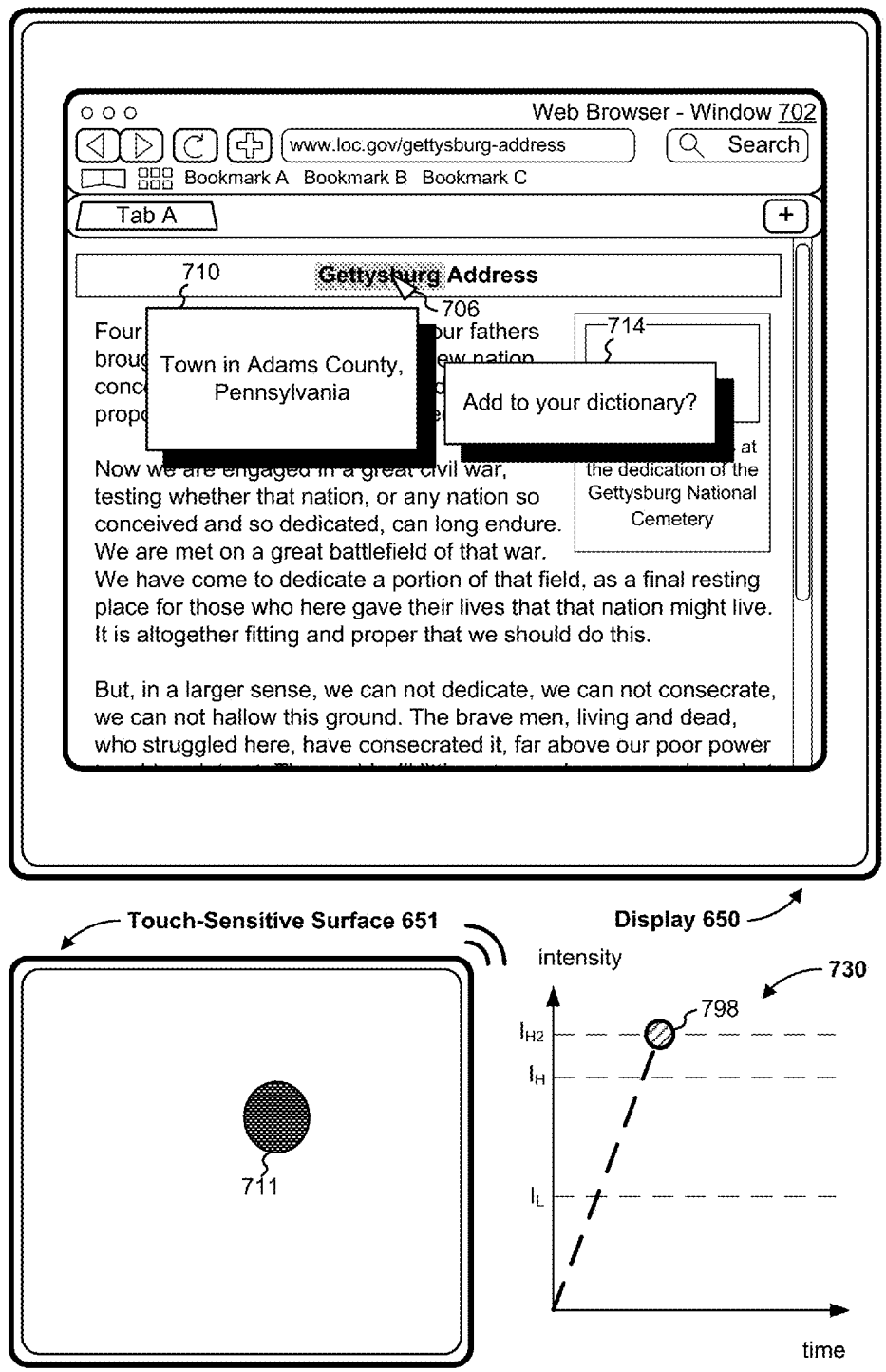
Figure 7A:
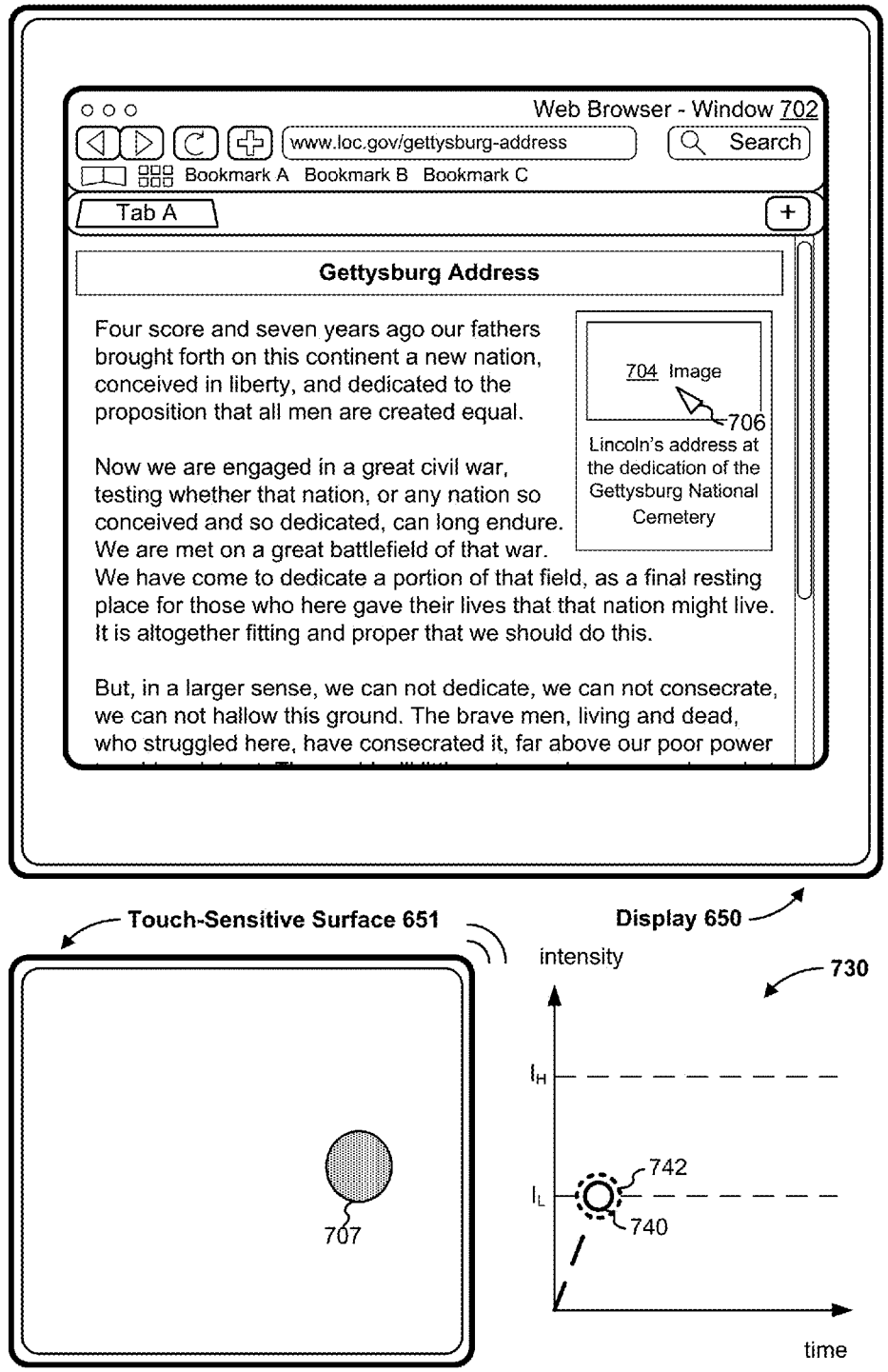
Figure 7B:
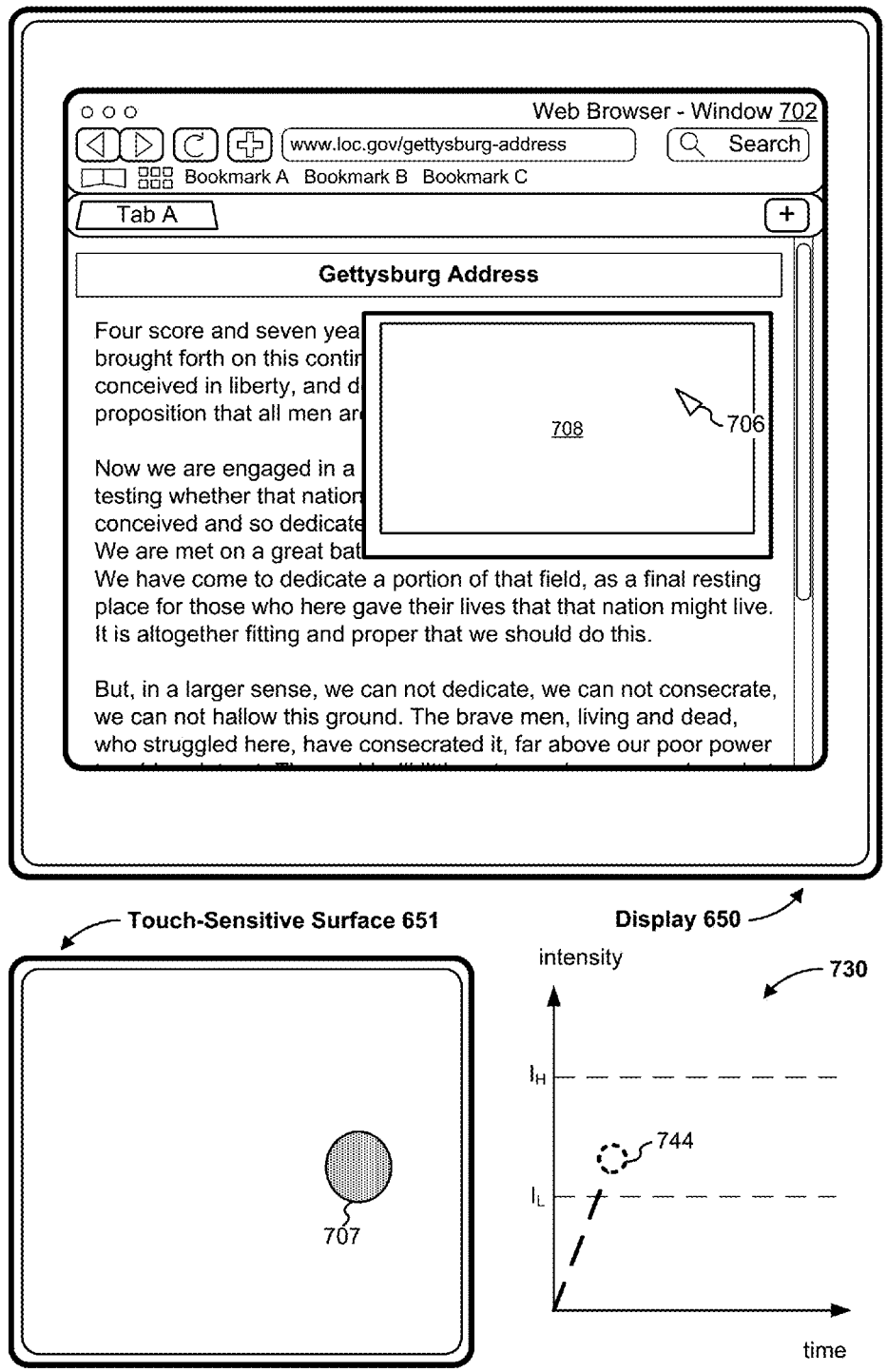
Figure 7C:
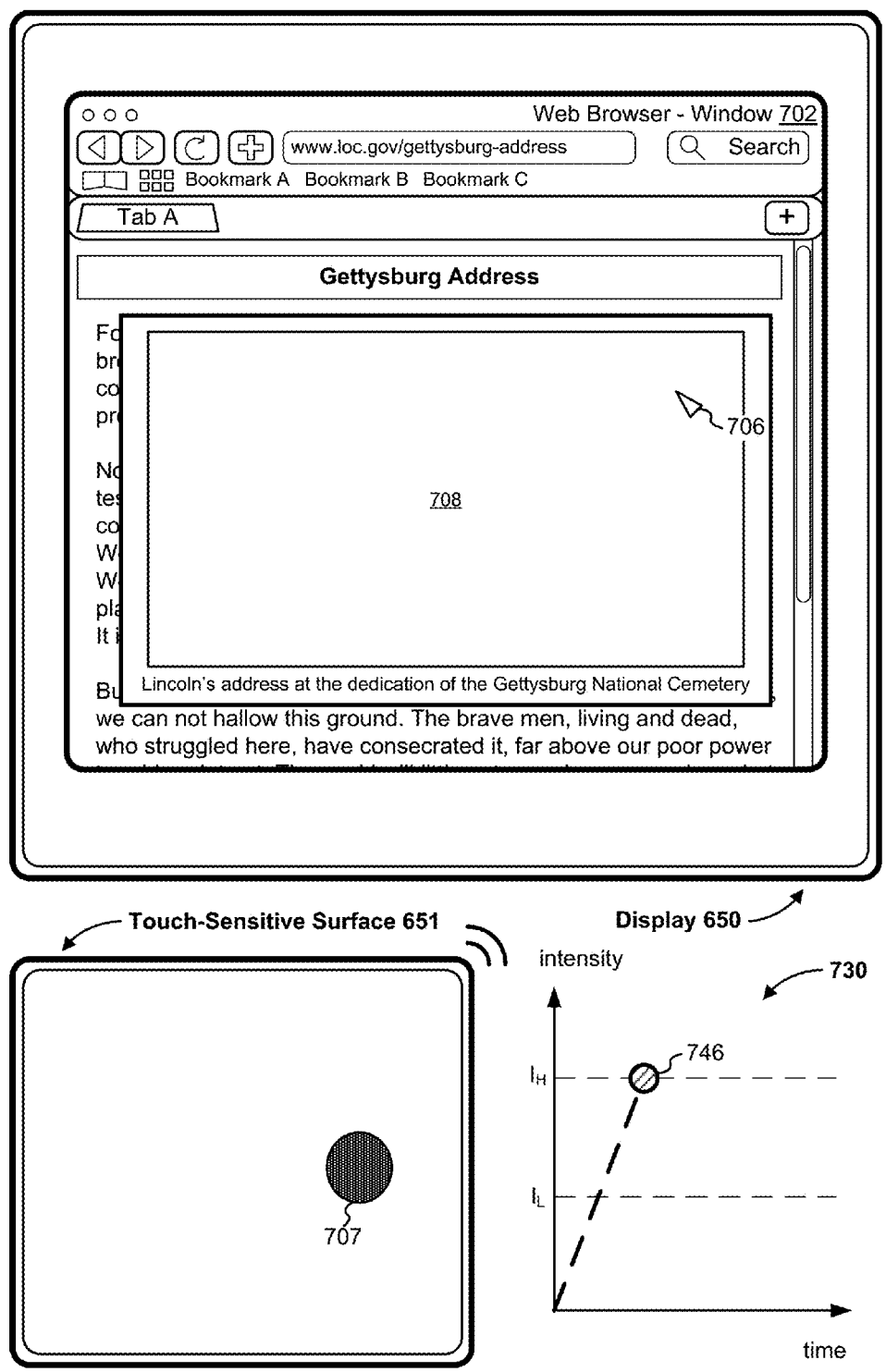
Figure 7D:
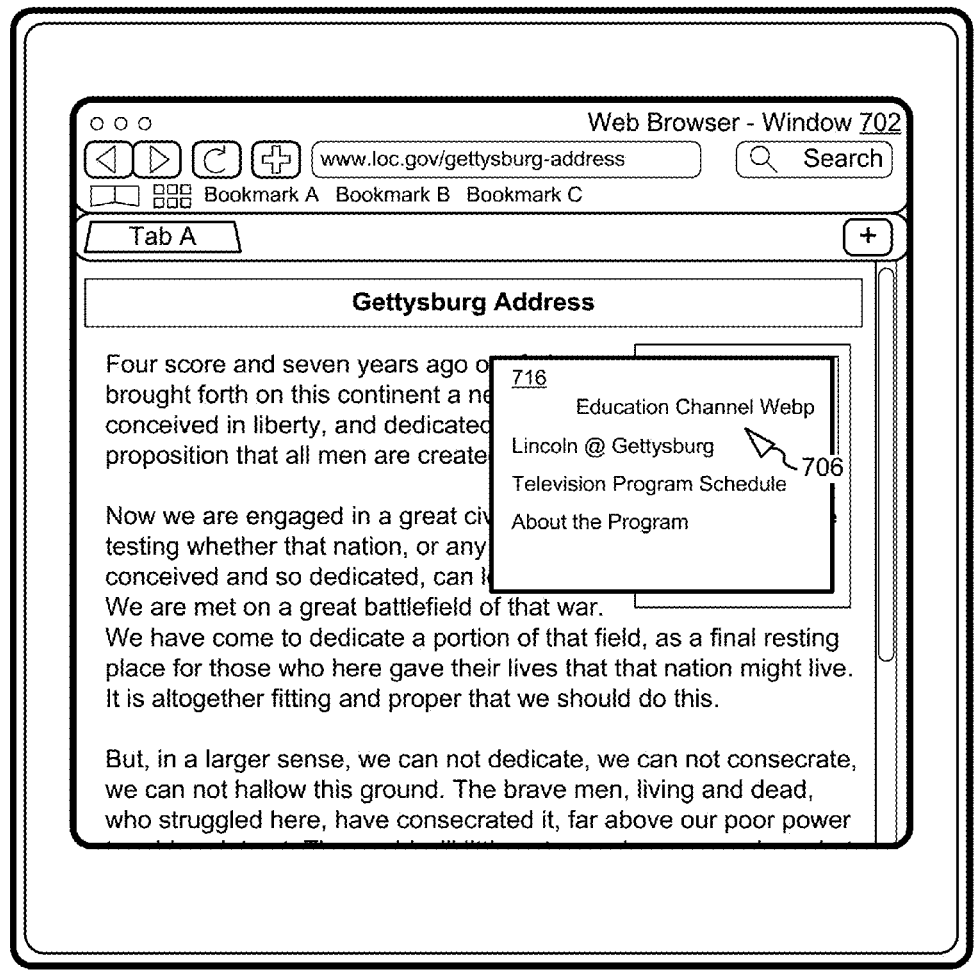
Figure 7D:
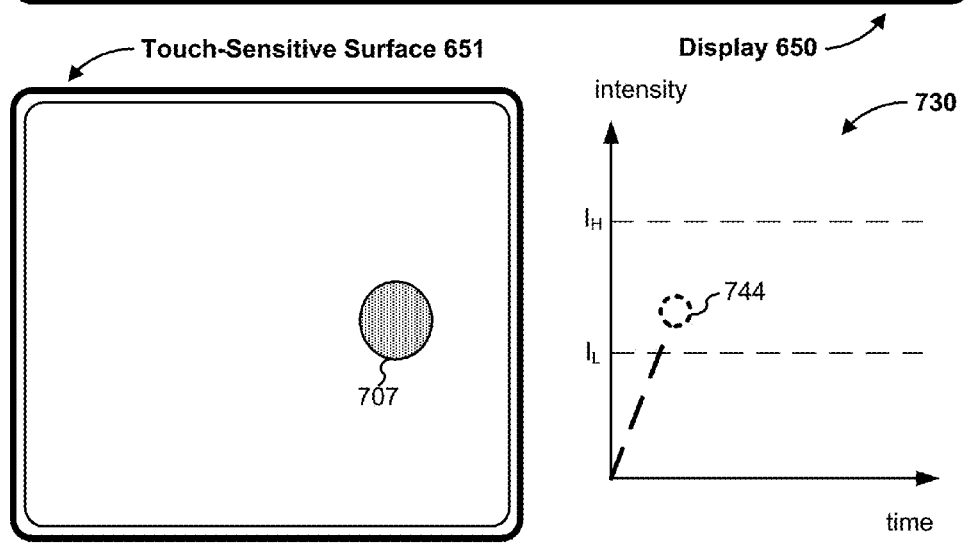
Figure 7E:
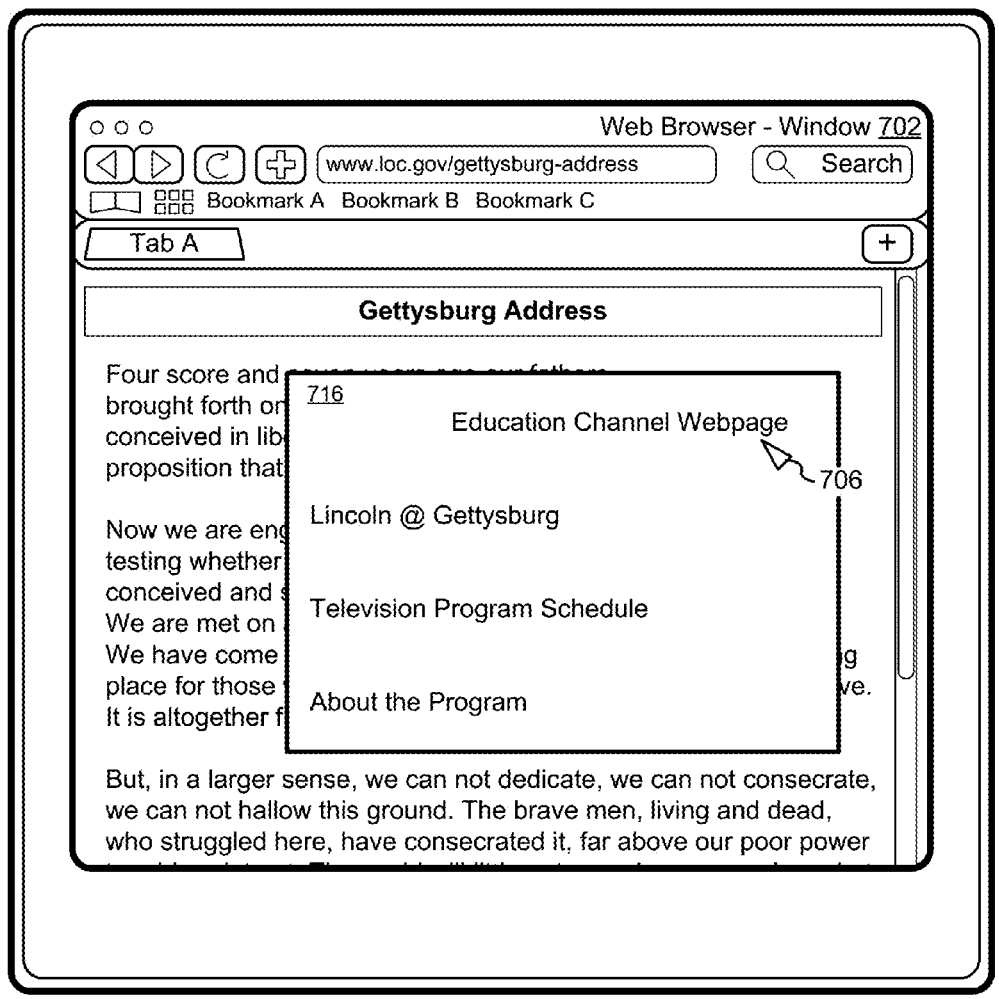
Figure 7E:
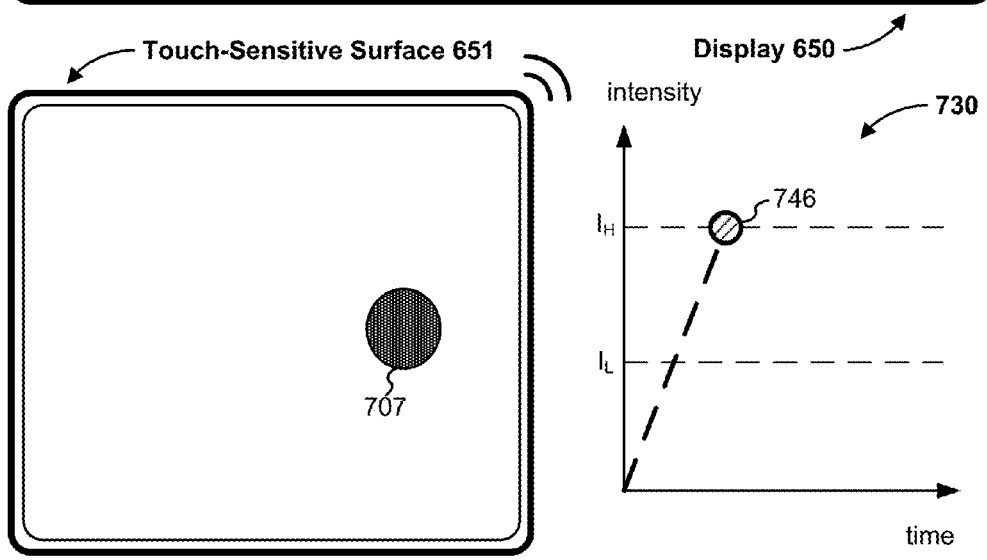
Figure 7F:
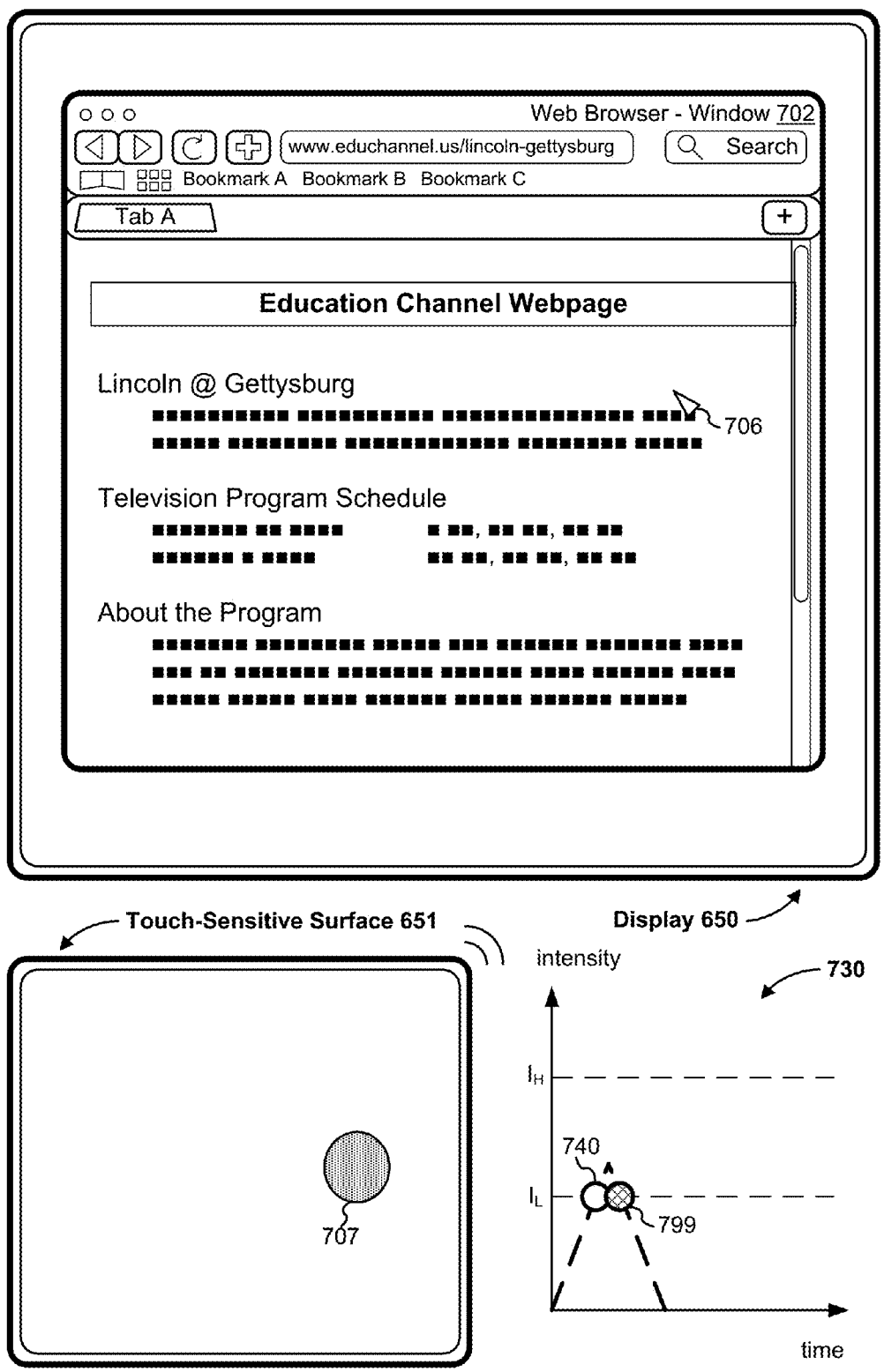

FIG. 7Z illustrates that, in some embodiments, multiple high intensity thresholds are used. In FIG. 7Z, intensity diagram 730 illustrates that the intensity applied by touch input 711 on touch-sensitive surface 651 reaches a second high intensity threshold $I_{H2}$ (or the intensity applied by touch input 711 has changed from below the second high intensity threshold $I_{H2}$ to above the second high intensity threshold $I_{H2}$). Intensity diagram 730 in FIG. 7Z also illustrates that the device generates another force down event 798. Thus, multiple force down events can be generated for a single touch input at different intensity thresholds (e.g., a first force down event at the (first) high intensity threshold $I_H$ and a second force down event at the second high intensity threshold $I_{H2}$). Similarly, multiple force up events can be generated for a single touch input at different intensity thresholds (e.g., a first force up event at the second high intensity threshold $I_{H2}$ and a second force up event at the (first) high intensity threshold $I_H$). Although FIG. 7Z illustrates two high intensity thresholds $I_H$ and $I_{H2}$, more than two high intensity thresholds are used in some embodiments.

FIG. 7Z also illustrates that, in response to detecting that the intensity applied by touch input 711 on touch-sensitive surface 651 has reached the second high intensity threshold $I_{H2}$ (or the intensity applied by touch input 711 changing from below the second high intensity threshold $I_{H2}$ to above the second high intensity threshold $I_{H2}$), user interface 702 is updated (e.g., user interface object 714 is displayed).

FIGS. 7AA-7FF illustrate generation of certain force events and corresponding changes to the user interface in accordance with some embodiments.

In FIG. 7AA (which corresponds to FIG. 7B), the user interface includes display of a portion of a web page (e.g., web page 185, FIG. 3) that includes image 704, and touch input 707 (e.g., a finger or stylus contact) is detected on touch-sensitive surface 651 at a location that corresponds to image 704 of the web page (e.g., focus selector 706, such as a cursor, is on image 704 of the web page). Intensity diagram 730 in FIG. 7AA indicates that the intensity applied by touch input 707 on touch-sensitive surface 651 reaches the low intensity threshold $I_L$ (or the intensity applied by touch input 707 has changed from below the low intensity threshold $I_L$ to above the low intensity threshold $I_L$), and the device generates mouse down event 740 and, optionally "will begin" event 742, in response to the intensity applied by touch input 707 on touch-sensitive surface 651 reaching the low intensity threshold $I_L$ (or the intensity applied by touch input 707 changing from below the low intensity threshold $I_L$ to above the low intensity threshold $I_L$).

FIGS. 7BB-7CC illustrate operations when image 704 is not associated with a link to additional content (e.g., no hyperlink is associated with image 704) in accordance with some embodiments.

FIG. 7BB illustrates that the intensity applied by touch input 707 on touch-sensitive surface 651 continues to increase, and the device generates force changed event 744. The device displays display region 708 that includes image 704, and enlarges display region 708 (e.g., along with image 704 in display region 708) as the intensity applied by touch input 707 increases. In some embodiments, a smoothing function is applied (e.g., by the browser application that controls the generation of user interface 702 so that the size of display region 708 and the size of image 704 smoothly transition with increases and decreases in the intensity applied by touch input 707.

FIG. 7CC illustrates that the intensity applied by touch input 707 on touch-sensitive surface 651 reaches the high intensity threshold $I_H$ (or the intensity applied by touch input has 707 has changed from below the high intensity threshold $I_H$ to above the high intensity threshold $I_H$), and the device displays the enlarged version of image 704 (e.g., in enlarged display region 708). In FIG. 7CC, the enlarged version of image 704 is displayed with at least a portion of the web page.

FIGS. 7DD-7FF illustrate operations when image 704 is associated with a link to additional content (e.g., a hyperlink to another web page is associated with image 704) in accordance with some embodiments.

FIG. 7DD illustrates that the intensity applied by touch input 707 on touch-sensitive surface 651 continues to increase, and the device generates force changed event 744. In response, the device displays display region 716 that includes a preview of the linked content (e.g., a preview of another web page), and enlarges display region 716 (e.g., along with the preview in display region 716) as the intensity applied by touch input 707 increases. In some embodiments, a smoothing function is applied (e.g., by the browser application that controls the generation of user interface 702) so that the size of display region 716 (and the preview of the linked content) smoothly transition with increases and decreases in the intensity applied by touch input 707.

FIG. 7EE illustrates that the intensity applied by touch input 707 on touch-sensitive surface 651 reaches the high intensity threshold $I_H$ (or the intensity applied by touch input has 707 has changed from below the high intensity threshold $I_H$ to above the high intensity threshold $I_H$), and the device displays the preview of the linked content (e.g., in enlarged display region 716). In FIG. 7EE, the preview of the linked content is displayed with at least a portion of the web page.

FIG. 7FF illustrates that the intensity applied by touch input 707 on touch-sensitive surface 651 has changed from below the low intensity threshold $I_L$ to above the low intensity threshold $I_L$ (causing the device to generate mouse down event 740), followed by the intensity applied by touch input 707 on touch-sensitive surfaced 651 falling below the low intensity threshold $I_L$ (causing the device to generate mouse up event 799). Thus, the intensity applied by touch input 707 on touch-sensitive surface 651 does not reach the high intensity threshold $I_H$. In response to the sequence of mouse down event 740 and mouse up event 799, as shown in FIG. 7FF, the device displays the linked content (e.g., another web page) without showing the web page illustrated in FIG. 7AA. In some embodiments, the device (e.g., a browser application executed by the device) interprets the mouse down event and mouse up event sequence as a "click" that selects the link associated with image 704 (see FIG. 7AA and discussion), thereby causing the device (i.e., browser application) to display the linked content corresponding to the selected link.

Although FIGS. 7A-7FF illustrate generation of certain force events (e.g., a force down event, a force changed event, a force up event, and a force cancel event), other force events can be used in conjunction with at least a subset of the illustrated force events. For example, in some embodiments, the device generates a force cancel event (also called herein a force cancelled event) in response to determining that, subsequent to generating a will begin event, a touch input ceases to be detected on the touch-sensitive surface without (or, prior to) generating a force down event (e.g., detecting a release of a touch input that has satisfied the first intensity threshold but has not satisfied the second intensity threshold initiates generating a force cancel event).

FIGS. 8A-8C illustrate a flow diagram of method 800 of processing touch inputs with instructions in a web page in accordance with some embodiments. Method 800 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, method 800 provides an enhanced way to process touch inputs with instructions in a web page. Method 800 improves efficiency in processing touch inputs with instructions in a web page. In addition, method 800 improves compatibility in processing touch inputs with instructions in legacy web pages.

While displaying a user interface that corresponds to at least a portion of a web page on the display, the device detects (802) a touch input on the touch-sensitive surface at a first location that corresponds to the displayed portion of the web page on the display. For example, as shown in FIG. 7A, touch input 707 is detected on touch-sensitive surface 651. The location of touch input 707 detected on touch-sensitive surface 651 corresponds to the location of focus selector 706 in web browser window 702 (e.g., a user interface of a web browser application).

In some embodiments, while detecting the touch input on the touch-sensitive surface, the device receives (804) an input that corresponds to a request to generate a mouse down event (e.g., clicking on a mouse button, providing a touch input on the touch-sensitive surface with sufficient intensity, etc.), and in response to receiving the input that corresponds to a request to generate a mouse down event, generates the mouse down event. For example, in FIG. 7B, touch input 707 is detected on touch-sensitive surface 651, with intensity applied by touch input 707 reaching the intensity threshold $I_L$ (or the intensity applied by touch input 707 changing from below the intensity threshold $I_L$ to above the intensity threshold $I_L$), and, in response, mouse down event 740 is generated. In some embodiments, the input that corresponds to a request to generate a mouse down event is independent of whether the intensity of the touch input on the touch-sensitive surface has changed from below a first intensity threshold (e.g., a force down intensity threshold, such as $I_H$ in FIG. 7B) to above the first intensity threshold. In some embodiments, the input that corresponds to a request to generate a mouse down event is based on the intensity of the touch input on the touch-sensitive surface changing from below a second intensity threshold, distinct from the first intensity threshold, to above the second intensity threshold.

In some embodiments, while detecting the touch input on the touch-sensitive surface (and, in some embodiments, prior to detecting the intensity of the touch input that has changed from below the first intensity threshold to above the first intensity threshold), the device detects (806) an intensity of the touch input on the touch-sensitive surface (e.g., with the one or more sensors configured to detect intensity of contacts on the touch-sensitive surface), and determines whether the intensity of the touch input on the touch-sensitive surface has changed from below a second intensity threshold that is distinct from the first intensity threshold to above the second intensity threshold. In response to determining that the intensity of the touch input on the touch-sensitive surface has changed from below the second intensity threshold to above the second intensity threshold, the device generates a mouse down event. For example, in FIG. 7B, touch input 707 is detected on touch-sensitive surface 651, with intensity applied by touch input 707 changing from below the intensity threshold $I_L$ to above the intensity threshold $I_L$ (or the intensity applied by touch input 707 reaching the intensity threshold $I_L$), and, in response, mouse down event 740 is generated. In some embodiments, after generating the mouse down event, the device provides the mouse down event to the web page. In some embodiments, after generating the mouse down event, the device processes instructions in the web page that correspond to a mouse down event.

In some embodiments, the second intensity threshold is higher than a detection intensity threshold. In some embodiments, the device processes instructions in the web page (e.g., instructions that correspond to a mouse moved event), distinct and separate from instructions in the web page that correspond to a mouse down event and instructions in the web page that correspond to a force down event, at least in response to determining that the intensity of the touch input on the touch-sensitive surface satisfies the detection intensity threshold (e.g., a mouse moved event generated in response to a movement of the touch input across the touch-sensitive surface while the intensity applied by the touch input satisfies the detection intensity threshold).

The device detects (808) an intensity of the touch input on the touch-sensitive surface (e.g., with the one or more sensors). In some embodiments, the intensity of the touch input on the touch-sensitive surface is detected subsequent to generating a mouse down event (e.g., operations 804 and/or 808). The device determines (810) whether the intensity of the touch input on the touch-sensitive surface has changed from below a first intensity threshold to above the first intensity threshold. In some embodiments, the first intensity threshold is higher than the second intensity threshold. In response to determining that the intensity of the touch input on the touch-sensitive surface has changed from below the first intensity threshold to above the first intensity threshold, the device generates (812) a force down event that is distinct from a mouse down event. For example, FIG. 7D illustrates the intensity of touch input 707 increasing to reach intensity threshold $I_H$ (e.g., the first intensity threshold). FIG. 7D also illustrates generation of a force down event (e.g., force down event 746) in response to determining that the intensity of touch input 707 on touch-sensitive surface 651 has reached the intensity threshold $I_H$ (or the intensity has changed from below intensity threshold $I_H$ to above intensity threshold $I_H$).

In some embodiments, while detecting the touch input on the touch-sensitive surface, and in response to determining that the intensity of the touch input on the touch-sensitive surface has changed from below the first intensity threshold to above the first intensity threshold, the device processes (814, FIG. 8B) instructions in the web page that correspond to the force down event. For example, FIG. 7R illustrates, in response to determining that the intensity of touch input 711 on touch-sensitive surface 651 has changed from below intensity threshold $I_H$ (e.g., the first intensity threshold) to above intensity threshold $I_H$ (e.g., the first intensity threshold), displaying (or locking display of) pop-up view 710 in accordance with instructions in the web page.

In some embodiments, while detecting the touch input on the touch-sensitive surface, and subsequent to determining that the intensity of the touch input on the touch-sensitive surface has changed from below the first intensity threshold to above the first intensity threshold, the device determines whether the intensity of the touch input on the touch-sensitive surface has changed from above a third intensity threshold (e.g., a release threshold) to below the third intensity threshold. In response to determining that the intensity of the touch input on the touch-sensitive surface has changed from above the third intensity threshold to below the third intensity threshold, the device generates a force up event that is distinct from the force down event. For example, in FIG. 7G, in response to determining that the intensity of touch input 707 has changed from a third intensity threshold (e.g., $I_H$) to below the third intensity threshold, the device generates force up event 750. In some embodiments, the force up event is distinct from a force down event. In some embodiments, the force up event is distinct from a mouse down event. In some embodiments, the device processes instructions in the web page that correspond to the force up event in response to determining that the intensity of the touch input on the touch-sensitive surface has changed from above the third intensity threshold to below the third intensity threshold. In some embodiments, the instructions in the web page that correspond to the force up event are distinct and separate from the instructions in the web page that correspond to the force down event (and instructions in the web page that correspond to a mouse up event and/or instructions in the web page that correspond to a mouse down event).

In some embodiments, the third intensity threshold is identical to the first intensity threshold (e.g., in FIG. 7G, both the first intensity threshold and the third intensity threshold correspond to $I_H$). In some embodiments, the third intensity threshold is distinct from the first intensity threshold (e.g., the third intensity threshold is lower than the first intensity threshold). For example, as shown in FIG. 7L, the third intensity (e.g., $I_{HS}$) is distinct from the first intensity threshold (e.g., $I_H$).

In some embodiments, while detecting the touch input on the touch-sensitive surface, subsequent to determining that the intensity of the touch input on the touch-sensitive surface has changed from above the third intensity threshold to below the third intensity threshold, the device determines whether the intensity of the touch input on the touch-sensitive surface has changed from above a fourth intensity threshold (e.g., a mouse release threshold) to below the fourth intensity threshold, and in response to determining that the intensity of the touch input on the touch-sensitive surface has changed from above the fourth intensity threshold to below the fourth intensity threshold, generating a mouse up event that is distinct from the force up event. For example, as shown in FIG. 7M, the intensity of touch input 707 changes from above intensity threshold $I_{LD}$ (e.g., a fourth intensity threshold), to below intensity threshold $I_{LD}$. In some embodiments, the fourth intensity threshold (e.g., $I_{LD}$) is distinct from the second intensity threshold (e.g., $I_L$). In some embodiments, the fourth intensity threshold is identical to the second intensity threshold (e.g., $I_L$) as shown in FIG. 7I.

In some embodiments, while detecting the touch input on the touch-sensitive surface, the device determines (818) whether the intensity of the touch input on the touch-sensitive surface has changed, and in response to determining that the intensity of the touch input on the touch-sensitive surface has changed, generates a force changed event. For example, in FIG. 7C, force changed event 744 is generated in response to determining that the intensity of touch input 707 has changed (e.g., increased). In some embodiments, in response to determining that the intensity of the touch input on the touch-sensitive surface has changed, the device processes instructions in the web page that correspond to the force changed event. In some embodiments, the force changed event is distinct from the force down event and the force up event. In some embodiments, the instructions that correspond to the force changed event are distinct and separate from the instructions that correspond to the force down event and/or instructions that correspond to a force up event.

In some embodiments, the device also determines whether the intensity of the touch input on the touch-sensitive surface has changed without crossing over the first intensity threshold or the second intensity threshold, and in response to determining that the intensity of the touch input on the touch-sensitive surface has changed without crossing over the first intensity threshold or the second intensity threshold, the device generates the force changed event. In some embodiments, the device determines that the intensity of the touch input on the touch-sensitive surface has crossed over the first intensity threshold or the second intensity threshold, and in response, generates a mouse down event, a force down event, a force up event, or a mouse up event without generating a force changed event.

In some embodiments, the intensity of the touch input on the touch-sensitive surface must be detected to change by a predetermined amount before the device generates the force changed event (e.g., the change in the intensity of the touch input needs to be more than the predetermined amount to trigger a force changed event). In some embodiments, force changed events are generated in accordance with a predetermined time interval (e.g., force changed events are generated no more frequent than the predetermined time interval).

In some embodiments, while detecting the touch input on the touch-sensitive surface, in response to determining that the intensity of the touch input on the touch-sensitive surface has changed and determining that the touch input has not moved across the touch-sensitive surface, the device generates (820) the force changed event without generating a mouse moved event. For example, in FIG. 7X, because the touch input has not moved across the touch-sensitive surface when generating force changed event 796, a mouse moved event that corresponds to a change to a location of the touch input on the touch-sensitive surface is not generated. Thus, events that correspond to changes to the intensity of the touch input (e.g., force changed events) and events that correspond to changes to the location of the touch input (e.g., mouse moved event) are separated. If the device were configured to generate a mouse moved event that corresponds to no changes to a location of a touch input on the touch-sensitive surface (e.g., no movement of the touch input) in response to a change to the intensity of the touch input on the touch-sensitive surface, certain web pages, designed for mouse moved events that correspond to movements of a touch input across the touch-sensitive surface, may malfunction with a mouse moved event that corresponds to no movement of the touch input (e.g., dividing a certain value with a travel distance of the touch input would generate an error if the travel distance is zero). Thus, preventing generation of the mouse moved event that corresponds to no movement of the touch input (e.g., by separating force changed events and mouse moved events) reduces malfunctions and/or errors in processing such web pages.

In some embodiments, the force changed event is generated subsequent to determining that the intensity of the touch input on the touch-sensitive surface has changed from below the second intensity threshold to above the second intensity threshold and before determining that the intensity of the touch input on the touch-sensitive surface has changed from above the fourth intensity threshold to below the fourth intensity threshold. For example, in FIGS. 7A-7J, force changed events are generated only while the intensity of the touch input is above the intensity threshold $I_L$. In some embodiments, generation of the force changed event is forgone prior to determining that the intensity of the touch input on the touch-sensitive surface has changed from below the second intensity threshold to above the second intensity threshold (e.g., no force changed event is generated in FIG. 7A in response to a change in the intensity of the touch input) and/or after determining that the intensity of the touch input on the touch-sensitive surface has changed from above the fourth intensity threshold to below the fourth intensity threshold (e.g., no force changed event is generated in FIG. 7J in response to a change in the intensity of the touch input). Alternatively, the force changed event is generated regardless of whether the intensity of the touch input is above the intensity threshold $I_L$. For example, a force changed event is generated in response to a change to intensity applied by a touch input even when the intensity of the touch input is below the intensity threshold $I_L$, in some embodiments.

In some embodiments, while detecting the touch input on the touch-sensitive surface, and in response to detecting an input that includes movement of the touch input and a change in intensity of the touch input on the touch-sensitive surface, the device generates (822) one or more mouse moved events that correspond to the touch input and generates one or more force changed events that correspond to the touch input. The one or more force changed events are separate from the one or more mouse moved events. FIG. 7X illustrates that the device generates, for touch input 711, mouse moved events 790, 792, and 794 and force changed events 786, 788, and 796. In some embodiments, at least one of the one or more mouse moved events is generated concurrently with a respective force changed event of the one or more force changed events (e.g., mouse moved event 790 is generated concurrently with force changed event 788).

In some embodiments, the device provides the one or more force changed events (and optionally, the one or more mouse moved events) to a website that corresponds to the displayed web page. In some embodiments, in accordance with a determination that the website is not configured to accept force changed events, the one or more mouse moved events are provided to the website without the one or more force changed events. In accordance with a determination that the website is configured to accept force changed events, the one or more mouse moved events are provided to the website along with the one or more force changed events.

In some embodiments, while detecting the touch input on the touch-sensitive surface, in response to determining that force event will begin criteria are satisfied, the device generates (824, FIG. 8C) a will begin event (also called a "force will begin" event) that is distinct from the mouse down event. In some embodiments, the force event will begin criteria are deemed to be satisfied in accordance with a determination that the intensity of the touch input on the touch-sensitive surface has changed from a will begin intensity threshold to above the will begin intensity threshold. In some embodiments, the will begin intensity threshold is the same as the second intensity threshold (that corresponds to the mouse down event) (e.g., $I_L$ in FIG. 7B). In some embodiments, the will begin intensity threshold (e.g., $I_W$ in FIG. 7W) is distinct from the second intensity threshold (e.g., lower than the second intensity threshold $I_L$). In some embodiments, the force event will begin criteria are satisfied in accordance with a determination that a first application (e.g., a software component configured to render web pages, such as Web Engine Module 175 in FIG. 1A, or operating system 126) will initiate a default operation that corresponds to the second intensity threshold (e.g., an operation that occurs in response to, or is triggered by, the touch input reaching or exceeding the second intensity threshold). In some embodiments, the default operation is initiated in response to the touch input exceeding the second intensity threshold by a predetermined intensity margin (e.g., the default operation does not start immediately upon the touch input reaching the second intensity threshold, and rather, waits until the touch input exceeding the second intensity threshold by the predetermined intensity margin).

In some embodiments, the device is configured to perform default operations in accordance with an intensity of the touch input satisfying and further exceeding the will begin intensity threshold (e.g., a touch input that satisfies a force event preview threshold at which a preview of a force-based operation that will be performed when the intensity of the touch input reaches the first intensity threshold, where the force event preview intensity threshold is greater than the will begin intensity threshold). The will begin event can be used to prevent the default operations (e.g., default operations that depend on the intensity of the touch input), and optionally, initiate custom operations defined in the web page (e.g., display of a map as shown in FIG. 7V), instead of the default operations (e.g., display of a dictionary lookup as shown in FIG. 7R).

In some embodiments, a combination of the mouse down event and the force will begin event is used to determine that the device includes one or more sensors to detect intensity of contacts with the touch-sensitive surface (compared to legacy devices that do not include one or more sensors to detect intensity of contacts with the touch-sensitive surface). For example, a device that does not include one or more sensors to detect intensity of contacts with the touch-sensitive surface does not generate a force will begin event. In some embodiments, in response to determining that the device does not include one or more sensors to detect intensity of contacts with the touch-sensitive surface (e.g., based on the absence of the force will begin event), the device forgoes processing instructions that correspond to respective force events. In some embodiments, a device that includes one or more sensors to detect intensity of contacts with the touch-sensitive surface generates a force will begin event in temporal proximity to generating a mouse down event (e.g., concurrent generation as shown in FIG. 7B or proximate generation as shown in FIG. 7W), and determines that the device includes one or more sensors to detect intensity of contacts with the touch-sensitive surface based on generation of the force will begin event in temporal proximity to the mouse down event.

In some embodiments, while detecting the touch input on the touch-sensitive surface, and in response to determining that force event preview criteria are satisfied: in accordance with a determination that the web page does not include instructions that correspond to the will begin event, the device processes (826) the touch input in accordance with (e.g., default) instructions in the first application (e.g., a software component configured to rendering web pages, such as Web Engine Module 175 in FIG. 1A) that correspond to the will begin event. For example, this includes exemplary default operations such as showing an animation visually indicating a transition from the mouse down event to the force down event, showing a dictionary lookup of a corresponding word (if the touch input is detected at a location that corresponds to a word) as shown in FIGS. 7P-7R, and/or showing a preview of a linked web page (if the touch input is detected at a location that corresponds to a hyperlink or a word or phrase associated with a hyperlink). In some embodiments the force event preview criteria are based on the will begin intensity threshold. In some embodiments, the force event preview criteria are based on a force event preview intensity threshold that is greater than the will begin intensity threshold.

In some embodiments, in accordance with a determination that the web page includes instructions that correspond to the will begin event, the device forgoes processing the touch input in accordance with (e.g., default) instructions in the first application (e.g., a software component configured to rendering web pages, such as Web Engine Module 175 in FIG. 1A) that correspond to the will begin event (and, optionally, processing the instructions in the web page that correspond to the will begin event). Some examples of customized operations include showing a dictionary lookup from a customized dictionary instead of a default dictionary, preventing display of a preview, and displaying customized animations.

In some embodiments, processing the touch input in accordance with instructions in the web page is conditioned on a setting in the web page. For example, the web page includes instructions to define a property (e.g., "prevent default operations" property) and sets the property to either prevent default operations or allow default operations. In accordance with the setting of the property, the device conditionally processes the touch input in accordance with instructions in the web page (e.g., if the property is set to prevent default operations) or in accordance with default instructions (e.g., if the property is set to allow default operations). In some embodiments, the property is associated with a respective user interface object. For example, a first user interface object is associated with a property that is set to prevent default operations and a second user interface object is associated with a property that is set to allow default operations. In some embodiments, the property is adjusted while the device processes the touch input (or while the device processes the instructions in the web page). For example, the property is initially set to allow default operations, and in accordance with instructions in the web page, subsequently set to prevent default operations. Alternatively, the property is initially set to prevent default operations, and in accordance with instructions in the web page, subsequently set to allow default operations.

In some embodiments, the instructions in the web page that correspond to the force down event are processed (828) using a first application (e.g., a software component configured to rendering web pages, such as Web Engine Module 175 in FIG. 1A), and the device also generates a tactile output that corresponds to the force down event using a tactile output module (e.g., Haptic Feedback Module 133) that is distinct and separate from the first application. The tactile output that corresponds to the force down event is generated concurrently with processing the instructions in the web page that correspond to the force down event. For example, in FIG. 7R, concurrently with (or in temporal proximity to) the touch input reaching the high intensity threshold $I_H$, the device generates a tactile output, which serves as a haptic feedback indicating that the intensity applied by the touch input has reached the high intensity threshold $I_H$. In the example shown in FIG. 7R, the device also generates force down event 770 in response to the touch input 711 reaching the high intensity threshold $I_H$.

In some embodiments, the tactile output that corresponds to the force down event (e.g., force down event 770, FIG. 7R) is generated using the tactile output module without sending instructions from the first application to the tactile output module. For example, in FIG. 1A, contact/motion module 130 determines that the intensity of the touch input on the touch-sensitive surface has changed from below the first intensity threshold to above the first intensity threshold, and sends instructions or signals to both haptic feedback module 133 and web engine module 175. Haptic feedback module 133 initiates providing a tactile output (e.g., using haptic feedback controller 161 and tactile output generator(s) 163) while web engine module 175 independently processes instructions in web page 185 to update the display. Thus, although operations of haptic feedback module 133 and web engine module 175 are coordinated (by the contact/motion module 130), there is no need for web engine module 175 to send instructions to haptic feedback module 133 or for haptic feedback module 133 to send instructions to web engine module 175. This reduces the operational burden on Web Engine Module 175, and thus, improves the efficiency in processing touch inputs in accordance with instructions in the web page (and providing tactile outputs).

In some embodiments, the device generates a tactile output that corresponds to the force up event using the tactile output module (e.g., Haptic Feedback Module 133) that is distinct and separate from the first application (e.g., Web Engine Module 175). In some embodiments, the tactile output that corresponds to the force up event is generated using the tactile output module without sending instructions from the first application to the tactile output module. In some embodiments, the tactile output module generates the tactile output based on the intensity determined by the one or more sensors.

In some embodiments, the force down and force up events are generated by a software component other than the first application (e.g., contact/motion module 130) and provided to the first application (e.g., Web Engine Module 175) so that the first application updates the user interface in coordination with the tactile output to be generated by the tactile output module when the touch input reaches the triggering intensity threshold. In this example, the tactile output is not generated in response the force down event (because the force down event is not sent to the tactile output module), rather, the force down event is provided to the first application to generate a visual or audible output in conjunction with the tactile output (if it is configured to do so). The tactile outputs are generated in response to signals or instructions, other than force down events or force up events.

In some embodiments, the first location on the touch-sensitive surface corresponds (830) to a first user interface object. The instructions in the web page that correspond to the mouse down event correspond to the first user interface object, and the instructions in the web page that correspond to the force down event correspond to the first user interface object. For example, instructions in the web page are configured to operate with respect to respective user interface objects (e.g., a first set of instructions for a force down event is configured for processing a force down event that corresponds to a first user interface object and a second set of instructions for a force down event is configured for processing a force down event that corresponds to a second user interface object). FIG. 7T illustrates generation of a mouse down event (e.g., highlighting the text "Gettysburg") that corresponds to the text "Gettysburg" (e.g., a first user interface object) under focus selector 706, and FIG. 7V illustrates generation of a force down event (e.g., displaying and/or locking pop-up view 712) that corresponds to the text "Gettysburg" (e.g., the first user interface object).

In some embodiments, the web page defines a plurality of user interface objects and includes a plurality of sets of instructions that correspond to a force down event. Respective sets of instructions correspond to a force down event for respective user interface objects. For example, the web page includes (i) information defining the first user interface object and a second user interface object and (ii) instructions that correspond to a force down event for the first user interface object and instructions that correspond to a force down event for the second user interface object. Similarly, the web page may include location-specific or user-interface-object-specific instructions that correspond to events of different types (e.g., force up event, force changed event, and will begin event). In some embodiments, the web page includes (i) information defining the first user interface object and the second user interface object and (ii) instructions that correspond to a will begin event for the first user interface object and instructions that correspond to a will begin event for the second user interface object.

It should be understood that the particular order in which the operations in FIGS. 8A-8C have been described is merely exemplary and is not intended to indicate that the described order is the only order in which the operations could be performed. One of ordinary skill in the art would recognize various ways to reorder the operations described herein. For example, in some embodiments, a method performed at an electronic device with a touch-sensitive surface, a display, and one or more sensors to detect intensity of contacts with the touch-sensitive surface includes, while displaying a user interface that corresponds to at least a portion of a web page on the display, detecting a touch input on the touch-sensitive surface at a first location that corresponds to the displayed portion of the web page on the display. The method also includes, while detecting the touch input on the touch-sensitive surface, detecting an intensity of the touch input on the touch-sensitive surface (e.g., with the one or more sensors); determining whether the intensity of the touch input on the touch-sensitive surface has changed from below a first intensity threshold (e.g., a low intensity threshold, such as a mouse down intensity threshold) to above the first intensity threshold; and, in response to determining that the intensity of the touch input on the touch-sensitive surface has changed from below the first intensity threshold to above the first intensity threshold, generating a mouse down event (and optionally, processing instructions in the web page that correspond to a mouse down event). The method further includes, subsequent to determining that the intensity of the touch input on the touch-sensitive surface has changed from below the first intensity threshold to above the first intensity threshold, detecting the intensity of the touch input on the touch-sensitive surface; determining whether the intensity of the touch input on the touch-sensitive surface has changed from below a second intensity threshold (e.g., a high intensity threshold, such as a force down intensity threshold) that is distinct from the first intensity threshold to above the second intensity threshold; and, in response to determining that the intensity of the touch input on the touch-sensitive surface has changed from below the second intensity threshold to above the second intensity threshold, generating a force down event that is distinct from the mouse down event. For brevity, these details are not repeated herein.

Additionally, it should be noted that details of other processes described herein with respect to other methods described herein (e.g., method 900) are also applicable in an analogous manner to method 800 described above with respect to FIGS. 8A-8C. For example, the web pages, touch inputs, user interface objects, intensity thresholds, and animations described above with reference to method 800 optionally have one or more of the characteristics of the web pages, touch inputs, user interface objects, intensity thresholds, and animations described herein with reference to other methods described herein (e.g., method 900). For brevity, these details are not repeated here.

FIG. 9 is a flow diagram illustrating method 900 of processing touch inputs based on an association of displayed content in accordance with some embodiments. Method 900 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 900 are, optionally, combined and/or the order of some operations is, optionally, changed.

As described below, method 900 provides an enhanced way to process touch inputs based on displayed content. Method 900 improves efficiency in accessing information associated with web pages. For example, by providing an enlarged image in response to a touch input on an image when the image is not associated with a linked content (e.g., not associated with a hyperlink) and providing a preview of the linked content in response to a touch input on an image when the image is associated with the linked content (e.g., associated with a hyperlink), method 900 provides additional information (be it an enlarged image or a preview of a linked content) associated with the image, thereby facilitating use of the information on the web page. In some circumstances, efficiency is increased because the additional information (e.g., preview of the linked content) enables the user to avoid selecting content (and thus switching to a new context corresponding to that content) not of current interest to the user, and to concentrate the user's efforts on other content more directly of current interest to the user.

The device displays (902), on the display, a content region including first content that contains an image (e.g., the web page with image 704, as shown in FIG. 7AA).

In some embodiments, the content region is (904) a content region of a web browser. The first content is a first web page. The image is an image in the first web page. For example, the user interface shown in FIG. 7AA is a user interface of a web browser that includes display of a web page with image 704 in the web page.

While displaying the first content in the content region on the display, the device detects (906) an input at a location that corresponds to the location of the image on the display (e.g., touch input 707 on touch-sensitive surface 651 while focus selector 706 is positioned over image 704, or a touch input on display 650 over image 704 when display 650 is a touch-sensitive display).

In response to detecting the input, the device, in accordance with a determination that the input includes an intensity above a respective threshold and that the image is associated with a link to second content that is different from the first content, displays (908) a preview of the second content while maintaining display of at least a portion of the first content in the content region. For example, in FIG. 7EE, the intensity applied by touch input 707 reaches (or exceeds) the high intensity threshold $I_H$ (and image 704 is associated with a link to a different web page). In response, the device displays a preview of the linked content in display region 716 while a portion of the web page remains on display 650.

In some embodiments, the second content is (910) a second web page. The link to the second content is a hyperlink to the second web page that is associated with the image. For example, in FIGS. 7DD-7EE, image 704 is associated with a hyperlink to the second webpage (e.g., the web page includes HTML tags, such as <a href="URL of the second page"><img src="filename of image 704" width="100" height="100" border="0" ></a>).

In accordance with a determination that the input includes an intensity above the respective threshold and that the image is not associated with a link to additional content, the device displays (912) an enlarged version of the image while maintaining display of at least a portion of the first content in the content region. For example, in FIG. 7CC, the intensity applied by touch input 707 reaches (or exceeds) the high intensity threshold $I_H$ (and image 704 is not associated with a link to a different web page). In response, the device displays an enlarged version of image 704 in display region 708 while a portion of the web page remains on display 650.

In some embodiments, displaying the preview of the second content includes (914) enlarging the image as the intensity of the input increases (e.g., display region 708 and the image in display region 708 enlarge as the intensity of touch input 707 increases, as shown in FIGS. 7BB-7CC). Displaying the enlarged version of the image includes enlarging the preview as the intensity of the input increases (e.g., display region 716 and the preview in display region 716 enlarge as the intensity of touch input 707 increases, as shown in FIGS. 7DD-7EE). In some embodiments, the touch-sensitive surface and the display are integrated (e.g., a touch-sensitive display) and the input is detected on the touch-sensitive display. In some embodiments, the image enlarges as the intensity of the input on the touch-sensitive display increases. In some embodiments, the preview enlarges as the intensity of the input on the touch-sensitive display increases.

In some embodiments, the device, in response to detecting the input and in accordance with a determination that the input does not include an intensity above the respective threshold and that the image is associated with a link to the second content, replaces (916) display of the first content in the content region with the second content. For example, as shown in FIG. 7FF, in response to detecting touch input 707 and in accordance with a determination that the intensity of touch input 707 does not reach (or exceed) the high intensity threshold $I_H$ (and image 704 is associated with a link to a different web page), display of the web page (shown in FIG. 7AA) is replaced with display of the linked web page (e.g., as in response to a conventional mouse click on a hyperlinked object on a web page). Alternatively, in some embodiments, the determination that causes the device to replace the display of the first content in the content region with second content is a determination that the intensity of the input increases above first threshold (e.g., low threshold, $I_L$, FIG. 7EE) and then decreases below the first threshold without increasing above the respective threshold (e.g., high threshold, $I_H$, FIG. 7EE).

In some embodiments, the device, in response to detecting the input and in accordance with a determination that the input does not include an intensity above the respective threshold and that the image is not associated with a link to additional content, maintains (918) display of the first content in the content region. For example, display of the web page remains on the display, as shown in FIG. 7C (e.g., as in response to a conventional mouse click on a web page object that is not associated with a hyperlink).

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 800) are also applicable in an analogous manner to method 900 described above with respect to FIG. 9. For example, the web pages, touch inputs, user interface objects, intensity thresholds, and animations described above with reference to method 900 optionally have one or more of the characteristics of the web pages, touch inputs, user interface objects, intensity thresholds, and animations described herein with reference to other methods described herein (e.g., method 800). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8C and FIG. 9 are, optionally, implemented by components depicted in FIGS. 1A-1B. For example, intensity detection operation 808, event generation operation 812, and instruction processing operation 814 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at an electronic device with a touch-sensitive surface and a display, wherein the touch-sensitive surface includes one or more sensors to detect intensity of contacts with the touch-sensitive surface; and the electronic device stores a web browser application that includes instructions for processing force down events and a web page that includes instructions for processing force down events:
      while displaying, using the web browser application, a user interface that corresponds to at least a portion of the web page on the display, detecting a touch input on the touch-sensitive surface at a first location that corresponds to the displayed portion of the web page on the display; and,
      while detecting the touch input on the touch-sensitive surface:
         detecting an intensity of the touch input on the touch-sensitive surface;

in response to determining that force-event-will-begin criteria are satisfied:
    generating a will begin event that is distinct from a mouse down event; and
    disabling the instructions, in the web browser application, for processing force down events; and,
after generating the will begin event:
    determining whether the intensity of the touch input on the touch-sensitive surface has changed from below a force-down intensity threshold to above the force-down intensity threshold; and,
    in response to determining that the intensity of the touch input on the touch-sensitive surface has changed from below the force-down intensity threshold to above the force-down intensity threshold:
        generating a force down event that is distinct from the mouse down event and the will begin event;
        forgoing execution of the instructions, in the web browser application, for processing force down events, and thereby forgoing processing of the force down event by said instructions in the web browser application; and
        updating the user interface by executing the instructions, in the web page, for processing force down events so as to process the force down event.

2. The method of claim 1, including:
while detecting the touch input on the touch-sensitive surface, receiving an input that corresponds to a request to generate a mouse down event; and,
in response to receiving the input that corresponds to a request to generate a mouse down event, generating the mouse down event.

3. The method of claim 2, including:
while detecting the touch input on the touch-sensitive surface:
    determining whether the intensity of the touch input on the touch-sensitive surface has changed from below a mouse-down intensity threshold that is distinct from the force-down intensity threshold to above the mouse-down intensity threshold;
    in response to determining that the intensity of the touch input on the touch-sensitive surface has changed from below the mouse-down intensity threshold to above the mouse-down intensity threshold, generating a mouse down event.

4. The method of claim 3, wherein:
the mouse-down intensity threshold is lower than the force-down intensity threshold.

5. The method of claim 1, including:
while detecting the touch input on the touch-sensitive surface:
    subsequent to determining that the intensity of the touch input on the touch-sensitive surface has changed from below the force-down intensity threshold to above the force-down intensity threshold, determining whether the intensity of the touch input on the touch-sensitive surface has changed from above a force-up intensity threshold to below the force-up intensity threshold; and,
    in response to determining that the intensity of the touch input on the touch-sensitive surface has changed from above the force-up intensity threshold to below the force-up intensity threshold, generating a force up event that is distinct from the force down event.

6. The method of claim 1, including:
generating a tactile output that corresponds to the force down event using a tactile output module that is distinct and separate from the web browser application, wherein the tactile output that corresponds to the force down event is generated concurrently with executing the instructions in the web page for processing force down events so as to process the force down event.

7. The method of claim 1, including:
while detecting the touch input on the touch-sensitive surface:
    determining whether the intensity of the touch input on the touch-sensitive surface has changed; and,
    in response to determining that the intensity of the touch input on the touch-sensitive surface has changed, generating a force changed event.

8. The method of claim 7, including:
while detecting the touch input on the touch-sensitive surface:
    in response to determining that the intensity of the touch input on the touch-sensitive surface has changed and determining that the touch input has not moved across the touch-sensitive surface, generating the force changed event without generating a mouse moved event.

9. The method of claim 7, including:
while detecting the touch input on the touch-sensitive surface:
    in response to detecting an input that includes a movement of the touch input and a change in the intensity of the touch input on the touch-sensitive surface, generating one or more mouse moved events that correspond to the touch input and generating one or more force changed events that correspond to the touch input, wherein the one or more force changed events are separate from the one or more mouse moved events.

10. The method of claim 1, wherein:
the web browser application includes instructions for processing a particular type of force event that is distinct from the force down event; and
the method includes, in accordance with generating the will begin event, disabling the instructions, in the web browser application, for processing the particular type of force event.

11. The method of claim 1, including:
while detecting the touch input on the touch-sensitive surface;
    in response to determining that force event preview criteria are satisfied:
        in accordance with a determination that the web page does not include instructions for processing a particular type of force event that is distinct from the force down event, processing the touch input in accordance with instructions in the web browser application for processing the particular type of force event; and,
        in accordance with a determination that the web page includes instructions for processing the particular type of force event, forgoing processing the touch input in accordance with instructions in the web browser application for processing the particular type of force event.

12. The method of claim 1, wherein:
the first location on the touch-sensitive surface corresponds to a first user interface object;
the web page includes instructions, corresponding to the first user interface object, for processing mouse down events; and
the instructions in the web page for processing force down events correspond to the first user interface object.

13. The method of claim 1, including:
determining whether the intensity of the touch input on the touch-sensitive surface has changed from below a force-event-will-begin intensity threshold to above the force-event-will-begin intensity threshold, wherein the force-event-will-begin intensity threshold is lower than the force-down intensity threshold; and
in response to determining that the intensity of the touch input on the touch-sensitive surface has changed from below the force-event-will-begin intensity threshold to above the force-event-will-begin intensity threshold, generating the will begin event.

14. The method of claim 1, wherein:
updating the user interface include updating the user interface in conjunction with the generation of the force down event.

15. The method of claim 1, including transmitting the will begin event to the web page, wherein the will begin event enables the web page to perform one or more actions before the intensity of the touch input increases above the force-down intensity threshold.

16. An electronic device, comprising:
a display;
a touch-sensitive surface;
one or more sensors to detect intensity of contacts with the touch-sensitive surface;
one or more processors;
memory storing a web browser application that includes instructions for processing force down events and a web page that includes instructions for processing force down events; and
one or more programs, wherein the one or more programs are stored in the memory and configured to be executed by the one or more processors, the one or more programs including instructions for:
while displaying, using the web browser application, a user interface that corresponds to at least a portion of the web page on the display, detecting a touch input on the touch-sensitive surface at a first location that corresponds to the displayed portion of the web page on the display; and,
while detecting the touch input on the touch-sensitive surface:
detecting an intensity of the touch input on the touch-sensitive surface;
in response to determining that force-event-will-begin criteria are satisfied:
generating a will begin event that is distinct from a mouse down event; and
disabling the instructions, in the web browser application, for processing force down events; and,
after generating the will begin event:
determining whether the intensity of the touch input on the touch-sensitive surface has changed from below a force-down intensity threshold to above the force-down intensity threshold; and,
in response to determining that the intensity of the touch input on the touch-sensitive surface has changed from below the force-down intensity threshold to above the force-down intensity threshold:
generating a force down event that is distinct from the mouse down event and the will begin event;
forgoing execution of the instructions, in the web browser application, for processing force down events, and thereby forgoing processing of the force down event by said instructions in the web browser application; and
updating the user interface by executing the instructions, in the web page, for processing force down events so as to process the force down event.

17. The electronic device of claim 16, wherein:
the web browser application includes instructions for processing a particular type of force event that is distinct from the force down event; and
the one or more programs include instructions for, in accordance with generating the will begin event, disabling the instructions, in the web browser application, for processing the particular type of force event.

18. The electronic device of claim 16, wherein the one or more programs include instructions for:
while detecting the touch input on the touch-sensitive surface, receiving an input that corresponds to a request to generate a mouse down event; and,
in response to receiving the input that corresponds to a request to generate a mouse down event, generating the mouse down event.

19. The electronic device of claim 18, wherein the one or more programs include instructions for:
while detecting the touch input on the touch-sensitive surface:
determining whether the intensity of the touch input on the touch-sensitive surface has changed from below a mouse-down intensity threshold that is distinct from the force-down intensity threshold to above the mouse-down intensity threshold;
in response to determining that the intensity of the touch input on the touch-sensitive surface has changed from below the mouse-down intensity threshold to above the mouse-down intensity threshold, generating a mouse down event.

20. The electronic device of claim 19, wherein:
the mouse-down intensity threshold is lower than the force-down intensity threshold.

21. The electronic device of claim 16, wherein the one or more programs include instructions for:
while detecting the touch input on the touch-sensitive surface:
subsequent to determining that the intensity of the touch input on the touch-sensitive surface has changed from below the force-down intensity threshold to above the force-down intensity threshold, determining whether the intensity of the touch input on the touch-sensitive surface has changed from above a force-up intensity threshold to below the force-up intensity threshold; and,
in response to determining that the intensity of the touch input on the touch-sensitive surface has changed from above the force-up intensity threshold to below the force-up intensity threshold, generating a force up event that is distinct from the force down event.

22. The electronic device of claim 16, wherein the one or more programs include instructions for:
generating a tactile output that corresponds to the force down event using a tactile output module that is distinct and separate from the web browser application, wherein the tactile output that corresponds to the force down event is generated concurrently with executing the instructions in the web page for processing force down events so as to process the force down event.

23. The electronic device of claim 16, wherein the one or more programs include instructions for:
while detecting the touch input on the touch-sensitive surface:
determining whether the intensity of the touch input on the touch-sensitive surface has changed; and,
in response to determining that the intensity of the touch input on the touch-sensitive surface has changed, generating a force changed event.

24. The electronic device of claim 23, wherein the one or more programs include instructions for:
while detecting the touch input on the touch-sensitive surface:
in response to determining that the intensity of the touch input on the touch-sensitive surface has changed and determining that the touch input has not moved across the touch-sensitive surface, generating the force changed event without generating a mouse moved event.

25. The electronic device of claim 23, wherein the one or more programs include instructions for:
while detecting the touch input on the touch-sensitive surface:
in response to detecting an input that includes a movement of the touch input and a change in the intensity of the touch input on the touch-sensitive surface, generating one or more mouse moved events that correspond to the touch input and generating one or more force changed events that correspond to the touch input, wherein the one or more force changed events are separate from the one or more mouse moved events.

26. The electronic device of claim 16, wherein the one or more programs include instructions for:
while detecting the touch input on the touch-sensitive surface;
in response to determining that force event preview criteria are satisfied:
in accordance with a determination that the web page does not include instructions for processing a particular type of force event that is distinct from the force down event, processing the touch input in accordance with instructions in the web browser application for processing the particular type of force event; and,
in accordance with a determination that the web page includes instructions for processing the particular type of force event, forgoing processing the touch input in accordance with instructions in the web browser application for processing the particular type of force event.

27. The electronic device of claim 16, wherein:
the first location on the touch-sensitive surface corresponds to a first user interface object;
the web page includes instructions, corresponding to the first user interface object, for processing mouse down events; and
the instructions in the web page for processing force down events correspond to the first user interface object.

28. The electronic device of claim 16, wherein the one or more programs include instructions for:
determining whether the intensity of the touch input on the touch-sensitive surface has changed from below a force-event-will-begin intensity threshold to above the force-event-will-begin intensity threshold, wherein the force-event-will-begin intensity threshold is lower than the force-down intensity threshold; and
in response to determining that the intensity of the touch input on the touch-sensitive surface has changed from below the force-event-will-begin intensity threshold to above the force-event-will-begin intensity threshold, generating the will begin event.

29. The electronic device of claim 16, wherein the one or more programs include instructions for:
updating the user interface include updating the user interface in conjunction with the generation of the force down event.

30. The electronic device of claim 16, wherein the one or more programs include instructions for transmitting the will begin event to the web page, wherein the will begin event enables the web page to perform one or more actions before the intensity of the touch input increases above the force-down intensity threshold.

31. A non-transitory computer readable storage medium storing one or more programs, the one or more programs comprising instructions, which, when executed by an electronic device that stores a web browser application that includes instructions for processing force down events and a web page that includes instructions for processing force down events and includes a display, a touch-sensitive surface, and one or more sensors to detect intensity of contacts with the touch-sensitive surface, cause the device to:
while displaying, using the web browser application, a user interface that corresponds to at least a portion of the web page on the display, detect a touch input on the touch-sensitive surface at a first location that corresponds to the displayed portion of the web page on the display; and,
while detecting the touch input on the touch-sensitive surface:
detect an intensity of the touch input on the touch-sensitive surface;
in response to determining that force-event-will-begin criteria are satisfied:
generate a will begin event that is distinct from a mouse down event; and
disable the instructions, in the web browser application, for processing force down events; and,
after generating the will begin event:
determine whether the intensity of the touch input on the touch-sensitive surface has changed from below a force-down intensity threshold to above the force-down intensity threshold; and,
in response to determining that the intensity of the touch input on the touch-sensitive surface has changed from below the force-down intensity threshold to above the force-down intensity threshold:
generate a force down event that is distinct from the mouse down event and the will begin event;

forgo execution of the instructions, in the web browser application, for processing force down events, and thereby forgoing processing of the force down event by said instructions in the web browser application; and update the user interface by executing the instructions, in the web page, for processing force down events so as to process the force down event.

32. The non-transitory computer readable storage medium of claim 31, wherein:

the web browser application includes instructions for processing a particular type of force event that is distinct from the force down event; and the one or more programs include instructions for, in accordance with generating the will begin event, disabling the instructions, in the web browser application, for processing the particular type of force event.

33. The computer readable storage medium of claim 31, wherein the one or more programs include instructions, which, when executed by the electronic device, cause the electronic device to:

while detecting the touch input on the touch-sensitive surface, receive an input that corresponds to a request to generate a mouse down event; and, in response to receiving the input that corresponds to a request to generate a mouse down event, generate the mouse down event.

34. The computer readable storage medium of claim 33, wherein the one or more programs include instructions, which, when executed by the electronic device, cause the electronic device to:

while detecting the touch input on the touch-sensitive surface:

determine whether the intensity of the touch input on the touch-sensitive surface has changed from below a mouse-down intensity threshold that is distinct from the force-down intensity threshold to above the mouse-down intensity threshold;

in response to determining that the intensity of the touch input on the touch-sensitive surface has changed from below the mouse-down intensity threshold to above the mouse-down intensity threshold, generate a mouse down event.

35. The computer readable storage medium of claim 34, wherein:

the mouse-down intensity threshold is lower than the force-down intensity threshold.

36. The computer readable storage medium of claim 31, wherein the one or more programs include instructions, which, when executed by the electronic device, cause the electronic device to:

while detecting the touch input on the touch-sensitive surface:

subsequent to determining that the intensity of the touch input on the touch-sensitive surface has changed from below the force-down intensity threshold to above the force-down intensity threshold, determine whether the intensity of the touch input on the touch-sensitive surface has changed from above a force-up intensity threshold to below the force-up intensity threshold; and, in response to determining that the intensity of the touch input on the touch-sensitive surface has changed from above the force-up intensity threshold to below the force-up intensity threshold, generate a force up event that is distinct from the force down event.

37. The computer readable storage medium of claim 31, wherein the one or more programs include instructions, which, when executed by the electronic device, cause the electronic device to:

generate a tactile output that corresponds to the force down event using a tactile output module that is distinct and separate from the web browser application, wherein the tactile output that corresponds to the force down event is generated concurrently with executing the instructions in the web page for processing force down events so as to process the force down event.

38. The computer readable storage medium of claim 31, wherein the one or more programs include instructions, which, when executed by the electronic device, cause the electronic device to:

while detecting the touch input on the touch-sensitive surface:

determine whether the intensity of the touch input on the touch-sensitive surface has changed; and, in response to determining that the intensity of the touch input on the touch-sensitive surface has changed, generate a force changed event.

39. The computer readable storage medium of claim 38, wherein the one or more programs include instructions, which, when executed by the electronic device, cause the electronic device to:

while detecting the touch input on the touch-sensitive surface:

in response to determining that the intensity of the touch input on the touch-sensitive surface has changed and determining that the touch input has not moved across the touch-sensitive surface, generate the force changed event without generating a mouse moved event.

40. The computer readable storage medium of claim 38, wherein the one or more programs include instructions, which, when executed by the electronic device, cause the electronic device to:

while detecting the touch input on the touch-sensitive surface:

in response to detecting an input that includes a movement of the touch input and a change in the intensity of the touch input on the touch-sensitive surface, generate one or more mouse moved events that correspond to the touch input and generate one or more force changed events that correspond to the touch input, wherein the one or more force changed events are separate from the one or more mouse moved events.

41. The computer readable storage medium of claim 31, wherein the one or more programs include instructions, which, when executed by the electronic device, cause the electronic device to:

while detecting the touch input on the touch-sensitive surface;

in response to determining that force event preview criteria are satisfied:

in accordance with a determination that the web page does not include instructions for processing a particular type of force event that is distinct from the force down event, process the touch input in accordance with instructions in the web browser application for processing the particular type of force event; and, in accordance with a determination that the web page includes instructions for processing the particular type of force event, forgo processing the touch input in accordance with instructions in the web browser application for processing the particular type of force event.

42. The computer readable storage medium of claim 31, wherein:
the first location on the touch-sensitive surface corresponds to a first user interface object;
the web page includes instructions, corresponding to the first user interface object, for processing mouse down events; and
the instructions in the web page for processing force down events correspond to the first user interface object.

43. The computer readable storage medium of claim 31, wherein the one or more programs include instructions, which, when executed by the electronic device, cause the electronic device to:
determine whether the intensity of the touch input on the touch-sensitive surface has changed from below a force-event-will-begin intensity threshold to above the force-event-will-begin intensity threshold, wherein the force-event-will-begin intensity threshold is lower than the force-down intensity threshold; and
in response to determining that the intensity of the touch input on the touch-sensitive surface has changed from below the force-event-will-begin intensity threshold to above the force-event-will-begin intensity threshold, generate the will begin event.

44. The computer readable storage medium of claim 31, wherein the one or more programs include instructions, which, when executed by the electronic device, cause the electronic device to:
update the user interface include updating the user interface in conjunction with the generation of the force down event.

45. The computer readable storage medium of claim 31, wherein:
the one or more programs include instructions, which, when executed by the electronic device, cause the electronic device to transmit the will begin event to the web page; and
the will begin event enables the web page to perform one or more actions before the intensity of the touch input increases above the force-down intensity threshold.

* * * * *

UNITED STATES PATENT AND TRADEMARK OFFICE
CERTIFICATE OF CORRECTION

PATENT NO. : 9,830,048 B2  
APPLICATION NO. : 14/866489  
DATED : November 28, 2017  
INVENTOR(S) : Dakin et al.

Page 1 of 1

It is certified that error appears in the above-identified patent and that said Letters Patent is hereby corrected as shown below:

In the Claims

Claim 14, Column 65, Line 22, please delete "include updating" and insert --includes updating--;

Claim 29, Column 68, Lines 21-22, please delete "include updating the user interface";

Claim 44, Column 72, Lines 12-13, please delete "include updating the user interface".

Signed and Sealed this
Thirtieth Day of January, 2018

Joseph Matal
*Performing the Functions and Duties of the
Under Secretary of Commerce for Intellectual Property and
Director of the United States Patent and Trademark Office*